United States Patent
Gantier

(10) Patent No.: US 12,448,622 B2
(45) Date of Patent: Oct. 21, 2025

(54) OLIGONUCLEOTIDES

(71) Applicant: HUDSON INSTITUTE OF MEDICAL RESEARCH, Clayton (AU)

(72) Inventor: Michael Gantier, McKinnon (AU)

(73) Assignee: Hudson Institute of Medical Research, Clayton (AU)

(*) Notice: Subject to any disclaimer, the term of this patent is extended or adjusted under 35 U.S.C. 154(b) by 0 days.

(21) Appl. No.: 18/213,116

(22) Filed: Jun. 22, 2023

(65) Prior Publication Data

US 2024/0287510 A1    Aug. 29, 2024

Related U.S. Application Data

(63) Continuation of application No. 17/926,383, filed as application No. PCT/AU2021/050469 on May 19, 2021.

(30) Foreign Application Priority Data

May 19, 2020   (AU) ................. 2020901606

(51) Int. Cl.
| | | |
|---|---|---|
| C12N 15/113 | (2010.01) | |
| A61K 45/06 | (2006.01) | |
| C12N 15/11 | (2006.01) | |

(52) U.S. Cl.
CPC ............ *C12N 15/113* (2013.01); *A61K 45/06* (2013.01); *C12N 15/111* (2013.01); *C12N 2310/11* (2013.01); *C12N 2310/315* (2013.01); *C12N 2310/321* (2013.01); *C12N 2310/3231* (2013.01); *C12N 2310/341* (2013.01); *C12N 2310/344* (2013.01); *C12N 2320/53* (2013.01)

(58) Field of Classification Search
CPC . C12N 15/113; C12N 15/111; C12N 2310/11; C12N 2310/315; C12N 2310/321; C12N 2310/3231; C12N 2310/341; C12N 2310/344; C12N 2320/53; A61K 45/06
See application file for complete search history.

(56) References Cited

U.S. PATENT DOCUMENTS

| | | | |
|---|---|---|---|
| 6,320,041 B1 | 11/2001 | Hogrefe et al. | |
| 8,361,753 B2 | 1/2013 | Zon et al. | |
| 9,631,227 B2 | 4/2017 | Paul et al. | |
| 10,238,682 B2 * | 3/2019 | Hartmann | A61P 43/00 |
| 10,441,653 B2 * | 10/2019 | Hoerr | C12N 15/117 |
| 10,494,399 B2 | 12/2019 | Hogrefe et al. | |
| 10,519,189 B2 | 12/2019 | Hogrefe et al. | |
| 10,913,768 B2 | 2/2021 | Hogrefe et al. | |
| 2005/0239733 A1 | 10/2005 | Jurk et al. | |
| 2012/0121551 A1 | 5/2012 | Hartmann et al. | |
| 2017/0275672 A1 | 9/2017 | Paul et al. | |
| 2018/0273576 A1 | 9/2018 | Hogrefe et al. | |
| 2019/0144490 A1 | 5/2019 | Hogrefe et al. | |
| 2019/0270766 A1 | 9/2019 | Hogrefe et al. | |

FOREIGN PATENT DOCUMENTS

| | | | | |
|---|---|---|---|---|
| WO | 03/86280 A2 | 10/2003 | | |
| WO | 2006/063252 A2 | 6/2006 | | |
| WO | WO 2007/031319 | 3/2007 | | |
| WO | 2008/019486 A1 | 2/2008 | | |
| WO | WO-2009060281 A2 * | 5/2009 | ......... | A61K 31/7088 |
| WO | 2018/184003 A1 | 10/2018 | | |
| WO | 2021/232099 A1 | 11/2021 | | |

OTHER PUBLICATIONS

Kandimalla, E.R. et al. "Mixed backbone antisense oligonucleotides: design, biochemical and biological properties of olignonucleotides containing 2'-5'-ribo- and 3'-5'-deoxyribonucleotide segments". Nucleic Acid Research, vol. 25, No. 2 (1997), pp. 370-378 (Year: 1997).*
Gorden, K.K.B. et al. "Oligodeoxynucleotides differentially modulate activation of TLR7 and TLR8 by imidazoquinolines".The Journal of Immunology, vol. 177, No. 11 (2006), pp. 8164-8170 (Year: 2006).*
Diebold, S.S. et al. "Nucleic acid agonists for Toll-like receptor 7 are defined by the presence of uridine ribonucleotides". European Journal of Immunology, vol. 36 (2006), pp. 3256-3267. (Year: 2006).*
Diebold, S.S. et al. "Nucleic acid agonists for Toll-like receptor 7 are defined by the presence of uridine ribonucleotides". European Journal of Immunology, vol. 36 (2006), pp. 3256-3267—Supporting Information—Supplemental Data Pdf. (Year: 2006).*
Sharaf, M.L. "Exploring the immunogenicity and therapeutic applications of boranophosphate-modified RNA:siRNA and RNA Aptamers." Department of Chemistry in the Graduate School of Duke University (2011). UMI No. 3453181. (Year: 2011).*
Bernard, M.A. et al. Novel HIV-1 MiRNAs Stimulate TNFa Release in Human Macrophages via TLR8 Signaling Pathway. PLOS One, vol. 9 (2014), p: e106006. (Year: 2014).*
Agrawal et al., "Mixed-backbone oligonucleotides as second generation antisense oligonucleotides: In vitro and in vivo studies", Proc. Natl. Acad. Sci. USA, vol. 94:2620-2625.
Goodchild et al., "Sequence determinants of innate immune activation by short interfering RNAs", BMC Immunology, 10:40, 2009.
Gorden, "Oligodeoxynucleotides differentially modulate activation of TLR7 and TLR8 by imidazoquinolines", J. Immunol. vol. 177:8164-1870, 2006.
Jurk et al., "Modulating responsiveness of human TLR7 and * to small molecule ligands with T-rich phosphorothiate oligodeoxynucleotides", Eur. J. Immunol. vol. 36:1815-1826, 2006.

(Continued)

*Primary Examiner* — Neil P Hammell
*Assistant Examiner* — Alexandra Geraldine Dace Denito
(74) *Attorney, Agent, or Firm* — MARSHALL, GERSTEIN & BORUN LLP

(57) ABSTRACT

The present invention relates to oligonucleotides that maintain a Toll-Like Receptor 7 (TLR7) response and/or which potentiate Toll-Like Receptor 8 (TLR8) sensing.

19 Claims, 18 Drawing Sheets

Figure 1:
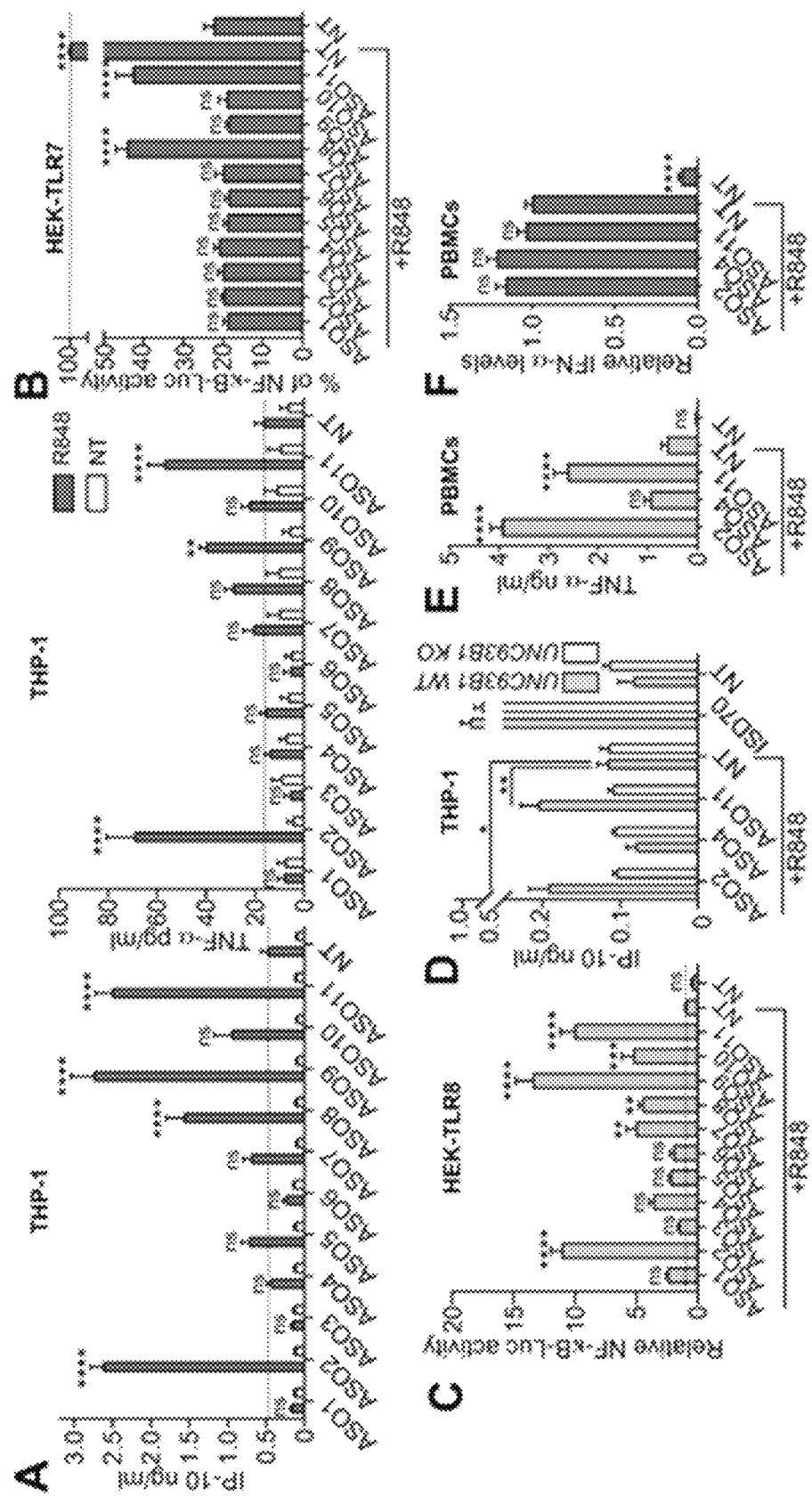
Figure 1:
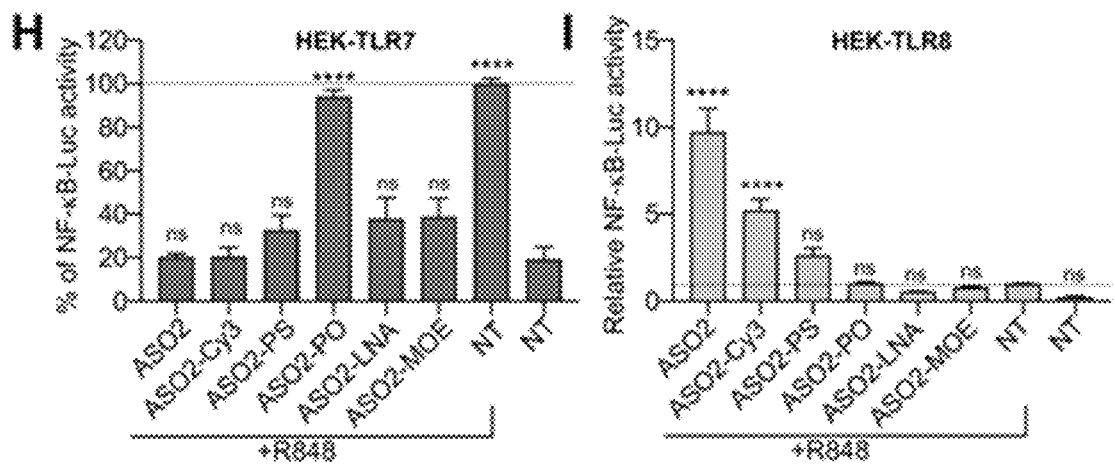

Specification includes a Sequence Listing.

(56) References Cited

OTHER PUBLICATIONS

Kandimalla et al., "Mixed backbone antisense oligonucleotides: design, biochemical and biological properties of oligonucleotides containing 2'-5'-ribo- and 3'-5'-deoxyribonucleotide segments", Nucleic Acids Research, vol. 25:370-378, 1997.
Written Opinion of the International Searching Authority for PCT/AU2021/050469 dated Aug. 13, 2021, 8 pages.
Nair et al. Multivalent N-Acetylgalactosamine-Conjugated siRNA Localizes in Hepatocytes and Elicits Robust RNAi-Mediated Gene Silencing, Journal of the American Chemical Society, 136(49):16958-1696 (Dec. 2014).
Padilla-Salinas et al. Discovery of Small-Molecule Cyclic GMP-AMP Synthase Inhibitors, The Journal of Organic Chemistry, 85(3):1579-1600 (Feb. 2020).
Pelka et al. Cutting Edge: The UNC93B1 Tyrosine-Based Motif Regulates Trafficking and TLR Responses via Separate Mechanisms, The Journal of Immunology, 193(7):3257-3261 (Oct. 2014).
Pepin et al. Connexin-Dependent Transfer of cGAMP to Phagocytes Modulates Antiviral Responses, mBio, 11(1):(1-6)e03187-19 (Feb. 2020).
Pepin et al. Topoisomerase 1 Inhibition Promotes Cyclic GMP-AMP Synthase-Dependent Antiviral Responses, mBio, 8(5):(1-9)e01611-17 (Oct. 2017).
Quin et al. Inhibition of RNA polymerase I transcription initiation by CX-5461 activates non-canonical ATM/ATR signaling, Oncotarget, 7(31):49800-49818 (Aug. 2016).
Ramanjulu et al. Design of amidobenzimidazole STING receptor agonists with systemic activity, Nature, 564(7736):439-443 (Dec. 2018).
Robbins et al. 2'-O-methyl-modified RNAs act as TLR7 antagonists, Molecular Therapy, 15(9):1663-1669 (Sep. 2007).
Sarvestani et al. Sequence-dependent off-target inhibition of TLR7/8 sensing by synthetic microRNA inhibitors, Nucleic Acids Research, 43(2):1177-1188 (Jan. 2015).
Schafer et al. Regulation of Type I Interferon Gene Expression by Interferon Regulatory Factor-3, Journal of Biological Chemistry, 273(5):2714-2720 (Jan. 1998).
Schmid-Burgk et al. OutKnocker: a web tool for rapid and simple genotyping of designer nuclease edited cell lines, Genome Research, 24(10):1719-1723 (Oct. 2014).
Shibata et al. Guanosine and its modified derivatives are endogenous ligands for TLR7, International Immunology, 28(5):211-222 (Oct. 2016).
Sioud et al. Suppression of immunostimulatory siRNA-driven innate immune activation by 2'-modified RNAs, Bioche Biophys Res Commun. 361:122-126, 361(1):122-126 (Sep. 2007).
Steinhagen et al. Suppressive oligodeoxynucleotides containing TTAGGG motifs inhibit cGAS activation in human monocytes, European Journal of Immunology, 0:1-7 (2017).
Steinhagen et al. Suppressive oligodeoxynucleotides containing TTAGGG motifs inhibit cGAS activation in human monocytes, European Journal of Immunology, 48(4):605-611 (Apr. 2018).
Stetson et al. Recognition of cytosolic DNA activates an IRF3-dependent innate immune response, Immunity, 24(1):93-103 (Jan. 2006).
Toloue et al. Antibody Targeted siRNA Delivery, Methods in Molecular Biology, 764:123-130 (2011).
Uhlen et al. A pathology atlas of the human cancer transcriptome, Science, 357(6352):(1 11)eaan2507 (Aug. 2017).
Unterholzner et al. IFI16 is an innate immune sensor for intracellular DNA, Nature Immunology, 11(11):997-1004 (Oct. 2010).
Valentin et al. Sequence-dependent inhibition of cGAS and TLR9 DNA sensing by 2'-O-methyl gapmer oligonucleotides, Nucleic Acids Research, 49(11):6082-6099 (Jun. 2021).
Vincent et al. Small molecule inhibition of cGAS reduces interferon expression in primary macrophages from autoimmune mice, Nat Commun. 8:750, 8(1):(1-13)750 (Sep. 2017).
Wang et al. PrimerBank: a PCR primer database for quantitative gene expression analysis, 2012 update, Nucleic Acids Research, 40(D1):D1144-D1149 (2012).
Wang et al. Suramin potently inhibits cGAMP synthase, cGAS, in THP1 cells to modulate IFN-β levels, Future Medicinal Chemistry, 10(11):1301-1317 (Jun. 2018).
Xia et al. Deregulation of STING Signaling in Colorectal Carcinoma Constrains DNA Damage Responses and Correlates With Tumorigenesis, Cell Reports, 14(2):282-297 (Jan. 2016).
Xie et al. Human cGAS catalytic domain has an additional DNA-binding interface that enhances enzymatic activity and liquid-phase condensation, PNAS U.S.A., 116(24):11946-1195 (2019).
Yang et al. cGAS is essential for cellular senescence, PNAS U.S.A., 114(23):E4612-E4620 (Jun. 2017).
Yin et al. Targeting RNA: A Transformative Therapeutic Strategy, Clinical and Translational Science, 12(2):98-112 (Mar. 2019).
Zhao et al. In Silico Screening-Based Discovery of Novel Inhibitors of Human Cyclic GMP-AMP Synthase: A Cross-Validation Study of Molecular Docking and Experimental Testing, Journal of Chemical Information and Modeling, 60(6):3265-3276 (Jun. 2020).
Ablasser et al. Cell intrinsic immunity spreads to bystander cells via the intercellular transfer of cGAMP, Nature, 503(7477):530-534 (Nov. 2013).
Al Shaer et al. 2019 FDA TIDES (Peptides and Oligonucleotides) Harvest, Pharmaceuticals, 13(40):1-16 (Mar. 2020).
Alharbi et al. Rational design of antisense oligonucleotides modulating the activity of TLR7/8 agonists, Nucleic Acids Research, 48(13):7052-7065 (Jul. 2020).
An et al. Inhibition of Cyclic GMP-AMP Synthase Using a Novel Antimalarial Drug Derivative in Trex1-Deficient Mice, Arthritis & Rheumatology, 70(11):1807-1819 (Nov. 2018).
Arnett et al. The American Rheumatism Association 1987 revised criteria for the classification of rheumatoid arthritis, Arthritis & Rheumatology, 31(3):315-324 (Mar. 1988).
Bailey et al. Fitting a mixture model by expectation maximization to discover motifs in biopolymers, Proceedings International Conference on intelligent Systems for Molecular Biology, 2:28-36 (1994).
Barrat et al. Nucleic acids of mammalian origin can act as endogenous ligands for Toll-like receptors and may promote systemic lupus erythematosus, The Journal of Experimental Medicine, 202(8):1131-1139 (Oct. 2005).
Bayik et al. Structure, mechanism and therapeutic utility of immunosuppressive oligonucleotides, Pharmacological Research, 105():216-225 (Mar. 2016).
Beignon et al. Endocytosis of HIV-1 activates plasmacytoid dendritic cells via Toll-like receptor-viral RNA interactions, The Journal of Clinical Investigation, 115(11):3265-3275 (Nov. 2005).
Bode et al. Cytosolic d-type CpG-oligonucleotides induce a type I interferon response by activating the cGAS-STING signaling pathway, European Journal of Immunology, 51(7):1686-1697 (Jul. 2021).
Campisi J. Senescent cells, tumor suppression, and organismal aging: good citizens, bad neighbors, Cell, 120(4):513-520 (Feb. 2005).
Chow et al. Differential and Overlapping Immune Programs Regulated by IRF3 and IRF5 in Plasmacytoid Dendritic Cells, The Journal of Immunology, 201(10):3036-3050 (Nov. 2018).
Coutinho et al., RNA Therapeutics: How Far Have We Gone?, Advances in Experimental Medicine and Biology, 1157:133-177 (2019).
Dai et al. Acetylation Blocks cGAS Activity and Inhibits Self-DNA-Induced Autoimmunity, Cell, 176(6):1447-1460 (Mar. 2019).
Devarkar et al. Structural basis for m7G recognition and 2'-O-methyl discrimination in capped RNAs by the innate immune receptor RIG-I, PNAS U.S.A., 113(3):596-601 (Jan. 2016).
Dou et al. Cytoplasmic chromatin triggers inflammation in senescence and cancer, Nature, 550(7676):402-406 (Oct. 2017).
Esposito et al. Aptamer Chimeras for Therapeutic Delivery: The Challenging Perspectives, Genes, 9(529):1-20 (Oct. 2018).
Ferrand et al. Assessing the Inhibitory Activity of Oligonucleotides on TLR7 Sensing, Methods in Molecular Biology, 1390:79-90 (2016).

(56) References Cited

OTHER PUBLICATIONS

Ferrand et al. The Use of CRISPR/Cas9 Gene Editing to Confirm Congenic Contaminations in Host-Pathogen Interaction Studies, Frontiers in Cellular and Infection Microbiology, 8(87):8 (Mar. 2018).
Fosbach et al. Identification of RNA Sequence Motifs Stimulating Sequence-Specific TLR8-Dependent Immune Responses, The Journal of Immunology, 180(6):3729-3738 (Mar. 2008).
Frazier (2015) Toxicol Pathol. Antisense oligonucleotide therapies: the promise and the challenges from a toxicologic pathologist's perspective, Toxicologic Pathology, 43(1):78- 89 (Jan. 2015).
Gantier et al. Rational Design of Immunostimulatory siRNAs, Molecular Therapy, 18(4):785-795 (Apr. 2010).
Gantier et al. TLR7 Is Involved in Sequence-Specific Sensing of Single-Stranded RNAs in Human Macrophages, The Journal of Immunology, 180(4):2117-2124 (Feb. 2008).
Gantier et al., Monitoring innate immune recruitment by siRNAs in mammalian cells, Methods in Molecular Biology, 623:21-33 (2010).
Gantier M. P. Strategies for Designing and Validating Immunostimulatory siRNAs, Methods in Molecular Biology, 942:179-191 (2013).
Gluck et al. Innate immune sensing of cytosolic chromatin fragments through cGAS promotes senescence, Nat Cell Biol., 19(9):1061-1070 (Sep. 2017).
Gray et al. Cutting Edge: cGAS Is Required for Lethal Autoimmune Disease in the Trex1- Deficient Mouse Model of Aicardi-Goutières Syndrome, The Journal of Immunology, 195(5):1939-1943 (Sep. 2015).
Greulich et al. TLR8 Is a Sensor of RNase T2 Degradation Products, Cell, 179(6):1264-1275 (Nov. 2019).
Gursel et al. Repetitive Elements in Mammalian Telomeres Suppress Bacterial DNAInduced Immune Activation, The Journal of Immunology, 171(3):1393-1400 (Aug. 2003).
Hall et al. Discovery of PF-06928215 as a high affinity inhibitor of cGAS enabled by a novel fluorescence polarization assay, PLoS One, 12(9):(1-16)e0184843 (Sep. 2017).
Hamm et al. Alternating 2'-O-ribose methylation is a universal approach for generating non-stimulatory siRNA by acting as TLR7 antagonist, Immunobiology, 215(7):559-569 (Jul. 2010).
Hemmi et al. A Toll-like receptor recognizes bacterial DNA, Nature, 408(6813):740-745 (Dec. 2000).
Herzner et al. Sequence-specific activation of the DNA sensor cGAS by Y-form DNA structures as found in primary HIV-1 cDNA, Nature Immunology, 16(10):1025-1033 (Oct. 2015).
Hope et al. Cationic lipids, phosphatidylethanolamine and the intracellular delivery of polymeric, nucleic acid-based drugs (Review), Molecular Membrane Biology 15:1., 15(1):1-14 (Mar. 1998).
Hornung et al. Sequence-specific potent induction of IFN-alpha by short interfering RNA in plasmacytoid dendritic cells through TLR7, Nature Medicine, 11(3):263-270 (Mar. 2005).
Judge et al. Design of noninflammatory synthetic siRNA mediating potent gene silencing in vivo, Molecular therapy, 13(3):494-505 (Mar. 2006).
Judge et al. Sequence-dependent stimulation of the mammalian innate immune response by synthetic siRNA, Nature Biotechnology, 23():457-462 (Apr. 2005).
Kaminski et al. Synthetic oligodeoxynucleotides containing suppressive TTAGGG motifs inhibit AIM2 inflammasome activation, The Journal of Immunology, 191(7):3876-3883 (Oct. 2013).
Kariko et al. Suppression of RNA recognition by Toll-like receptors: the impact of nucleoside modification and the evolutionary origin of RNA, Immunity, 23(2):165-175 (Aug. 2005).
Kleinman et al. Sequence- and target-independent angiogenesis suppression by siRNA via TLR3, Nature, 452(7187):591-597 (Apr. 2008).
Kranzusch et al. Structure of human cGAS reveals a conserved family of second-messenger enzymes in innate immunity, Cell Reports, 3(5):1362-1368 (May 2013).
Krieg et al. CpG motifs in bacterial DNA trigger direct B-cell activation, Nature, 374(6522):546-549 (Apr. 1995).
Krieg et al. Sequence motifs in adenoviral DNA block immune activation by stimulatory CpG motifs, PNAS U.S.A., 95(21):12631-1263 (Oct. 1998).
Lama et al. Development of human cGAS-specific small-molecule inhibitors for repression of dsDNA-triggered interferon expression, Nature Communication, 10(2261):1-14 (May 2019).
Leech et al. Macrophage migration inhibitory factor in rheumatoid arthritis: evidence of proinflammatory function and regulation by glucocorticoids, Arthritis & Rheumatology, 42(8):1601-1608 (Aug. 1999).
Lewis et al. A serum-resistant cytofectin for cellular delivery of antisense oligodeoxynucleotides and plasmid DNA, PNAS U.S.A., 93(8):3176-3181 (Apr. 1996).
Li et al. Inhibition of double-strand DNA-sensing cGAS ameliorates brain injury after ischemic stroke, EMBO Molecular Medicine, 12():(1-18)e11002 (Apr. 2020).
Liu et al. G3BP1 promotes DNA binding and activation of cGAS, Nature Immunology, 20(1):18-28 (Jan. 2019).
Mankan et al. Cytosolic RNA:DNA hybrids activate the cGAS-STING axis, The EMBO Journal, 33(24):2937-2946 (Nov. 2014).
McWhirter et al. Nucleic Acid Sensors as Therapeutic Targets for Human Disease, Immunity, 53(1):78-97 (Jul. 2020).

\* cited by examiner

A

| Name | p-value | Sites | |
|---|---|---|---|
| [CD.]2139 | 1.63e-7 | CUUGUGAAAAGAUUAUCUUC | (SEQ ID NO: 52) |
| [CT.]3476 | 2.10e-7 | CAUAUUAAAAAGGAAACUAA | (SEQ ID NO: 115) |
| [CT.]589 | 2.34e-6 | ACUGUGUAGAUGGGAUCUGC | (SEQ ID NO: 126) |
| ASO2504 | 5.03e-6 | CCUAUUAAAAAAAUUUAUAC | (SEQ ID NO: 23) |
| ASO8 | 5.51e-6 | CAUUAGGTGCAGAAAUCUUC | (SEQ ID NO: 10) |
| [CT.]3697 | 1.51e-5 | CGAAUGAAUUAAAAGUUUAA | (SEQ ID NO: 124) |
| [CT.]3487 | 6.01e-5 | CUUAUUUUAAGCAUAUUAAA | (SEQ ID NO: 120) |
| ASO11 | 1.24e-4 | CUUUAGUCGUAGUUGCUUCC | (SEQ ID NO: 13) |

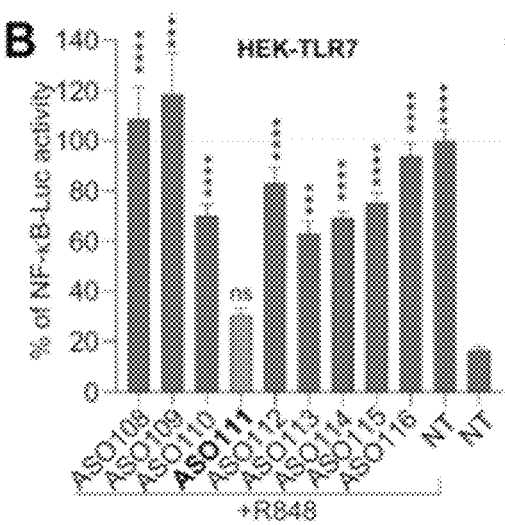

C

| | 5' 3' | |
|---|---|---|
| ASO108 | ...GGTCCCATCC... | (SEQ ID NO: 183) |
| ASO109 | ...CGTCCCATC... | (SEQ ID NO: 184) |
| ASO110 | ...CUGTCCCATC... | (SEQ ID NO: 185) |
| ASO111 | UUCUCTCGTCCCAUCCCU | (SEQ ID NO: 186) |
| ASO112 | ...UCTCGTCCCAUCC... | (SEQ ID NO: 187) |
| ASO113 | ...CTCTCGTCCAUCC... | (SEQ ID NO: 188) |
| ASO114 | ...CTCTCTCGTCC... | (SEQ ID NO: 189) |
| ASO115 | ...ACTCTCTCGTC... | (SEQ ID NO: 190) |
| ASO116 | CACCTTCTCTCGU... | (SEQ ID NO: 191) |

D

| | 5' 3' | |
|---|---|---|
| ASO11 | CUUUAGUCGUAGUUGCUUCC | (SEQ ID NO: 13) |
| ASO11-Mut1 | CUUUAGUCGUAGUUGCUCUC | (SEQ ID NO: 19) |
| ASO11-Mut2 | ...GGUCGUAGUUGCUUCC | (SEQ ID NO: 20) |
| ASO2 | ...CCUCGGAAGCUCUC | (SEQ ID NO: 4) |

FIG. 3

SEQUENCE LISTING

```
Sequence total quantity: 488
SEQ ID NO: 1            moltype = DNA  length = 20
FEATURE                 Location/Qualifiers
misc_feature            1..20
                        note = NC1 2OMe/PS ASO (Neg Cont)
source                  1..20
                        mol_type = other DNA
                        organism = synthetic construct
modified_base           1..4
                        mod_base = OTHER
                        note = t is uracil
modified_base           14..20
                        mod_base = OTHER
                        note = t is uracil
SEQUENCE: 1
gcgtattata gccgattaac                                               20
```

```
SEQ ID NO: 2               moltype = DNA   length = 20
FEATURE                    Location/Qualifiers
misc_feature               1..20
                           note = NC5 2OMe/PS ASO (Neg Cont)
source                     1..20
                           mol_type = other DNA
                           organism = synthetic construct
modified_base              14..20
                           mod_base = OTHER
                           note = t is uracil
SEQUENCE: 2
gcgactatac gcgcaatatg                                                  20

SEQ ID NO: 3               moltype = DNA   length = 20
FEATURE                    Location/Qualifiers
misc_feature               1..20
                           note = [cGAS]ASO1
source                     1..20
                           mol_type = other DNA
                           organism = synthetic construct
modified_base              1..4
                           mod_base = OTHER
                           note = t is uracil
SEQUENCE: 3
atggcctttc cgtgccaagg                                                  20

SEQ ID NO: 4               moltype = DNA   length = 20
FEATURE                    Location/Qualifiers
misc_feature               1..20
                           note = [cGAS]ASO2
source                     1..20
                           mol_type = other DNA
                           organism = synthetic construct
modified_base              1..4
                           mod_base = OTHER
                           note = t is uracil
modified_base              12..20
                           mod_base = OTHER
                           note = t is uracil
SEQUENCE: 4
tccggcctcg gaagctctct                                                  20

SEQ ID NO: 5               moltype = DNA   length = 20
FEATURE                    Location/Qualifiers
misc_feature               1..20
                           note = [cGAS]ASO3
source                     1..20
                           mol_type = other DNA
                           organism = synthetic construct
modified_base              1..7
                           mod_base = OTHER
                           note = t is uracil
modified_base              17..20
                           mod_base = OTHER
                           note = t is uracil
SEQUENCE: 5
gcattccgtg cggaagcctt                                                  20

SEQ ID NO: 6               moltype = DNA   length = 20
FEATURE                    Location/Qualifiers
misc_feature               1..20
                           note = [cGAS]ASO4
source                     1..20
                           mol_type = other DNA
                           organism = synthetic construct
modified_base              17..20
                           mod_base = OTHER
                           note = t is uracil
SEQUENCE: 6
ggccgaactt tcccgcctta                                                  20

SEQ ID NO: 7               moltype = DNA   length = 20
FEATURE                    Location/Qualifiers
misc_feature               1..20
                           note = [cGAS]ASO5
source                     1..20
                           mol_type = other DNA
                           organism = synthetic construct
modified_base              1..5
```

```
                        mod_base = OTHER
                        note = t is uracil
SEQUENCE: 7
ggtcttggct tcgtggagca                                                      20

SEQ ID NO: 8           moltype = DNA  length = 20
FEATURE                Location/Qualifiers
misc_feature           1..20
                       note = [cGAS]ASO6
source                 1..20
                       mol_type = other DNA
                       organism = synthetic construct
SEQUENCE: 8
ggagcttcga ggccccaggc                                                      20

SEQ ID NO: 9           moltype = DNA  length = 20
FEATURE                Location/Qualifiers
misc_feature           1..20
                       note = [cGAS]ASO7
source                 1..20
                       mol_type = other DNA
                       organism = synthetic construct
modified_base          1..4
                       mod_base = OTHER
                       note = t is uracil
modified_base          16..20
                       mod_base = OTHER
                       note = t is uracil
SEQUENCE: 9
ggtggtccac aaccccttc                                                       20

SEQ ID NO: 10          moltype = DNA  length = 20
FEATURE                Location/Qualifiers
misc_feature           1..20
                       note = [cGAS]ASO8
source                 1..20
                       mol_type = other DNA
                       organism = synthetic construct
modified_base          1..5
                       mod_base = OTHER
                       note = t is uracil
modified_base          14..20
                       mod_base = OTHER
                       note = t is uracil
SEQUENCE: 10
cattaggtgc agaaatcttc                                                      20

SEQ ID NO: 11          moltype = DNA  length = 20
FEATURE                Location/Qualifiers
misc_feature           1..20
                       note = [cGAS]ASO9
source                 1..20
                       mol_type = other DNA
                       organism = synthetic construct
modified_base          1..5
                       mod_base = OTHER
                       note = t is uracil
modified_base          15..20
                       mod_base = OTHER
                       note = t is uracil
SEQUENCE: 11
ttctggggac ttccagttta                                                      20

SEQ ID NO: 12          moltype = RNA  length = 20
FEATURE                Location/Qualifiers
misc_feature           1..20
                       note = [cGAS]ASO10
source                 1..20
                       mol_type = other RNA
                       organism = synthetic construct
SEQUENCE: 12
tgattccaaa gccagggtta                                                      20

SEQ ID NO: 13          moltype = DNA  length = 20
FEATURE                Location/Qualifiers
misc_feature           1..20
                       note = [cGAS]ASO11
source                 1..20
                       mol_type = other DNA
```

```
                        organism = synthetic construct
modified_base           1..5
                        mod_base = OTHER
                        note = t is uracil
modified_base           15..20
                        mod_base = OTHER
                        note = t is uracil
SEQUENCE: 13
ctttagtcgt agttgcttcc                                              20

SEQ ID NO: 14           moltype = DNA   length = 20
FEATURE                 Location/Qualifiers
misc_feature            1..20
                        note = ASO2-Cy3
source                  1..20
                        mol_type = other DNA
                        organism = synthetic construct
modified_base           1..3
                        mod_base = OTHER
                        note = t is uracil
modified_base           15..20
                        mod_base = OTHER
                        note = t is uracil
SEQUENCE: 14
tccggcctcg gaagctctct                                              20

SEQ ID NO: 15           moltype = DNA   length = 20
FEATURE                 Location/Qualifiers
misc_feature            1..20
                        note = ASO2-PS
source                  1..20
                        mol_type = other DNA
                        organism = synthetic construct
SEQUENCE: 15
tccggcctcg gaagctctct                                              20

SEQ ID NO: 16           moltype = DNA   length = 20
FEATURE                 Location/Qualifiers
misc_feature            1..20
                        note = ASO2-PO
source                  1..20
                        mol_type = other DNA
                        organism = synthetic construct
modified_base           1..3
                        mod_base = OTHER
                        note = t is uracil
modified_base           14..20
                        mod_base = OTHER
                        note = t is uracil
SEQUENCE: 16
tccggcctcg gaagctctct                                              20

SEQ ID NO: 17           moltype = DNA   length = 16
FEATURE                 Location/Qualifiers
misc_feature            1..16
                        note = ASO2-LNA
source                  1..16
                        mol_type = other DNA
                        organism = synthetic construct
SEQUENCE: 17
cggcctcgga agctct                                                  16

SEQ ID NO: 18           moltype = DNA   length = 20
FEATURE                 Location/Qualifiers
misc_feature            1..20
                        note = ASO2-2MOE
source                  1..20
                        mol_type = other DNA
                        organism = synthetic construct
SEQUENCE: 18
tccggcctcg gaagctctct                                              20

SEQ ID NO: 19           moltype = DNA   length = 20
FEATURE                 Location/Qualifiers
misc_feature            1..20
                        note = ASO11-Mut1
source                  1..20
                        mol_type = other DNA
                        organism = synthetic construct
```

```
modified_base          1..5
                       mod_base = OTHER
                       note = t is uracil
modified_base          15..20
                       mod_base = OTHER
                       note = t is uracil
SEQUENCE: 19
ctttagtcgt agttgtctct                                                   20

SEQ ID NO: 20          moltype = DNA  length = 20
FEATURE                Location/Qualifiers
misc_feature           1..20
                       note = ASO11-Mut2
source                 1..20
                       mol_type = other DNA
                       organism = synthetic construct
modified_base          1..3
                       mod_base = OTHER
                       note = t is uracil
modified_base          16..20
                       mod_base = OTHER
                       note = t is uracil
SEQUENCE: 20
tccgggtcgt agttgcttcc                                                   20

SEQ ID NO: 21          moltype = DNA  length = 20
FEATURE                Location/Qualifiers
misc_feature           1..20
                       note = ASO852
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 21
ctctctttct gtggtttctc                                                   20

SEQ ID NO: 22          moltype = DNA  length = 20
FEATURE                Location/Qualifiers
misc_feature           1..20
                       note = ASO852-dT
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 22
ctctcttttt ttttttctc                                                    20

SEQ ID NO: 23          moltype = DNA  length = 20
FEATURE                Location/Qualifiers
misc_feature           1..20
                       note = ASO2504
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 23
cctattaaaa aaatttatac                                                   20

SEQ ID NO: 24          moltype = DNA  length = 20
FEATURE                Location/Qualifiers
misc_feature           1..20
                       note = ASO2504-Mut
source                 1..20
                       mol_type = other DNA
```

```
                        organism = synthetic construct
modified_base           1..5
                        mod_base = OTHER
                        note = t is uracil
modified_base           16..20
                        mod_base = OTHER
                        note = t is uracil
SEQUENCE: 24
cctattttct gtggttatac                                                    20

SEQ ID NO: 25           moltype = DNA  length = 20
FEATURE                 Location/Qualifiers
misc_feature            1..20
                        note = dT20
source                  1..20
                        mol_type = other DNA
                        organism = synthetic construct
SEQUENCE: 25
tttttttttt tttttttttt                                                    20

SEQ ID NO: 26           moltype = DNA  length = 21
FEATURE                 Location/Qualifiers
misc_feature            1..21
                        note = Hs HPRT F517
source                  1..21
                        mol_type = other DNA
                        organism = synthetic construct
SEQUENCE: 26
gactttgctt tccttggtca g                                                  21

SEQ ID NO: 27           moltype = DNA  length = 24
FEATURE                 Location/Qualifiers
misc_feature            1..24
                        note = Hs HPRT R591
source                  1..24
                        mol_type = other DNA
                        organism = synthetic construct
SEQUENCE: 27
ggcttatatc caacacttcg tggg                                               24

SEQ ID NO: 28           moltype = DNA  length = 26
FEATURE                 Location/Qualifiers
misc_feature            1..26
                        note = Hs HPRT P554 FAM
source                  1..26
                        mol_type = other DNA
                        organism = synthetic construct
SEQUENCE: 28
atggtcaagg tcgcaagctt gctggt                                             26

SEQ ID NO: 29           moltype = DNA  length = 25
FEATURE                 Location/Qualifiers
misc_feature            1..25
                        note = Hs SFRS9 F594
source                  1..25
                        mol_type = other DNA
                        organism = synthetic construct
SEQUENCE: 29
gtcgagtatc tcagaaaaga agaca                                              25

SEQ ID NO: 30           moltype = DNA  length = 22
FEATURE                 Location/Qualifiers
misc_feature            1..22
                        note = Hs SFRS9 R690
source                  1..22
                        mol_type = other DNA
                        organism = synthetic construct
SEQUENCE: 30
ctcggatgta ggaagtttca cc                                                 22

SEQ ID NO: 31           moltype = DNA  length = 24
FEATURE                 Location/Qualifiers
misc_feature            1..24
                        note = Hs SFRS9 P625 HEX
source                  1..24
                        mol_type = other DNA
                        organism = synthetic construct
SEQUENCE: 31
atgccctgcg taaactggat gaca                                               24
```

```
SEQ ID NO: 32          moltype = DNA  length = 24
FEATURE                Location/Qualifiers
misc_feature           1..24
                       note = ODN 2006
source                 1..24
                       mol_type = other DNA
                       organism = synthetic construct
SEQUENCE: 32
tcgtcgtttt gtcgttttgt cgtt                                              24

SEQ ID NO: 33          moltype = DNA  length = 70
FEATURE                Location/Qualifiers
misc_feature           1..70
                       note = ISD70-FWD
source                 1..70
                       mol_type = other DNA
                       organism = synthetic construct
SEQUENCE: 33
ccatcagaaa gaggtttaat attttttgtga gaccatcgaa gagagaaaga gataaaactt       60
ttttacgact                                                              70

SEQ ID NO: 34          moltype = DNA  length = 70
FEATURE                Location/Qualifiers
misc_feature           1..70
                       note = ISD70-REV
source                 1..70
                       mol_type = other DNA
                       organism = synthetic construct
SEQUENCE: 34
agtcgtaaaa aagttttatc tctttctctc ttcgatggtc tcacaaaaat attaaacctc       60
tttctgatgg                                                              70

SEQ ID NO: 35          moltype = DNA  length = 20
FEATURE                Location/Qualifiers
misc_feature           1..20
                       note = [CDKN2B-AS1]1240
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 35
gtctctactg ttacctctga                                                   20

SEQ ID NO: 36          moltype = DNA  length = 20
FEATURE                Location/Qualifiers
misc_feature           1..20
                       note = [CDKN2B-AS1]132
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 36
ttaaataatc tagtttgaag                                                   20

SEQ ID NO: 37          moltype = DNA  length = 20
FEATURE                Location/Qualifiers
misc_feature           1..20
                       note = [CDKN2B-AS1]1415
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 37
```

```
gtgtccttca tgctttggat                                                        20

SEQ ID NO: 38           moltype = RNA   length = 20
FEATURE                 Location/Qualifiers
misc_feature            1..20
                        note = [CDKN2B-AS1]1519
source                  1..20
                        mol_type = other RNA
                        organism = synthetic construct
SEQUENCE: 38
agaaagaagc aaagattcaa                                                        20

SEQ ID NO: 39           moltype = RNA   length = 20
FEATURE                 Location/Qualifiers
misc_feature            1..20
                        note = [CDKN2B-AS1]1522
source                  1..20
                        mol_type = other RNA
                        organism = synthetic construct
SEQUENCE: 39
cctagaaaga agcaaagatt                                                        20

SEQ ID NO: 40           moltype = DNA   length = 20
FEATURE                 Location/Qualifiers
misc_feature            1..20
                        note = [CDKN2B-AS1]1528
source                  1..20
                        mol_type = other DNA
                        organism = synthetic construct
modified_base           1..5
                        mod_base = OTHER
                        note = t is uracil
SEQUENCE: 40
gtcaaaccta gaaagaagca                                                        20

SEQ ID NO: 41           moltype = DNA   length = 20
FEATURE                 Location/Qualifiers
misc_feature            1..20
                        note = [CDKN2B-AS1]1773
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 41
gattaaaaca gattaataca                                                        20

SEQ ID NO: 42           moltype = DNA   length = 20
FEATURE                 Location/Qualifiers
misc_feature            1..20
                        note = [CDKN2B-AS1]1774
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 42
ggattaaaac agattaatac                                                        20

SEQ ID NO: 43           moltype = DNA   length = 20
FEATURE                 Location/Qualifiers
misc_feature            1..20
                        note = [CDKN2B-AS1]1775
source                  1..20
                        mol_type = other DNA
                        organism = synthetic construct
modified_base           1..5
                        mod_base = OTHER
                        note = t is uracil
modified_base           16..20
                        mod_base = OTHER
```

```
                                note = t is uracil
SEQUENCE: 43
aggattaaaa cagattaata                                                        20

SEQ ID NO: 44           moltype = DNA   length = 20
FEATURE                 Location/Qualifiers
misc_feature            1..20
                        note = [CDKN2B-AS1]2108
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 44
gagttcttcg taggcttctg                                                        20

SEQ ID NO: 45           moltype = DNA   length = 20
FEATURE                 Location/Qualifiers
misc_feature            1..20
                        note = [CDKN2B-AS1]2130
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 45
agattatctt cttttaattt                                                        20

SEQ ID NO: 46           moltype = DNA   length = 20
FEATURE                 Location/Qualifiers
misc_feature            1..20
                        note = [CDKN2B-AS1]2131
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 46
aagattatct tcttttaatt                                                        20

SEQ ID NO: 47           moltype = DNA   length = 20
FEATURE                 Location/Qualifiers
misc_feature            1..20
                        note = [CDKN2B-AS1]2132
source                  1..20
                        mol_type = other DNA
                        organism = synthetic construct
modified_base           16..20
                        mod_base = OTHER
                        note = t is uracil
SEQUENCE: 47
aaagattatc ttcttttaat                                                        20

SEQ ID NO: 48           moltype = DNA   length = 20
FEATURE                 Location/Qualifiers
misc_feature            1..20
                        note = [CDKN2B-AS1]2133
source                  1..20
                        mol_type = other DNA
                        organism = synthetic construct
modified_base           16..20
                        mod_base = OTHER
                        note = t is uracil
SEQUENCE: 48
aaaagattat cttcttttaa                                                        20

SEQ ID NO: 49           moltype = DNA   length = 20
```

```
FEATURE              Location/Qualifiers
misc_feature         1..20
                     note = [CDKN2B-AS1]2134
source               1..20
                     mol_type = other DNA
                     organism = synthetic construct
modified_base        16..20
                     mod_base = OTHER
                     note = t is uracil
SEQUENCE: 49
gaaaagatta tcttcttta                                                  20

SEQ ID NO: 50        moltype = DNA  length = 20
FEATURE              Location/Qualifiers
misc_feature         1..20
                     note = [CDKN2B-AS1]2137
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 50
tgtgaaaaga ttatcttctt                                                 20

SEQ ID NO: 51        moltype = DNA  length = 20
FEATURE              Location/Qualifiers
misc_feature         1..20
                     note = [CDKN2B-AS1]2138
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 51
ttgtgaaaag attatcttct                                                 20

SEQ ID NO: 52        moltype = DNA  length = 20
FEATURE              Location/Qualifiers
misc_feature         1..20
                     note = [CDKN2B-AS1]2139
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 52
cttgtgaaaa gattatcttc                                                 20

SEQ ID NO: 53        moltype = RNA  length = 20
FEATURE              Location/Qualifiers
misc_feature         1..20
                     note = [CDKN2B-AS1]2196
source               1..20
                     mol_type = other RNA
                     organism = synthetic construct
SEQUENCE: 53
ggtggccaca ggcaacgtca                                                 20

SEQ ID NO: 54        moltype = RNA  length = 20
FEATURE              Location/Qualifiers
misc_feature         1..20
                     note = [CDKN2B-AS1]2198
source               1..20
                     mol_type = other RNA
                     organism = synthetic construct
SEQUENCE: 54
aaggtggcca caggcaacgt                                                 20
```

| | | |
|---|---|---|
| SEQ ID NO: 55<br>FEATURE<br>misc_feature<br><br>source<br><br><br>modified_base | moltype = DNA length = 20<br>Location/Qualifiers<br>1..20<br>note = [CDKN2B-AS1]2218<br>1..20<br>mol_type = other DNA<br>organism = synthetic construct<br>16..20<br>mod_base = OTHER<br>note = t is uracil | |
| SEQUENCE: 55<br>aggcctccag tgtcttctcc | | 20 |
| SEQ ID NO: 56<br>FEATURE<br>misc_feature<br><br>source<br><br><br>modified_base | moltype = DNA length = 20<br>Location/Qualifiers<br>1..20<br>note = [CDKN2B-AS1]2219<br>1..20<br>mol_type = other DNA<br>organism = synthetic construct<br>16..20<br>mod_base = OTHER<br>note = t is uracil | |
| SEQUENCE: 56<br>caggcctcca gtgtcttctc | | 20 |
| SEQ ID NO: 57<br>FEATURE<br>misc_feature<br><br>source<br><br><br>modified_base<br><br><br>modified_base | moltype = DNA length = 20<br>Location/Qualifiers<br>1..20<br>note = [CDKN2B-AS1]2223<br>1..20<br>mol_type = other DNA<br>organism = synthetic construct<br>1..5<br>mod_base = OTHER<br>note = t is uracil<br>16..20<br>mod_base = OTHER<br>note = t is uracil | |
| SEQUENCE: 57<br>gtcccaggcc tccagtgtct | | 20 |
| SEQ ID NO: 58<br>FEATURE<br>misc_feature<br><br>source<br><br><br>modified_base<br><br><br>modified_base | moltype = DNA length = 20<br>Location/Qualifiers<br>1..20<br>note = [CDKN2B-AS1]2227<br>1..20<br>mol_type = other DNA<br>organism = synthetic construct<br>1..5<br>mod_base = OTHER<br>note = t is uracil<br>16..20<br>mod_base = OTHER<br>note = t is uracil | |
| SEQUENCE: 58<br>ccatgtccca ggcctccagt | | 20 |
| SEQ ID NO: 59<br>FEATURE<br>misc_feature<br><br>source<br><br><br>modified_base<br><br><br>modified_base | moltype = DNA length = 20<br>Location/Qualifiers<br>1..20<br>note = [CDKN2B-AS1]2227<br>1..20<br>mol_type = other DNA<br>organism = synthetic construct<br>1..5<br>mod_base = OTHER<br>note = t is uracil<br>16..20<br>mod_base = OTHER<br>note = t is uracil | |
| SEQUENCE: 59<br>tctccatgtc ccaggcctcc | | 20 |
| SEQ ID NO: 60<br>FEATURE<br>misc_feature | moltype = DNA length = 20<br>Location/Qualifiers<br>1..20<br>note = [CDKN2B-AS1]2231 | |

```
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 60
gtctccatgt cccaggcctc                                                       20

SEQ ID NO: 61           moltype = DNA  length = 20
FEATURE                 Location/Qualifiers
misc_feature            1..20
                        note = [CDKN2B-AS1]2232
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 61
agtctccatg tcccaggcct                                                       20

SEQ ID NO: 62           moltype = DNA  length = 20
FEATURE                 Location/Qualifiers
misc_feature            1..20
                        note = [CDKN2B-AS1]2233
source                  1..20
                        mol_type = other DNA
                        organism = synthetic construct
modified_base           1..5
                        mod_base = OTHER
                        note = t is uracil
SEQUENCE: 62
cagtctccat gtcccaggcc                                                       20

SEQ ID NO: 63           moltype = DNA  length = 20
FEATURE                 Location/Qualifiers
misc_feature            1..20
                        note = [CDKN2B-AS1]2234
source                  1..20
                        mol_type = other DNA
                        organism = synthetic construct
modified_base           1..5
                        mod_base = OTHER
                        note = t is uracil
SEQUENCE: 63
gcagtctcca tgtcccaggc                                                       20

SEQ ID NO: 64           moltype = DNA  length = 20
FEATURE                 Location/Qualifiers
misc_feature            1..20
                        note = [CDKN2B-AS1]2235
source                  1..20
                        mol_type = other DNA
                        organism = synthetic construct
SEQUENCE: 64
agcagtctcc atgtcccagg                                                       20

SEQ ID NO: 65           moltype = DNA  length = 20
FEATURE                 Location/Qualifiers
misc_feature            1..20
                        note = [CDKN2B-AS1]2236
source                  1..20
                        mol_type = other DNA
                        organism = synthetic construct
SEQUENCE: 65
aagcagtctc catgtcccag                                                       20

SEQ ID NO: 66           moltype = DNA  length = 20
FEATURE                 Location/Qualifiers
misc_feature            1..20
                        note = [CDKN2B-AS1]2237
source                  1..20
```

```
                        mol_type = other DNA
                        organism = synthetic construct
modified_base           16..20
                        mod_base = OTHER
                        note = t is uracil
SEQUENCE: 66
aaagcagtct ccatgtccca                                                    20

SEQ ID NO: 67           moltype = DNA  length = 20
FEATURE                 Location/Qualifiers
misc_feature            1..20
                        note = [CDKN2B-AS1]368
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 67
gtcgtggcaa atagtcctag                                                    20

SEQ ID NO: 68           moltype = DNA  length = 20
FEATURE                 Location/Qualifiers
misc_feature            1..20
                        note = [CDKN2B-AS1]442
source                  1..20
                        mol_type = other DNA
                        organism = synthetic construct
SEQUENCE: 68
ggagatcaga tgagaggagc                                                    20

SEQ ID NO: 69           moltype = DNA  length = 20
FEATURE                 Location/Qualifiers
misc_feature            1..20
                        note = [CDKN2B-AS1]495
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 69
agtggcacat accacaccct                                                    20

SEQ ID NO: 70           moltype = DNA  length = 20
FEATURE                 Location/Qualifiers
misc_feature            1..20
                        note = [CDKN2B-AS1]568
source                  1..20
                        mol_type = other DNA
                        organism = synthetic construct
modified_base           1..5
                        mod_base = OTHER
                        note = t is uracil
SEQUENCE: 70
cttcacatcc aagacagcaa                                                    20

SEQ ID NO: 71           moltype = DNA  length = 20
FEATURE                 Location/Qualifiers
misc_feature            1..20
                        note = [CDKN2B-AS1]611
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 71
gtgtttttaa ttttgtagag                                                    20
```

```
SEQ ID NO: 72              moltype = DNA  length = 20
FEATURE                    Location/Qualifiers
misc_feature               1..20
                           note = [CDKN2B-AS1]613
source                     1..20
                           mol_type = other DNA
                           organism = synthetic construct
modified_base              16..20
                           mod_base = OTHER
                           note = t is uracil
modified_base              1..5
                           mod_base = OTHER
                           note = t is uracil
SEQUENCE: 72
cagtgttttt aattttgtag                                                 20

SEQ ID NO: 73              moltype = DNA  length = 20
FEATURE                    Location/Qualifiers
misc_feature               1..20
                           note = [CDKN2B-AS1]626
source                     1..20
                           mol_type = other DNA
                           organism = synthetic construct
modified_base              1..5
                           mod_base = OTHER
                           note = t is uracil
modified_base              16..20
                           mod_base = OTHER
                           note = t is uracil
SEQUENCE: 73
atttccacat gcccagtgtt                                                 20

SEQ ID NO: 74              moltype = DNA  length = 20
FEATURE                    Location/Qualifiers
misc_feature               1..20
                           note = [CDKN2B-AS1]627
source                     1..20
                           mol_type = other DNA
                           organism = synthetic construct
modified_base              1..5
                           mod_base = OTHER
                           note = t is uracil
modified_base              16..20
                           mod_base = OTHER
                           note = t is uracil
SEQUENCE: 74
tatttccaca tgcccagtgt                                                 20

SEQ ID NO: 75              moltype = DNA  length = 20
FEATURE                    Location/Qualifiers
misc_feature               1..20
                           note = [CDKN2B-AS1]645
source                     1..20
                           mol_type = other DNA
                           organism = synthetic construct
modified_base              1..5
                           mod_base = OTHER
                           note = t is uracil
modified_base              16..20
                           mod_base = OTHER
                           note = t is uracil
SEQUENCE: 75
aatttaaagc atgaatatta                                                 20

SEQ ID NO: 76              moltype = DNA  length = 20
FEATURE                    Location/Qualifiers
misc_feature               1..20
                           note = [CDKN2B-AS1]79
source                     1..20
                           mol_type = other DNA
                           organism = synthetic construct
modified_base              1..5
                           mod_base = OTHER
                           note = t is uracil
SEQUENCE: 76
aaaataaggg gaatagggga                                                 20

SEQ ID NO: 77              moltype = DNA  length = 20
FEATURE                    Location/Qualifiers
```

```
misc_feature             1..20
                         note = [CDKN2B-AS1]80
source                   1..20
                         mol_type = other DNA
                         organism = synthetic construct
modified_base            1..5
                         mod_base = OTHER
                         note = t is uracil
SEQUENCE: 77
taaaataagg ggaatagggg                                                     20

SEQ ID NO: 78            moltype = DNA   length = 20
FEATURE                  Location/Qualifiers
misc_feature             1..20
                         note = [CDKN2B-AS1]831
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 78
atatctgctg cccaccttct                                                     20

SEQ ID NO: 79            moltype = DNA   length = 20
FEATURE                  Location/Qualifiers
misc_feature             1..20
                         note = [CDKN2B-AS1]832
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 79
aatatctgct gcccaccttc                                                     20

SEQ ID NO: 80            moltype = DNA   length = 20
FEATURE                  Location/Qualifiers
misc_feature             1..20
                         note = [CDKN2B-AS1]852
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 80
ctctctttct gtggtttctc                                                     20

SEQ ID NO: 81            moltype = DNA   length = 20
FEATURE                  Location/Qualifiers
misc_feature             1..20
                         note = [CDKN2B-AS1]924
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 81
gtggttaagt acatgagctc                                                     20

SEQ ID NO: 82            moltype = DNA   length = 20
FEATURE                  Location/Qualifiers
misc_feature             1..20
                         note = [CDKN2B-AS1]965
```

```
source                  1..20
                        mol_type = other DNA
                        organism = synthetic construct
modified_base           16..20
                        mod_base = OTHER
                        note = t is uracil
SEQUENCE: 82
ggacacttag ctgttcctcg                                                           20

SEQ ID NO: 83           moltype = DNA  length = 20
FEATURE                 Location/Qualifiers
misc_feature            1..20
                        note = [CTNNB1]1212
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 83
gggtccacca ctagccagta                                                           20

SEQ ID NO: 84           moltype = DNA  length = 20
FEATURE                 Location/Qualifiers
misc_feature            1..20
                        note = [CTNNB1]1234
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 84
tcattatatt tactaaagct                                                           20

SEQ ID NO: 85           moltype = DNA  length = 20
FEATURE                 Location/Qualifiers
misc_feature            1..20
                        note = [CTNNB1]1235
source                  1..20
                        mol_type = other DNA
                        organism = synthetic construct
modified_base           1..5
                        mod_base = OTHER
                        note = t is uracil
SEQUENCE: 85
ctcattatat ttactaaagc                                                           20

SEQ ID NO: 86           moltype = DNA  length = 20
FEATURE                 Location/Qualifiers
misc_feature            1..20
                        note = [CTNNB1]1294
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 86
cagatagcac cttcagcact                                                           20

SEQ ID NO: 87           moltype = DNA  length = 20
FEATURE                 Location/Qualifiers
misc_feature            1..20
                        note = [CTNNB1]1445
source                  1..20
                        mol_type = other DNA
                        organism = synthetic construct
modified_base           1..5
                        mod_base = OTHER
```

```
                        note = t is uracil
modified_base           16..20
                        mod_base = OTHER
                        note = t is uracil
SEQUENCE: 87
tccatccctt cctgtttagt                                              20

SEQ ID NO: 88           moltype = DNA   length = 20
FEATURE                 Location/Qualifiers
misc_feature            1..20
                        note = [CTNNB1]1548
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 88
cttataatta ttgcaagtga                                              20

SEQ ID NO: 89           moltype = DNA   length = 20
FEATURE                 Location/Qualifiers
misc_feature            1..20
                        note = [CTNNB1]1549
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 89
tcttataatt attgcaagtg                                              20

SEQ ID NO: 90           moltype = DNA   length = 20
FEATURE                 Location/Qualifiers
misc_feature            1..20
                        note = [CTNNB1]1575
source                  1..20
                        mol_type = other DNA
                        organism = synthetic construct
modified_base           16..20
                        mod_base = OTHER
                        note = t is uracil
SEQUENCE: 90
acccacttgg cagaccatca                                              20

SEQ ID NO: 91           moltype = DNA   length = 20
FEATURE                 Location/Qualifiers
misc_feature            1..20
                        note = [CTNNB1]1576
source                  1..20
                        mol_type = other DNA
                        organism = synthetic construct
modified_base           16..20
                        mod_base = OTHER
                        note = t is uracil
SEQUENCE: 91
cacccacttg gcagaccatc                                              20

SEQ ID NO: 92           moltype = DNA   length = 20
FEATURE                 Location/Qualifiers
misc_feature            1..20
                        note = [CTNNB1]1577
source                  1..20
                        mol_type = other DNA
                        organism = synthetic construct
modified_base           16..20
                        mod_base = OTHER
                        note = t is uracil
SEQUENCE: 92
ccacccactt ggcagaccat                                              20

SEQ ID NO: 93           moltype = DNA   length = 20
```

```
FEATURE          Location/Qualifiers
misc_feature     1..20
                 note = [CTNNB1]1578
source           1..20
                 mol_type = other DNA
                 organism = synthetic construct
SEQUENCE: 93
accacccact tggcagacca                                                 20

SEQ ID NO: 94    moltype = DNA   length = 20
FEATURE          Location/Qualifiers
misc_feature     1..20
                 note = [CTNNB1]1642
source           1..20
                 mol_type = other DNA
                 organism = synthetic construct
modified_base    1..5
                 mod_base = OTHER
                 note = t is uracil
modified_base    16..20
                 mod_base = OTHER
                 note = t is uracil
SEQUENCE: 94
tggcaggctc agtgatgtct                                                 20

SEQ ID NO: 95    moltype = DNA   length = 20
FEATURE          Location/Qualifiers
misc_feature     1..20
                 note = [CTNNB1]1678
source           1..20
                 mol_type = other DNA
                 organism = synthetic construct
modified_base    1..5
                 mod_base = OTHER
                 note = t is uracil
modified_base    16..20
                 mod_base = OTHER
                 note = t is uracil
SEQUENCE: 95
cttggtgtcg gctggtcaga                                                 20

SEQ ID NO: 96    moltype = DNA   length = 20
FEATURE          Location/Qualifiers
misc_feature     1..20
                 note = [CTNNB1]1692
source           1..20
                 mol_type = other DNA
                 organism = synthetic construct
modified_base    16..20
                 mod_base = OTHER
                 note = t is uracil
SEQUENCE: 96
ggccatctct gcttcttggt                                                 20

SEQ ID NO: 97    moltype = DNA   length = 20
FEATURE          Location/Qualifiers
misc_feature     1..20
                 note = [CTNNB1]1703
source           1..20
                 mol_type = other DNA
                 organism = synthetic construct
modified_base    1..5
                 mod_base = OTHER
                 note = t is uracil
modified_base    16..20
                 mod_base = OTHER
                 note = t is uracil
SEQUENCE: 97
actgcattct gggccatctc                                                 20

SEQ ID NO: 98    moltype = DNA   length = 20
FEATURE          Location/Qualifiers
misc_feature     1..20
                 note = [CTNNB1]2071
source           1..20
                 mol_type = other DNA
                 organism = synthetic construct
modified_base    1..5
                 mod_base = OTHER
```

```
                         note = t is uracil
SEQUENCE: 98
caatgggaga ataaagcagc                                                20

SEQ ID NO: 99            moltype = DNA  length = 20
FEATURE                  Location/Qualifiers
misc_feature             1..20
                         note = [CTNNB1]2072
source                   1..20
                         mol_type = other DNA
                         organism = synthetic construct
modified_base            1..5
                         mod_base = OTHER
                         note = t is uracil
SEQUENCE: 99
tcaatgggag aataaagcag                                                20

SEQ ID NO: 100           moltype = DNA  length = 20
FEATURE                  Location/Qualifiers
misc_feature             1..20
                         note = [CTNNB1]2073
source                   1..20
                         mol_type = other DNA
                         organism = synthetic construct
modified_base            1..5
                         mod_base = OTHER
                         note = t is uracil
SEQUENCE: 100
ttcaatggga gaataaagca                                                20

SEQ ID NO: 101           moltype = DNA  length = 20
FEATURE                  Location/Qualifiers
misc_feature             1..20
                         note = [CTNNB1]2136
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 101
ttctgcagct tccttgtcct                                                20

SEQ ID NO: 102           moltype = DNA  length = 20
FEATURE                  Location/Qualifiers
misc_feature             1..20
                         note = [CTNNB1]2252
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 102
tgtggcttgt cctcagacat                                                20

SEQ ID NO: 103           moltype = DNA  length = 20
FEATURE                  Location/Qualifiers
misc_feature             1..20
                         note = [CTNNB1]2341
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 103
gtccaagatc agcagtctca                                                20

SEQ ID NO: 104           moltype = DNA  length = 20
```

```
FEATURE                 Location/Qualifiers
misc_feature            1..20
                        note = [CTNNB1]2439
source                  1..20
                        mol_type = other DNA
                        organism = synthetic construct
modified_base           16..20
                        mod_base = OTHER
                        note = t is uracil
SEQUENCE: 104
acccaaggca tcctggccat                                                   20

SEQ ID NO: 105          moltype = DNA   length = 20
FEATURE                 Location/Qualifiers
misc_feature            1..20
                        note = [CTNNB1]2446
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 105
ggtccatacc caaggcatcc                                                   20

SEQ ID NO: 106          moltype = DNA   length = 20
FEATURE                 Location/Qualifiers
misc_feature            1..20
                        note = [CTNNB1]2447
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 106
gggtccatac ccaaggcatc                                                   20

SEQ ID NO: 107          moltype = DNA   length = 20
FEATURE                 Location/Qualifiers
misc_feature            1..20
                        note = [CTNNB1]2479
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 107
ggtggtggcc acccatctca                                                   20

SEQ ID NO: 108          moltype = DNA   length = 20
FEATURE                 Location/Qualifiers
misc_feature            1..20
                        note = [CTNNB1]2516
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 108
agatctggca gcccatcaac                                                   20

SEQ ID NO: 109          moltype = DNA   length = 20
FEATURE                 Location/Qualifiers
misc_feature            1..20
```

```
                              note = [CTNNB1]2545
source                        1..20
                              mol_type = other DNA
                              organism = synthetic construct
modified_base                 16..20
                              mod_base = OTHER
                              note = t is uracil
SEQUENCE: 109
gcccatccat gaggtcctgg                                                          20

SEQ ID NO: 110                moltype = DNA   length = 20
FEATURE                       Location/Qualifiers
misc_feature                  1..20
                              note = [CTNNB1]2742
source                        1..20
                              mol_type = other DNA
                              organism = synthetic construct
modified_base                 1..5
                              mod_base = OTHER
                              note = t is uracil
modified_base                 16..20
                              mod_base = OTHER
                              note = t is uracil
SEQUENCE: 110
tcaaagtata tacctgtttt                                                          20

SEQ ID NO: 111                moltype = DNA   length = 20
FEATURE                       Location/Qualifiers
misc_feature                  1..20
                              note = [CTNNB1]311
source                        1..20
                              mol_type = other DNA
                              organism = synthetic construct
modified_base                 16..20
                              mod_base = OTHER
                              note = t is uracil
SEQUENCE: 111
gccgcttttc tgtctggttc                                                          20

SEQ ID NO: 112                moltype = DNA   length = 20
FEATURE                       Location/Qualifiers
misc_feature                  1..20
                              note = [CTNNB1]3395
source                        1..20
                              mol_type = other DNA
                              organism = synthetic construct
modified_base                 1..5
                              mod_base = OTHER
                              note = t is uracil
modified_base                 16..20
                              mod_base = OTHER
                              note = t is uracil
SEQUENCE: 112
cagattacaa ttaattagag                                                          20

SEQ ID NO: 113                moltype = DNA   length = 20
FEATURE                       Location/Qualifiers
misc_feature                  1..20
                              note = [CTNNB1]3401
source                        1..20
                              mol_type = other DNA
                              organism = synthetic construct
modified_base                 1..5
                              mod_base = OTHER
                              note = t is uracil
modified_base                 16..20
                              mod_base = OTHER
                              note = t is uracil
SEQUENCE: 113
tttattcaga ttacaattaa                                                          20

SEQ ID NO: 114                moltype = DNA   length = 20
FEATURE                       Location/Qualifiers
misc_feature                  1..20
                              note = [CTNNB1]3445
source                        1..20
                              mol_type = other DNA
                              organism = synthetic construct
modified_base                 1..5
```

-continued

```
                        mod_base = OTHER
                        note = t is uracil
modified_base           16..20
                        mod_base = OTHER
                        note = t is uracil
SEQUENCE: 114
tctatttgtc tattttatac                                              20

SEQ ID NO: 115          moltype = DNA  length = 20
FEATURE                 Location/Qualifiers
misc_feature            1..20
                        note = [CTNNB1]3476
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 115
catattaaaa aggaaactaa                                              20

SEQ ID NO: 116          moltype = DNA  length = 20
FEATURE                 Location/Qualifiers
misc_feature            1..20
                        note = [CTNNB1]3483
source                  1..20
                        mol_type = other DNA
                        organism = synthetic construct
modified_base           1..5
                        mod_base = OTHER
                        note = t is uracil
SEQUENCE: 116
ttttaagcat attaaaaagg                                              20

SEQ ID NO: 117          moltype = DNA  length = 20
FEATURE                 Location/Qualifiers
misc_feature            1..20
                        note = [CTNNB1]3484
source                  1..20
                        mol_type = other DNA
                        organism = synthetic construct
modified_base           1..5
                        mod_base = OTHER
                        note = t is uracil
SEQUENCE: 117
attttaagca tattaaaaag                                              20

SEQ ID NO: 118          moltype = DNA  length = 20
FEATURE                 Location/Qualifiers
misc_feature            1..20
                        note = [CTNNB1]3485
source                  1..20
                        mol_type = other DNA
                        organism = synthetic construct
modified_base           1..5
                        mod_base = OTHER
                        note = t is uracil
SEQUENCE: 118
tattttaagc atattaaaaa                                              20

SEQ ID NO: 119          moltype = DNA  length = 20
FEATURE                 Location/Qualifiers
misc_feature            1..20
                        note = [CTNNB1]3486
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 119
ttattttaag catattaaaa                                              20
```

| | | |
|---|---|---|
| SEQ ID NO: 120<br>FEATURE<br>misc_feature<br><br>source<br><br><br>modified_base<br><br><br>modified_base<br><br><br>SEQUENCE: 120<br>cttattttaa gcatattaaa | moltype = DNA   length = 20<br>Location/Qualifiers<br>1..20<br>note = [CTNNB1]3487<br>1..20<br>mol_type = other DNA<br>organism = synthetic construct<br>1..5<br>mod_base = OTHER<br>note = t is uracil<br>16..20<br>mod_base = OTHER<br>note = t is uracil<br><br> | <br><br><br><br><br><br><br><br><br><br><br><br><br><br><br>20 |
| SEQ ID NO: 121<br>FEATURE<br>misc_feature<br><br>source<br><br><br>modified_base<br><br><br>modified_base<br><br><br>SEQUENCE: 121<br>gcttatttta agcatattaa | moltype = DNA   length = 20<br>Location/Qualifiers<br>1..20<br>note = [CTNNB1]3488<br>1..20<br>mol_type = other DNA<br>organism = synthetic construct<br>1..5<br>mod_base = OTHER<br>note = t is uracil<br>16..20<br>mod_base = OTHER<br>note = t is uracil<br><br> | <br><br><br><br><br><br><br><br><br><br><br><br><br><br><br>20 |
| SEQ ID NO: 122<br>FEATURE<br>misc_feature<br><br>source<br><br><br>modified_base<br><br><br>modified_base<br><br><br>SEQUENCE: 122<br>tgcttatttt aagcatatta | moltype = DNA   length = 20<br>Location/Qualifiers<br>1..20<br>note = [CTNNB1]3489<br>1..20<br>mol_type = other DNA<br>organism = synthetic construct<br>1..5<br>mod_base = OTHER<br>note = t is uracil<br>16..20<br>mod_base = OTHER<br>note = t is uracil<br><br> | <br><br><br><br><br><br><br><br><br><br><br><br><br><br><br>20 |
| SEQ ID NO: 123<br>FEATURE<br>misc_feature<br><br>source<br><br><br>modified_base<br><br><br>modified_base<br><br><br>SEQUENCE: 123<br>ctcttgaagc atcgtatcac | moltype = DNA   length = 20<br>Location/Qualifiers<br>1..20<br>note = [CTNNB1]3648<br>1..20<br>mol_type = other DNA<br>organism = synthetic construct<br>16..20<br>mod_base = OTHER<br>note = t is uracil<br>1..5<br>mod_base = OTHER<br>note = t is uracil<br><br> | <br><br><br><br><br><br><br><br><br><br><br><br><br><br><br>20 |
| SEQ ID NO: 124<br>FEATURE<br>misc_feature<br><br>source<br><br><br>modified_base<br><br><br>modified_base<br><br><br>SEQUENCE: 124<br>cgaatgaatt aaaagtttaa | moltype = DNA   length = 20<br>Location/Qualifiers<br>1..20<br>note = [CTNNB1]3697<br>1..20<br>mol_type = other DNA<br>organism = synthetic construct<br>1..5<br>mod_base = OTHER<br>note = t is uracil<br>16..20<br>mod_base = OTHER<br>note = t is uracil<br><br> | <br><br><br><br><br><br><br><br><br><br><br><br><br><br><br>20 |

```
SEQ ID NO: 125          moltype = DNA   length = 20
FEATURE                 Location/Qualifiers
misc_feature            1..20
                        note = [CTNNB1]577
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 125
ggatctgcat gccctcatct                                                     20

SEQ ID NO: 126          moltype = DNA   length = 20
FEATURE                 Location/Qualifiers
misc_feature            1..20
                        note = [CTNNB1]589
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 126
actgtgtaga tgggatctgc                                                     20

SEQ ID NO: 127          moltype = DNA   length = 20
FEATURE                 Location/Qualifiers
misc_feature            1..20
                        note = [CTNNB1]808
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 127
cgtgtctgga agcttccttt                                                     20

SEQ ID NO: 128          moltype = DNA   length = 20
FEATURE                 Location/Qualifiers
misc_feature            1..20
                        note = [CTNNB1]809
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 128
gcgtgtctgg aagcttcctt                                                     20

SEQ ID NO: 129          moltype = DNA   length = 20
FEATURE                 Location/Qualifiers
misc_feature            1..20
                        note = [CTNNB1]811
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 129
```

```
tagcgtgtct ggaagcttcc                                                   20

SEQ ID NO: 130          moltype = DNA   length = 20
FEATURE                 Location/Qualifiers
misc_feature            1..20
                        note = [CTNNB1]916
source                  1..20
                        mol_type = other DNA
                        organism = synthetic construct
modified_base           16..20
                        mod_base = OTHER
                        note = t is uracil
SEQUENCE: 130
gggaaaggtt atgcaaggtc                                                   20

SEQ ID NO: 131          moltype = DNA   length = 20
FEATURE                 Location/Qualifiers
misc_feature            1..20
                        note = [EGFR]1010
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 131
cttgcacgtg gcttcgtctc                                                   20

SEQ ID NO: 132          moltype = DNA   length = 20
FEATURE                 Location/Qualifiers
misc_feature            1..20
                        note = [EGFR]1013
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 132
gtccttgcac gtggcttcgt                                                   20

SEQ ID NO: 133          moltype = DNA   length = 20
FEATURE                 Location/Qualifiers
misc_feature            1..20
                        note = [EGFR]1014
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 133
tgtccttgca cgtggcttcg                                                   20

SEQ ID NO: 134          moltype = DNA   length = 20
FEATURE                 Location/Qualifiers
misc_feature            1..20
                        note = [EGFR]1015
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 134
gtgtccttgc acgtggcttc                                                   20
```

```
SEQ ID NO: 135         moltype = DNA   length = 20
FEATURE                Location/Qualifiers
misc_feature           1..20
                       note = [EGFR]1016
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 135
ggtgtccttg cacgtggctt                                              20

SEQ ID NO: 136         moltype = DNA   length = 20
FEATURE                Location/Qualifiers
misc_feature           1..20
                       note = [EGFR]1017
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 136
aggtgtcctt gcacgtggct                                              20

SEQ ID NO: 137         moltype = DNA   length = 20
FEATURE                Location/Qualifiers
misc_feature           1..20
                       note = [EGFR]1018
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
SEQUENCE: 137
caggtgtcct tgcacgtggc                                              20

SEQ ID NO: 138         moltype = DNA   length = 20
FEATURE                Location/Qualifiers
misc_feature           1..20
                       note = [EGFR]1115
source                 1..20
                       mol_type = other DNA
                       organism = synthetic construct
SEQUENCE: 138
gggacacttc ttcacgcagg                                              20

SEQ ID NO: 139         moltype = DNA   length = 20
FEATURE                Location/Qualifiers
misc_feature           1..20
                       note = [EGFR]1224
source                 1..20
                       mol_type = other DNA
                       organism = synthetic construct
modified_base          16..20
                       mod_base = OTHER
                       note = t is uracil
SEQUENCE: 139
aaggcccttc gcacttctta                                              20

SEQ ID NO: 140         moltype = DNA   length = 20
FEATURE                Location/Qualifiers
misc_feature           1..20
                       note = [EGFR]1225
source                 1..20
                       mol_type = other DNA
                       organism = synthetic construct
modified_base          16..20
```

```
                            mod_base = OTHER
                            note = t is uracil
SEQUENCE: 140
caaggccctt cgcacttctt                                                        20

SEQ ID NO: 141              moltype = DNA  length = 20
FEATURE                     Location/Qualifiers
misc_feature                1..20
                            note = [EGFR]1226
source                      1..20
                            mol_type = other DNA
                            organism = synthetic construct
modified_base               16..20
                            mod_base = OTHER
                            note = t is uracil
SEQUENCE: 141
gcaaggccct tcgcacttct                                                        20

SEQ ID NO: 142              moltype = DNA  length = 20
FEATURE                     Location/Qualifiers
misc_feature                1..20
                            note = [EGFR]2313
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 142
cactgggtgt aagaggctcc                                                        20

SEQ ID NO: 143              moltype = DNA  length = 20
FEATURE                     Location/Qualifiers
misc_feature                1..20
                            note = [EGFR]2790
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 143
ctgtgatctt gacatgctgc                                                        20

SEQ ID NO: 144              moltype = DNA  length = 20
FEATURE                     Location/Qualifiers
misc_feature                1..20
                            note = [EGFR]2859
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 144
taggcacttt gcctccttct                                                        20

SEQ ID NO: 145              moltype = DNA  length = 20
FEATURE                     Location/Qualifiers
misc_feature                1..20
                            note = [EGFR]2874
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
```

```
SEQUENCE: 145
atgccatcca cttgataggc                                                   20

SEQ ID NO: 146          moltype = DNA  length = 20
FEATURE                 Location/Qualifiers
misc_feature            1..20
                        note = [EGFR]3263
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 146
atccaccacg tcgtccatgt                                                   20

SEQ ID NO: 147          moltype = DNA  length = 20
FEATURE                 Location/Qualifiers
misc_feature            1..20
                        note = [EGFR]3266
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 147
ggcatccacc acgtcgtcca                                                   20

SEQ ID NO: 148          moltype = DNA  length = 20
FEATURE                 Location/Qualifiers
misc_feature            1..20
                        note = [EGFR]3267
source                  1..20
                        mol_type = other DNA
                        organism = synthetic construct
modified_base           16..20
                        mod_base = OTHER
                        note = t is uracil
SEQUENCE: 148
cggcatccac cacgtcgtcc                                                   20

SEQ ID NO: 149          moltype = DNA  length = 20
FEATURE                 Location/Qualifiers
misc_feature            1..20
                        note = [EGFR]3268
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 149
tcggcatcca ccacgtcgtc                                                   20

SEQ ID NO: 150          moltype = DNA  length = 20
FEATURE                 Location/Qualifiers
misc_feature            1..20
                        note = [EGFR]3274
source                  1..20
                        mol_type = other DNA
                        organism = synthetic construct
modified_base           1..5
                        mod_base = OTHER
                        note = t is uracil
SEQUENCE: 150
tactcgtcgg catccaccac                                                   20

SEQ ID NO: 151          moltype = DNA  length = 20
FEATURE                 Location/Qualifiers
```

```
misc_feature                1..20
                            note = [EGFR]3275
source                      1..20
                            mol_type = other DNA
                            organism = synthetic construct
modified_base               1..5
                            mod_base = OTHER
                            note = t is uracil
SEQUENCE: 151
gtactcgtcg gcatccacca                                                           20

SEQ ID NO: 152              moltype = DNA  length = 20
FEATURE                     Location/Qualifiers
misc_feature                1..20
                            note = [EGFR]335
source                      1..20
                            mol_type = other DNA
                            organism = synthetic construct
modified_base               1..5
                            mod_base = OTHER
                            note = t is uracil
SEQUENCE: 152
gttactcgtg ccttggcaaa                                                           20

SEQ ID NO: 153              moltype = RNA  length = 20
FEATURE                     Location/Qualifiers
misc_feature                1..20
                            note = [EGFR]3526
source                      1..20
                            mol_type = other RNA
                            organism = synthetic construct
SEQUENCE: 153
cttttgggaa cggactggtt                                                           20

SEQ ID NO: 154              moltype = DNA  length = 20
FEATURE                     Location/Qualifiers
misc_feature                1..20
                            note = [EGFR]3652
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 154
acagtgttga gatactcggg                                                           20

SEQ ID NO: 155              moltype = DNA  length = 20
FEATURE                     Location/Qualifiers
misc_feature                1..20
                            note = [EGFR]3908
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 155
gggtatcgaa agagtctgga                                                           20

SEQ ID NO: 156              moltype = DNA  length = 20
FEATURE                     Location/Qualifiers
misc_feature                1..20
                            note = [EGFR]4705
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
```

```
SEQUENCE: 156
tgggctggaa tccgagttat                                                      20

SEQ ID NO: 157          moltype = DNA  length = 20
FEATURE                 Location/Qualifiers
misc_feature            1..20
                        note = [EGFR]4885
source                  1..20
                        mol_type = other DNA
                        organism = synthetic construct
modified_base           16..20
                        mod_base = OTHER
                        note = t is uracil
SEQUENCE: 157
ggagatttca gagcagcttc                                                      20

SEQ ID NO: 158          moltype = DNA  length = 20
FEATURE                 Location/Qualifiers
misc_feature            1..20
                        note = [EGFR]5094
source                  1..20
                        mol_type = other DNA
                        organism = synthetic construct
modified_base           1..5
                        mod_base = OTHER
                        note = t is uracil
SEQUENCE: 158
ttactttaaa agcaaaagga                                                      20

SEQ ID NO: 159          moltype = DNA  length = 20
FEATURE                 Location/Qualifiers
misc_feature            1..20
                        note = [EGFR]5095
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 159
tgaagtaaaa atcaatagcg                                                      20

SEQ ID NO: 160          moltype = DNA  length = 20
FEATURE                 Location/Qualifiers
misc_feature            1..20
                        note = [EGFR]5101
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 160
gtaaaaagct tttgaagtga                                                      20

SEQ ID NO: 161          moltype = DNA  length = 20
FEATURE                 Location/Qualifiers
misc_feature            1..20
                        note = [EGFR]5102
source                  1..20
                        mol_type = other DNA
                        organism = synthetic construct
modified_base           1..5
                        mod_base = OTHER
                        note = t is uracil
SEQUENCE: 161
ttgaagtgaa gtaaaaggag                                                      20

SEQ ID NO: 162          moltype = DNA  length = 20
FEATURE                 Location/Qualifiers
misc_feature            1..20
                        note = [EGFR]5103
source                  1..20
```

-continued

```
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 162
ttttgaagtg tttaatattc                                                   20

SEQ ID NO: 163          moltype = RNA  length = 20
FEATURE                 Location/Qualifiers
misc_feature            1..20
                        note = [EGFR]5104
source                  1..20
                        mol_type = other RNA
                        organism = synthetic construct
SEQUENCE: 163
gtaaaaggag aaaactatct                                                   20

SEQ ID NO: 164          moltype = DNA  length = 20
FEATURE                 Location/Qualifiers
misc_feature            1..20
                        note = [EGFR]5105
source                  1..20
                        mol_type = other DNA
                        organism = synthetic construct
modified_base           1..5
                        mod_base = OTHER
                        note = t is uracil
SEQUENCE: 164
tttgaagtga agtaaaagga                                                   20

SEQ ID NO: 165          moltype = DNA  length = 20
FEATURE                 Location/Qualifiers
misc_feature            1..20
                        note = [EGFR]5106
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 165
tttacggttt tcagaatatc                                                   20

SEQ ID NO: 166          moltype = DNA  length = 20
FEATURE                 Location/Qualifiers
misc_feature            1..20
                        note = [EGFR]5107
source                  1..20
                        mol_type = other DNA
                        organism = synthetic construct
modified_base           1..5
                        mod_base = OTHER
                        note = t is uracil
SEQUENCE: 166
gaagtgaagt aaaggagaa                                                    20

SEQ ID NO: 167          moltype = DNA  length = 20
FEATURE                 Location/Qualifiers
misc_feature            1..20
                        note = [EGFR]5108
source                  1..20
                        mol_type = other DNA
                        organism = synthetic construct
modified_base           16..20
                        mod_base = OTHER
                        note = t is uracil
SEQUENCE: 167
aaaaggagaa aactatcttc                                                   20

SEQ ID NO: 168          moltype = DNA  length = 20
FEATURE                 Location/Qualifiers
misc_feature            1..20
```

|  |  |  |
|---|---|---|
|  | note = [EGFR]5110 |  |
| source | 1..20 |  |
|  | mol_type = other DNA |  |
|  | organism = synthetic construct |  |
| SEQUENCE: 168 |  |  |
| aaaaattact ttaaaagcaa |  | 20 |
|  |  |  |
| SEQ ID NO: 169 | moltype = DNA length = 20 |  |
| FEATURE | Location/Qualifiers |  |
| misc_feature | 1..20 |  |
|  | note = [EGFR]5111 |  |
| source | 1..20 |  |
|  | mol_type = other DNA |  |
|  | organism = synthetic construct |  |
| modified_base | 1..5 |  |
|  | mod_base = OTHER |  |
|  | note = t is uracil |  |
| modified_base | 16..20 |  |
|  | mod_base = OTHER |  |
|  | note = t is uracil |  |
| SEQUENCE: 169 |  |  |
| agtaaaaagc ttttgaagtg |  | 20 |
|  |  |  |
| SEQ ID NO: 170 | moltype = DNA length = 20 |  |
| FEATURE | Location/Qualifiers |  |
| misc_feature | 1..20 |  |
|  | note = [EGFR]5112 |  |
| source | 1..20 |  |
|  | mol_type = other DNA |  |
|  | organism = synthetic construct |  |
| modified_base | 1..5 |  |
|  | mod_base = OTHER |  |
|  | note = t is uracil |  |
| SEQUENCE: 170 |  |  |
| ttttgaagtg aagtaaaagg |  | 20 |
|  |  |  |
| SEQ ID NO: 171 | moltype = DNA length = 20 |  |
| FEATURE | Location/Qualifiers |  |
| misc_feature | 1..20 |  |
|  | note = [EGFR]5113 |  |
| source | 1..20 |  |
|  | mol_type = other DNA |  |
|  | organism = synthetic construct |  |
| modified_base | 1..5 |  |
|  | mod_base = OTHER |  |
|  | note = t is uracil |  |
| modified_base | 16..20 |  |
|  | mod_base = OTHER |  |
|  | note = t is uracil |  |
| SEQUENCE: 171 |  |  |
| gtagagaaat tattttagga |  | 20 |
|  |  |  |
| SEQ ID NO: 172 | moltype = DNA length = 20 |  |
| FEATURE | Location/Qualifiers |  |
| misc_feature | 1..20 |  |
|  | note = [EGFR]5114 |  |
| source | 1..20 |  |
|  | mol_type = other DNA |  |
|  | organism = synthetic construct |  |
| modified_base | 1..5 |  |
|  | mod_base = OTHER |  |
|  | note = t is uracil |  |
| SEQUENCE: 172 |  |  |
| aattacttta aaagcaaaag |  | 20 |
|  |  |  |
| SEQ ID NO: 173 | moltype = DNA length = 20 |  |
| FEATURE | Location/Qualifiers |  |
| misc_feature | 1..20 |  |
|  | note = [EGFR]5115 |  |
| source | 1..20 |  |
|  | mol_type = other DNA |  |
|  | organism = synthetic construct |  |
| modified_base | 1..5 |  |
|  | mod_base = OTHER |  |
|  | note = t is uracil |  |
| modified_base | 16..20 |  |
|  | mod_base = OTHER |  |
|  | note = t is uracil |  |
| SEQUENCE: 173 |  |  |

```
tgtagagaaa ttattttagg                                               20

SEQ ID NO: 174          moltype = DNA   length = 20
FEATURE                 Location/Qualifiers
misc_feature            1..20
                        note = [EGFR]5118
source                  1..20
                        mol_type = other DNA
                        organism = synthetic construct
modified_base           1..5
                        mod_base = OTHER
                        note = t is uracil
SEQUENCE: 174
attactttaa aagcaaaagg                                               20

SEQ ID NO: 175          moltype = DNA   length = 20
FEATURE                 Location/Qualifiers
misc_feature            1..20
                        note = [EGFR]5119
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 175
tttttgaagt gtttaatatt                                               20

SEQ ID NO: 176          moltype = DNA   length = 20
FEATURE                 Location/Qualifiers
misc_feature            1..20
                        note = [EGFR]5120
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 176
taaaaggaga aaactatctt                                               20

SEQ ID NO: 177          moltype = DNA   length = 20
FEATURE                 Location/Qualifiers
misc_feature            1..20
                        note = [EGFR]5121
source                  1..20
                        mol_type = other DNA
                        organism = synthetic construct
modified_base           1..5
                        mod_base = OTHER
                        note = t is uracil
SEQUENCE: 177
cttttgaagt gaagtaaaag                                               20

SEQ ID NO: 178          moltype = DNA   length = 20
FEATURE                 Location/Qualifiers
misc_feature            1..20
                        note = [EGFR]727
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 178
atgtcccgcc actggatgct                                               20

SEQ ID NO: 179          moltype = DNA   length = 20
FEATURE                 Location/Qualifiers
misc_feature            1..20
```

```
                        note = [LINC-PINT]101
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 179
tcccatccct tctgctgcca                                                    20

SEQ ID NO: 180          moltype = DNA   length = 20
FEATURE                 Location/Qualifiers
misc_feature            1..20
                        note = [LINC-PINT]102
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 180
gtcccatccc ttctgctgcc                                                    20

SEQ ID NO: 181          moltype = DNA   length = 20
FEATURE                 Location/Qualifiers
misc_feature            1..20
                        note = [LINC-PINT]103
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 181
ggtcccatcc cttctgctgc                                                    20

SEQ ID NO: 182          moltype = DNA   length = 20
FEATURE                 Location/Qualifiers
misc_feature            1..20
                        note = [LINC-PINT]106
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 182
tctggtccca tcccttctgc                                                    20

SEQ ID NO: 183          moltype = DNA   length = 20
FEATURE                 Location/Qualifiers
misc_feature            1..20
                        note = [LINC-PINT]108
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 183
tctctggtcc catcccttct                                                    20

SEQ ID NO: 184          moltype = DNA   length = 20
FEATURE                 Location/Qualifiers
```

```
misc_feature                1..20
                            note = [LINC-PINT]109
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 184
ctctctggtc ccatcccttc                                                    20

SEQ ID NO: 185              moltype = DNA  length = 20
FEATURE                     Location/Qualifiers
misc_feature                1..20
                            note = [LINC-PINT]110
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 185
tctctctggt cccatccctt                                                    20

SEQ ID NO: 186              moltype = DNA  length = 20
FEATURE                     Location/Qualifiers
misc_feature                1..20
                            note = [LINC-PINT]111
source                      1..20
                            mol_type = other DNA
                            organism = synthetic construct
modified_base               1..5
                            mod_base = OTHER
                            note = t is uracil
SEQUENCE: 186
ttctctctgg tcccatccct                                                    20

SEQ ID NO: 187              moltype = DNA  length = 20
FEATURE                     Location/Qualifiers
misc_feature                1..20
                            note = [LINC-PINT]112
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 187
cttctctctg gtcccatccc                                                    20

SEQ ID NO: 188              moltype = DNA  length = 20
FEATURE                     Location/Qualifiers
misc_feature                1..20
                            note = [LINC-PINT]113
source                      1..20
                            mol_type = other DNA
                            organism = synthetic construct
modified_base               1..5
                            mod_base = OTHER
                            note = t is uracil
modified_base               16..20
                            mod_base = OTHER
                            note = t is uracil
SEQUENCE: 188
ccttctctct ggtcccatcc                                                    20

SEQ ID NO: 189              moltype = DNA  length = 20
FEATURE                     Location/Qualifiers
misc_feature                1..20
                            note = [LINC-PINT]114
```

```
source              1..20
                    mol_type = other DNA
                    organism = synthetic construct
modified_base       1..5
                    mod_base = OTHER
                    note = t is uracil
modified_base       16..20
                    mod_base = OTHER
                    note = t is uracil
SEQUENCE: 189
cccttctctc tggtcccatc                                                     20

SEQ ID NO: 190      moltype = DNA   length = 20
FEATURE             Location/Qualifiers
misc_feature        1..20
                    note = [LINC-PINT]115
source              1..20
                    mol_type = other DNA
                    organism = synthetic construct
modified_base       1..5
                    mod_base = OTHER
                    note = t is uracil
modified_base       16..20
                    mod_base = OTHER
                    note = t is uracil
SEQUENCE: 190
acccttctct ctggtcccat                                                     20

SEQ ID NO: 191      moltype = DNA   length = 20
FEATURE             Location/Qualifiers
misc_feature        1..20
                    note = [LINC-PINT]116
source              1..20
                    mol_type = other DNA
                    organism = synthetic construct
modified_base       16..20
                    mod_base = OTHER
                    note = t is uracil
SEQUENCE: 191
cacccttctc tctggtccca                                                     20

SEQ ID NO: 192      moltype = DNA   length = 20
FEATURE             Location/Qualifiers
misc_feature        1..20
                    note = [LINC-PINT]1222
source              1..20
                    mol_type = other DNA
                    organism = synthetic construct
modified_base       1..5
                    mod_base = OTHER
                    note = t is uracil
SEQUENCE: 192
ttagctcctt gcctcgttcc                                                     20

SEQ ID NO: 193      moltype = DNA   length = 20
FEATURE             Location/Qualifiers
misc_feature        1..20
                    note = [LINC-PINT]126
source              1..20
                    mol_type = other DNA
                    organism = synthetic construct
modified_base       1..5
                    mod_base = OTHER
                    note = t is uracil
modified_base       16..20
                    mod_base = OTHER
                    note = t is uracil
SEQUENCE: 193
gtctcctcca cacccttctc                                                     20

SEQ ID NO: 194      moltype = DNA   length = 20
FEATURE             Location/Qualifiers
misc_feature        1..20
                    note = [LINC-PINT]127
source              1..20
                    mol_type = other DNA
                    organism = synthetic construct
modified_base       1..5
                    mod_base = OTHER
```

```
                         note = t is uracil
modified_base            16..20
                         mod_base = OTHER
                         note = t is uracil
SEQUENCE: 194
ggtctcctcc acacccttct                                                      20

SEQ ID NO: 195           moltype = DNA  length = 20
FEATURE                  Location/Qualifiers
misc_feature             1..20
                         note = [LINC-PINT]128
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 195
gggtctcctc cacacccttc                                                      20

SEQ ID NO: 196           moltype = DNA  length = 20
FEATURE                  Location/Qualifiers
misc_feature             1..20
                         note = [LINC-PINT]1284
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 196
tcccaactct tctaactcgt                                                      20

SEQ ID NO: 197           moltype = RNA  length = 20
FEATURE                  Location/Qualifiers
misc_feature             1..20
                         note = [LINC-PINT]1315
source                   1..20
                         mol_type = other RNA
                         organism = synthetic construct
SEQUENCE: 197
gcaaggcaga gaaactccag                                                      20

SEQ ID NO: 198           moltype = DNA  length = 20
FEATURE                  Location/Qualifiers
misc_feature             1..20
                         note = [LINC-PINT]148.1
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 198
aaatgtcctg gccctcactg                                                      20

SEQ ID NO: 199           moltype = DNA  length = 20
FEATURE                  Location/Qualifiers
misc_feature             1..20
                         note = [LINC-PINT]1497.1
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 199
```

-continued

```
gatggttcca gtccctcttc                                           20

SEQ ID NO: 200         moltype = DNA   length = 20
FEATURE                Location/Qualifiers
misc_feature           1..20
                       note = [LINC-PINT]2504
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil SEQUENCE: 200
cctattaaaa aaatttatac                                           20

SEQ ID NO: 201         moltype = DNA   length = 20
FEATURE                Location/Qualifiers
misc_feature           1..20
                       note = [LINC-PINT]2524
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil SEQUENCE: 201
tattcatatt tttatttcag                                           20

SEQ ID NO: 202         moltype = DNA   length = 20
FEATURE                Location/Qualifiers
misc_feature           1..20
                       note = [LINC-PINT]2527
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil SEQUENCE: 202
tgctattcat attttattt                                            20

SEQ ID NO: 203         moltype = DNA   length = 20
FEATURE                Location/Qualifiers
misc_feature           1..20
                       note = [LINC-PINT]2673.1
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil SEQUENCE: 203
ttggcctgtg gatgctttgt                                           20

SEQ ID NO: 204         moltype = DNA   length = 20
FEATURE                Location/Qualifiers
misc_feature           1..20
                       note = [LINC-PINT]2690
source                 1..20
                       mol_type = other DNA
                       organism = synthetic construct
modified_base          1..5
                       mod_base = OTHER
                       note = t is uracil
modified_base          16..20
                       mod_base = OTHER
                       note = t is uracil
```

```
SEQUENCE: 204
tttgaaattc agaagatttg                                               20

SEQ ID NO: 205          moltype = DNA   length = 20
FEATURE                 Location/Qualifiers
misc_feature            1..20
                        note = [LINC-PINT]2754
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 205
tttatattac aaagctactt                                               20

SEQ ID NO: 206          moltype = DNA   length = 20
FEATURE                 Location/Qualifiers
misc_feature            1..20
                        note = [LINC-PINT]2755
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 206
ctttatatta caaagctact                                               20

SEQ ID NO: 207          moltype = DNA   length = 20
FEATURE                 Location/Qualifiers
misc_feature            1..20
                        note = [LINC-PINT]2811
source                  1..20
                        mol_type = other DNA
                        organism = synthetic construct
modified_base           16..20
                        mod_base = OTHER
                        note = t is uracil
SEQUENCE: 207
aaaagtggga aataaaggtt                                               20

SEQ ID NO: 208          moltype = DNA   length = 20
FEATURE                 Location/Qualifiers
misc_feature            1..20
                        note = [LINC-PINT]2812
source                  1..20
                        mol_type = other DNA
                        organism = synthetic construct
modified_base           16..20
                        mod_base = OTHER
                        note = t is uracil
SEQUENCE: 208
aaaaagtggg aataaaggt                                                20

SEQ ID NO: 209          moltype = DNA   length = 20
FEATURE                 Location/Qualifiers
misc_feature            1..20
                        note = [LINC-PINT]283.1
source                  1..20
                        mol_type = other DNA
                        organism = synthetic construct
modified_base           1..5
                        mod_base = OTHER
                        note = t is uracil
SEQUENCE: 209
tgatgatgct tgcaggaggc                                               20

SEQ ID NO: 210          moltype = DNA   length = 20
FEATURE                 Location/Qualifiers
misc_feature            1..20
                        note = [LINC-PINT]2990
source                  1..20
```

```
                        mol_type = other DNA
                        organism = synthetic construct
modified_base           1..5
                        mod_base = OTHER
                        note = t is uracil
SEQUENCE: 210
cactgtattt tattacagaa                                                20

SEQ ID NO: 211          moltype = DNA  length = 20
FEATURE                 Location/Qualifiers
misc_feature            1..20
                        note = [LINC-PINT]3011
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 211
agtttataga tttcaagtag                                                20

SEQ ID NO: 212          moltype = DNA  length = 20
FEATURE                 Location/Qualifiers
misc_feature            1..20
                        note = [LINC-PINT]384
source                  1..20
                        mol_type = other DNA
                        organism = synthetic construct
modified_base           1..5
                        mod_base = OTHER
                        note = t is uracil
SEQUENCE: 212
tgacaaaaca ataataacag                                                20

SEQ ID NO: 213          moltype = DNA  length = 20
FEATURE                 Location/Qualifiers
misc_feature            1..20
                        note = [LINC-PINT]412
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 213
gttcagtcag atcgctggga                                                20

SEQ ID NO: 214          moltype = RNA  length = 20
FEATURE                 Location/Qualifiers
misc_feature            1..20
                        note = [LINC-PINT]450
source                  1..20
                        mol_type = other RNA
                        organism = synthetic construct
SEQUENCE: 214
aaagtcaaaa agaaaaactg                                                20

SEQ ID NO: 215          moltype = RNA  length = 20
FEATURE                 Location/Qualifiers
misc_feature            1..20
                        note = [LINC-PINT]501
source                  1..20
                        mol_type = other RNA
                        organism = synthetic construct
SEQUENCE: 215
tgtttccccg gagagcaatg                                                20

SEQ ID NO: 216          moltype = DNA  length = 20
FEATURE                 Location/Qualifiers
misc_feature            1..20
                        note = [LINC-PINT]523
source                  1..20
                        mol_type = other DNA
```

```
                        organism = synthetic construct
modified_base           1..5
                        mod_base = OTHER
                        note = t is uracil
modified_base           16..20
                        mod_base = OTHER
                        note = t is uracil
SEQUENCE: 216
tgacatttcg tggctcctac                                                   20

SEQ ID NO: 217          moltype = DNA  length = 20
FEATURE                 Location/Qualifiers
misc_feature            1..20
                        note = [LINC-PINT]524.1
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 217
atgacatttc gtggctccta                                                   20

SEQ ID NO: 218          moltype = RNA  length = 20
FEATURE                 Location/Qualifiers
misc_feature            1..20
                        note = [LINC-PINT]587
source                  1..20
                        mol_type = other RNA
                        organism = synthetic construct
SEQUENCE: 218
agccgaacag aaggagcgtc                                                   20

SEQ ID NO: 219          moltype = DNA  length = 20
FEATURE                 Location/Qualifiers
misc_feature            1..20
                        note = [LINC-PINT]727.1
source                  1..20
                        mol_type = other DNA
                        organism = synthetic construct
modified_base           1..5
                        mod_base = OTHER
                        note = t is uracil
SEQUENCE: 219
gtccgtacct ccacccaccg                                                   20

SEQ ID NO: 220          moltype = DNA  length = 20
FEATURE                 Location/Qualifiers
misc_feature            1..20
                        note = [LINC-PINT]83.1
source                  1..20
                        mol_type = other DNA
                        organism = synthetic construct
modified_base           16..20
                        mod_base = OTHER
                        note = t is uracil
SEQUENCE: 220
caagccccag cgttcctccg                                                   20

SEQ ID NO: 221          moltype = DNA  length = 20
FEATURE                 Location/Qualifiers
misc_feature            1..20
                        note = [LINC-PINT]877
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 221
ccctaatgct ttcctctcca                                                   20

SEQ ID NO: 222          moltype = DNA  length = 20
```

```
FEATURE                    Location/Qualifiers
misc_feature               1..20
                           note = [LINC-PINT]935
source                     1..20
                           mol_type = other DNA
                           organism = synthetic construct
modified_base              1..5
                           mod_base = OTHER
                           note = t is uracil
modified_base              16..20
                           mod_base = OTHER
                           note = t is uracil
SEQUENCE: 222
gcgtagtttc tcttcctccc                                                    20

SEQ ID NO: 223             moltype = DNA  length = 20
FEATURE                    Location/Qualifiers
misc_feature               1..20
                           note = [LINC-PINT]937.1
source                     1..20
                           mol_type = other DNA
                           organism = synthetic construct
modified_base              1..5
                           mod_base = OTHER
                           note = t is uracil
modified_base              16..20
                           mod_base = OTHER
                           note = t is uracil
SEQUENCE: 223
tggcgtagtt tctcttcctc                                                    20

SEQ ID NO: 224             moltype = DNA  length = 20
FEATURE                    Location/Qualifiers
misc_feature               1..20
                           note = [LINC-PINT]94
source                     1..20
                           mol_type = other DNA
                           organism = synthetic construct
modified_base              1..5
                           mod_base = OTHER
                           note = t is uracil
SEQUENCE: 224
ccttctgctg ccaagcccca                                                    20

SEQ ID NO: 225             moltype = DNA  length = 20
FEATURE                    Location/Qualifiers
misc_feature               1..20
                           note = [LINC-PINT]98
source                     1..20
                           mol_type = other DNA
                           organism = synthetic construct
modified_base              1..5
                           mod_base = OTHER
                           note = t is uracil
SEQUENCE: 225
catcccttct gctgccaagc                                                    20

SEQ ID NO: 226             moltype = DNA  length = 20
FEATURE                    Location/Qualifiers
misc_feature               1..20
                           note = [LINC-PINT]99
source                     1..20
                           mol_type = other DNA
                           organism = synthetic construct
modified_base              1..5
                           mod_base = OTHER
                           note = t is uracil
SEQUENCE: 226
ccatcccttc tgctgccaag                                                    20

SEQ ID NO: 227             moltype = RNA  length = 20
FEATURE                    Location/Qualifiers
misc_feature               1..20
                           note = [HPRT]1027
source                     1..20
                           mol_type = other RNA
                           organism = synthetic construct
SEQUENCE: 227
aatccgccca aagggaactg                                                    20
```

-continued

```
SEQ ID NO: 228          moltype = DNA   length = 20
FEATURE                 Location/Qualifiers
misc_feature            1..20
                        note = [HPRT]1353
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 228
gctgacaaag attcactggt                                                    20

SEQ ID NO: 229          moltype = DNA   length = 20
FEATURE                 Location/Qualifiers
misc_feature            1..20
                        note = [HPRT]292
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 229
acgttcagtc ctgtccataa                                                    20

SEQ ID NO: 230          moltype = DNA   length = 20
FEATURE                 Location/Qualifiers
misc_feature            1..20
                        note = [HPRT]294
source                  1..20
                        mol_type = other DNA
                        organism = synthetic construct
modified_base           16..20
                        mod_base = OTHER
                        note = t is uracil
SEQUENCE: 230
agacgttcag tcctgtccat                                                    20

SEQ ID NO: 231          moltype = DNA   length = 20
FEATURE                 Location/Qualifiers
misc_feature            1..20
                        note = [HPRT]326
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 231
ggcctcccat ctccttcatc                                                    20

SEQ ID NO: 232          moltype = DNA   length = 20
FEATURE                 Location/Qualifiers
misc_feature            1..20
                        note = [HPRT]329
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 232
gatggcctcc catctccttc                                                    20

SEQ ID NO: 233          moltype = DNA   length = 20
```

```
FEATURE              Location/Qualifiers
misc_feature         1..20
                     note = [HPRT]330
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 233
tgatggcctc ccatctcctt                                              20

SEQ ID NO: 234       moltype = DNA   length = 20
FEATURE              Location/Qualifiers
misc_feature         1..20
                     note = [HPRT]331
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 234
gtgatggcct cccatctcct                                              20

SEQ ID NO: 235       moltype = DNA   length = 20
FEATURE              Location/Qualifiers
misc_feature         1..20
                     note = [HPRT]331
source               1..20
                     mol_type = other DNA
                     organism = synthetic construct
SEQUENCE: 235
tgtgatggcc tcccatctcc                                              20

SEQ ID NO: 236       moltype = DNA   length = 20
FEATURE              Location/Qualifiers
misc_feature         1..20
                     note = [HPRT]333
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 236
atgtgatggc ctcccatctc                                              20

SEQ ID NO: 237       moltype = DNA   length = 20
FEATURE              Location/Qualifiers
misc_feature         1..20
                     note = [HPRT]334
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 237
aatgtgatgg cctcccatct                                              20

SEQ ID NO: 238       moltype = DNA   length = 20
FEATURE              Location/Qualifiers
misc_feature         1..20
                     note = [HPRT]335
source               1..20
                     mol_type = other DNA
```

```
                        organism = synthetic construct
modified_base           1..5
                        mod_base = OTHER
                        note = t is uracil
modified_base           16..20
                        mod_base = OTHER
                        note = t is uracil
SEQUENCE: 238
caatgtgatg gcctcccatc                                                    20

SEQ ID NO: 239          moltype = DNA   length = 20
FEATURE                 Location/Qualifiers
misc_feature            1..20
                        note = [HPRT]388
source                  1..20
                        mol_type = other DNA
                        organism = synthetic construct
modified_base           1..5
                        mod_base = OTHER
                        note = t is uracil
SEQUENCE: 239
atccagcagg tcagcaaaga                                                    20

SEQ ID NO: 240          moltype = DNA   length = 20
FEATURE                 Location/Qualifiers
misc_feature            1..20
                        note = [HPRT]475
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 240
ctggtcatta caatagctct                                                    20

SEQ ID NO: 241          moltype = DNA   length = 20
FEATURE                 Location/Qualifiers
misc_feature            1..20
                        note = [HPRT]489
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 241
atgtcccctg ttgactggtc                                                    20

SEQ ID NO: 242          moltype = DNA   length = 20
FEATURE                 Location/Qualifiers
misc_feature            1..20
                        note = [HPRT]551
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 242
cttccacaat caagacattc                                                    20

SEQ ID NO: 243          moltype = DNA   length = 20
FEATURE                 Location/Qualifiers
misc_feature            1..20
                        note = [HPRT]660
source                  1..20
                        mol_type = other DNA
                        organism = synthetic construct
modified_base           1..5
```

```
                        mod_base = OTHER
                        note = t is uracil
modified_base           16..20
                        mod_base = OTHER
                        note = t is uracil
SEQUENCE: 243
cttcgtgggg tccttttcac                                                      20

SEQ ID NO: 244          moltype = DNA   length = 20
FEATURE                 Location/Qualifiers
misc_feature            1..20
                        note = [HPRT]661
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 244
acttcgtggg gtccttttca                                                      20

SEQ ID NO: 245          moltype = DNA   length = 20
FEATURE                 Location/Qualifiers
misc_feature            1..20
                        note = [HPRT]662
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 245
cacttcgtgg ggtccttttc                                                      20

SEQ ID NO: 246          moltype = DNA   length = 20
FEATURE                 Location/Qualifiers
misc_feature            1..20
                        note = [HPRT]663
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 246
acacttcgtg gggtcctttt                                                      20

SEQ ID NO: 247          moltype = DNA   length = 20
FEATURE                 Location/Qualifiers
misc_feature            1..20
                        note = [HPRT]664
source                  1..20
                        mol_type = other DNA
                        organism = synthetic construct
modified_base           16..20
                        mod_base = OTHER
                        note = t is uracil
SEQUENCE: 247
aacacttcgt ggggtccttt                                                      20

SEQ ID NO: 248          moltype = DNA   length = 20
FEATURE                 Location/Qualifiers
misc_feature            1..20
                        note = [HPRT]665
source                  1..20
                        mol_type = other DNA
                        organism = synthetic construct
modified_base           16..20
                        mod_base = OTHER
                        note = t is uracil
```

```
SEQUENCE: 248
caacacttcg tggggtcctt                                                20

SEQ ID NO: 249          moltype = DNA  length = 20
FEATURE                 Location/Qualifiers
misc_feature            1..20
                        note = [HPRT]666
source                  1..20
                        mol_type = other DNA
                        organism = synthetic construct
modified_base           16..20
                        mod_base = OTHER
                        note = t is uracil
SEQUENCE: 249
ccaacacttc gtgggtcct                                                 20

SEQ ID NO: 250          moltype = DNA  length = 20
FEATURE                 Location/Qualifiers
misc_feature            1..20
                        note = [HPRT]667
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 250
tccaacactt cgtggggtcc                                                20

SEQ ID NO: 251          moltype = DNA  length = 20
FEATURE                 Location/Qualifiers
misc_feature            1..20
                        note = [HPRT]668
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 251
atccaacact tcgtggggtc                                                20

SEQ ID NO: 252          moltype = DNA  length = 20
FEATURE                 Location/Qualifiers
misc_feature            1..20
                        note = [HPRT]669
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 252
tatccaacac ttcgtggggt                                                20

SEQ ID NO: 253          moltype = DNA  length = 20
FEATURE                 Location/Qualifiers
misc_feature            1..20
                        note = [HPRT]692
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 253
caaatccaac aaagtctggc                                                20
```

```
SEQ ID NO: 254          moltype = DNA  length = 20
FEATURE                 Location/Qualifiers
misc_feature            1..20
                        note = [HPRT]732
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 254
tagtcaaggg catatcctac                                              20

SEQ ID NO: 255          moltype = DNA  length = 20
FEATURE                 Location/Qualifiers
misc_feature            1..20
                        note = [HPRT]847
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 255
ataggactcc agatgtttcc                                              20

SEQ ID NO: 256          moltype = DNA  length = 20
FEATURE                 Location/Qualifiers
misc_feature            1..20
                        note = [HPRT]950
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 256
ctaaagtaca aaacagataa                                              20

SEQ ID NO: 257          moltype = DNA  length = 20
FEATURE                 Location/Qualifiers
misc_feature            1..20
                        note = [HPRT]1292
source                  1..20
                        mol_type = other DNA
                        organism = synthetic construct
modified_base           16..20
                        mod_base = OTHER
                        note = t is uracil
SEQUENCE: 257
aacactacta aaataattcc                                              20

SEQ ID NO: 258          moltype = DNA  length = 20
FEATURE                 Location/Qualifiers
misc_feature            1..20
                        note = [HPRT]1335
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 258
gtaataattt gaacaagttg                                              20

SEQ ID NO: 259          moltype = DNA  length = 20
```

```
FEATURE              Location/Qualifiers
misc_feature         1..20
                     note = [HPRT]1126
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 259
ctaatatatc ttctctttat                                                    20

SEQ ID NO: 260       moltype = DNA  length = 20
FEATURE              Location/Qualifiers
misc_feature         1..20
                     note = [HPRT]1123
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 260
atatatcttc tctttatttc                                                    20

SEQ ID NO: 261       moltype = DNA  length = 20
FEATURE              Location/Qualifiers
misc_feature         1..20
                     note = [HPRT]225
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 261
ttaggtatgc aaaataaatc                                                    20

SEQ ID NO: 262       moltype = DNA  length = 20
FEATURE              Location/Qualifiers
misc_feature         1..20
                     note = [HPRT]1121
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 262
atatcttctc tttatttctt                                                    20

SEQ ID NO: 263       moltype = DNA  length = 20
FEATURE              Location/Qualifiers
misc_feature         1..20
                     note = [HPRT]1194
source               1..20
                     mol_type = other DNA
                     organism = synthetic construct
modified_base        1..5
                     mod_base = OTHER
                     note = t is uracil
modified_base        16..20
                     mod_base = OTHER
                     note = t is uracil
SEQUENCE: 263
taattaacaa tattcaatca                                                    20
```

-continued

```
SEQ ID NO: 264           moltype = DNA  length = 20
FEATURE                  Location/Qualifiers
misc_feature             1..20
                         note = [HPRT]939
source                   1..20
                         mol_type = other DNA
                         organism = synthetic construct
modified_base            16..20
                         mod_base = OTHER
                         note = t is uracil
SEQUENCE: 264
aacagataaa attcttagaa                                                    20

SEQ ID NO: 265           moltype = DNA  length = 20
FEATURE                  Location/Qualifiers
misc_feature             1..20
                         note = [HPRT]944
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 265
tacaaaacag ataaaattct                                                    20

SEQ ID NO: 266           moltype = DNA  length = 20
FEATURE                  Location/Qualifiers
misc_feature             1..20
                         note = [HPRT]1244
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 266
tctttgatgt gaaaattgac                                                    20

SEQ ID NO: 267           moltype = DNA  length = 20
FEATURE                  Location/Qualifiers
misc_feature             1..20
                         note = [HPRT]1133
source                   1..20
                         mol_type = other DNA
                         organism = synthetic construct
modified_base            1..5
                         mod_base = OTHER
                         note = t is uracil
modified_base            16..20
                         mod_base = OTHER
                         note = t is uracil
SEQUENCE: 267
taaaaaacta atatatcttc                                                    20

SEQ ID NO: 268           moltype = DNA  length = 20
FEATURE                  Location/Qualifiers
misc_feature             1..20
                         note = [HPRT]938
source                   1..20
                         mol_type = other DNA
                         organism = synthetic construct
SEQUENCE: 268
acagataaaa ttcttagaag                                                    20

SEQ ID NO: 269           moltype = DNA  length = 20
FEATURE                  Location/Qualifiers
misc_feature             1..20
                         note = [HPRT]934
source                   1..20
                         mol_type = other DNA
                         organism = synthetic construct
modified_base            1..5
```

```
                        mod_base = OTHER
                        note = t is uracil
modified_base           16..20
                        mod_base = OTHER
                        note = t is uracil
SEQUENCE: 269
ataaaattct tagaagatac                                                    20

SEQ ID NO: 270          moltype = DNA  length = 20
FEATURE                 Location/Qualifiers
misc_feature            1..20
                        note = [HPRT]1135
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 270
attaaaaaac taatatatct                                                    20

SEQ ID NO: 271          moltype = DNA  length = 20
FEATURE                 Location/Qualifiers
misc_feature            1..20
                        note = [HPRT]1124
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 271
aatatatctt ctctttattt                                                    20

SEQ ID NO: 272          moltype = DNA  length = 20
FEATURE                 Location/Qualifiers
misc_feature            1..20
                        note = [HPRT]1134
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 272
ttaaaaaact aatatatctt                                                    20

SEQ ID NO: 273          moltype = DNA  length = 20
FEATURE                 Location/Qualifiers
misc_feature            1..20
                        note = [HPRT]1195
source                  1..20
                        mol_type = other DNA
                        organism = synthetic construct
modified_base           1..5
                        mod_base = OTHER
                        note = t is uracil
modified_base           16..20
                        mod_base = OTHER
                        note = t is uracil
SEQUENCE: 273
ataattaaca atattcaatc                                                    20

SEQ ID NO: 274          moltype = DNA  length = 22
FEATURE                 Location/Qualifiers
misc_feature            1..22
                        note = AS01-UC
source                  1..22
                        mol_type = other DNA
                        organism = synthetic construct
```

| | | |
|---|---|---|
| modified_base | 1..5<br>mod_base = OTHER<br>note = t is uracil | |
| SEQUENCE: 274 | | |
| tcatggcctt tccgtgccaa gg | | 22 |
| | | |
| SEQ ID NO: 275<br>FEATURE<br>misc_feature | moltype = DNA  length = 16<br>Location/Qualifiers<br>1..16<br>note = ASO2 LNA | |
| source | 1..16<br>mol_type = other DNA<br>organism = synthetic construct | |
| SEQUENCE: 275 | | |
| cggcctcgga agctct | | 16 |
| | | |
| SEQ ID NO: 276<br>FEATURE<br>misc_feature | moltype = DNA  length = 18<br>Location/Qualifiers<br>1..18<br>note = ASO2-LNA Mut1 | |
| source | 1..18<br>mol_type = other DNA<br>organism = synthetic construct | |
| modified_base | 1..5<br>mod_base = OTHER<br>note = t is uracil | |
| SEQUENCE: 276 | | |
| tccggcctcg gaagctct | | 18 |
| | | |
| SEQ ID NO: 277<br>FEATURE<br>misc_feature | moltype = DNA  length = 22<br>Location/Qualifiers<br>1..22<br>note = ASO2-LNA Mut2 | |
| source | 1..22<br>mol_type = other DNA<br>organism = synthetic construct | |
| modified_base | 1..5<br>mod_base = OTHER<br>note = t is uracil | |
| modified_base | 18..20<br>mod_base = OTHER<br>note = t is uracil | |
| SEQUENCE: 277 | | |
| cttcggcctc ggaagctctt tc | | 22 |
| | | |
| SEQ ID NO: 278<br>FEATURE<br>misc_feature | moltype = DNA  length = 20<br>Location/Qualifiers<br>1..20<br>note = ASO 660 | |
| source | 1..20<br>mol_type = other DNA<br>organism = synthetic construct | |
| modified_base | 1..5<br>mod_base = OTHER<br>note = t is uracil | |
| modified_base | 16..20<br>mod_base = OTHER<br>note = t is uracil | |
| SEQUENCE: 278 | | |
| cttcgtgggg tccttttcac | | 20 |
| | | |
| SEQ ID NO: 279<br>FEATURE<br>misc_feature | moltype = DNA  length = 20<br>Location/Qualifiers<br>1..20<br>note = ASO 660-Mut | |
| source | 1..20<br>mol_type = other DNA<br>organism = synthetic construct | |
| modified_base | 16..20<br>mod_base = OTHER<br>note = t is uracil | |
| SEQUENCE: 279 | | |
| gaacgtgggg tccttttcac | | 20 |
| | | |
| SEQ ID NO: 280<br>FEATURE<br>misc_feature | moltype = DNA  length = 20<br>Location/Qualifiers<br>1..20<br>note = C2Mut-1 | |
| source | 1..20 | |

```
                          mol_type = other DNA
                          organism = synthetic construct
modified_base             1..5
                          mod_base = OTHER
                          note = t is uracil
SEQUENCE: 280
gcggtatcca tgtcccaggc                                                   20

SEQ ID NO: 281            moltype = DNA  length = 20
FEATURE                   Location/Qualifiers
misc_feature              1..20
                          note = C2Mut1-PS
source                    1..20
                          mol_type = other DNA
                          organism = synthetic construct
SEQUENCE: 281
gcggtatcca tgtcccaggc                                                   20

SEQ ID NO: 282            moltype = RNA  length = 20
FEATURE                   Location/Qualifiers
misc_feature              1..20
                          note = C2Mut1-2OMe
source                    1..20
                          mol_type = other RNA
                          organism = synthetic construct
SEQUENCE: 282
gcggtatcca tgtcccaggc                                                   20

SEQ ID NO: 283            moltype = DNA  length = 16
FEATURE                   Location/Qualifiers
misc_feature              1..16
                          note = Synthetic construct
source                    1..16
                          mol_type = other DNA
                          organism = synthetic construct
SEQUENCE: 283
cgcttttctg tctggt                                                       16

SEQ ID NO: 284            moltype = DNA  length = 16
FEATURE                   Location/Qualifiers
misc_feature              1..16
                          note = Synthetic construct
source                    1..16
                          mol_type = other DNA
                          organism = synthetic construct
SEQUENCE: 284
acacttcgtg gggtcc                                                       16

SEQ ID NO: 285            moltype = DNA  length = 16
FEATURE                   Location/Qualifiers
misc_feature              1..16
                          note = Synthetic construct
source                    1..16
                          mol_type = other DNA
                          organism = synthetic construct
SEQUENCE: 285
tgatggcctc ccatct                                                       16

SEQ ID NO: 286            moltype = DNA  length = 16
FEATURE                   Location/Qualifiers
misc_feature              1..16
                          note = Synthetic construct
source                    1..16
                          mol_type = other DNA
                          organism = synthetic construct
SEQUENCE: 286
atggcctccc atctcc                                                       16

SEQ ID NO: 287            moltype = DNA  length = 16
FEATURE                   Location/Qualifiers
misc_feature              1..16
                          note = Synthetic construct
source                    1..16
                          mol_type = other DNA
                          organism = synthetic construct
SEQUENCE: 287
ccacttggca gaccat                                                       16

SEQ ID NO: 288            moltype = DNA  length = 16
```

```
FEATURE              Location/Qualifiers
misc_feature         1..16
                     note = Synthetic construct
source               1..16
                     mol_type = other DNA
                     organism = synthetic construct
SEQUENCE: 288
gtgatcttga catgct                                                           16

SEQ ID NO: 289       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 289
aggcccttcg cacttc                                                           16

SEQ ID NO: 290       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 290
accacgtctg ctctaa                                                           16

SEQ ID NO: 291       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 291
gcacacttcg taccca                                                           16

SEQ ID NO: 292       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 292
aaccccttcc accatc                                                           16

SEQ ID NO: 293       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 293
gaggtcttgg cttcgt                                                           16

SEQ ID NO: 294       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 294
ccagcaggtc agcaaa                                                           16

SEQ ID NO: 295       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 295
gaaaggttat gcaagg                                                           16
```

```
SEQ ID NO: 296          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 296
gtgatggcct cccatc                                                         16

SEQ ID NO: 297          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 297
atgtgatggc ctccca                                                         16

SEQ ID NO: 298          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 298
tcgtggggtc cttttc                                                         16

SEQ ID NO: 299          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 299
tgtctggaag cttcct                                                         16

SEQ ID NO: 300          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 300
agtgttgaga tactcg                                                         16

SEQ ID NO: 301          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 301
gtccttgcac gtggct                                                         16

SEQ ID NO: 302          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 302
tactttccga ggtgtc                                                         16

SEQ ID NO: 303          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 303
ggctcggctt gcctac                                                         16
```

```
SEQ ID NO: 304          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 304
gcacttcagt ctgagc                                                         16

SEQ ID NO: 305          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 305
ggtcttggct tcgtgg                                                         16

SEQ ID NO: 306          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 306
ggtcattaca atagct                                                         16

SEQ ID NO: 307          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 307
gatagcacct tcagca                                                         16

SEQ ID NO: 308          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 308
caacacttcg tggggt                                                         16

SEQ ID NO: 309          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 309
tgtgatggcc tcccat                                                         16

SEQ ID NO: 310          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 310
tccaacactt cgtggg                                                         16

SEQ ID NO: 311          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 311
```
ccatccatga ggtcct                                                        16

SEQ ID NO: 312        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 312
gtatcgaaag agtctg                                                        16

SEQ ID NO: 313        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 313
gccatccact tgatag                                                        16

SEQ ID NO: 314        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 314
ggttacggct cagtat                                                        16

SEQ ID NO: 315        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 315
tgcacacttc gtaccc                                                        16

SEQ ID NO: 316        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 316
tcgtagttgc ttccta                                                        16

SEQ ID NO: 317        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 317
gtcttggctt cgtgga                                                        16

SEQ ID NO: 318        moltype = DNA   length = 16
FEATURE               Location/Qualifiers
misc_feature          1..16
                      note = Synthetic construct
source                1..16
                      mol_type = other DNA
                      organism = synthetic construct SEQUENCE: 318
gtcccctgtt gactgg                                                        16

SEQ ID NO: 319        moltype = DNA   length = 16
FEATURE               Location/Qualifiers
misc_feature          1..16
                      note = Synthetic construct
source                1..16
                      mol_type = other DNA
                      organism = synthetic construct

```
SEQUENCE: 319
ccaagatcag cagtct                                                         16

SEQ ID NO: 320          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 320
tggcctccca tctcct                                                         16

SEQ ID NO: 321          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 321
ttcgtggggt cctttt                                                         16

SEQ ID NO: 322          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 322
gttcagtcct gtccat                                                         16

SEQ ID NO: 323          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 323
gcaggctcag tgatgt                                                         16

SEQ ID NO: 324          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 324
ggctggaatc cgagtt                                                         16

SEQ ID NO: 325          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 325
gcatccacca cgtcgt                                                         16

SEQ ID NO: 326          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 326
ttttggctgg gatcaa                                                         16

SEQ ID NO: 327          moltype = DNA  length = 16
FEATURE                 Location/Qualifiers
misc_feature            1..16
                        note = Synthetic construct
source                  1..16
                        mol_type = other DNA
```

```
                              organism = synthetic construct
SEQUENCE: 327
gccatgctgg ctcgga                                                          16

SEQ ID NO: 328         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 328
gccatgtttc ttcttg                                                          16

SEQ ID NO: 329         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 329
cggcctcgga agctct                                                          16

SEQ ID NO: 330         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 330
tccacaatca agacat                                                          16

SEQ ID NO: 331         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 331
cttgaagcat cgtatc                                                          16

SEQ ID NO: 332         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 332
aacacttcgt ggggtc                                                          16

SEQ ID NO: 333         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 333
cttcgtgggg tcctttt                                                         16

SEQ ID NO: 334         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 334
aggactccag atgttt                                                          16

SEQ ID NO: 335         moltype = DNA  length = 16
FEATURE                Location/Qualifiers
misc_feature           1..16
                       note = Synthetic construct
source                 1..16
```

```
                        mol_type = other DNA
                        organism = synthetic construct
SEQUENCE: 335
atctggcagc ccatca                                                    16

SEQ ID NO: 336          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 336
agatttcaga gcagct                                                    16

SEQ ID NO: 337          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 337
ccttgcacgt ggcttc                                                    16

SEQ ID NO: 338          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 338
aaaggactga ggaaag                                                    16

SEQ ID NO: 339          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 339
ttcaggcgct gccttg                                                    16

SEQ ID NO: 340          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 340
tgactgtctt gagggt                                                    16

SEQ ID NO: 341          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 341
cttggcttcg tggagc                                                    16

SEQ ID NO: 342          moltype = DNA  length = 16
FEATURE                 Location/Qualifiers
misc_feature            1..16
                        note = Synthetic construct
source                  1..16
                        mol_type = other DNA
                        organism = synthetic construct
SEQUENCE: 342
aatccaacaa agtctg                                                    16

SEQ ID NO: 343          moltype = DNA  length = 16
FEATURE                 Location/Qualifiers
misc_feature            1..16
                        note = Synthetic construct
```

```
source                        1..16
                              mol_type = other DNA
                              organism = synthetic construct
SEQUENCE: 343
gtgtctggaa gcttcc                                                              16

SEQ ID NO: 344                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 344
cacttcgtgg ggtcct                                                              16

SEQ ID NO: 345                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 345
gatggcctcc catctc                                                              16

SEQ ID NO: 346                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 346
cgtattatag ccgatt                                                              16

SEQ ID NO: 347                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 347
ctgcagcttc cttgtc                                                              16

SEQ ID NO: 348                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 348
tccttgcacg tggctt                                                              16

SEQ ID NO: 349                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 349
tgtccttgca cgtggc                                                              16

SEQ ID NO: 350                moltype = DNA   length = 16
FEATURE                       Location/Qualifiers
misc_feature                  1..16
                              note = Synthetic construct
source                        1..16
                              mol_type = other DNA
                              organism = synthetic construct
SEQUENCE: 350
tcttcatcgg ccctgc                                                              16

SEQ ID NO: 351                moltype = DNA   length = 16
FEATURE                       Location/Qualifiers
misc_feature                  1..16
```

```
                        note = Synthetic construct
source                  1..16
                        mol_type = other DNA
                        organism = synthetic construct
SEQUENCE: 351
gtctctggag cttcct                                                     16

SEQ ID NO: 352          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 352
tcttggcttc gtggag                                                     16

SEQ ID NO: 353          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 353
agcttcgagg ccccag                                                     16

SEQ ID NO: 354          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 354
gtcaagggca tatcct                                                     16

SEQ ID NO: 355          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 355
tccataccca aggcat                                                     16

SEQ ID NO: 356          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 356
ccaacacttc gtgggg                                                     16

SEQ ID NO: 357          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 357
acgttcagtc ctgtcc                                                     16

SEQ ID NO: 358          moltype = DNA   length = 16
FEATURE                 Location/Qualifiers
misc_feature            1..16
                        note = Synthetic construct
source                  1..16
                        mol_type = other DNA
                        organism = synthetic construct
SEQUENCE: 358
gactatacgc gcaata                                                     16

SEQ ID NO: 359          moltype = DNA   length = 16
FEATURE                 Location/Qualifiers
```

```
                       -continued misc_feature           1..16
                       note = Synthetic construct
source                 1..16
                       mol_type = other DNA
                       organism = synthetic construct
SEQUENCE: 359
tggtggccac ccatct                                                    16

SEQ ID NO: 360         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 360
catccaccac gtcgtc                                                    16

SEQ ID NO: 361         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 361
gtcccgccac tggatg                                                    16

SEQ ID NO: 362         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 362
gtcttcatcg gccctg                                                    16

SEQ ID NO: 363         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 363
ccacatcctg tggctc                                                    16

SEQ ID NO: 364         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 364
aggtcttggc ttcgtg                                                    16

SEQ ID NO: 365         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 365
tggtccacaa cccctt                                                    16

SEQ ID NO: 366         moltype = DNA  length = 16
FEATURE                Location/Qualifiers
misc_feature           1..16
                       note = Synthetic construct
source                 1..16
                       mol_type = other DNA
                       organism = synthetic construct
SEQUENCE: 366
tccgcccaaa gggaac                                                    16

SEQ ID NO: 367         moltype = DNA  length = 16
```

```
FEATURE              Location/Qualifiers
misc_feature         1..16
                     note = Synthetic construct
source               1..16
                     mol_type = other DNA
                     organism = synthetic construct
SEQUENCE: 367
cccacttggc agacca                                                          16

SEQ ID NO: 368       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 368
acttcgtggg gtcctt                                                          16

SEQ ID NO: 369       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 369
cctcccatct ccttca                                                          16

SEQ ID NO: 370       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 370
ggcactttgc ctcctt                                                          16

SEQ ID NO: 371       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 371
tgctcctcgg tctccc                                                          16

SEQ ID NO: 372       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 372
ggaggtcttg gcttcg                                                          16

SEQ ID NO: 373       moltype = DNA   length = 16
FEATURE              Location/Qualifiers
misc_feature         1..16
                     note = Synthetic construct
source               1..16
                     mol_type = other DNA
                     organism = synthetic construct
SEQUENCE: 373
tgacaaagat tcactg                                                          16

SEQ ID NO: 374       moltype = DNA   length = 20
FEATURE              Location/Qualifiers
misc_feature         1..20
                     note = Synthetic construct
source               1..20
                     mol_type = other DNA
                     organism = synthetic construct
SEQUENCE: 374
atgtcccctg ttgactggtc                                                      20
```

```
SEQ ID NO: 375          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 375
cggaggtctt ggcttcgtgg                                                   20

SEQ ID NO: 376          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 376
ccaacacttc gtgggtcct                                                    20

SEQ ID NO: 377          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 377
gccgcttttc tgtctggttc                                                   20

SEQ ID NO: 378          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 378
acccacttgg cagaccatca                                                   20

SEQ ID NO: 379          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 379
ctgtgatctt gacatgctgc                                                   20

SEQ ID NO: 380          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 380
caaggccctt cgcacttctt                                                   20

SEQ ID NO: 381          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 381
gaaccacgtc tgctctaaca                                                   20

SEQ ID NO: 382          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 382
ttgcacactt cgtacccaaa                                                   20
```

```
SEQ ID NO: 383           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 383
acaaccccttt tcaccatccc                                                    20

SEQ ID NO: 384           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 384
tagtcaaggg catatcctac                                                     20

SEQ ID NO: 385           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 385
gaggtcttgg cttcgtggag                                                     20

SEQ ID NO: 386           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 386
aacacttcgt ggggtccttt                                                     20

SEQ ID NO: 387           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 387
gggaaaggtt atgcaaggtc                                                     20

SEQ ID NO: 388           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 388
cgtgtctgga agcttccttt                                                     20

SEQ ID NO: 389           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 389
acagtgttga gatactcggg                                                     20

SEQ ID NO: 390           moltype = DNA  length = 20
FEATURE                  Location/Qualifiers
misc_feature             1..20
                         note = Synthetic construct
source                   1..20
                         mol_type = other DNA
                         organism = synthetic construct
SEQUENCE: 390
```

-continued

```
gtgtccttgc acgtggcttc                                              20

SEQ ID NO: 391          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 391
cttactttcc gaggtgtcca                                              20

SEQ ID NO: 392          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 392
ttggctcggc ttgcctactt                                              20

SEQ ID NO: 393          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 393
tcgcacttca gtctgagcag                                              20

SEQ ID NO: 394          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 394
aatccgccca aagggaactg                                              20

SEQ ID NO: 395          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 395
aggtcttggc ttcgtggagc                                              20

SEQ ID NO: 396          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 396
atccaacact tcgtggggtc                                              20

SEQ ID NO: 397          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 397
cagatagcac cttcagcact                                              20

SEQ ID NO: 398          moltype = DNA   length = 20
FEATURE                 Location/Qualifiers
misc_feature            1..20
                        note = Synthetic construct
source                  1..20
                        mol_type = other DNA
                        organism = synthetic construct
```

```
SEQUENCE: 398
gcccatccat gaggtcctgg                                                    20

SEQ ID NO: 399         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 399
gggtatcgaa agagtctgga                                                    20

SEQ ID NO: 400         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 400
atgccatcca cttgataggc                                                    20

SEQ ID NO: 401         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 401
tgggttacgg ctcagtatgg                                                    20

SEQ ID NO: 402         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 402
tttgcacact tcgtacccaa                                                    20

SEQ ID NO: 403         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 403
agtcgtagtt gcttcctaac                                                    20

SEQ ID NO: 404         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 404
gctgacaaag attcactggt                                                    20

SEQ ID NO: 405         moltype = DNA  length = 20
FEATURE                Location/Qualifiers
misc_feature           1..20
                       note = Synthetic construct
source                 1..20
                       mol_type = other DNA
                       organism = synthetic construct
SEQUENCE: 405
tccggcctcg gaagctctct                                                    20

SEQ ID NO: 406         moltype = DNA  length = 20
FEATURE                Location/Qualifiers
misc_feature           1..20
                       note = Synthetic construct
source                 1..20
                       mol_type = other DNA
```

```
                              organism = synthetic construct
SEQUENCE: 406
acacttcgtg gggtccttttt                                                    20

SEQ ID NO: 407          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 407
gtccaagatc agcagtctca                                                     20

SEQ ID NO: 408          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 408
tggcaggctc agtgatgtct                                                     20

SEQ ID NO: 409          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 409
tgggctggaa tccgagttat                                                     20

SEQ ID NO: 410          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 410
cggcatccac cacgtcgtcc                                                     20

SEQ ID NO: 411          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 411
ggttttggct gggatcaagt                                                     20

SEQ ID NO: 412          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 412
ttgccatgct ggctcggact                                                     20

SEQ ID NO: 413          moltype = DNA   length = 20
FEATURE                 Location/Qualifiers
misc_feature            1..20
                        note = Synthetic construct
source                  1..20
                        mol_type = other DNA
                        organism = synthetic construct
SEQUENCE: 413
ccgccatgtt tcttcttgga                                                     20

SEQ ID NO: 414          moltype = DNA   length = 20
FEATURE                 Location/Qualifiers
misc_feature            1..20
                        note = Synthetic construct
source                  1..20
```

```
                        mol_type = other DNA
                        organism = synthetic construct
SEQUENCE: 414
caacacttcg tgggtcctt                                                20

SEQ ID NO: 415          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 415
gtcttggctt cgtggagcag                                               20

SEQ ID NO: 416          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 416
tgtgatggcc tcccatctcc                                               20

SEQ ID NO: 417          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 417
ctcttgaagc atcgtatcac                                               20

SEQ ID NO: 418          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 418
agatctggca gcccatcaac                                               20

SEQ ID NO: 419          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 419
ggagatttca gagcagcttc                                               20

SEQ ID NO: 420          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 420
gtccttgcac gtggcttcgt                                               20

SEQ ID NO: 421          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 421
tcaaaggact gaggaaaggg                                               20

SEQ ID NO: 422          moltype = DNA  length = 20
FEATURE                 Location/Qualifiers
misc_feature            1..20
                        note = Synthetic construct
```

```
source                          1..20
                                mol_type = other DNA
                                organism = synthetic construct
SEQUENCE: 422
gcttcaggcg ctgccttgcc                                                          20

SEQ ID NO: 423                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 423
actgactgtc ttgagggttc                                                          20

SEQ ID NO: 424                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 424
atgtgatggc ctcccatctc                                                          20

SEQ ID NO: 425                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 425
ggagcttcga ggccccaggc                                                          20

SEQ ID NO: 426                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 426
caatgtgatg gcctcccatc                                                          20

SEQ ID NO: 427                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 427
gcgtgtctgg aagcttcctt                                                          20

SEQ ID NO: 428                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 428
ttctgcagct tccttgtcct                                                          20

SEQ ID NO: 429                  moltype = DNA   length = 20
FEATURE                         Location/Qualifiers
misc_feature                    1..20
                                note = Synthetic construct
source                          1..20
                                mol_type = other DNA
                                organism = synthetic construct
SEQUENCE: 429
tgtccttgca cgtggcttcg                                                          20

SEQ ID NO: 430                  moltype = DNA   length = 20
FEATURE                         Location/Qualifiers
misc_feature                    1..20
```

```
                    note = Synthetic construct
source              1..20
                    mol_type = other DNA
                    organism = synthetic construct
SEQUENCE: 430
ggtgtccttg cacgtggctt                                              20

SEQ ID NO: 431      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 431
tgtcttcatc ggccctgcct                                              20

SEQ ID NO: 432      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 432
gagtctctgg agcttcctct                                              20

SEQ ID NO: 433      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 433
ggtcttggct tcgtggagca                                              20

SEQ ID NO: 434      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 434
tccaacactt cgtggggtcc                                              20

SEQ ID NO: 435      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 435
ggtggtccac aaccccttc                                               20

SEQ ID NO: 436      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 436
ggtccatacc caaggcatcc                                              20

SEQ ID NO: 437      moltype = DNA  length = 20
FEATURE             Location/Qualifiers
misc_feature        1..20
                    note = Synthetic construct
source              1..20
                    mol_type = other DNA
                    organism = synthetic construct
SEQUENCE: 437
ggtggtggcc acccatctca                                              20

SEQ ID NO: 438      moltype = DNA  length = 20
FEATURE             Location/Qualifiers
```

```
misc_feature              1..20
                          note = Synthetic construct
source                    1..20
                          mol_type = other DNA
                          organism = synthetic construct
SEQUENCE: 438
ggcatccacc acgtcgtcca                                             20

SEQ ID NO: 439            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 439
atgtcccgcc actggatgct                                             20

SEQ ID NO: 440            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 440
gtgtcttcat cggccctgcc                                             20

SEQ ID NO: 441            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 441
gtccacatcc tgtggctcgt                                             20

SEQ ID NO: 442            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 442
ggaggtcttg gcttcgtgga                                             20

SEQ ID NO: 443            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 443
gatggcctcc catctccttc                                             20

SEQ ID NO: 444            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 444
gcgactatac gcgcaatatg                                             20

SEQ ID NO: 445            moltype = DNA  length = 20
FEATURE                   Location/Qualifiers
misc_feature              1..20
                          note = Synthetic construct
source                    1..20
                          mol_type = other DNA
                          organism = synthetic construct
SEQUENCE: 445
cacccacttg gcagaccatc                                             20

SEQ ID NO: 446            moltype = DNA  length = 20
```

```
FEATURE                 Location/Qualifiers
misc_feature            1..20
                        note = Synthetic construct
source                  1..20
                        mol_type = other DNA
                        organism = synthetic construct
SEQUENCE: 446
taggcacttt gcctccttct                                                    20

SEQ ID NO: 447          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 447
gatgctcctc ggtctccctt                                                    20

SEQ ID NO: 448          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 448
gcgtattata gccgattaac                                                    20

SEQ ID NO: 449          moltype = DNA  length = 20
FEATURE                 Location/Qualifiers
misc_feature            1..20
                        note = Synthetic construct
source                  1..20
                        mol_type = other DNA
                        organism = synthetic construct
SEQUENCE: 449
gcggaggtct tggcttcgtg                                                    20

SEQ ID NO: 450          moltype =   length =
SEQUENCE: 450
000

SEQ ID NO: 451          moltype =   length =
SEQUENCE: 451
000

SEQ ID NO: 452          moltype =   length =
SEQUENCE: 452
000

SEQ ID NO: 453          moltype =   length =
SEQUENCE: 453
000

SEQ ID NO: 454          moltype =   length =
SEQUENCE: 454
000

SEQ ID NO: 455          moltype =   length =
SEQUENCE: 455
000

SEQ ID NO: 456          moltype =   length =
SEQUENCE: 456
000

SEQ ID NO: 457          moltype =   length =
SEQUENCE: 457
000

SEQ ID NO: 458          moltype =   length =
SEQUENCE: 458
000

SEQ ID NO: 459          moltype =   length =
SEQUENCE: 459
000
```

```
SEQ ID NO: 460          moltype =    length =
SEQUENCE: 460
000

SEQ ID NO: 461          moltype =    length =
SEQUENCE: 461
000

SEQ ID NO: 462          moltype =    length =
SEQUENCE: 462
000

SEQ ID NO: 463          moltype =    length =
SEQUENCE: 463
000

SEQ ID NO: 464          moltype =    length =
SEQUENCE: 464
000

SEQ ID NO: 465          moltype = DNA  length = 21
FEATURE                 Location/Qualifiers
misc_feature            1..21
                        note = Synthetic construct
source                  1..21
                        mol_type = other DNA
                        organism = synthetic construct
modified_base           1..18
                        mod_base = OTHER
                        note = t is uracil
SEQUENCE: 465
atgaatact cttggttact t                                              21

SEQ ID NO: 466          moltype = DNA  length = 21
FEATURE                 Location/Qualifiers
misc_feature            1..21
                        note = Synthetic construct
source                  1..21
                        mol_type = other DNA
                        organism = synthetic construct
modified_base           1..19
                        mod_base = OTHER
                        note = t is uracil
SEQUENCE: 466
gtaaccaaga gtattccatt t                                             21

SEQ ID NO: 467          moltype = DNA  length = 21
FEATURE                 Location/Qualifiers
misc_feature            1..21
                        note = Synthetic construct
source                  1..21
                        mol_type = other DNA
                        organism = synthetic construct
SEQUENCE: 467
gcgtttgctc ttcttcttgc g                                             21

SEQ ID NO: 468          moltype = DNA  length = 20
FEATURE                 Location/Qualifiers
misc_feature            1..20
                        note = Synthetic construct
source                  1..20
                        mol_type = other DNA
                        organism = synthetic construct
modified_base           1..5
                        mod_base = OTHER
                        note = t is uracil
SEQUENCE: 468
gcctcagtct gcttcgcacc                                               20

SEQ ID NO: 469          moltype = DNA  length = 19
FEATURE                 Location/Qualifiers
misc_feature            1..19
                        note = Synthetic construct
source                  1..19
                        mol_type = other DNA
                        organism = synthetic construct
modified_base           1..5
                        mod_base = OTHER
                        note = t is uracil
```

```
modified_base          15..19
                       mod_base = OTHER
                       note = t is uracil
SEQUENCE: 469
tctggttaca tgaaatccc                                                19

SEQ ID NO: 470         moltype = RNA   length = 30
FEATURE                Location/Qualifiers
misc_feature           1..30
                       note = Synthetic construct
source                 1..30
                       mol_type = other RNA
                       organism = synthetic construct
SEQUENCE: 470
ctccaacatc aaggaagatg gcatttctag                                    30

SEQ ID NO: 471         moltype = DNA   length = 18
FEATURE                Location/Qualifiers
misc_feature           1..18
                       note = Synthetic construct
source                 1..18
                       mol_type = other DNA
                       organism = synthetic construct
SEQUENCE: 471
tcactttcat aatgctgg                                                 18

SEQ ID NO: 472         moltype = DNA   length = 25
FEATURE                Location/Qualifiers
misc_feature           1..25
                       note = Synthetic construct
source                 1..25
                       mol_type = other DNA
                       organism = synthetic construct
SEQUENCE: 472
gttgcctccg gttctgaagg tgttc                                         25

SEQ ID NO: 473         moltype = RNA   length = 21
FEATURE                Location/Qualifiers
misc_feature           1..21
                       note = Synthetic construct
source                 1..21
                       mol_type = other RNA
                       organism = synthetic construct
SEQUENCE: 473
cagaaagagt gtctcatctt a                                             21

SEQ ID NO: 474         moltype = RNA   length = 23
FEATURE                Location/Qualifiers
misc_feature           1..23
                       note = Synthetic construct
source                 1..23
                       mol_type = other RNA
                       organism = synthetic construct
SEQUENCE: 474
taagatgaga cactctttct ggt                                           23

SEQ ID NO: 475         moltype = DNA   length = 21
FEATURE                Location/Qualifiers
misc_feature           1..21
                       note = hRSAD2-RT-FWD
source                 1..21
                       mol_type = other DNA
                       organism = synthetic construct
SEQUENCE: 475
tggtgaggtt ctgcaaagta g                                             21

SEQ ID NO: 476         moltype = DNA   length = 22
FEATURE                Location/Qualifiers
misc_feature           1..22
                       note = hRSAD2-RT-REV
source                 1..22
                       mol_type = other DNA
                       organism = synthetic construct
SEQUENCE: 476
gtcacaggag atagcgagaa tg                                            22

SEQ ID NO: 477         moltype = DNA   length = 20
FEATURE                Location/Qualifiers
misc_feature           1..20
```

```
                        note = hIFIT1-FWD
source                  1..20
                        mol_type = other DNA
                        organism = synthetic construct
SEQUENCE: 477
tcaccagata gggctttgct                                                    20

SEQ ID NO: 478          moltype = DNA  length = 20
FEATURE                 Location/Qualifiers
misc_feature            1..20
                        note = hIFIT1-REV
source                  1..20
                        mol_type = other DNA
                        organism = synthetic construct
SEQUENCE: 478
cacctcaaat gtgggctttt                                                    20

SEQ ID NO: 479          moltype = DNA  length = 20
FEATURE                 Location/Qualifiers
misc_feature            1..20
                        note = h18S-FWD
source                  1..20
                        mol_type = other DNA
                        organism = synthetic construct
SEQUENCE: 479
cggctaccac atccaaggaa                                                    20

SEQ ID NO: 480          moltype = DNA  length = 18
FEATURE                 Location/Qualifiers
misc_feature            1..18
                        note = h18S-REV
source                  1..18
                        mol_type = other DNA
                        organism = synthetic construct
SEQUENCE: 480
gctggaatta ccgcggct                                                      18

SEQ ID NO: 481          moltype = DNA  length = 21
FEATURE                 Location/Qualifiers
misc_feature            1..21
                        note = hIFI44-FWD
source                  1..21
                        mol_type = other DNA
                        organism = synthetic construct
SEQUENCE: 481
atggcagtga caactcgttt g                                                  21

SEQ ID NO: 482          moltype = DNA  length = 23
FEATURE                 Location/Qualifiers
misc_feature            1..23
                        note = hIFI44
source                  1..23
                        mol_type = other DNA
                        organism = synthetic construct
SEQUENCE: 482
tcctggtaac tctcttctgc ata                                                23

SEQ ID NO: 483          moltype = DNA  length = 23
FEATURE                 Location/Qualifiers
misc_feature            1..23
                        note = hIFNB-FWD
source                  1..23
                        mol_type = other DNA
                        organism = synthetic construct
SEQUENCE: 483
gcttggattc ctacaaagaa gca                                                23

SEQ ID NO: 484          moltype = DNA  length = 21
FEATURE                 Location/Qualifiers
misc_feature            1..21
                        note = hIFNBREV
source                  1..21
                        mol_type = other DNA
                        organism = synthetic construct
SEQUENCE: 484
atagatggtc aatgcggcgt c                                                  21

SEQ ID NO: 485          moltype = DNA  length = 21
FEATURE                 Location/Qualifiers
```

```
misc_feature       1..21
                   note = hHPRT-FWD
source             1..21
                   mol_type = other DNA
                   organism = synthetic construct
SEQUENCE: 485
gactttgctt tccttggtca g                                          21

SEQ ID NO: 486     moltype = DNA  length = 24
FEATURE            Location/Qualifiers
misc_feature       1..24
                   note = hHPRT-REV
source             1..24
                   mol_type = other DNA
                   organism = synthetic construct
SEQUENCE: 486
ggcttatatc caacacttcg tggg                                       24

SEQ ID NO: 487     moltype = DNA  length = 10
FEATURE            Location/Qualifiers
misc_feature       1..10
                   note = Synthetic construct
source             1..10
                   mol_type = other DNA
                   organism = synthetic construct
SEQUENCE: 487
tttctgtggt                                                       10

SEQ ID NO: 488     moltype = DNA  length = 10
FEATURE            Location/Qualifiers
misc_feature       1..10
                   note = Synthetic construct
source             1..10
                   mol_type = other DNA
                   organism = synthetic construct
SEQUENCE: 488
taaaaaaatt                                                       10
```

OLIGONUCLEOTIDES

CROSS-REFERENCE TO RELATED APPLICATIONS

The present application is a continuation of Non-Provisional U.S. patent application Ser. No. 17/926,383, filed Nov. 18, 2022, entitled "OLIGONUCLEOTIDES," which is a national phase application under 35 U.S.C. § 371 of International Application No. PCT/AU2021/050469, filed May 19, 2021, which claims priority from Australian Provisional Patent Application No. 2020901606 filed on 19 May 2020, the contents of which are incorporated herein by reference in their entirety.

INCORPORATION OF SEQUENCE LISTING

The sequence listing that is contained in the file named 59925_SubSeqListing.xml, which is 829,629 bytes (as measured in Microsoft Windows) and was created on Sep. 3, 2024, is filed herewith by electronic submission and is incorporated by reference herein.

FIELD OF THE INVENTION

The present invention relates to oligonucleotides that maintain a Toll-Like Receptor 7 (TLR7) response and/or which potentiate Toll-Like Receptor 8 (TLR8) sensing.

BACKGROUND OF THE INVENTION

With the approval of eight oligonucleotides-based therapeutics in the US and European Union (Yin and Rogge, 2019; Al Shaer et al., 2020), and the prospect of many more to be commercialised from current phase III studies (Coutinho et al., 2019), therapeutic targeting of messenger RNA (mRNA) is set to play a large role in disease management. While different strategies have been developed to impact mRNA translation, such as recruiting RNAse-H1 (with antisense oligonucleotides [ASOs] such as inotersen, or volanesorsen) or Ago2 (with small interfering RNAs [siRNAs] such as patisiran, inclisiran or givosiran) to actively degrade target mRNAs, or to promote splicing modulation (with ASOs such as eteplirsen and nusinersen), it is noteworthy that all therapeutic oligonucleotides approved to date rely on extensive chemical modifications. Such modifications are essential to prevent degradation by nucleases, and can also affect binding affinity to the target mRNA. These modifications can either be used to stabilise the phosphodiester (PO) internucleotide linkages, as seen with the phosphorothioate (PS) backbone modification, or to stabilise the bases with sugar modifications (e.g. with 2'-O-methyl[2'OMe], 2'-methoxyethyl[2'MOE], 2'-fluoro[2'F], or locked nucleic acid [LNA]) (Yin and Rogge, 2019).

In mammals, recognition of exogenous nucleic acids is a critical component of immune responses to pathogens and is achieved by a variety of innate immune sensors including, among others, the Toll-Like-Receptors (TLRs), such as TLR7, TLR8 and TLR9, the retinoic acid-inducible gene-I (RIG-I)-like receptors, NOD-like receptors, and the cyclic-GMP-AMP synthase (cGAS) pathway. It is therefore not surprising that select oligonucleotide therapeutics were found to instigate potent immune responses through direct engagement of such sensors (Hornung et al., 2005; Kleinman et al., 2008; Krieg et al., 1995; Pichlmair et al., 2006), directing industry to closely consider and monitor such immune responses during pre-clinical and clinical development (Frazier et al., 2015). Nevertheless, discrimination between self and non-self nucleic acids by innate immune sensors can be modulated by the presence of nucleic acid modifications rarely encountered in pathogens—as seen with 2'-Omethylated (2'OMe) nucleosides that are 25 times more abundant in human ribosomal RNA than bacterial RNA (Kariko et al., 2005). TLR7 and TLR8 selectively detect RNA molecules and bases analogues (such as imidazoquinolines and nucleoside analogues), and are inhibited by 2'OMe bases, facilitating molecular discrimination between self and non-self RNAs (Kariko et al., 2005). As such, incorporation of select base modifications in therapeutic oligonucleotides, including 2'OMe, is a useful strategy to help mitigate aberrant immune responses by TLR7 and TLR8 (Kariko et al.,2005; Hamm et al., 2010), and is widely applied to therapeutic siRNAs (Coutinho et al., 2019).

However, this approach can also result in unintended immunosuppressive effects, as has been observed in the case of TLR7 and TLR8 antagonism by oligonucleotide sequences containing specific 2'OMe motifs (Sarvestani et al., 2015). Similarly, PS-modified DNA oligonucleotides have been reported to antagonise sensing by TLR9 (Gursel et al, 2003), TLR7 (Beignon et al, 2005), AIM2 (Kaminkski et al., 2013) and cGAS (Steinhagen et al, 2018), in a sequence-dependent manner (Bayik et al., 2016). Critically, given that most therapeutic oligonucleotides currently approved or under investigation combine PS and base modifications, whether such combinations impact the frequency of immunosuppression is not currently defined.

Thus, there is a need for oligonucleotides with limited immunosuppressive effects on Toll-Like Receptor 7 (TLR7) and/or TLR8 responses.

SUMMARY OF THE INVENTION

While designing and testing oligonucleotides, the inventors observed structural features which assist in maintaining a Toll-Like Receptor 7 (TLR7) response.

Thus, in one aspect the present invention provides an oligonucleotide comprising three continuous pyrimidine bases within seven bases of the 5' and/or 3' end of the oligonucleotide.

In another aspect, the invention relates to an oligonucleotide comprising two continuous cytosine bases at or towards the 5' end of the oligonucleotide. Suitably, one or both of the two continuous cytosine bases are modified and/or which have a modified backbone.

In an embodiment, the oligonucleotide of the above aspects comprises
  a) a 5' region comprising bases which are modified and/or which have a modified backbone,
  b) a middle region comprising ribonucleic acid, deoxyribonucleic acid, or combination thereof, bases, and
  c) a 3' region comprising bases which are modified and/or which have a modified backbone.

In a related aspect, the present invention provides an oligonucleotide comprising a 5' region, a 3' region and a middle region comprising ribonucleic acid, deoxyribonucleic acid, or combination thereof, bases, wherein one or both of the 5' region and the 3' region comprise bases which are modified and/or which have a modified backbone, and at least one of the following apply;
  a) the 5' region comprises three continuous pyrimidine bases which are modified and/or which have a modified backbone,
  b) the 5' region comprises bases which are modified and/or which have a modified backbone and the junction between the 5' region and middle region comprises three continuous pyrimidine bases, c) the 3' region comprises three continuous pyrimidine bases which are modified and/or which have a modified backbone, d) the 3' region comprises bases which are modified and/or which have a modified backbone and the junction between the 3' region and middle region comprises three continuous pyrimidine bases, and e) the 5' region comprises two continuous cytosine bases which are modified and/or which have a modified backbone.

In an embodiment, the middle region is about 20, about 15 or about 10 bases in length.

In an embodiment, the 5' region and/or the 3' region are about 7, about 5, or about 3 bases in length.

In an embodiment, the three continuous pyrimidine bases are at or towards the 5' and/or 3' end of the oligonucleotide.

Examples of the 5' three continuous pyrimidine bases of the invention include, but are not limited to, those having the sequence 5'-CUU-3', 5'-CUT-3', 5'-CCU-3', 5'-UUC-3', 5'-UUU-3' or 5'-CTT-3'. In an embodiment, the 5' three continuous pyrimidine bases comprise the sequence 5'-CUU-3'.

Examples of the 3' three continuous pyrimidine bases of the invention include, but are not limited to, those having the sequence 5'-UUC-3', 5'-TUC-3' 5'-UCC-3', 5'-CUU-3', 5'-UUU-3' or 5'-TTC-3'. In an embodiment, the 3' three continuous pyrimidine bases have the sequence 5'-UUC-3'. In another embodiment, the 3' pyrimidine bases have the sequence 5'-CUUC-3'.

In an embodiment, one, two or all three of the pyrimidine bases are a modified base and/or have a modified backbone.

In an embodiment, the three continuous pyrimidine bases at the junction have the sequence 5'-mCmUT-3', 5'-mCTT-3', 5'-TmUmC-3' or 5'-TTmC-3', where m is a modified base and/or has a modified backbone.

Examples of modified bases useful for the invention include, but are not limited to, those which comprises a 2'-O-methyl, 2'-O-methoxyethoxy, 2'-fluoro, 2'-allyl, 2'-O-[2-(methylamino)-2-oxoethyl], 4'-thio, 4'-CH2-O-2'-bridge, 4'-(CH2) 2-O-2'-bridge, 2'-LNA, 2'-amino, fluoroarabinonucleotide, threose nucleic acid or 2'-O—-(N-methlycarbamate). In some embodiments, the modified base comprises a 2'-O-methyl, 2'-fluoro, 2'-allyl, 2'-O-[2-(methylamino)-2-oxoethyl], 4'-thio, 4'-CH2-O-2'-bridge, 4'-(CH2) 2-O-2'-bridge, 2'-amino, fluoroarabinonucleotide, threose nucleic acid or 2'-O—-(N-methlycarbamate).

Examples of modified backbones useful for the invention include, but are not limited to, those which comprise a phosphorothioate, a non-bridging oxygen atom substituting a sulfur atom, a phosphonate such as a methylphosphonate, a phosphodiester, a phosphoromorpholidate, a phosphoropiperazidate, amides, methylene(methylamino), fromacetal, thioformacetal, a peptide nucleic acid or a phosphoroamidate such as a morpholino phosphorodiamidate (PMO), N3'-P5' phosphoramidite or thiophosphoroamidite.

In an embodiment, at least a portion of the oligonucleotide has/is a ribonucleic acid, deoxyribonucleic acid, DNA phosphorothioate, RNA phosphorothioate, 2'-O-methyl-oligonucleotide, 2'-O-methyl-oligodeoxyribonucleotide, 2'-O-hydrocarbyl ribonucleic acid, 2'-O-hydrocarbyl DNA, 2'-O-hydrocarbyl RNA phosphorothioate, 2'-O-hydrocarbyl DNA phosphorothioate, 2'-F-phosphorothioate, 2'-F-phosphodiester, 2'-phosphorothioate, deoxy methoxyethyl 2-methoxyethyl phosphodiester, methylene(methylimino) (deoxy MMI), 2'-O-hydrocarby MMI, deoxy-methylphosphonate, 2'-O-hydrocarbyl methylphosphonate, morpholino, 4'-thio DNA, 4'-thio RNA, peptide nucleic acid, 3'-amidate, deoxy 3'-amidate, 2'-O-hydrocarbyl 3'-amidate, locked nucleic acid, cyclohexane nucleic acid, tricycle-DNA, 2'fluoro-arabino nucleic acid, N3'-P5' phosphoroamidate, carbamate linked, phosphotriester linked, a nylon backbone modification and any combination thereof.

In an embodiment, the modified base comprises a 2'O-methyl and the oligonucleotide comprises a phosphorothioate backbone.

In some embodiments of the above aspects, the two continuous cytosine bases comprise a 2'-LNA and a phosphorothioate backbone.

In an embodiment, one, two or all three of the three continuous pyrimidine bases do not hybridize to a target polynucleotide.

In an embodiment of the above aspects, one or both of the two continuous cytosine bases do not hybridize to a target polynucleotide.

In another aspect, the present invention provides an oligonucleotide comprising i) 5'-CUUGU-3', 5'-CCUAU-3', 5'-CAUUA-3', 5'-CGAAU-3' 5'-CUUAU-3', 5'-CUUUA-3' or 5'ACUGU-3' at the 5' end, and ii) 5'-CUUCU-3' 5'-CAUAU-3' 5'-CUUCU-3' 5'-AAUUU-3' 5'-AAAUU-3' 5'-CCUUC-3', 5'-AAUCA-3' or 5'-CGUCU-3' at the 3' end.

In an embodiment of the above aspects, the oligonucleotide comprises a terminal 5'U. In another embodiment, the oligonucleotide comprises a terminal 5'UC.

In an embodiment, any one of the following is modified to comprise a 5' region, preferably end, and/or a 3' region, preferably end, as described above;

5'-AUGGAAUACUCUUGGUUACTT-3' (SEQ ID NO: 465) and/or 5'-GUAACCAAGAGUAUUCCAUTT-3' (SEQ ID NO: 466) (strands of the siRNA used to treat polyneuropathy referred to as Patisiran);

5'-GCGTTTGCTCTTCTTCTTGCG-3' (SEQ ID NO: 467) (antisense oligonucleotide used to treat cytomegalovirus retinitis referred to as Fomivirsen);

5'-mG-mC*-mC*-mU*-mC*-dA-dG-dT-dC*-dT-dG-dC*-dT-dT-dC*-mG-mC *-mA-mC*-mC*-3' (SEQ ID NO: 468), where m is a 2'-O-(2-methoxyethyl) nucleoside and d is a 2'-deoxynucleoside, with methyl group at position 5 of C and U (*) (antisense oligonucleotide used to treat homozygous familial hypercholesterolemia referred to as Mipomersen); 30 5'-MeU MeC MeU G GTTAMeCATGAAA MeU MeC MeC MeC-3' (SEQ ID NO: 469), where underlined letters are 2'-O-(2-methoxyethyl) ribonucleotides; non-underlined letters are 2'deoxyribonucleotides; all pyrimidines are 5-methylated; all linkages are phosphorothioates (antisense oligonucleotide used to treatment of nerve damage in adults with hereditary transthyretin-mediated amyloidosis referred to as Inotersen);

5'-CUCCAACAUCAAGGAAGAUGGCAUUUCUAG-3' (SEQ ID NO: 470) (antisense oligonucleotide used to treat Duchenne muscular dystrophy referred to as Eteplirsen);

5'-TCACTTTCATAATGCTGG-3' (SEQ ID NO: 471) which is fully 2'-O-methoxyethyl (MOE) modified on a phosphorothioate backbone (antisense oligonucleotide used to treat spinal muscular atrophy referred to as Nusinersen);

5'-XGTTGCCTCCGGTTCTGAAGGTGTTC-3' (SEQ ID NO: 472) where bases are linked through a synthetic neutral phosphorodiamidate morpholino oligomer (PMO) backbone and X is hydrophilic triethylene glycol chain (antisense oligonucleotide used to treat Duchenne muscular dystrophy referred to as Golodirsen); or 5'-CAGAAAGAGUGUCUCAUCUUA-3' (SEQ ID NO: 473) and/or 5'-UAAGAUGAGACACUCUUUCUGGU-3' (SEQ ID NO: 474) (strands of the siRNA used to treat acute hepatic *porphyria* referred to as Givosiran). Furthermore, such oligonucleotides may have other modifications such as those standard in the art.

In an embodiment, an oligonucleotide of any of the above aspects does not inhibit Toll-like receptor 7 (TLR7) activity when administered to an animal. In an embodiment, the animal is a human.

In a further aspect, the present invention provides an oligonucleotide comprising one or more modified bases and at least four thymidines, wherein the oligonucleotide potentiates Toll-like receptor 8 (TLR8) activity when administered to an animal.

In an embodiment, the oligonucleotide comprises a 5'U. In another embodiment, the oligonucleotide comprises a 5'UC.

In an embodiment, the oligonucleotides comprises:
a) a 5' region at least five bases in length which are modified and/or which have a modified backbone,
b) a middle region comprising a stretch of ten bases, wherein at least four of the bases are thymidine,
c) a 3' region at least five bases in length.

In a further embodiment, the at least four thymidine bases are in a continuous stretch.

In another embodiment, one, two, three or four of the at least four thymidine bases are not in a continuous stretch.

In yet a further aspect, the present invention provides an oligonucleotide comprising
a) a 5' region at least five bases in length, wherein the 5' end consists of terminal 5'-mUmC-3' or terminal 5'-mCmU-3', where m is a modified base and/or has a modified backbone,
b) a middle region comprising a stretch of ten bases, wherein at least two of the bases are thymidine, and
c) a 3' region at least five bases in length and/or has a modified backbone, wherein the oligonucleotide potentiates Toll-like receptor 8 (TLR8) activity when administered to an animal (such as a human).

In an embodiment, an oligonucleotide of the above two aspects is also an oligonucleotide as defined for the other aspects.

The oligonucleotide can be any size. Examples of suitable sizes include, but are not limited to at least about 10, at least about 18, at least about 20, at least about 21, at least about 22, at least about 23, at least about 24, at least about 25, at least about 26, at least about 27, at least about 28, at least about 29, at least about 30, at about least 40, between about 10 and about 50 nucleotides, between about 18 and about 50 nucleotides, between about 18 and about 30 nucleotides, between about 20 and about 30 nucleotides, between about 20 and 1,000 nucleotides, between about 20 and 5,000 nucleotides, or about 20 bases in length.

An oligonucleotide of the invention can be used for a variety of purposes. In one embodiment, the oligonucleotide is an antisense oligonucleotide such as for hybridizing to a target mRNA to reduce translation thereof. In another embodiment, the oligonucleotide is, or forms part of, a stranded oligonucleotide for gene silencing (such as RNA interference). In another embodiment, the oligonucleotide is used to potentiate Toll-like receptor 8 (TLR8) activity but does not hybridize to a target RNA.

In one embodiment, the oligonucleotide is a gapmer antisense oligonucleotide. In an embodiment, one, two or all three of the three continuous pyrimidine bases are removed by an endonuclease in vivo.

In an embodiment, the antisense oligonucleotide down regulates expression of a gene and potentiates Toll-like receptor 8 (TLR8) activity.

In an embodiment, the double stranded oligonucleotide for gene silencing is an siRNA or an shRNA.

In an embodiment, the oligonucleotide is between 10 and 16 bases in length and potentiates Toll-like receptor 8 (TLR8) activity when administered to an animal (such as a human).

In yet a further aspect, the present invention provides a method for selecting an oligonucleotide for reducing the expression of a target gene, the method comprising
i) scanning a target polynucleotide, or complement thereof, for a region with at least three continuous pyrimidine bases;
ii) producing one or more candidate oligonucleotides comprising the three continuous pyrimidine bases, wherein one or both of the following apply;
a) the candidate oligonucleotide comprises three continuous pyrimidine bases within seven bases of the 5' end of the oligonucleotide, and
b) the candidate oligonucleotide comprises three continuous pyrimidine bases within seven bases of the 3' end of the oligonucleotide,
iii) testing the ability of the one or more candidate oligonucleotides to reduce expression of the target gene, and
iv) selecting an oligonucleotide which reduces expression of the target gene.

In an embodiment, the three continuous pyrimidine bases of a candidate oligonucleotide have a modified base and/or a modified backbone.

In another aspect, the present invention provides a method for selecting an oligonucleotide for reducing the expression of a target gene, the method comprising
i) scanning a target polynucleotide, or complement thereof, for a region with at least three continuous pyrimidine bases;
ii) producing one or more candidate oligonucleotides comprising a 5' region, a 3' region and a middle region comprising ribonucleic acid, deoxyribonucleic acid, or combination thereof, bases, wherein one or both of the 5' region and the 3' region comprise bases which are modified and/or which have a modified backbone, and at least one of the following apply;
a) the 5' region comprises three continuous pyrimidine bases which are modified and/or which have a modified backbone,
b) the 5' region comprises bases which are modified and/or which have a modified backbone and the junction between the 5' region and middle region comprises three continuous pyrimidine bases,
c) the 3' region comprises three continuous pyrimidine bases which are modified and/or which have a modified backbone, and
d) the 3' region comprises bases which are modified and/or which have a modified backbone and the junction between the 3' region and middle region comprises three continuous pyrimidine bases,
iii) testing the ability of the one or more candidate oligonucleotides to reduce expression of the target gene, and
iv) selecting an oligonucleotide which reduces expression of the target gene.

In another aspect, the present invention provides a method for selecting an oligonucleotide for reducing the expression of a target gene, the method comprising i) scanning a target polynucleotide, or complement thereof, for a region with one of the following sequences 5'-CUUGU-3', 5'-CCUAU-3', 5'-CAUUA-3', 5'-CGAAU-3' 5'-CUUAU-3', 5'-CUUUA-3', 5'ACUGU-3', 5'-CUUCU-3' 5'-CAUAU-3' 5'-CUUCU-3' 5'-AAUUU-3' 5'-AAAUU-3' 5'-CCUUC-3', 5'-AAUCA-3' or 5'-CGUCU-3', wherein the U may be a T, ii) producing one or more candidate oligonucleotides comprising
   a) 5'-CUUGU-3', 5'-CCUAU-3', 5'-CAUUA-3', 5'-CGAAU-3' 5'-CUUAU-3', 5'-CUUUA-3' or 5'ACUGU-3' at the 5' end, and/or
   b) 5'-CUUCU-3' 5'-CAUAU-3' 5'-CUUCU-3' 5'-AAUUU-3' 5'-AAAUU-3' 5'-CCUUC-3', 5'-AAUCA-3' or 5'-CGUCU-3' at the 3' end, iii) testing the ability of the one or more candidate oligonucleotides to reduce expression of the target gene, and iv) selecting an oligonucleotide which reduces expression of the target gene.

In still a further aspect, the present invention resides in a method for selecting an oligonucleotide for reducing the expression of a target gene, the method comprising
  i) scanning a target polynucleotide, or complement thereof, for a region with at least two continuous cytosine bases;
  ii) producing one or more candidate oligonucleotides comprising the two continuous cytosine bases, wherein the candidate oligonucleotide comprises two continuous cytosine bases at or towards the 5' end of the oligonucleotide,
  iii) testing the ability of the one or more candidate oligonucleotides to reduce expression of the target gene, and
  iv) selecting an oligonucleotide which reduces expression of the target gene.

In some embodiments, the two continuous cytosine bases of the oligonucleotide have a modified base and/or a modified backbone.

In other embodiments, the oligonucleotide comprises:
  a) a 5' region comprising bases which are modified and/or which have a modified backbone,
  b) a middle region comprising ribonucleic acid, deoxyribonucleic acid, or combination thereof, bases, and
  c) a 3' region comprising bases which are modified and/or which have a modified backbone.

In one embodiment, the 5' region and/or the 3' region are about 3 bases in length.

In another embodiment, the middle region is about 10 bases in length.

In a related aspect, the invention relates to a method for selecting an oligonucleotide for reducing the expression of a target gene, the method comprising
  i) scanning a target polynucleotide, or complement thereof, for a region with at least two continuous cytosine bases;
  ii) producing one or more candidate oligonucleotides comprising a 5' region, a 3' region and a middle region comprising ribonucleic acid, deoxyribonucleic acid, or combination thereof, bases, wherein one or both of the 5' region and the 3' region comprise bases which are modified and/or which have a modified backbone, and the 5' region comprises two continuous cytosine bases which are modified and/or which have a modified backbone, iii) testing the ability of the one or more candidate oligonucleotides to reduce expression of the target gene, and iv) selecting an oligonucleotide which reduces expression of the target gene.

In one embodiment, the 5' region and/or the 3' region are about 3 bases in length.

In another embodiment, the middle region is about 10 bases in length.

In certain embodiments of the above two aspects, one or both of the two continuous cytosine bases are a modified base and/or have a modified backbone. Suitably, for the two above aspects, the two continuous cytosine bases comprise a 2'-LNA and a phosphorothioate backbone.

In an embodiment of the three above aspects, the method further comprises testing the ability of the one or more candidate oligonucleotides to inhibit Toll-like receptor 7 (TLR7) activity, and selecting an oligonucleotide which does not inhibit TLR7 activity. In this regard, the methods of the above aspects are suitably for decreasing the TLR7 inhibitory activity of the oligonucleotide.

While designing and testing oligonucleotides, the inventors also observed new structural features which assist in potentiating Toll-like receptor 8 (TLR8) activity.

Thus, in yet a further aspect, the present invention provides a method for selecting an oligonucleotide for reducing the expression of a target gene, the method comprising
  i) scanning a target polynucleotide, or complement thereof, for a region comprising at least four of the bases are thymidine;
  ii) producing one or more candidate oligonucleotides comprising one or more modified bases and at least four thymidines,
  iii) testing the ability of the one or more candidate oligonucleotides to reduce expression of the target gene and to potentiate Toll-like receptor 8 (TLR8) activity, and
  iv) selecting an oligonucleotide which reduces expression of the target gene and which potentiates TLR8 activity.

In another aspect, the present invention provides a method for selecting an oligonucleotide which potentiates Toll-like receptor 8 (TLR8) activity, the method comprising
  i) scanning a target polynucleotide, or complement thereof, for a region with the sequence UC or CU and a stretch of ten bases, wherein at least two of the bases are thymidine;
  ii) producing one or more candidate oligonucleotides comprising;
    a) a 5' region at least five bases in length, wherein the 5' end consists of terminal 5'-mUmC-3' or terminal 5'-mCmU-3', where m is a modified base and/or has a modified backbone,
    b) a middle region comprising a stretch of ten bases, wherein at least two of the bases are thymidine, and
    c) a 3' region at least five bases in length and/or has a modified backbone,
  iii) testing the ability of the one or more candidate oligonucleotides to potentiate TLR8 activity, and
  iv) selecting an oligonucleotide which potentiates TLR8 activity.

In some instances it may not be possible to design a suitable oligonucleotide with the required pyrimidine bases. Alternatively, in other instances it may be desirable to improve the functioning of a pre-existing oligonucleotide which lacks the required pyrimidine bases. Thus, in another aspect, the present invention provides a method of reducing the Toll-like receptor 7 (TLR7) inhibitory activity of an oligonucleotide, the method comprising modifying the oligonucleotide by adding a sequence of nucleotides to the 5' and/or 3' end of the oligonucleotide such that the modified oligonucleotide comprises three continuous pyrimidine bases within seven bases of the 5' and/or 3' end of the oligonucleotide.

In an embodiment, one, two or all three of the pyrimidine bases are a modified base and/or have a modified backbone.

In another aspect, the present invention provides a method of reducing the Toll-like receptor 7 (TLR7) inhibitory activity of an oligonucleotide, the method comprising modifying the oligonucleotide such that the modified oligonucleotide comprises at least one of the following;
   a) the 5' region comprises three continuous pyrimidine bases which are modified and/or which have a modified backbone,
   b) the 5' region comprises bases which are modified and/or which have a modified backbone and the junction between the 5' region and middle region comprises three continuous pyrimidine bases,
   c) the 3' region comprises three continuous pyrimidine bases which are modified and/or which have a modified backbone, and
   d) the 3' region comprises bases which are modified and/or which have a modified backbone and the junction between the 3' region and middle region comprises three continuous pyrimidine bases.

In an embodiment of the two above aspects, the three continuous pyrimidine bases are at the 5' and/or 3' end of the modified oligonucleotide.

In a further aspect, the invention provides a method of reducing the Toll-like receptor 7 (TLR7) inhibitory activity of an oligonucleotide, the method comprising modifying the oligonucleotide by adding a sequence of nucleotides to the 5' end of the oligonucleotide such that the modified oligonucleotide comprises two continuous cytosine bases at or towards the 5' end of the oligonucleotide.

In certain embodiments, one or both of the two continuous cytosine bases are a modified base and/or have a modified backbone.

In a related aspect, the invention resides in a method of reducing the Toll-like receptor 7 (TLR7) inhibitory activity of an oligonucleotide, the method comprising modifying the oligonucleotide such that the modified oligonucleotide comprises a 5' region comprising two continuous cytosine bases which are modified and/or which have a modified backbone.

In particular embodiments of the above two aspects, the two continuous cytosine bases are at or towards the 5' end of the modified oligonucleotide.

In other embodiments of the above two aspects, the two continuous cytosine bases comprise a 2'-LNA and a phosphorothioate backbone.

In another embodiment of the four above aspects, the method further comprises testing the ability of the modified oligonucleotide to inhibit TLR7 activity, and selecting an oligonucleotide which inhibits (TLR7) activity to a lesser extent than the unmodified oligonucleotide.

Also provided is an oligonucleotide selected using the method of the invention, or modified using a method of the invention.

In another aspect, the present invention resides in an oligonucleotide comprising, consisting of or consisting essentially of a nucleic acid sequence set forth in Tables 1 to 6 or a variant thereof.

In another aspect, the present invention provides a composition comprising an oligonucleotide of the invention.

In an embodiment, the composition further comprises a pharmaceutically acceptable carrier.

In another embodiment, the composition further comprises an immune response modifier.

In another aspect, the present invention provides a method of reducing expression of a target gene in a cell, the method comprising contacting the cell with an oligonucleotide of the invention.

In another aspect, the present invention provides a method of treating or preventing a disease in a subject, the method comprising administering to the subject an oligonucleotide of the invention, wherein the oligonucleotide reduces the expression of a target gene involved in the disease.

In an embodiment, the animal has been, or will be, administered with an immune response modifier.

In an embodiment, the immune response modifier is a Toll-like receptor (TLR) agonist. Examples of suitable Toll-like receptor (TLR) agonists include, but are not limited to, a base analogue (including: a guanosine analogue, a deazaadenosine analogue, an imidazoquinoline or a derivative, a hydroxyadenine compound or a derivative, a thiazoloquinolone compound or a derivative, a benzoazepine compound or a derivative), or an RNA molecule.

In an embodiment, the TLR agonist is Guanosine, Uridine, Resiquimod (R848), Loxoribine, Isatoribine, Imiquimod, CL075, CL097, CL264, CL307, 852A, or TL8-506.

Also provided is the use of an oligonucleotide of the invention in the manufacture of a medicament for treating or preventing a disease in a subject, wherein the oligonucleotide reduces the expression of a target gene involved in the disease.

Further, provided is an oligonucleotide of the invention for use in treating or preventing a disease in a subject, wherein the oligonucleotide reduces the expression of a target gene involved in the disease.

Any embodiment herein shall be taken to apply mutatis mutandis to any other embodiment unless specifically stated otherwise.

The present invention is not to be limited in scope by the specific embodiments described herein, which are intended for the purpose of exemplification only. Functionally-equivalent products, compositions and methods are clearly within the scope of the invention, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The invention is hereinafter described by way of the following non-limiting Examples and with reference to the accompanying figures.

BRIEF DESCRIPTION OF THE
ACCOMPANYING DRAWINGS

FIG. 1. ASO-dependent modulation of R848 sensing by TLR7/8.
   (A) Wild-type THP-1 pre-treated overnight with 100 nM indicated ASO targeted to cGAS (Table 1), were stimulated or not (non-treated[NT]) with 1 µg/ml R848 for 8.5 h, and IP-10 (left panel) and TNF-α (right panel) levels in supernatants determined by ELISA. Data shown are averaged from three (left) or two (right) independent experiments in biological triplicate (±s.e.m and ordinary one-way ANOVA with Dunnett's multiple comparison tests to the "R848 without ASO" condition are shown). There was no basal effect of the ASOs on NT cells for either cytokines.

(B, C) HEK-TLR7 (B) and HEK-TLR8 (C) cells expressing an NF-κB-luciferase reporter were treated with 500 nM indicated ASOs for 50 min prior to stimulation with 1 μg/ml R848. NF-κB-luciferase levels were measured after overnight incubation. Percentages (B) or fold increases (C) relative to the condition "R848 without ASO" condition are averaged from three independent experiments in biological triplicate (+s.e.m and ordinary one-way ANOVA with Dunnett's multiple comparison tests to the NT condition [B] or the "R848 without ASO" condition [C] are shown).

(D) UNC93B1-deficient THP-1 (KO) and matched controls with rescued UNC93B1 expression (WT) were treated with 100 nM ASO overnight, prior to stimulation with 1 μg/ml R848 for 24 h and IP-10 levels in supernatants determined by ELISA. Data shown are averaged from two independent experiments in biological triplicate for each cell line (±s.e.m and unpaired t-tests are shown). The cGAS ligand ISD70 was used at 2.5 μg/ml as positive control to induce IP-10. (E, F) PBMCs from two blood donors were incubated 20-45 min with 100 nM ASO, and stimulated with 0.5 g/ml R848 for 4 h prior to TNF-α ELISA (E), or 24 h prior to IFN-α ELISA (F).

(E) Data shown are averaged from 2 blood donors in biological triplicate (±s.e.m. and ordinary one-way ANOVA with Dunnett's multiple comparison tests to the "R848 without ASO" condition are shown).

(F) Data were normalised to the condition "R848 without ASO" to limit variations between patients, and are averaged from 2 blood donors in biological triplicate (±s.e.m. and Brown-Forsythe and Welch ANOVA with Dunnett's T3 multiple comparison tests to the "R848 without ASO" condition are shown).

(G) [cGAS] ASO2 sequence variants used. The central DNA region is highlighted in light grey. For the 3' and 5' flanking regions (highlighted in dark grey), the DNA bases are in black, the five 5' and 3' bases of ASO2, ASOs-Cys3 and ASO-PO are 2'OMe bases, the three 5' and 3' bases of ASO2-LNA are LNA bases and the five 5' and 3' bases of ASO2-MOE are 2'MOE bases. Underlined bases are on a PS backbone.

(H, I) HEKTLR7 (H) and HEK-TLR8 (I) cells expressing an NF-κB-luciferase reporter were treated with 500 nM indicated ASOs for 20 min prior to stimulation with 1 μg/ml R848. NF-κB-luciferase levels were measured after overnight incubation. Percentages (H) or fold increases (I) relative to the condition "R848 without ASO" condition are averaged from three (I) or two (H) independent experiments in biological triplicate (+s.e.m and ordinary one-way ANOVA with Dunnett's multiple comparison tests to the NT condition [H] or the "R848 without ASO" condition [I] are shown). * P≤0.05,  P≤0.01, * P≤0.001, **** P≤0.0001, ns: non-significant.

Figure 2:
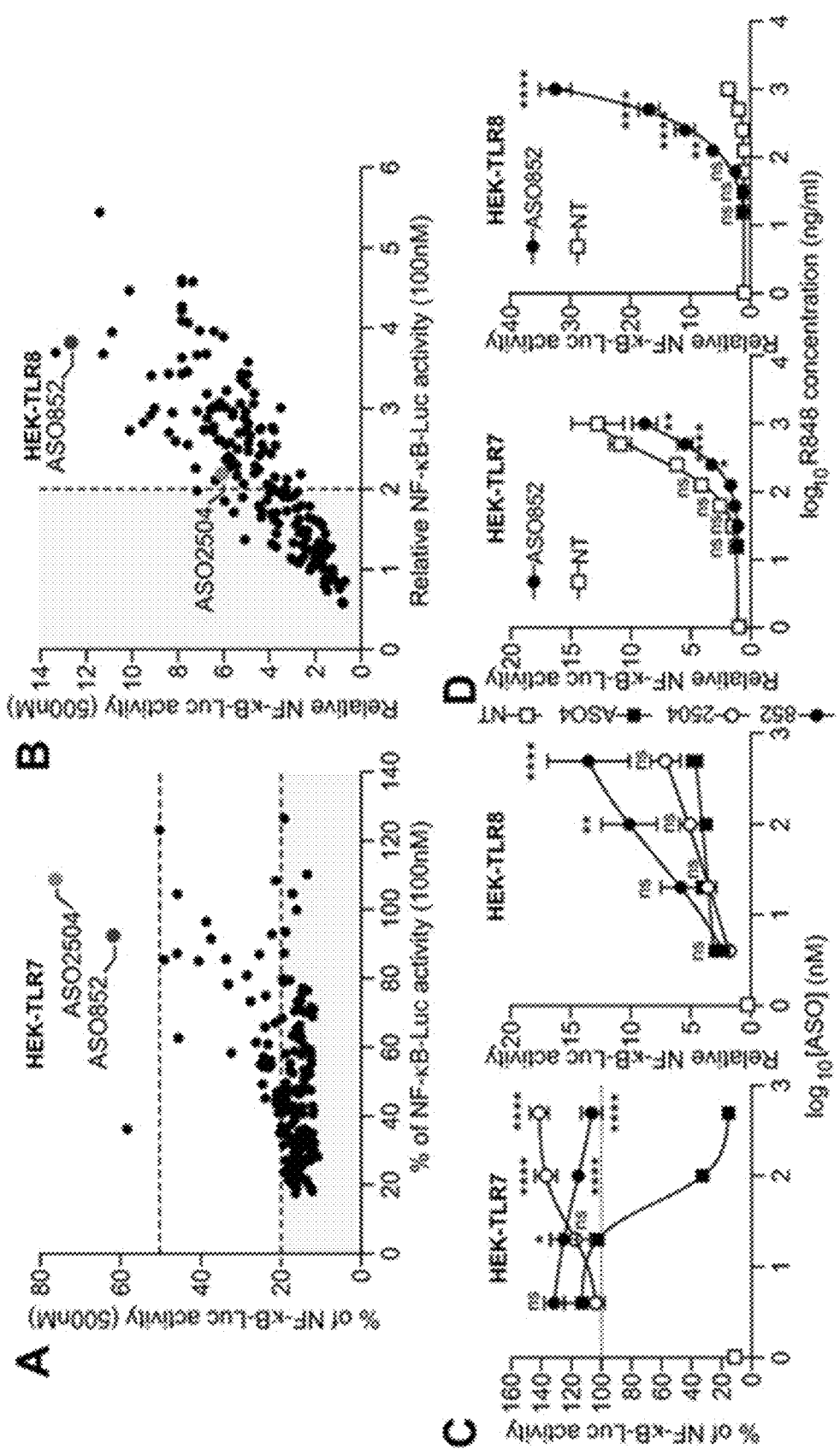

FIG. 2. Identification of ASOs with low TLR7 inhibition and high TLR8 potentiation.

(A, B) HEK-TLR7 (A) and HEK-TLR8 (B) cells expressing an NF-κB-luciferase reporter were treated with 100 nM or 500 nM indicated ASOs for 20-50 min prior to stimulation with 1 μg/ml R848. NF-κB-luciferase levels were measured after overnight incubation. Percentages (A) or fold increases (B) relative to the condition "R848 without ASO" are averaged from biological duplicates (averaged data are provided in Table 2). Stimulations with 100 nM and 500 nM ASO were performed in independent experiments (data shown for each concentration is from a single experiment). [CDKN2B-AS1]-852, and [LINCPINT]-2504 are referred to as ASO852 and ASO2504, and are indicated on the plot. ASOs with ≥80% reduction of TLR7 activity at 500 nM (A) and ≤2 fold TLR8 potentiation at 100 nM (B) are highlighted with grey shading.

(C, D) HEK-TLR7 (left panels) and HEK-TLR8 (right panels) cells expressing an NF-κB-luciferase reporter were treated with increasing ASOs concentrations (4, 20, 100 and 500 nM) (C) or with 500 nM ASOs (D) for 20 min prior to stimulation with 1 μg/ml R848 (C) or with increasing R848 concentrations (0.0156, 0.031, 0.062 0.125, 0.250, 0.5, 1 μg/ml) (D). NF-κB-luciferase levels were measured after overnight incubation. Percentages (left panels) or fold increases (right panels) relative to the condition "R848 without ASO" (C) or NT condition (D) are averaged from two independent experiments in biological triplicate (±s.e.m and ordinary two-way ANOVA with Dunnett's multiple comparison tests to the ASO4 condition [C] or R848 only condition [D] are shown). * P≤0.05,  P≤0.01, * P≤0.001, **** P≤0.0001, ns: non-significant.

Figure 3:
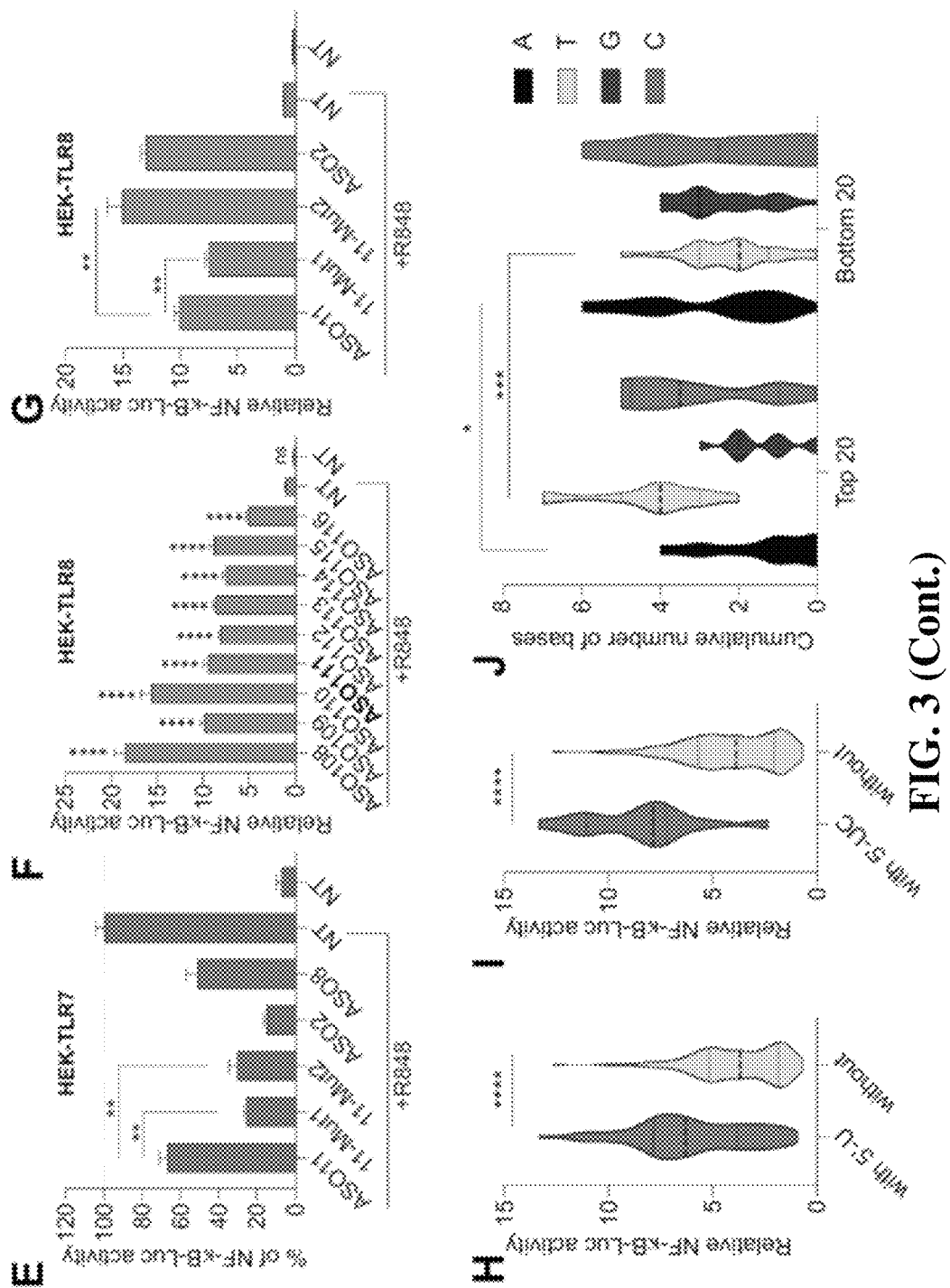
Figure 3:
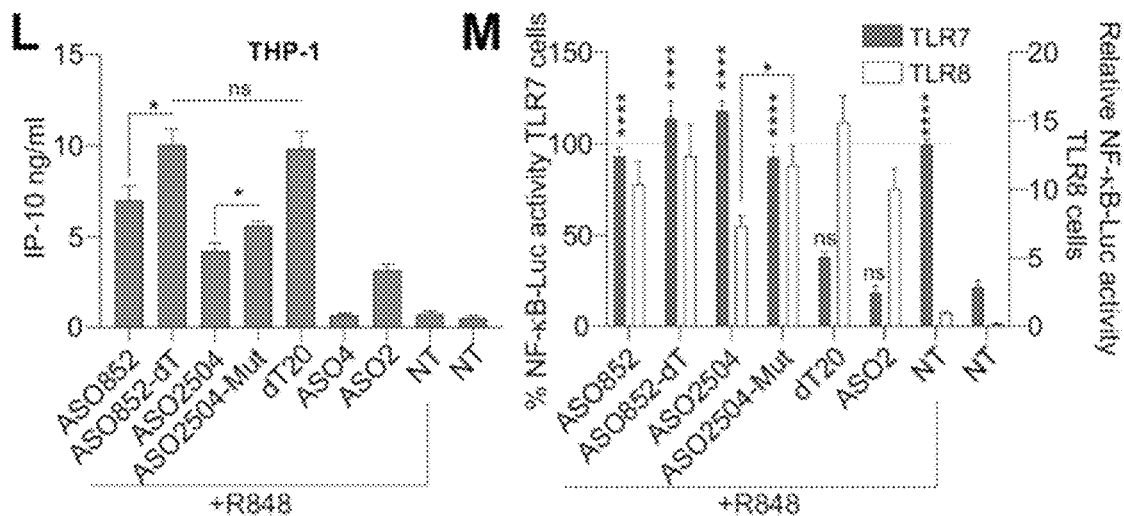

FIG. 3. Identification of molecular determinants of ASO effect on TLR7/8.

(A) Top: sequence alignments of ASOs from the screens on HEK-TLR7 cells (FIG. 2A) which displayed low TLR7 inhibition at 100 nM and harboured significantly enriched motif (see Table 2 for detail of the 17 ASOs used in this analysis). [CD.] is CDKN2B-AS1; [CT.] is CTNNB1. The central DNA region is highlighted in light grey and the 3' and 5' 2'OMe flanking regions are highlighted in dark grey. Bottom: MEME pictogram of the relative frequency of bases constituting the non-inhibitory motif. CUU motifs are in bold light grey, while UUC motifs are underlined.

(B, E) HEK-TLR7 cells expressing an NF-κB luciferase reporter were treated with 100 nM (B) or 500 nM (E) indicated ASOs for 20 min prior to stimulation with 1 μg/ml R848. NF-κB-luciferase levels were measured after overnight incubation. Percentages relative to the condition "R848 without ASO" are averaged from three (B) or two (E) independent experiments in biological triplicate (±s.e.m and ordinary one-way ANOVA with Dunnett's multiple comparison tests to the NT condition [B] or Mann-Whitney U tests [E] are shown).

(C, D) Sequence alignments of ASOs from the PINT series (C) and [cGAS] ASO11 variants (D). (C) The conserved region between all the sequences is highlighted in light grey. The 2'OMe flanking regions are highlighted in dark grey. (D) The central DNA region is highlighted in light grey and the 3' and 5' 2'OMe flanking regions are highlighted in dark grey. (C, D) CUU motifs are in bold light grey, while UUC motifs are underlined.

(F, G) HEK-TLR8 cells expressing an NF-κB-luciferase reporter were treated with 100 nM (F) or 500 nM (G) indicated ASOs for 20 min prior to stimulation with 1 μg/ml R848. NF-κB-luciferase levels were measured after overnight incubation. Fold increases relative to the condition "R848 without ASO" are averaged from three (F) or two (G) independent experiments in biological triplicate (±s.e.m and ordinary one-way ANOVA with Dunnett's multiple comparison tests to the NT condition [F] or Mann-Whitney U tests [G] are shown).

(H, I) 192 ASOs from the screen were sorted into two groups according to presence/absence of terminal 5'mU (H) or 5'mUmC (I), and fold increase NF-κB-luciferase levels to R848 only (using 500 nM ASOs-Table 2) are shown as violin plots for each population. Mann-Whitney U tests are shown.

(J) The central 10 DNA bases of the top and bottom 20 TLR8 potentiators from the 192 ASOs screened (Table 2) was analysed for base content. The violin plots show the distribution of the cumulative number of each central base for both ASO populations. Ordinary two-way ANOVA with Sidak's multiple comparison tests are shown.

(K) ASO852 and ASO2504 variants. The central DNA region is highlighted in blue and the 3' and 5' 2'OMe flanking regions are highlighted in orange.

(L) WT THP-1 were pre-treated overnight with 100 nM ASO, and stimulated with 1 μg/ml R848 for 7 h and IP-10 levels in supernatants determined by ELISA. Data shown are averaged from two independent experiments in biological triplicate (±s.e.m and unpaired t-tests are shown).

(M) HEK-TLR7 and HEK-TLR8 cells expressing an NF-κB-luciferase reporter were treated with 500 nM indicated ASOs for 20 min prior to stimulation with 1 μg/ml R848. NF-κB-luciferase levels were measured after overnight incubation. Percentages or fold increases relative to the condition "R848 without ASO" condition are averaged from three independent experiments in biological triplicate (±s.e.m and ordinary one-way ANOVA with Dunnett's multiple comparison tests to the NT condition [TLR7] or Mann-Whitney U test [TLR8] are shown). * P≤0.05,  P≤0.01, * P≤0.001, *** P≤0.0001, ns: non-significant.

Figure 4:
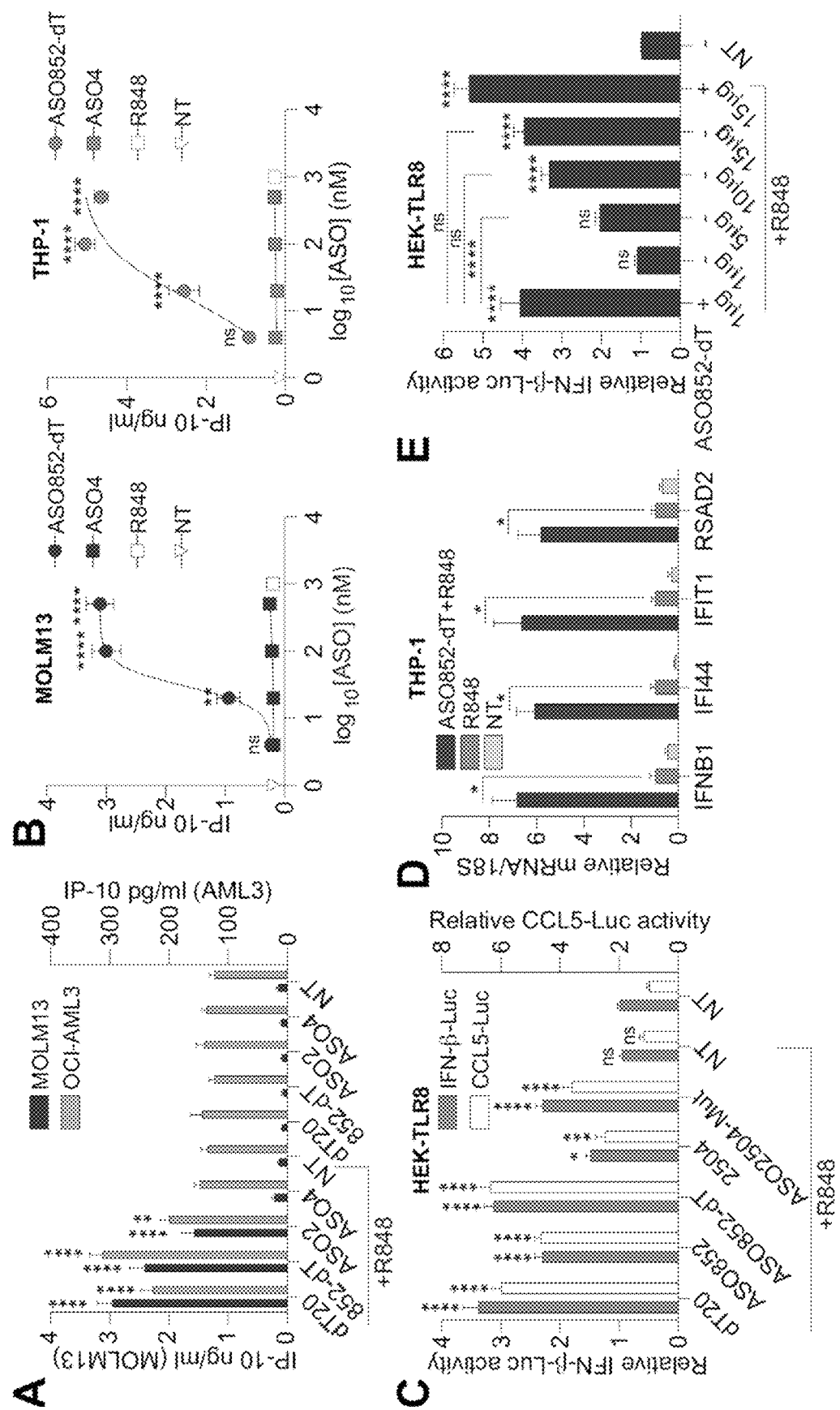

FIG. 4. Characterization of ASOs potentiation of R848 sensing by TLR8.

(A) MOLM13 and OCIAML3 cells were incubated overnight with 500 nM ASOs, stimulated with 1 μg/ml R848 for 8 h (MOLM13) or 24 h (OCI-AML3), and IP-10 levels in supernatants determined by ELISA. Data shown are averaged from five (MOML13) or four (OCI-AML3) independent experiments for all conditions with exception of the ASO only conditions (carried out in two independent experiments) in biological triplicate (±s.e.m and ordinary one-way ANOVA with Dunnett's multiple comparison tests to the "R848 without ASO" condition are shown).

(B) MOLM13 and THP-1 were incubated overnight with increasing doses of ASOs (4, 20, 100, 500 nM), stimulated with 1 μg/ml R848 for 8 h and IP-10 levels in supernatants determined by ELISA. Data shown are averaged from two independent experiments in biological triplicate (±s.e.m and ordinary two-way ANOVA with Dunnett's multiple comparison tests to the ASO4 condition are shown).

(C) HEK-TLR8 cells expressing a CCL5-luciferase reporter (right-hand side) or an IFN-β-luciferase reporter (left-hand side) were treated with 500 nM indicated ASOs for 20 min prior to stimulation with 1 μg/ml R848. Luciferase levels were measured after overnight incubation. Data are shown as fold increase to NT condition, and are averaged from two independent experiments in biological triplicate (±s.e.m and ordinary one-way ANOVA with Dunnett's multiple comparison tests to the NT condition are shown).

(D) WT THP-1 were incubated overnight with 500 nM ASO852-dT (or NT), and stimulated or not for 4 h with 1 μg/ml R848, prior to RNA purification. Expression of panel of 4 IRF-driven genes was analysed by RT-qPCR. Expression of the indicated genes was reported to 18S expression, and further normalised to the average of the "R848 without ASO" condition. Data shown represent the average of two independent experiments conducted in biological duplicate (±s.e.m and MannWhitney U tests are shown).

(E) HEK-TLR8 cells expressing an IFN-β-luciferase reporter were treated with 500 nM ASO852-dT (or NT) for 20 min prior to stimulation with increasing doses of R848 (1, 5, 10, 15 μg/ml). IFN-β-luciferase levels were measured after overnight incubation. Data are shown as fold increase to NT condition, and are averaged from two independent experiments in biological triplicate (±s.e.m and ordinary one-way ANOVA with Tukey's multiple comparison tests to the NT condition and selected pairs of conditions are shown). * P≤0.05,  P≤0.01, * P≤0.001, **** P≤0.0001, ns: non-significant.

Figure 5:
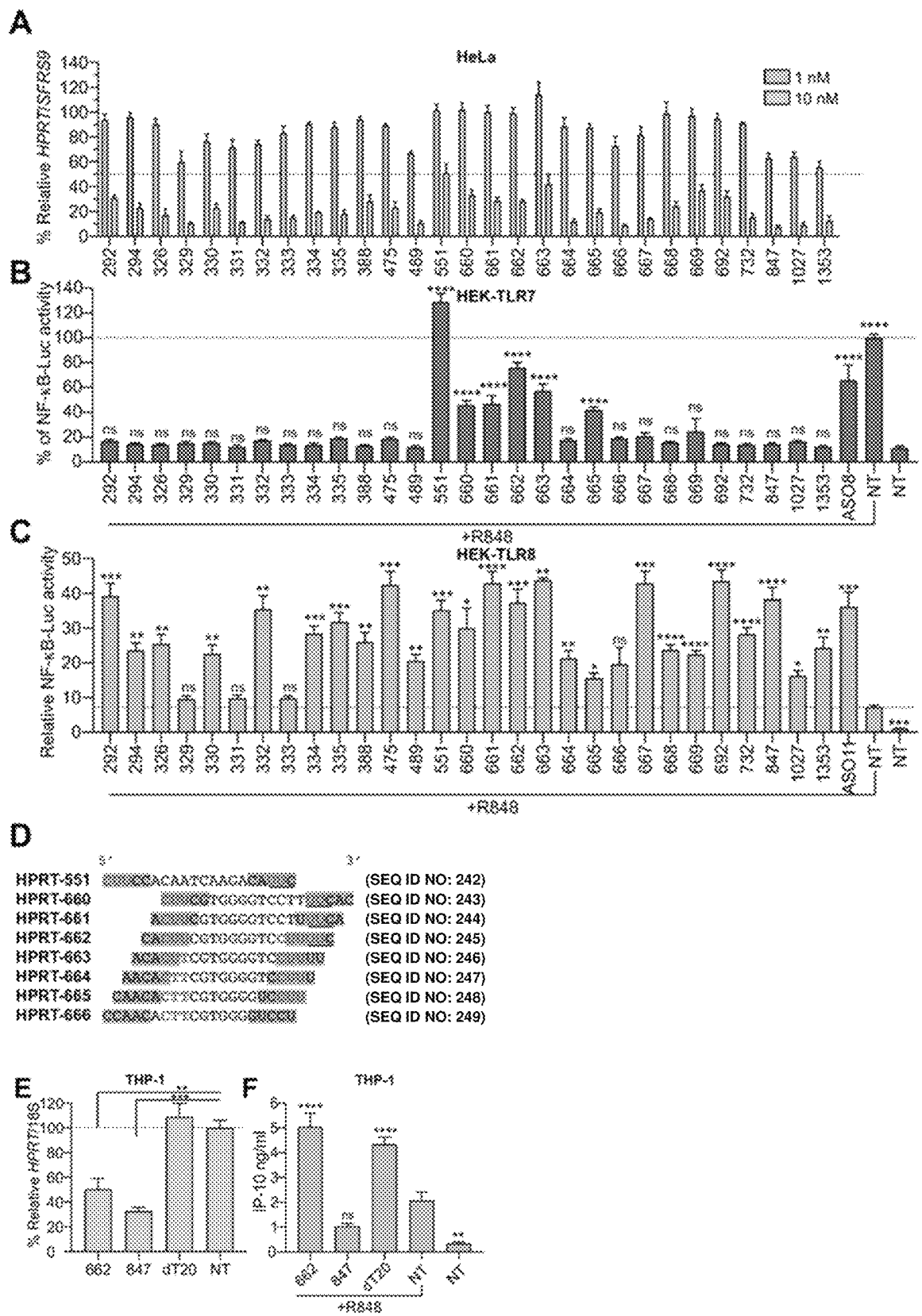

FIG. 5. Rational selection of HPRT-targeting ASOs exhibiting TLR8 potentiation.

(A) HeLa cells were reverse-transfected with 1 nM (left-hand side) or 10 nM of (right-hand side) HPRT-targeting ASOs as detailed in Example 1 and Table 3, and HPRT levels measured by RT-qPCR after 24 h incubation. HPRT levels were reported to SFRS9 expression, and further normalised to the average of the non-targeting ASONC1 and ASONC5 control conditions. Data shown represent the average of three independent experiments conducted in biological triplicate (±s.e.m).

(B, C) HEKTLR7 (B) and HEK-TLR8 (C) cells expressing an NF-κB-luciferase reporter were treated with 500 nM ASOs for 20 min prior to stimulation with 1 μg/ml R848. NF-κB-luciferase levels were measured after overnight incubation. Percentages (B) or fold increases (C) relative to the condition "R848 without ASO" (B) or NT condition (C) are averaged from three independent experiments in biological triplicate (±s.e.m and ordinary one-way ANOVA with Dunnett's multiple comparison tests to the NT condition [B] or the "R848 without ASO" condition [C] are shown).

(D) Selected HPRT ASO sequences with low TLR7 inhibition. The conserved region between all the sequences is highlighted in light grey. The 2'OMe flanking regions are highlighted in dark grey. CUU motifs are in bold light grey, while UUC motifs are underlined.

(E, F) WT THP-1 were incubated overnight with 100 nM ASOs. The next day, the cells were treated with LIPOFECTAMINE™ 2000 (at 2.5 μl/ml, to enhance cytoplasmic delivery of the ASOs), just before R848 stimulation (1 μg/ml—for F only). Supernatants were collected after 8 h for IP-10 ELISA (F), and cells lysed for RNA purification after 24 h (E). (E) HPRT levels were reported to 18S, and normalised to NT condition. Data are averaged from four (E) or three (F) independent experiments in duplicate (±s.e.m and ordinary one-way ANOVA with Dunnett's multiple comparison tests to the "R848 without ASO" condition [F] or Mann-Whitney U tests [E] are shown). * P≤0.05,  P≤0.01, * P≤0.001, **** P≤0.0001, ns: non-significant.

Figure 6:
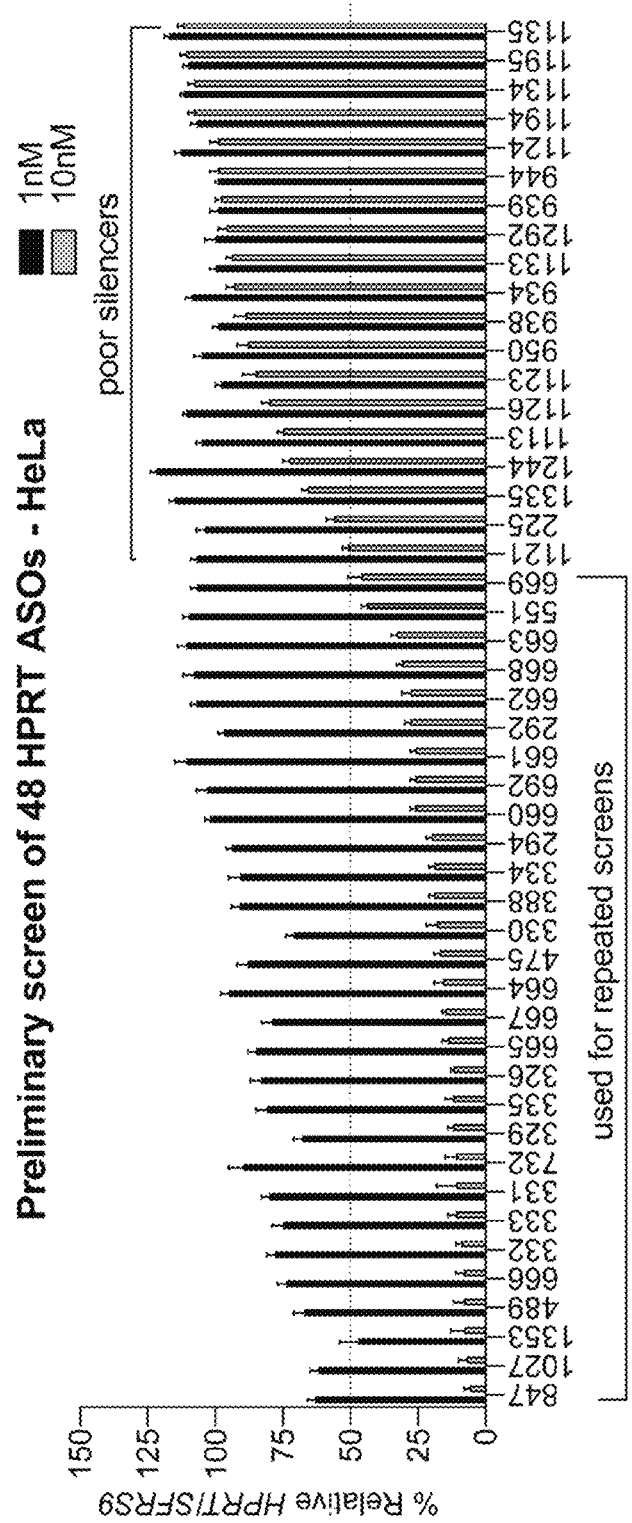

FIG. 6. Preliminary screen of 48 ASOs targeting the human HPRT gene in HeLa cells. HeLa cells were reverse-transfected with indicated ASO quantities as detailed in Example 1, and HPRT levels measured by RT-qPCR after 24 h incubation. HPRT levels were reported to SFRS9 expression, and further normalised to the average of the non-targeting ASONC1 and ASONC5 control conditions. Data shown represent the average of biological triplicates from one experiment (±s.e.m.).

Figure 7:
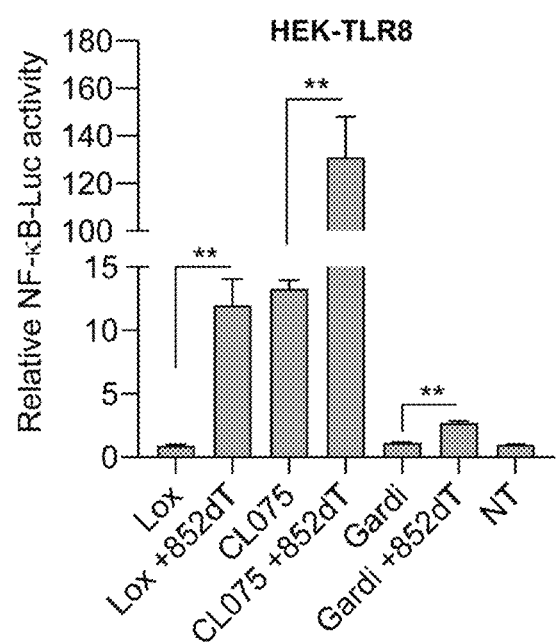

FIG. 7. ASO852-dT potentiation of TLR7 and TLR8 ligands. HEK-TLR8 cells expressing an NF-κB-luciferase reporter were treated with 100 nM ASO852-dT (or NT) for 20 min prior to stimulation with Loxoribine (5 mM), CL075 (1 μg/ml), Gardiquimod (1 μg/ml). NF-κB-luciferase levels were measured after overnight incubation. Data are shown as fold increase to NT condition, and are averaged from two independent experiment in biological triplicate (±s.e.m. and ordinary one-way ANOVA with Mann-Whitney U tests are shown).

Figure 8:
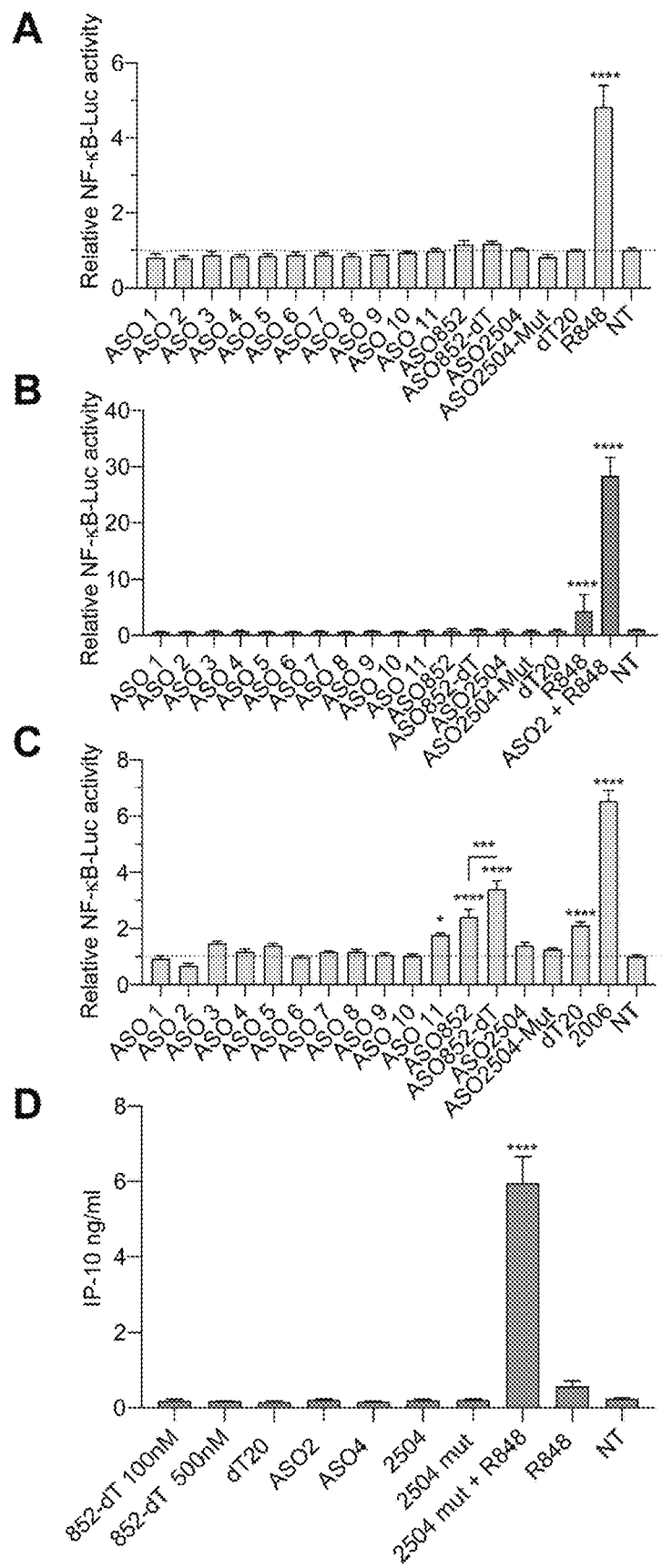

FIG. 8. Basal activities of ASOs on TLR7, 8, 9 HEK cells and THP-1 cells. (A, B, C) HEK-TLR7 (A), TLR8 (B), and TLR9 (C) cells expressing an NF-κB-luciferase reporter were treated with 500 nM indicated ASOs. NF-κB-luciferase levels were measured after overnight incubation. (A, B) cells were treated with 1 μg/ml R848 as positive control, alone or in the presence of ASO2 at 500 nM (for panel B only). (C) HEK-TLR9 cells were stimulated with 200 nM of ODN 2006 as a positive control. Fold increases relative to the NT condition are averaged from two (A, B) or three independent experiments (C) in biological triplicate (±s.e.m and ordinary one-way ANOVA with Dunnett's multiple comparison tests [A, B] or Tukey's multiple comparison tests to the NT condition and selected pairs of conditions [C] are shown). (D) WT THP-1 were pre-treated overnight with 100 nM ASO (except condition "852-dT 500 nM" with 500 nM ASO used), and stimulated with 1 μg/ml R848 for 8 h and IP-10 levels in supernatants determined by ELISA. Data shown are averaged from two independent experiments in biological triplicate (±s.e.m and ordinary one-way ANOVA with Dunnett's multiple comparison tests to the NT condition are shown). (A-D) Unless otherwise mentioned, differences to NT condition were non-significant. * P≤0.05,  P≤0.01, * P≤0.001, **** P≤0.0001.

Figure 9:
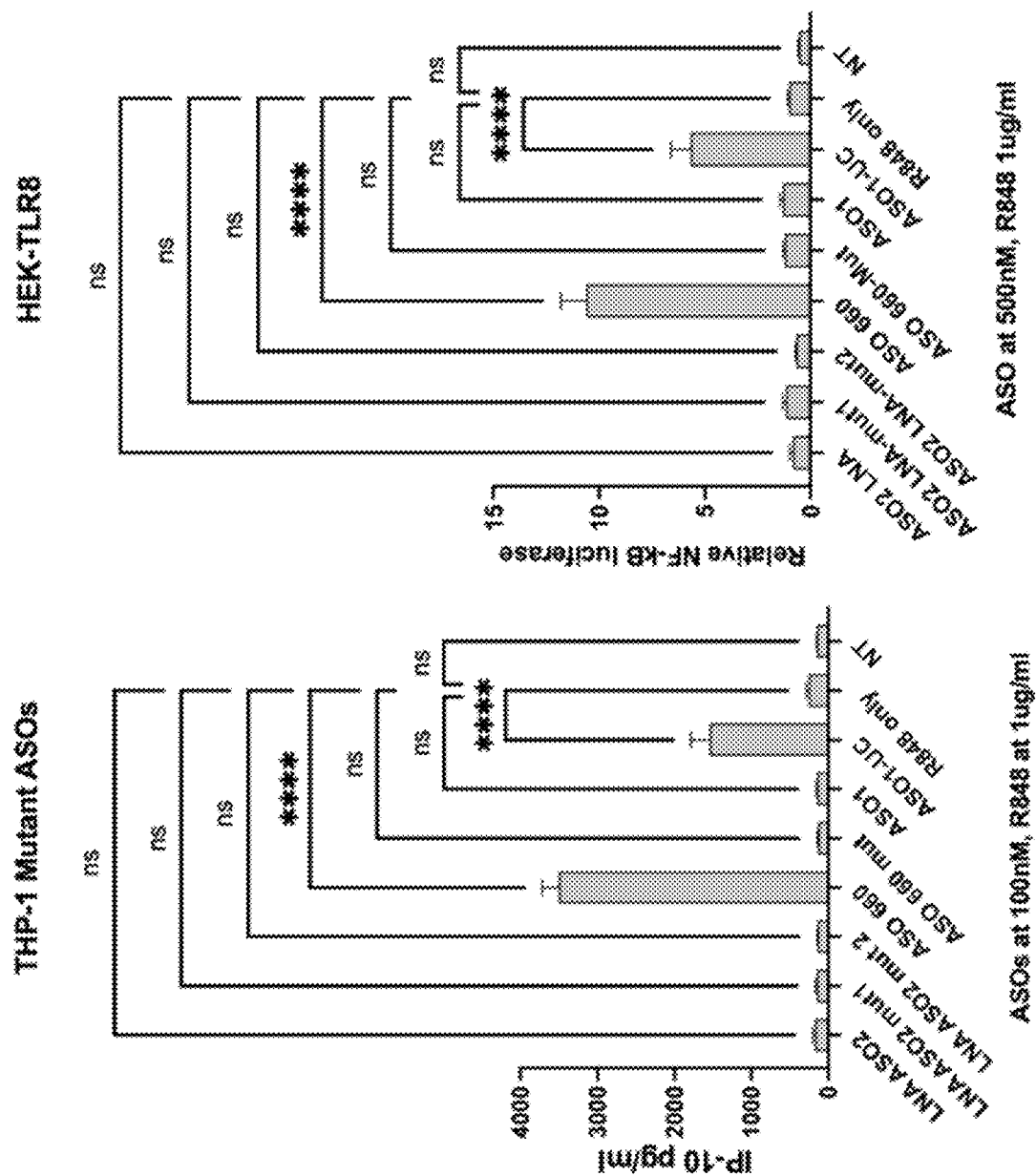

FIG. 9. Motif-specific TLR8 potentiation. THP-1 cells and HEK-TLR8 cells expressing an NF-κB-luciferase reporter were pre-treated (overnight for THP-1, and ~30 min for HEK) with indicated concentrations of ASOs, prior to R848 stimulation for 7 h (THP-1, IP-10 ELISA) or overnight for NF-κB-Luciferase. Data shown are averaged from 3 independent experiments in biological triplicate. For HEK-TLR8, the NF-κB-luciferase values are reported to the R848 condition. All ASO conditions are with R848 co-stimulation. SEM and One-way ANOVA with Dunnett's multiple comparisons to R848 only condition are shown.

Figure 10:
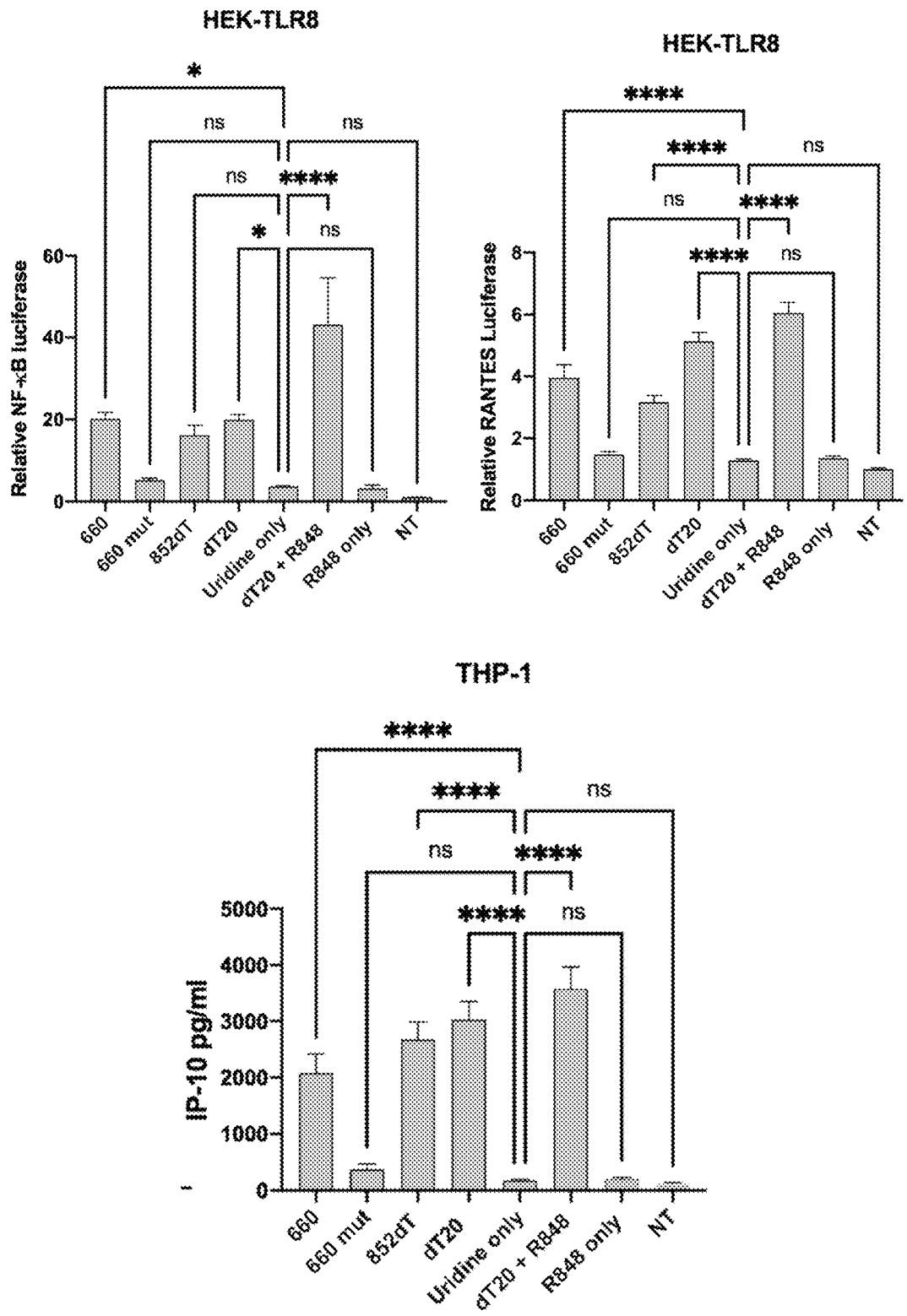

FIG. 10. Sequence-specific potentiation of uridine sensing by ASOs. THP-1 cells and HEK-TLR8 cells expressing an NF-κB-luciferase reporter or a RANTES-luciferase reporter were pre-treated (overnight for THP-1, and ~30 min for HEK) with 100 nM (THP-1) or 500 nM ASOs (HEKs), prior to uridine stimulation (20 mM) for 7 h (THP-1, IP-10 ELISA) or overnight for HEK-TLR8 cells. Data shown are averaged from 3 (THP-1 and RANTES-Luc HEKs) or 2 (NF-κB-Luc HEKs) independent experiments in biological triplicate. For HEK-TLR8, the NF-κB-luciferase values are reported to R848 condition; for RANTES-luciferase values are reported to NT condition. All ASO conditions are with Uridine co-stimulation (except R848 conditions at 1 μg/ml). SEM and One-way ANOVA with Dunnett's multiple comparisons to "Uridine only" condition are shown.

Figure 11:
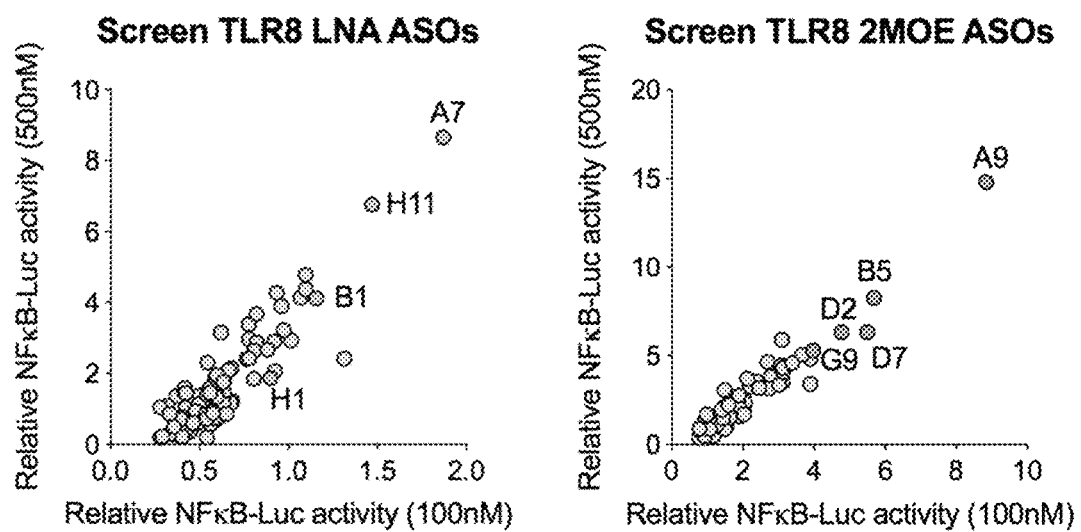

FIG. 11. Identification of LNA and 2'MOE gapmer ASOs potentiating TLR8 sensing. HEK-TLR8 cells expressing an NF-κB-luciferase reporter were pre-treated for ~30 min with indicated concentrations of ASOs, prior to R848 stimulation (1 μg/ml) overnight. Fold increases relative to the condition 'R848 without ASO' are averaged from biological duplicates (averaged data are provided in Table 1). Stimulations with 100 nM and 500 nM ASO were performed in independent experiments (data shown for each concentration is from a single experiment).

Figure 12:
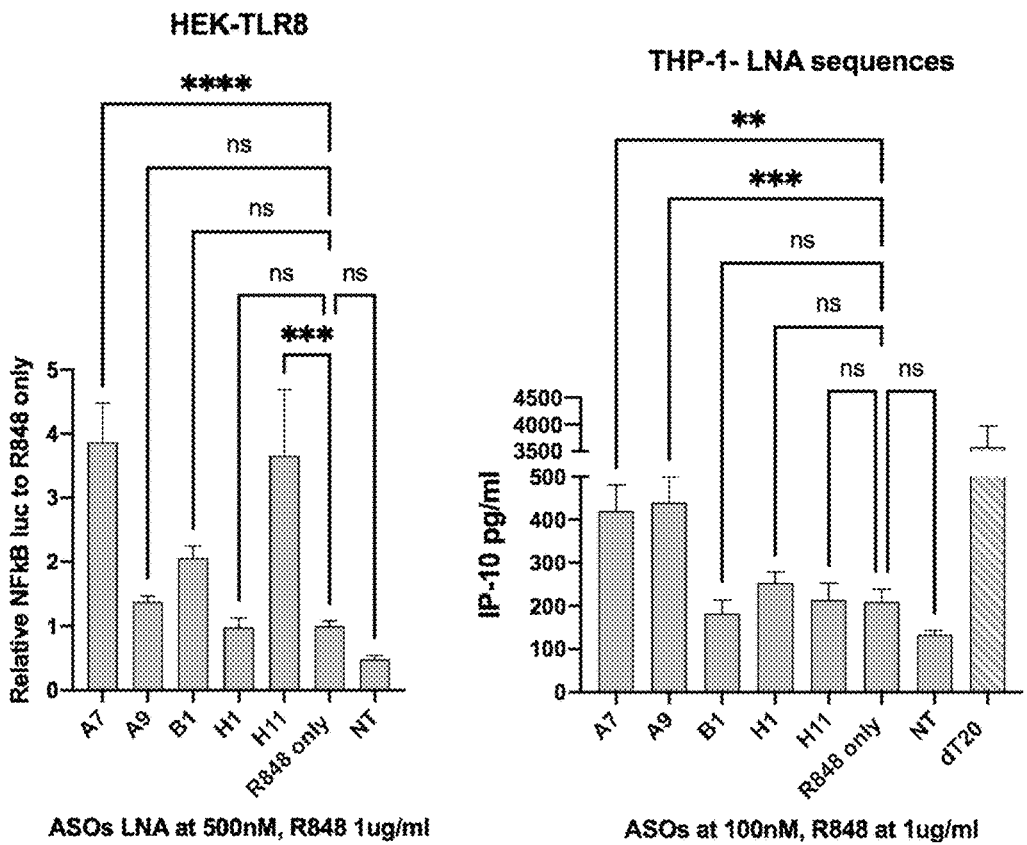

FIG. 12. Validation of LNA ASOs potentiating TLR8. THP-1 cells and HEK-TLR8 cells expressing an NF-κB-luciferase reporter were pre-treated (overnight for THP-1, and ~30 min for HEK) with indicated concentrations of LNA ASOs, prior to R848 stimulation for 7 h (THP-1, IP-10 ELISA) or overnight for NF-κB-Luciferase. Data shown are averaged from 3 independent experiments in biological triplicate (THP-1) or duplicate (HEKs). For HEK-TLR8 cells, the NF-κB-luciferase values are reported to "R848 only" condition. All ASO conditions are with R848 co-stimulation. SEM and One-way ANOVA with Dunnett's multiple comparisons to R848 only condition are shown.

Figure 13:
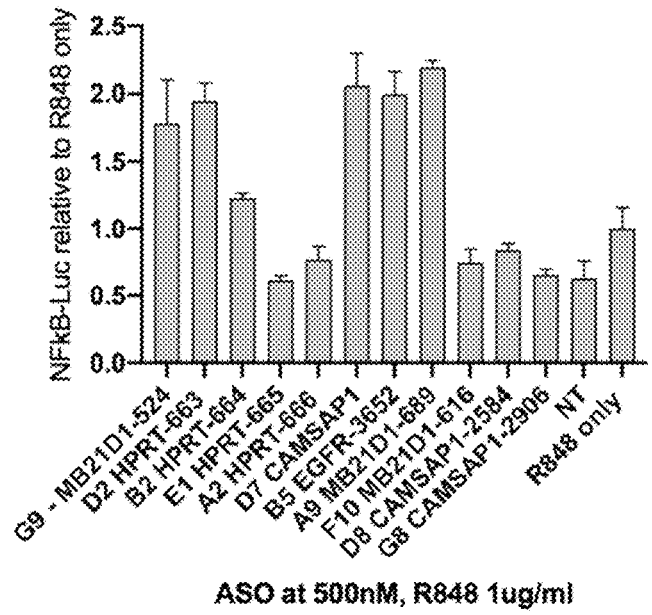

FIG. 13. Validation of 2'MOE ASOs potentiating TLR8. HEK-TLR8 cells expressing an NF-κB-luciferase reporter were pre-treated for ~30 min with 500 nM indicated 2'MOE ASOs, prior to R848 stimulation (1 μg/ml) overnight. All ASO conditions are with R848 co-stimulation. Fold increases relative to the condition 'R848 without ASO' are averaged from biological replicate-data shown are from a single experiment (±SEM).

Figure 14:
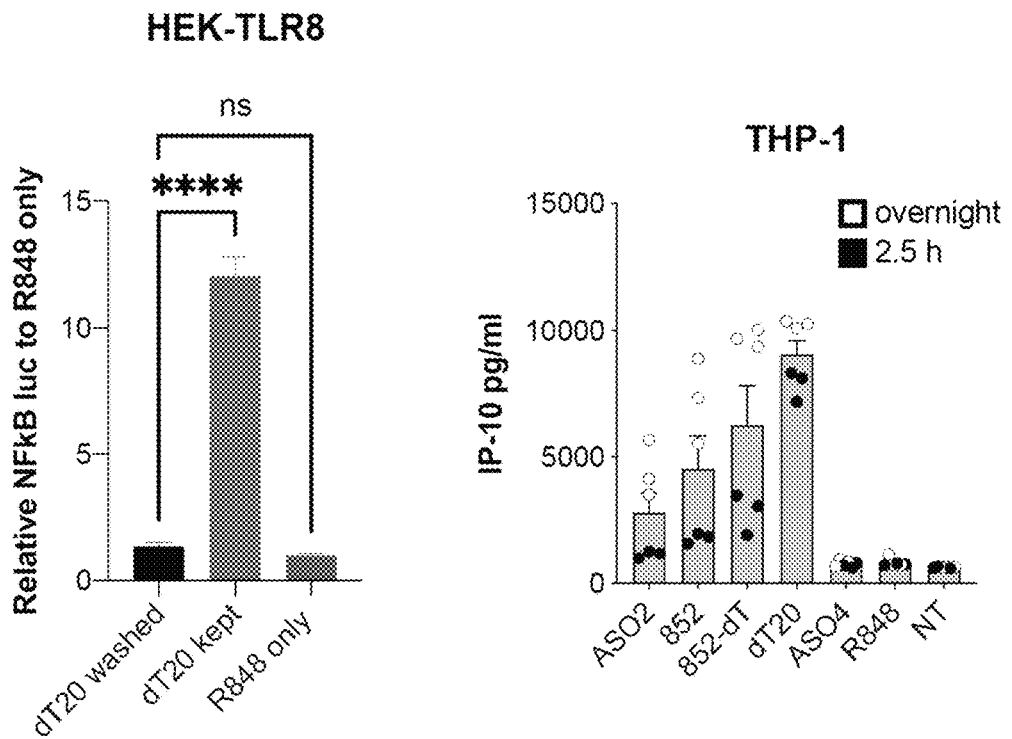

FIG. 14. Potentiation of TLR8 sensing by dT20 does not persist after wash off of the oligonucleotides. Left: HEK-TLR8 cells expressing an NF-κB-luciferase reporter were pre-treated overnight with 500 nM dT20, prior to be washed (or not) and stimulated with R848 stimulation (1 μg/ml) overnight. Data shown are averaged from 2 independent experiments in biological triplicate, and reported to R848 only condition. SEM and One-way ANOVA with Dunnett's multiple comparisons to R848 only condition are shown. Right: THP-1 cells were incubated with 100 nM indicated ASOs overnight (purple) or for 2.5 h, prior to R848 stimulation (1 μg/ml) for ~7 h. IP-10 levels were measured by ELISA. Data shown are from a single experiment in biological triplicate (each dot represents a biological replicate). All ASO conditions are with R848 co-stimulation.

Figure 15:
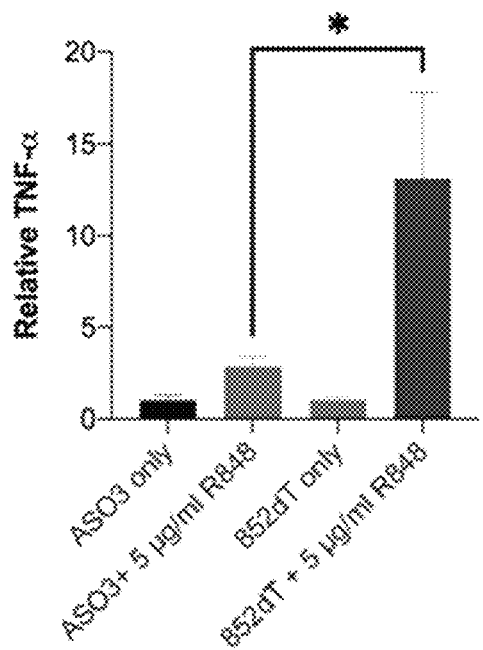

FIG. 15. Co-culture of phagocytes with ASO-transfected cells leads to sequence specific TLR8 potentiation. HEK WT cells were transfected with 500 nM ASO3 (non-TLR8 potentiating) or 500 nM 852dT (strongly potentiating TLR8), for 4 h, prior to UV treatment (254 nm at 120 mJ/cm2), extensive washing (2×5 ml—to remove untransfected ASOs), and co-culture with 6-day PMA-differentiated THP-1 overnight, before 24 h R848 stimulation (at 5 μg/ml). TNFα levels were measured by ELISA. Data shown are relative to ASO3 or ASO 852dT conditions, and averaged from 2 independent experiments with biological replicate. SEM and unpaired two-tailed t-test are shown.

Figure 16:
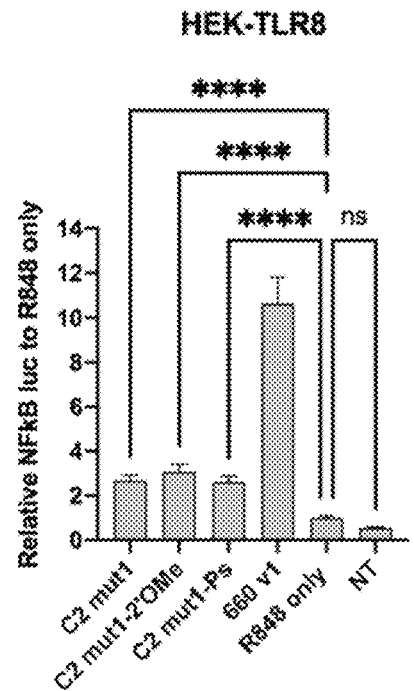

FIG. 16. TLR8-potentiation by fully a 2'Ome modified ASO. HEK-TLR8 cells expressing an NF-κB-luciferase reporter were pre-treated for ~30 min with 500 nM indicated 2'MOE ASOs, prior to R848 stimulation (1 μg/ml) overnight. All ASO conditions are with R848 co-stimulation.

Fold increases relative to the condition 'R848 without ASO' are averaged from 3 independent experiments in biological triplicate (±SEM and One-way ANOVA with Dunnett's multiple comparisons to R848 only condition are shown).

Figure 17:
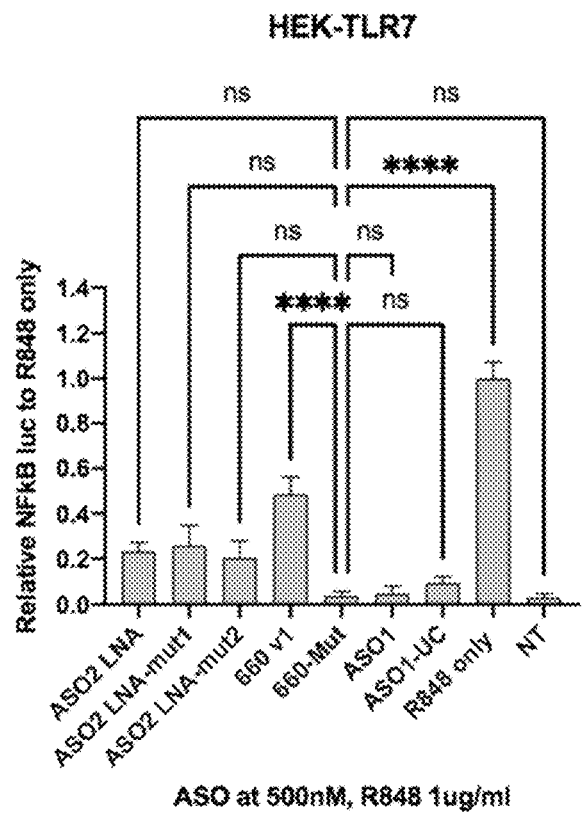

FIG. 17. 5'-end CUU motifs modulate TLR7 sensing in the context of 2'OMe ASOs, not LNA ASOs. HEK-TLR7 cells expressing an NF-κB-luciferase reporter were pre-treated for ~30 min with 500 nM indicated 2'MOE ASOs, prior to R848 stimulation (1 μg/ml) overnight. All ASO conditions are with R848 co-stimulation. Data shown are averaged from 3 independent experiments in biological triplicate, and reported to R848 only condition. SEM and One-way ANOVA with Dunnett's multiple comparisons to "660-Mut" condition are shown.

Figure 18:
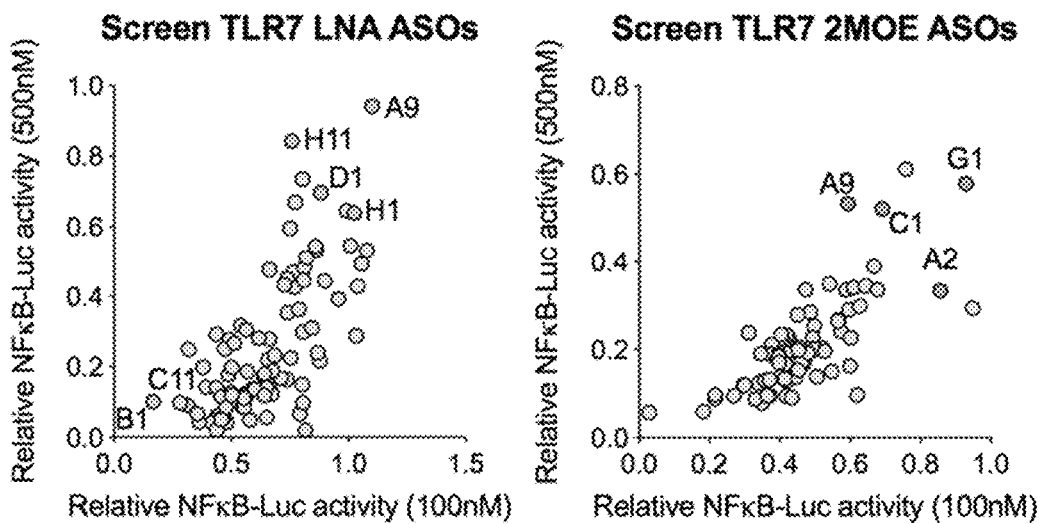

FIG. 18. Identification of LNA and 2'MOE gapmer ASOs that do not inhibit TLR7 sensing. HEK-TLR7 cells expressing an NF-κB-luciferase reporter were pre-treated for ~30 min with indicated concentrations of ASOs, prior to R848 stimulation (1 μg/ml) overnight. Fold increases relative to the condition 'R848 without ASO' are averaged from biological duplicates (averaged data are provided in Table 2). Stimulations with 100 nM and 500 nM ASO were performed in independent experiments (data shown for each concentration is from a single experiment).

Figure 19:
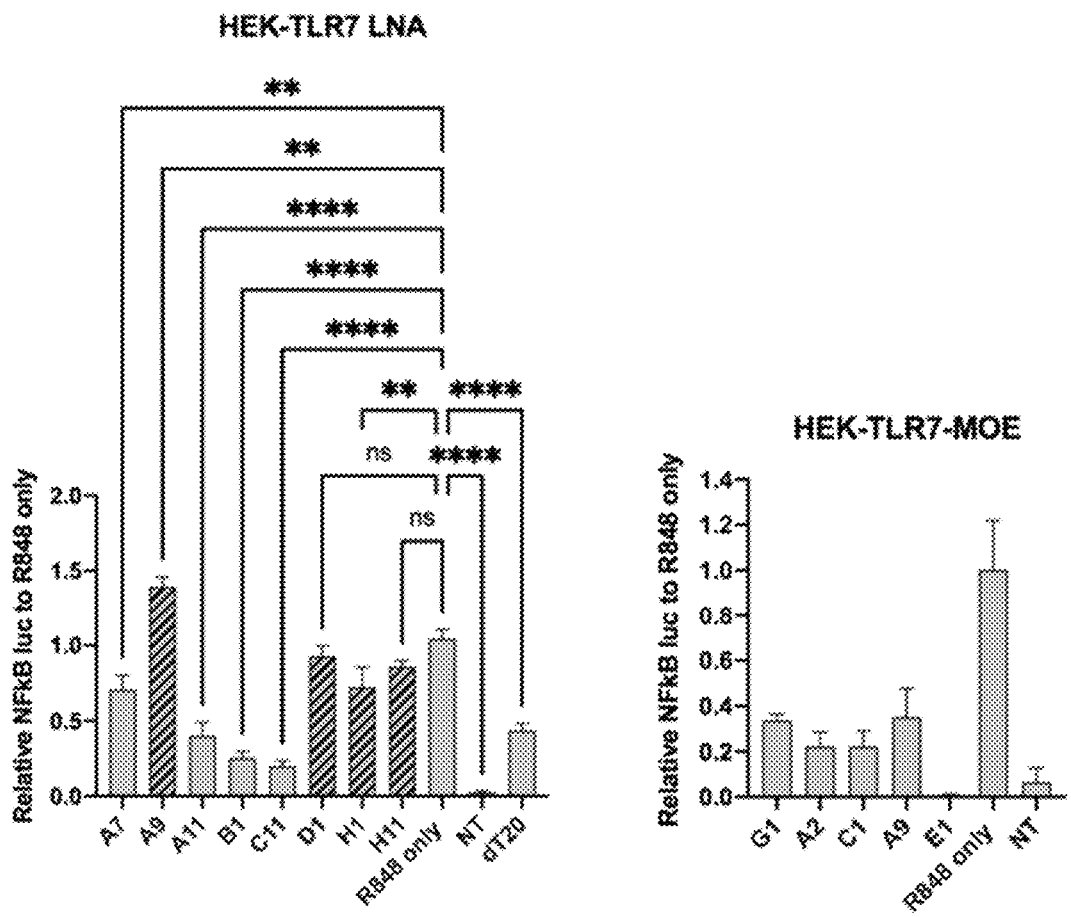

FIG. 19. Validation of LNA and 2'MOE gapmer ASOs with limited TLR7 inhibition. HEK-TLR7 cells expressing an NF-κB-luciferase reporter were pre-treated for ~30 min with 500 nM indicated 2'MOE ASOs, prior to R848 stimulation (1 μg/ml) overnight. All ASO conditions are with R848 co-stimulation. Data shown are averaged from 3 independent experiments (for LNA) or a single experiment (for 2'MOE) in biological triplicate, and reported to R848 only condition. SEM and One-way ANOVA with Dunnett's multiple comparisons to "R848 only" condition are shown for LNA ASOs (left). Hatched bars refer to ASOs with a 5'+C+C motif. For the 2'MOE experiment, the inventors note that E1 and a few other ASOs (not shown) entirely ablated TLR7 sensing—but G1-A2-C1-A9 did not.

BRIEF DESCRIPTION ON THE SEQUENCES

SEQ ID NO: 1 and SEQ ID NO: 2 represent the nucleotide sequences of negative targeting controls ASOs from Table 1. SEQ ID NO:3 through SEQ ID NO:20 represent the nucleotide sequences of ASOs targeting human cGAS mRNA and modified versions thereof from Table 1. SEQ ID NO: 21 and SEQ ID NO: 22 represent the nucleotide sequences of ASO852 and ASO852-DT from Table 1. SEQ ID NO: 23 and SEQ ID NO:24 represent the nucleotide sequences of ASO2504 and ASO2504-dT from Table 1. SEQ ID NO: 25 represents the nucleotide sequences of dT20 from Table 1. SEQ ID NO:26 through SEQ ID NO:34 represent the nucleotide sequences of Hs HPRT F517, Hs HPRT R591, Hs HPRT P554 FAM, Hs SFRS9 F594, Hs SFRS9 R690, Hs SFRS9 P625 HEX, ODN 2006, ISD70-FWD and ISD70-REV respectively from Table 1.

SEQ ID NO:35 through SEQ ID NO:82 represent the nucleotide sequences of CDKN2B-AS1 ASOs from Table 2. SEQ ID NO:83 through SEQ ID NO:130 represent the nucleotide sequences of CTNNB1 ASOs from Table 2. SEQ ID NO:131 through SEQ ID NO:178 represent the nucleotide sequences of EGFR ASOs from Table 2. SEQ ID NO: 179 through SEQ ID NO:226 represent the nucleotide sequences of LINC-PINT ASOs from Table 2.

SEQ ID NO:227 through SEQ ID NO:273 represent the nucleotide sequences of HPRT ASOs from Table 3. SEQ ID NO:274 through SEQ ID NO:282 represent the nucleotide sequences of ASO1-UC, ASO2 LNA, ASO2-LNA Mut1, ASO2-LNA Mut2, ASO 660, ASO 660-Mut, C2Mut-1, C2Mut1-PS, C2Mut1-20Me respectively of Table 4. SEQ ID NO:283 through SEQ ID NO:373 represent the LNA-modified nucleotide sequences of Table 5. SEQ ID NO:374 through SEQ ID NO:449 represent the 2'-MOE-modified nucleotide sequences of Table 6.

DETAILED DESCRIPTION OF THE INVENTION

General Techniques and Definitions

Unless specifically defined otherwise, all technical and scientific terms used herein shall be taken to have the same meaning as commonly understood by one of ordinary skill in the art (e.g., in oligonucleotide design, molecular genetics, antisense oligonucleotides, gene silencing, gene expression and biochemistry).

Unless otherwise indicated, the recombinant protein, cell culture, and immunological techniques utilized in the present invention are standard procedures, well known to those skilled in the art. Such techniques are described and explained throughout the literature in sources such as, J. Perbal, A Practical Guide to Molecular Cloning, John Wiley and Sons (1984), J. Sambrook et al., Molecular Cloning: A Laboratory Manual, Cold Spring Harbour Laboratory Press (1989), T. A. Brown (editor), Essential Molecular Biology: A Practical Approach, Volumes 1 and 2, IRL Press (1991), D. M. Glover and B. D. Hames (editors), DNA Cloning: A Practical Approach, Volumes 1-4, IRL Press (1995 and 1996), and F. M. Ausubel et al. (editors), Current Protocols in Molecular Biology, Greene Pub. Associates and Wiley-Interscience (1988, including all updates until present), Ed Harlow and David Lane (editors) Antibodies: A Laboratory Manual, Cold Spring Harbour Laboratory (1988), and J. E. Coligan et al. (editors) Current Protocols in Immunology, John Wiley & Sons (including all updates until present).

The term "and/or", e.g., "X and/or Y" shall be understood to mean either "X and Y" or "X or Y" and shall be taken to provide explicit support for both meanings or for either meaning.

As used herein, the term about, unless stated to the contrary, refers to +/−10%, more preferably +/−5%, more preferably +/−1%, of the designated value.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

By "consisting essentially of" in the context of an oligonucleotide sequence is meant the recited oligonucleotide sequence together with an additional one, two or three nucleic acids at the 5' or 3' end thereof.

As used herein, the phrase "does not inhibit Toll-like receptor 7 (TLR7) activity" or variations thereof means that after administration to an animal of an oligonucleotide of the invention the animal is still able to elicit a TLR7 based immune response, such as to a pathogen. In an embodiment, the TLR7 based immune response in the presence of the oligonucleotide is at least about 10%, 20%, 30%, 40%, 50%, 60%, 70%, 80%, 85%, 90%, 95%, 97%, 99% or 100% of the response in the absence of the oligonucleotide.

Similarly, the phrase "reducing the Toll-like receptor 7 (TLR7) inhibitory activity of an oligonucleotide" or the like means that after being modified in accordance with the invention, an animal administered with the modified oligonucleotide is able to mount a stronger TLR7 based immune response when compared to the starting (unmodified) oligonucleotide.

As used herein, the phrase "potentiates Toll-like receptor 8 (TLR8) activity" and the like means that after administration to an animal of an oligonucleotide of the invention the animal has an enhanced (increased) TLR8 based immune response.

As used herein, an "immune response modifier" refers to any agent that mimics, augments, or require participation of host immune cells for optimal effectiveness, and/or has a known ability to activate, augment, or enhance specific immune responses. Examples of immune response modifiers include, but are not limited to, Toll-like receptor (TLR) agonists including Resiquimod (R848), Loxoribine, Isatoribine, Imiquimod, CL075, CL097, CL264, CL307, 852A, and/or TL8-506. Other Toll-like receptor (TLR) agonists can include a base analogue (including: a guanosine analogue, a deaza-adenosine analogue, an imidazoquinoline or a derivative, a hydroxyadenine compound or a derivative, a thiazoloquinolone compound or a derivative, a benzoazepine compound or a derivative) and/or an RNA molecule.

The phrase "pharmaceutically acceptable" is employed herein to refer to those compounds, materials, compositions, and/or dosage forms that are, within the scope of sound medical judgment, suitable for use in contact with the tissues of human beings and animals without excessive toxicity, irritation, allergic response, and/or other problem or complication, commensurate with a reasonable benefit/risk ratio.

As used herein, the terms "treating", "treat" or "treatment" include administering a therapeutically effective amount of a compound(s) described herein sufficient to reduce or eliminate at least one symptom of a disease.

As used herein, the terms "preventing", "prevent" or "prevention" include administering a therapeutically effective amount of a compound(s) described herein sufficient to stop or hinder the development of at least one symptom of a disease.

Oligonucleotides

In the context of this invention, the term "oligonucleotide" refers to an oligomer or polymer of ribonucleic acid (RNA) or deoxyribonucleic acid (DNA), wherein the polymer or oligomer of nucleotide monomers contains any combination of nucleobases (referred to in the art and herein as simply as "base"), modified nucleobases, sugars, modified sugars, phosphate bridges, or modified phosphorus atom bridges (also referred to herein as "internucleotidic linkage").

Oligonucleotides can be single-stranded or double-stranded or a combination thereof. A single-stranded oligonucleotide can have double-stranded regions and a double-stranded oligonucleotide can have single-stranded regions (such as a microRNA or shRNA).

"Gapmer" refers to an oligonucleotide comprising an internal region having a plurality of nucleosides that support RNase H cleavage positioned between external regions having one or more nucleosides, wherein the nucleosides comprising the internal region are chemically distinct from the nucleoside or nucleosides comprising the external regions. The internal region may be referred to as the "gap" and the external regions may be referred to as the "wings."

As used herein, a "target" such as a "target gene" or "target polynucleotide" refers to a molecule upon which an oligonucleotide of the invention directly or indirectly exerts its effects. Typically, the oligonucleotide of the invention or portion thereof and the target, or a product of the target such as mRNA encoded by a gene, or portion thereof, are able to hybridize under physiological conditions.

As used herein, the phrase "reduces expression of the target gene" or the like refers to an oligonucleotide of the invention reducing the ability of a gene to exert is biological effect. This can be directly or indirectly achieved by reduction in the amount of RNA encoded by the gene and/or reduction of the amount of protein translated from an RNA.

Typically, an oligonucleotide of the invention will be synthesized in vitro. However, in some instances where modified bases and backbone are not required they can be expressed in vitro or in vivo in a suitable system such as by a recombinant virus or cell.

An oligonucleotide of the invention may be conjugated to one or more moieties or groups which enhance the activity, cellular distribution or cellular uptake of the oligonucleotide. These moieties or groups may be covalently bound to functional groups such as primary or secondary hydroxyl groups. Exemplary moieties or groups include intercalators, reporter molecules, polyamines, polyamides, polyethylene glycols, polyethers, groups that enhance the pharmacodynamic properties of oligomers, and groups that enhance the pharmacokinetic properties of oligomers. Typical conjugate groups include cholesterols, lipids, phospholipids, biotin, phenazine, folate, phenanthridine, anthraquinone, acridine, fluoresceins, rhodamines, coumarins and dyes.

In particular embodiments, the oligonucleotide described herein may comprise a synthetic oligonucleotide sequence. As used herein, a "synthetic oligonucleotide sequence" refers to an oligonucleotide sequence which lacks a corresponding sequence that occurs naturally. By way of example, a synthetic oligonucleotide sequence is not complementary to a specific RNA molecule, such as one encoding an endogenous polypeptide. As such, the synthetic oligonucleotide sequence is suitably not capable of interfering with a post-transcriptional event, such as RNA translation.

As used herein, an oligonucleotide "variant" shares a definable nucleotide sequence relationship with a reference nucleic acid sequence. The reference nucleic acid sequence may be one of those provided in Tables 1 through 6 (e.g., SEQ ID NOs. 1-449), for example. The "variant" oligonucleotide may have one or a plurality of nucleic acids of the reference nucleic acid sequence deleted or substituted by different nucleic acids. Preferably, oligonucleotide variants share at least 70% or 75%, preferably at least 80% or 85% or more preferably at least 90%, 91%, 92%, 93%, 94%, 95%, 96%, 97%, 98% or 99% sequence identity with a reference nucleic acid sequence.

Modified Bases

Oligonucleotides of the invention may have nucleobase ("base") modifications or substitutions.

Examples include oligonucleotides comprising one of the following at the 2' position: OH; F; O-, S-, or N-alkyl; O-, S-, or N-alkenyl; O-, S-or N-alkynyl; or O-alkyl-O-alkyl, wherein the alkyl, alkenyl and alkynyl may be substituted or unsubstituted C1 to C10 alkyl or C2 to C10 alkenyl and alkynyl. In one embodiment, the oligonucleotide comprises one of the following at the 2' position: $O[(CH_2)nO]mCH_3$, $O(CH_2)nOCH_3$, $O(CH_2)nNH_2$, $O(CH_2)nCH_3$, $O(CH_2)nONH_2$, and $O(CH_2)nON[(CH_2)nCH_3]_2$, where n and m are from 1 to about 10.

Further examples include of modified oligonucleotides include oligonucleotides comprising one of the following at the 2' position: C1 to C10 lower alkyl, substituted lower alkyl, alkenyl, alkynyl, alkaryl, aralkyl, O-alkaryl or O-aralkyl, SH, $SCH_3$, OCN, Cl, Br, CN, $CF_3$, $OCF_3$, $SOCH_3$, SO$_2$CH$_3$, ONO$_2$, N$_3$, NH$_2$, heterocycloalkyl, heterocycloalkaryl, aminoalkylamino, polyalkylamino, substituted silyl, an RNA cleaving group, a reporter group, an intercalator, a group for improving the pharmacokinetic properties of an oligonucleotide, or a group for improving the pharmacodynamic properties of an oligonucleotide, and other substituents having similar properties.

In one embodiment, the modification includes 2'-methoxyethoxy (2'-O—CH2CH2OCH3 (also known as 2'-O-(2-methoxyethyl) or 2'-MOE) (Martin et al., 1995), that is, an alkoxyalkoxy group. In some embodiments, the modification does not comprise 2'-MOE. In a further embodiment, the modification includes 2'-dimethylaminooxyethoxy, that is, a O(CH$_2$)$_2$ON(CH$_3$)$_2$ group (also known as 2'-DMAOE), or 2'-dimethylaminoethoxyethoxy (also known in the art as 2'-O-dimethyl-amino-ethoxy-ethyl or 2'-DMAEOE), that is, 2'-O—CH$_2$—O—CH$_2$—N(CH$_3$)$_2$.

Other modifications include 2'-methoxy (2'-O—CH$_3$), 2'-aminopropoxy (2'-OCH$_2$CH$_2$CH$_2$NH$_2$), 2'-allyl(2'-CH$_2$—CH=CH$_2$), 2'-O-allyl(2'-O—CH$_2$—CH—CH$_2$) and 2'-fluoro (2'-F). The 2'-modification may be in the arabino (up) position or ribo (down) position. In one embodiment a 2'-arabino modification is 2'-F.

Similar modifications may also be made at other positions on the oligonucleotide, particularly the 3' position of the sugar on the 3' terminal nucleotide or in 2'-5' linked oligonucleotides and the 5' position of the 5' terminal nucleotide.

Oligonucleotides may also have sugar mimetics, such as cyclobutyl moieties in place of the pentofuranosyl sugar.

Representative United States patents that teach the preparation of such modified sugar structures include, but are not limited to, U.S. Pat. Nos. 4,981,957, 5,118,800, 5,319,080, 5,359,044, 5,393,878, 5,446,137, 5,466,786, 5,514,785, 5,519,134, 5,567,811, 5,576,427, 5,591,722, 5,597,909, 5,610,300, 5,627,053, 5,639,873, 5,646,265, 5,658,873, 5,670,633, 5,792,747, and 5,700,920.

A further modification of the sugar includes Locked Nucleic Acids (LNAs) in which the 2'-hydroxyl group is linked to the 3' or 4' carbon atom of the sugar ring, thereby forming a bicyclic sugar moiety. In one embodiment, the linkage is a methylene (—CH2—)n group bridging the 2' oxygen atom and the 4' carbon atom, wherein n is 1 or 2. LNAs and preparation thereof are described in WO 98/39352 and WO 99/14226. In some embodiments, however, the modification does not comprise LNA.

Modified nucleobases include other synthetic and natural nucleobases such as, for example, 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl (—CC—CH3) uracil and cytosine and other alkynyl derivatives of pyrimidine bases, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 2-F-adenine, 2-amino-adenine, 8-azaguanine and 8-azaadenine, 7-deazaguanine and 7-deazaadenine and 3-deazaguanine and 3-deazaadenine.

Further modified nucleobases include tricyclic pyrimidines, such as phenoxazine cytidine (1H-pyrimido[5,4-b][1,4]benzoxazin-2 (3H)-one), phenothiazine cytidine (1H-pyrimido[5,4-b][1,4]benzothiazin-2 (3H)-one), G-clamps such as, for example, a substituted phenoxazine cytidine (e.g., 9-(2-aminoethoxy)-H-pyrimido[5,4-b][1,4]benzoxazin-2 (3H)-one), carbazole cytidine (2H-pyrimido[4,5-b]indol-2-one), pyridoindole cytidine (H-pyrido[3',2': 4,5]pyrrolo[2,3-d]pyrimidin-2-one).

Modified nucleobases may also include those in which the purine or pyrimidine base is replaced with other heterocycles, for example, 7-deaza-adenine, 7-deazaguanosine, 2-aminopyridine and 2-pyridone. Further nucleobases include those disclosed in U.S. Pat. No. 3,687,808, those disclosed in J. I. Kroschwitz (editor), The Concise Encyclopedia of Polymer Science and Engineering, pages 858-859, John Wiley and Sons (1990), those disclosed by Englisch et al. (1991), and those disclosed by Y. S. Sanghvi, Chapter 15: Antisense Research and Applications, pages 289-302, S. T. Crooke, B. Lebleu (editors), CRC Press, 1993.

Certain of these nucleobases are particularly useful for increasing the binding affinity of the oligonucleotide. These include 5-substituted pyrimidines, 6-azapyrimidines and N-2, N-6 and O-6 substituted purines, including 2-aminopropyladenine, 5-propynyluracil and 5-propynylcytosine. 5-methylcytosine substitutions have been shown to increase nucleic acid duplex stability by 0.6-1.2 oC. In one embodiment, these nucleobase substitutions are combined with 2'-O-methoxyethyl sugar modifications.

Representative United States patents that teach the preparation of certain of the above noted modified nucleobases as well as other modified nucleobases include, but are not limited to, U.S. Pat. Nos. 3,687,808, 4,845,205, 5,130,302, 5,134,066, 5,175,273, 5,367,066, 5,432,272, 5,457,187, 5,459,255, 5,484,908, 5,502,177, 5,525,711, 5,552,540, 5,587,469, 5,594,121, 5,596,091, 5,614,617, 5,645,985, 5,830,653, 5,763,588, 6,005,096, 5,681,941 and 5,750,692.

Unless stated to the contrary, reference to an A, T, G, U or C can either mean a naturally occurring base or a modified version thereof.

In particular embodiments, two or more bases (e.g., 2, 3, 4, 5, 6, 7, 8, 9, 10, 11, 12, 13, 14, 15, 16, 17, 18, 19, 20 bases inclusive of any range therein) of the oligonucleotide described herein are modified. In some embodiments, all bases of the oligonucleotide described herein are modified. In alternative embodiments, no bases of the oligonucleotide described herein are modified.

Backbones

Oligonucleotides of the present disclosure include those having modified backbones or non-natural internucleoside linkages. Oligonucleotides having modified backbones include those that retain a phosphorus atom in the backbone and those that do not have a phosphorus atom in the backbone.

Modified oligonucleotide backbones containing a phosphorus atom therein include, for example, phosphorothioates, chiral phosphorothioates, phosphorodithioates, phosphotriesters, aminoalkylphosphotriesters, methyl and other alkyl phosphonates including 3'-alkylene phosphonates, 5'-alkylene phosphonates and chiral phosphonates, phosphinates, phosphoramidates including 3'-amino phosphoramidate and aminoalkylphosphoramidates, thionophosphoramidates, thionoalkylphosphonates, thionoalkylphosphotriesters, selenophosphates, and boranophosphates having normal 3'-5' linkages, 2'-5' linked analogs of these, and those having inverted polarity wherein one or more internucleotide linkages is a 3' to 3', 5' to 5' or 2' to 2' linkage. Oligonucleotides having inverted polarity comprise a single 3' to 3' linkage at the 3'-most internucleotide linkage, that is, a single inverted nucleoside residue which may be abasic (the nucleobase is missing or has a hydroxyl group in place thereof). Various salts, mixed salts and free acid forms are also included.

Representative United States patents that teach the preparation of the above phosphorus-containing linkages include, but are not limited to, U.S. Pat. Nos. 3,687,808, 4,469,863, 4,476,301, 5,023,243, 5,177,196, 5,188,897, 5,264,423, 5,276,019, 5,278,302, 5,286,717, 5,321,131, 5,399,676, 5,405,939, 5,453,496, 5,455,233, 5,466,677, 5,476,925, 5,519,126, 5,536,821, 5,541,306, 5,550,111, 5,563,253, 5,571,799, 5,587,361, 5,194,599, 5,565,555, 5,527,899, 5,721,218, 5,672,697 and 5,625,050.

Modified oligonucleotide backbones that do not include a phosphorus atom therein include, for example, backbones formed by short chain alkyl or cycloalkyl internucleoside linkages, mixed heteroatom and alkyl or cycloalkyl internucleoside linkages, or one or more short chain heteroatomic or heterocyclic internucleoside linkages. These include those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; riboacetyl backbones; alkene containing backbones; sulfamate backbones; methyleneimino and methylenehydrazino backbones; sulfonate and sulfonamide backbones; amide backbones; and others having mixed N, O, S and CH2 component parts.

Representative United States patents that teach the preparation of the above oligonucleotides include, but are not limited to, U.S. Pat. Nos. 5,034,506, 5,166,315, 5,185,444, 5,214,134, 5,216,141, 5,235,033, 5,264,562, 5,264,564, 5,405,938, 5,434,257, 5,466,677, 5,470,967, 5,489,677, 5,541,307, 5,561,225, 5,596,086, 5,602,240, 5,610,289, 5,602,240, U.S. Pat. Nos. 5,608,046, 5,610,289, 5,618,704, 5,623,070, 5,663,312, 5,633,360, 5,677,437, 5,792,608, 5,646,269 and 5,677,439.

Antisense Oligonucleotides

The term "antisense oligonucleotide" shall be taken to mean an oligonucleotide that is complementary to at least a portion of a specific mRNA molecule, such as encoding an endogenous polypeptide and capable of interfering with a post-transcriptional event such as mRNA translation. The use of antisense methods is well known in the art (see for example, G. Hartmann and S. Endres, Manual of Antisense Methodology, Kluwer (1999)).

In one embodiment, the antisense oligonucleotide hybridises under physiological conditions, that is, the antisense oligonucleotide (which is fully or partially single stranded) is at least capable of forming a double stranded polynucleotide with mRNA, such as encoding an endogenous polypeptide, under normal conditions in a cell.

Antisense oligonucleotides may include sequences that correspond to the structural genes or for sequences that effect control over the gene expression or splicing event. For example, the antisense sequence may correspond to the targeted coding region of endogenous gene, or the 5'-untranslated region (UTR) or the 3'-UTR or combination of these. It may be complementary in part to intron sequences, which may be spliced out during or after transcription, preferably only to exon sequences of the target gene. In view of the generally greater divergence of the UTRs, targeting these regions provides greater specificity of gene inhibition.

The antisense oligonucleotide may be complementary to the entire gene transcript, or part thereof. The degree of identity of the antisense sequence to the targeted transcript should be at least 90% and more preferably 95-100%. The antisense RNA or DNA molecule may of course comprise unrelated sequences which may function to stabilize the molecule such as described herein.

Gene Silencing

Oligonucleotide molecules, particularly RNA, may be employed to regulate gene expression. The terms "RNA interference", "RNAi" or "gene silencing" refer generally to a process in which a dsRNA molecule reduces the expression of a nucleic acid sequence with which the double-stranded RNA molecule shares substantial or total homology. However, it has been shown that RNA interference can be achieved using non-RNA double stranded molecules (see, for example, US20070004667).

The double-stranded regions should be at least 19 contiguous nucleotides, for example about 19 to 23 nucleotides, or may be longer, for example 30 or 50 nucleotides, or 100 nucleotides or more. The full-length sequence corresponding to the entire gene transcript may be used. Preferably, they are about 19 to about 23 nucleotides in length.

The degree of identity of a double-stranded region of a nucleic acid molecule to the targeted transcript should be at least 90% and more preferably 95-100%. The nucleic acid molecule may of course comprise unrelated sequences which may function to stabilize the molecule.

The term "short interfering RNA" or "siRNA" as used herein refers to a polynucleotide which comprises ribonucleotides capable of inhibiting or down regulating gene expression, for example by mediating RNAi in a sequence-specific manner, wherein the double stranded portion is less than 50 nucleotides in length, preferably about 19 to about 23 nucleotides in length. For example the siRNA can be a nucleic acid molecule comprising self-complementary sense and antisense regions, wherein the antisense region comprises nucleotide sequence that is complementary to nucleotide sequence in a target nucleic acid molecule or a portion thereof and the sense region having nucleotide sequence corresponding to the target nucleic acid sequence or a portion thereof. The siRNA can be assembled from two separate oligonucleotides, where one strand is the sense strand and the other is the antisense strand, wherein the antisense and sense strands are self-complementary. The two strands can be of different length.

As used herein, the term siRNA is meant to be equivalent to other terms used to describe polynucleotides that are capable of mediating sequence specific RNAi, for example micro-RNA (miRNA), short hairpin RNA (shRNA), short interfering oligonucleotide, short interfering nucleic acid (siNA), short interfering modified oligonucleotide, chemically-modified siRNA, post-transcriptional gene silencing RNA (ptgsRNA), and others. In addition, as used herein, the term RNAi is meant to be equivalent to other terms used to describe sequence specific RNA interference, such as post transcriptional gene silencing, translational inhibition, or epigenetics. For example, siRNA molecules can be used to epigenetically silence genes at both the post-transcriptional level or the pre-transcriptional level. In a non-limiting example, epigenetic regulation of gene expression by siRNA molecules can result from siRNA mediated modification of chromatin structure to alter gene expression.

By "shRNA" or "short-hairpin RNA" is meant an RNA molecule where less than about 50 nucleotides, preferably about 19 to about 23 nucleotides, is base paired with a complementary sequence located on the same RNA molecule, and where said sequence and complementary sequence are separated by an unpaired region of at least about 4 to about 15 nucleotides which forms a single-stranded loop above the stem structure created by the two regions of base complementarity. An Example of a sequence of a single-stranded loop includes: 5' UUCAAGAGA 3'.

Included shRNAs are dual or bi-finger and multi-finger hairpin dsRNAs, in which the RNA molecule comprises two or more of such stem-loop structures separated by single-stranded spacer regions.

Design and Testing of Candidate Oligonucleotides

As the skilled person is aware, in addition to design elements of the invention, there are many known factors to be considered when producing an oligonucleotide. The specifics depend on the purpose of the oligonucleotide but include features such as strength and stability of the oligonucleotide-target nucleic acid interaction, such as the mRNA secondary structure, thermodynamic stability, the position of the hybridization site, and/or functional motifs.

Some methods the invention involve scanning a target polynucleotide, or complement thereof, for specific features. This can be done by eye or using computer programs known in the art. Software programs which can be used to design, analyse and predict functional properties of antisense oligonucleotides include Mfold, Sfold, NUPACK, Nanofolder, Hyperfold, and/or RNA designer. Software programs which can be used to design, analyse and predict functional properties of oligonucleotides for gene silencing include dsCheck, E-RNAi and/or siRNA-Finder.

In one embodiment, available software is used to select potentially useful oligonucleotides, and then these are scanned for desired features as described herein. Alternatively, software could readily be developed to scan a target polynucleotide, or complement thereof, for desired features as described herein.

Once synthesized, candidate oligonucleotides can be tested for their desired activity using standard procedures in the art. This may involve administering the candidate to cells in vitro expressing the gene of interest and analysing the amount of gene product such as RNA and/or protein. In another example, the candidate is administered to an animal, and the animal screened for the amount of target RNA and/or protein and/or using a functional assay. In another embodiment, the oligonucleotide is tested for its ability to hybridize to a target polynucleotide (such as mRNA).

In some examples expression and oligonucleotide activity can be determined by mRNA reverse transcription quantitative real-time PCR (RT-qPCR). For example, RNA can be extracted and purified from cells which have been incubated with a candidate oligonucleotide. cDNA is then synthesized from isolated RNA and RT-qPCR can be performed, using methods and reagents known the art. In one example, RNA can be purified from cells using the ISOLATE II RNA Mini Kit (Bioline) and cDNA can be synthesized from isolated RNA using the High-Capacity cDNA Archive kit (Thermo Fisher Scientific) according to the manufacturer's instructions. RT-qPCR can be performed using the Power SYBR™ Green Master Mix (Thermo Fisher Scientific) on the HT7900 and QUANTSTUDIO™ 6 RT-PCR system (Thermo Fisher Scientific), according to manufacturer's instructions.

Testing for Inhibition of TLR7 Activity

Some aspects of the present invention involve testing for inhibition of TLR7 activity which can be determined using any method known in the art. In some embodiments, TLR7 activity in cells may be measured by expression and/or secretion of one or more proinflammatory cytokines (e.g. TNFα, IP-10), and/or activation or expression of transcription factors (e.g. NF-κB).

The ability of an oligonucleotide to inhibit TLR7 activity can, for example, be analysed by incubating cells which express TLR7 with an oligonucleotide, then stimulating said cells with a TLR7 agonist, and analysing the overall TLR7 response in the cell population, or analysing the proportion of cells having TLR7-positive activity after a defined period of time.

In such examples, inhibition of TLR7 activity can be identified by observation of an overall decreased TLR7 response of the cell population, or a lower proportion of cells having TLR7-positive activity as compared to positive control condition in which cells are treated with a TLR7 agonist in the absence of the oligonucleotide (or in the presence of an appropriate control inhibitory agent). In one example, 293XLhTLR7 (referred to as HEK-TLR7) cells are transfected with pNF-κB-Luc4 reporter, incubated with an oligonucleotide, and then stimulated with R848. TLR7 activity can be determined by a luciferase assay, which measures activated NF-κB by luminescence. TLR7 activity can also be analysed by measuring cytokine levels, for example by ELISA.

Testing for Potentiating TLR8 Activity

Some aspects of the present invention involve testing for potentiation of TLR8 activity which can be determined using any method known in the art. In some embodiments TLR8 activity in cells may be measured by expression and/or secretion of one or more proinflammatory cytokines (e.g. TNFα, IP-10), and/or activation or expression of transcription factors (e.g. NF-κB).

The ability of an oligonucleotide to potentiate TLR8 activity can, for example, be analysed by incubating cells which express TLR8 with an oligonucleotide, then stimulating said cells with a TLR8 agonist, and analysing the overall TLR8 response in the cell population, or analysing the proportion of cells having TLR8-positive activity after a defined period of time.

In such examples, potentiation of TLR8 activity can be identified by observation of an overall decreased TLR8 response of the cell population, or a higher proportion of cells having TLR8-positive activity as compared to a negative control condition in which cells are treated with TLR8 agonist in the absence of the oligonucleotide (or in the presence of an appropriate control non-potentiating agent). In one example, 293XLhTLR8 (referred to as HEK-TLR8) cells are transfected with pNF-κB-Luc4 reporter, incubated with an oligonucleotide, and then stimulated with R848. TLR8 activity can be determined by a luciferase assay, which measures activated NF-κB by luminescence. TLR8 activity can also be analysed by measuring cytokine levels, for example by ELISA.

'Potentiation' refers to an increase in a functional property relative to a control condition. Potentiation of TLR8 activity may be greater than about 100%, e.g. about 2 fold, about 3 fold, about 4 fold, about 5 fold, about 6 fold, about 7 fold, about 8 fold, about 9 fold, about 10 fold, about 11 fold, about 12 fold, about 13 fold, about 14 fold, about 15 fold, about 20 fold or about 50 fold. Preferably, the level of TLR8 potentiation is between about 2 fold and 50 fold, between about 2 fold and 20 fold, and/or between about 5 fold and 20 fold greater.

Uses

Oligonucleotides of the invention are designed to be administered to an animal. In one example, the animal is a vertebrate. For example, the animal can be a mammal, avian, chordate, amphibian or reptile. Exemplary subjects include but are not limited to human, primate, livestock (e.g. sheep, cow, chicken, horse, donkey, pig), companion animals (e.g. dogs, cats), laboratory test animals (e.g. mice, rabbits, rats, guinea pigs, hamsters), captive wild animal (e.g. fox, deer). In one example, the mammal is a human.

Oligonucleotides of the invention can be used to target any gene/polynucleotide/function of interest. Typically, the oligonucleotide is used to modify a trait of an animal, more typically to treat or prevent a disease. In a preferred embodiment, the disease will benefit from the animal being able to mount a TLR7 and/or TLR8 response following administration of the oligonucleotide, in particular where the TLR7 response is not inhibited and/or the TLR8 response is potentiated.

Diseases which can be treated or prevented using an oligonucleotide of the invention include, but are not limited, to cancer (for example breast cancer, ovarian cancer, cancers of the central nervous system, gastrointestinal cancer, bladder cancer, skin cancer, lung cancer, head and neck cancers, haematological and lymphoid cancers, bone cancer) rare genetic diseases, neuromuscular and neurological diseases (for example, spinal muscular atrophy, Amyotrophic Lateral Sclerosis, Duchenne muscular dystrophy, Huntington's disease, Batten disease, Parkinson's disease, amyotrophic lateral sclerosis, Ataxia-telangiectasia, cerebral palsy) viruses (for example, cytomegalovirus, hepatitis C virus, Ebola hemorrhagic fever virus, human immunodeficiency virus, coronaviruses), cardiovascular disease (for example, familial hypercholesterolemia, hypertriglyceridemia), autoimmune and inflammatory diseases (for example arthritis, lupus, pouchitis, psoriasis, asthma), and non-alcoholic and alcoholic fatty liver diseases.

Examples of target genes (polynucleotides) of oligonucleotides of the invention include, but not limited to, PLK1ERBB2, PIK3CA, ERBB3, HDAC1, MET, EGFR, TYMS, TUBB4B, FGFR2, ESR1, FASN, CDK4, CDK6, NDUFB4, PPAT, NDUFB7, DNMT1, BCL2, ATP1A1, HDAC3, FGFR1, NDUFS2, HDAC2, NDUFS3, HMGCR, IGFIR, AKT1, BCL2L1, CDK2, MTOR, PDPK1, CSNK2A1, PIK3CB, CDK12, MCL1, ATR, PLK4, MEN1, PTK2, FZD5, KRAS, WRN, CREBBP, NRAS, MAT2A, RHOA, TPX2, PPP2CA, ALDOA, RAE1, SKP1, ATP5A1, EIF4G1, CTNNB1, TFRC, CDH1, CCNE1, CLTC, METAP2, GRB2, MDM4, SLC16A1, FERMT2, ENO1, STX4, SF3B1, RBBP4, FEN1, MRPL28, CCNA2, PTPN11, SAE1, KMT2D, APC, CAD, NAMPT, OGT, HSPA8, USP5, CSNK1A1, PGD, VRK1, SEPSECS, SUPT4H1, DNAJC9, TRIAP1, DLD, PTPN7, VDAC1, STAT3, TCEB2, ADSL, GMPS, DHPS, METAP1, TAF13, CFL1, SCD, RBM39, PGAM1, FNTB, PPP2R1A, ARF1, UBE2T, UMPS, MYC, PRMT5, EIF4G2, SKP2, STAG2, ATF4, WDR77, ILK, METTL16, SOD1, DDX6, FURIN, AARS, FNTA, PABPC1, RANBP2, CDC25B, SLC2A1, CENPE, ADAR, CDC42, RNF31, CCNC, PRIM1, SLC38A2, SNUPN, PDCD6IP, RTN4IP1, VMP1, TGFBR1, TXN, UBE2N, UAP1, RAC1, GGPS1, RAB10, RAB6A, TPI1, RPE, THG1L, UBE2D3, RHEB, PKM, GMNN, HGS, NCKAP1, NUP98, SMARCA2, RNF4, DDX39B, ACLY, XPO1, PPPIR8, YAPI, MTHFD1, LPAR1, TAF1, UROD, STXBP3, HSP90B1, VHL, EFR3A, FECH, MRPL44, AIFM1, MAGOH, MRPL17, SUZ12, RNMT, RAB1B, PNPT1, RAD1, WDR48, PITRM1, MRPL47, AP2M1, EIF4A1, UBE2C, LONP1, VPS4A, SNRNP25, TUBGCP6, DNM2, UBE2M, EXOSC9, TAFIB, CDC37, ATP6V1G1, POP1, JUP, PRPS1, GPX4, CFLAR, CHMP4B, ACTB, ACTRIA, PTPN23, SHC1, TRPM7, SLC4A7, HSPD1, XRN1, WDR1, ITGB5, UBR4, ATP5B, CPD, TUFM, MYH9, ATP5F1, ATP6V1C1, SOD2, PFAS, NFE2L2, ARF4, ITGAV, DHX36, KIF18A, DDX5, XRCC5, DNAJC11, ZBTB8OS, NCL, SDHB, ATP5C1, NDC1, SNF8, CUL3, SLC7A1, ASNA1, EDF1, TMED10, CHMP6, ARIH1, DDOST, RPL28, DIMT1, CMPK1, PPIL1, PPA2, SMAD7, CEP55, MVD, MVK, PDS5A, KNTC1, CAPZB, GMPPB, TPT1, ACIN1, SARIA, TAF6L, PTBP1, PAK2, CRKL, NHLRC2, INO80, SLC25A3, ACTR3, DDX3X, HUWE1, TBCA, IK, SSBP1, ARPC4, SLC7A5, OSGEP, PDCD2, TRAF2, SNAP23, RPN1, EIF5A, GEMIN4, BMPRIA, AHCYL1, CHMP5, TRAPPC1, LRP8, ARID2, UBE2L3, STAMBP, KDSR, UQCRC2, PNN, USP7, TBCD, ATP6VOE1, PCYTIA, TAZ, POLRMT, CELSR2, TERFI, BUB1, YRDC, SMG6, TBX3, SLC39A10, IPO13, CDIPT, UBA5, EMC7, FERMT1, VEZT, CCND1, CCND2, FPGS, JUN, PPMID, PGGT1B, NPM1, GTF2A1, MBTPS1, HMGCS1, LRR1, HSD17B12, LCE2A, NUP153, FOSL1, IRS2, CYB5R4, PMPCB, ARHGEF7, TRRAP, NRBP1, ARMC7, MOCS3, TIPARP, SEC61A1, PFDN5, MYB, IRF4, STX5, MYCN, FOXA1, SOX10, GATA3, ZEB2, MYBL2, MFN2, TBCB, KLF4, TRIM37, CEBPA, STAG1, POU2AF1, HYPK, FLI1, NCAPD2, MAF, NUP93, RBBP8, HJURP, SMARCB1, SOCS3, GRWD1, NKX2-1, FDXR, SPDEF, SBDS, SH3GL1, KLF5, CNOT3, ZNF407, CPSF1, RPTOR, EXT1, SMC1A, GUK1, TIMM23, FAU, ACO2, ALG1, CCNL1, SCAP, SRSF6, SPAG5, SOX9, LDB1, ASPM, LIG1, TFDP1, RPAIN, CENPA, MIS12, ILF3, HSCB, ERCC2, SOX2, ARFRP1, PMF1, POLR3E, MAD2L2, PELP1, NXT1, WDHD1, ZWINT, E2F3, FZR1, JUNB, OGDH, NOB1, SKA3, TACC3, UTP14A, XRN2, SMG5, IDH3A, CIAO1, COQ4, ZFP36L1, CDCA5, PRKRA, PFDN6, PAK1IP1, PSTK, EDC4, UTP18, TOMM22, CASC5, PTTG1, RBBP5, PPP1R12A, FARS2, FOXMI, SIN3A, BUB1B, GNBIL, SMC5, SARS2, SYNCRIP, IPPK, FANCD2, WDR46, FANCI, DCP2, RFC2, RNF20, DMAP1, MED23, MBNL1, CTPS1, TBP, MMS19, RAD51C, CDS2, NONO, USP18, PARS2, FBXW11, SUMO2, RRP12, FAM50A, URB2, MCM4, SLC25A28, IPO7, MAX, SFSWAP, SBNO1, DPAGT1, TINF2, BRCA2, NUP50, RPIA, EP400, IKBKAP, KIF14, RTTN, CCDCl15, GEMIN6, WWTR1, BCSIL, GTF3A, SCYL1, NELFB, DDX39A, TRA2B, SYVN1, ISL1, CYB5B, ACSL3, DPH3, E2F1, IREB2, SREBF1, SMC6, IRF8, ID1, PDCD11, SNAPC2, TIMM17A, ANAPC10, NUP85, SEHIL, VBP1, NUDC, MTX2, RPP25L, ISY1, LEMD2, ATP5D, EXOSC2, TAFIC, PPIL4, SEPHS2, HNRNPH1, CTR9, CDC26, TIMM13, FAM96B, CEBPZ, UFL1, ZNF236, COPG1, TPR, MIOS, UBE2G2, MED12, GTF3C1, PPP2R2A, UBIAD1, WTAP, MYBBPIA, NUP88, NELFCD, WDR73, RTCB, CEP192, GTF3C5, LENG1, RINT1, MED24, COX6B1, DCTN6, SLC25A38, LYRM4, STRAP, TTF2, DDX27, GTF2F1, ZNHIT2, BCLAF1, WDR18, GTF2H2C, NDE1, TIMM9, CHMP7, IPO11, TGIF1, NOC4L, EXOSC6, WDR24, INTS6, DDX41, UBE2S, ARGLUI, SHOC2, ATP5J, CSTF2, RPP30, NHP2, GRHL2, RPL22L1, WDR74, UTP23, CCDCl74, RPP21, UBE2J2, GEMIN8, ATP6VOB, KIAA1429, PNO1, MED22, ENY2, THOC7, DDX19A, SUGP1, PELO, ELAC2, CHCHD4, RNPC3, INTS3, PSMG4, UQCRC1, TAFIA, TSR1, UTP6, TRMT5, EIFIAD, GTF3C2, DCTN3, GPS1, WDR7, EXOSC8, KANSLI, SPRTN, KANSL3, EXOSC5, PRCC, TRNAUIAP, EIF3J, TAMM41, HAUS6, OIP5, HAUS5, TAF6, MRPS22, MRPS34, WBP11, COG8, DHX38, DNLZ, LAGE3, FUBP1, MED26, SLC7A6OS, MARS2, RBM28, ASCC3, PSMG3, TUBGCP5, PCF11, or LAS1L.

In an embodiment, the gene to be targeted includes PKN3, VEGFA, KIF11, MYC, EPHA2, KRAS (G12), ERBB3, BIRC5, HIFIA, BCL2, STAT3, AR, EPAS1, BRCA2, or CLU.

Examples of commercial oligonucleotides which can be modified as described herein include, but are not limited to, inclisiran, mipomersen (Kynamro), nusinersen (Spinraza), eteplirsen (Exondys51), miravirsen (SPC3649), RG6042 (IONIS-HTTRx), inotersen, volanesorsen, golodirsen (Vyondys53), fomivirsen (Vitravene), patisiran, givosiran, inclisiran, danvatirsen and IONIS-AR-2.5Rx.

Compositions

Oligonucleotides of the disclosure may be admixed, encapsulated, conjugated (such as fused) or otherwise associated with other molecules, molecule structures or mixtures of compounds, resulting in, for example, liposomes, receptor-targeted molecules, oral, rectal, topical or other formulations, for assisting in uptake, distribution and/or absorption. Representative United States patents that teach the preparation of such uptake, distribution and/or absorption-assisting formulations include, but are not limited to, U.S. Pat. Nos. 5,108,921, 5,354,844, 5,416,016, 5,459,127, 5,521,291, 5,543,158, 5,547,932, 5,583,020, 5,591,721, 4,426,330, 4,534,899, 5,013,556, 5,108,921, 5,213,804, 5,227,170, 5,264,221, 5,356,633, 5,395,619, 5,416,016, 5,417,978, 5,462,854, 5,469,854, 5,512,295, 5,527,528, 5,534,259, 5,543,152, 5,556,948, 5,580,575, and 5,595,756.

Oligonucleotides of the disclosure may be administered in a pharmaceutically acceptable carrier. The pharmaceutically acceptable carrier may be solid or liquid. Useful examples of pharmaceutically acceptable carriers include, but are not limited to, diluents, solvents, surfactants, excipients, suspending agents, buffering agents, lubricating agents, adjuvants, vehicles, emulsifiers, absorbants, dispersion media, coatings, stabilizers, protective colloids, adhesives, thickeners, thixotropic agents, penetration agents, sequestering agents, isotonic and absorption delaying agents that do not affect the activity of the active agents of the disclosure.

In one embodiment, the pharmaceutical carrier is water for injection (WFI) and the pharmaceutical composition is adjusted to pH 7.4, 7.2-7.6. In one embodiment, the salt is a sodium or potassium salt.

The oligonucleotides may contain chiral (asymmetric) centers or the molecule as a whole may be chiral. The individual stereoisomers (enantiomers and diastereoisomers) and mixtures of these are within the scope of the present disclosure.

Oligonucleotides of the disclosure may be pharmaceutically acceptable salts, esters, or salts of the esters, or any other compounds which, upon administration are capable of providing (directly or indirectly) the biologically active metabolite. The term "pharmaceutically acceptable salts" as used herein refers to physiologically and pharmaceutically acceptable salts of the oligonucleotide that retain the desired biological activities of the parent compounds and do not impart undesired toxicological effects upon administration. Examples of pharmaceutically acceptable salts and their uses are further described in U.S. Pat. No. 6,287,860.

Oligonucleotides of the disclosure may be prodrugs or pharmaceutically acceptable salts of the prodrugs, or other bioequivalents. The term "prodrugs" as used herein refers to therapeutic agents that are prepared in an inactive form that is converted to an active form (i.e., drug) upon administration by the action of endogenous enzymes or other chemicals and/or conditions. In particular, prodrug forms of the oligonucleotide of the disclosure are prepared as SATE [(S acetyl-2-thioethyl) phosphate] derivatives according to the methods disclosed in WO 93/24510, WO 94/26764 and U.S. Pat. No. 5,770,713.

A prodrug may, for example, be converted within the body, e. g. by hydrolysis in the blood, into its active form that has medical effects. Pharmaceutical acceptable prodrugs are described in T. Higuchi and V. Stella, Prodrugs as Novel Delivery Systems, Vol. 14 of the A. C. S. Symposium Series (1976); "Design of Prodrugs" ed. H. Bundgaard, Elsevier, 1985; and in Edward B. Roche, ed., Bioreversible Carriers in Drug Design, American Pharmaceutical Association and Pergamon Press, 1987. Those skilled in the art of organic chemistry will appreciate that many organic compounds can form complexes with solvents in which they are reacted or from which they are precipitated or crystallized. These complexes are known as "solvates". For example, a complex with water is known as a "hydrate".

In one embodiment, oligonucleotides of the invention can be complexed with a complexing agent to increase cellular uptake of oligonucleotides. An example of a complexing agent includes cationic lipids. Cationic lipids can be used to deliver oligonucleotides to cells.

The term "cationic lipid" includes lipids and synthetic lipids having both polar and non-polar domains and which are capable of being positively charged at or around physiological pH and which bind to polyanions, such as nucleic acids, and facilitate the delivery of nucleic acids into cells. In general cationic lipids include saturated and unsaturated alkyl and alicyclic ethers and esters of amines, amides, or derivatives thereof. Straight-chain and branched alkyl and alkenyl groups of cationic lipids can contain, e.g., from 1 to about 25 carbon atoms. Preferred straight chain or branched alkyl or alkene groups have six or more carbon atoms. Alicyclic groups include cholesterol and other steroid groups. Cationic lipids can be prepared with a variety of counterions (anions) including, e.g., Cl—, Br—, I—, F—, acetate, trifluoroacetate, sulfate, nitrite, and nitrate.

Examples of cationic lipids include polyethylenimine, polyamidoamine (PAMAM) starburst dendrimers, Lipofectin (a combination of DOTMA and DOPE), Lipofectase, LIPOFECTAMINE™ (e.g., LIPOFECTAMINE™ 2000), DOPE, Cytofectin (Gilead Sciences, Foster City, Calif.), and Eufectins (JBL, San Luis Obispo, Calif.). Exemplary cationic liposomes can be made from N-[1-(2,3-dioleoloxy)-propyl]-N,N,N-trimethylammonium chloride (DOTMA), N-[1-(2,3-dioleoloxy)-propyl]-N,N,N-trimethylammonium methylsulfate (DOTAP), 3.beta.-[N—-(N',N'-dimethylaminoethane) carbamoyl] cholesterol (DC-Chol), 2,3,-dioleyloxy-N-[2 (sperminecarboxamido)ethyl]-N,N-dimethyl-1-propanaminium trifluoroacetate (DOSPA), 1,2-dimyristyloxypropyl-3-dimethyl-hydroxyethyl ammonium bromide; and dimethyldioctadecylammonium bromide (DDAB). Oligonucleotides can also be complexed with, e.g., poly(L-lysine) or avidin and lipids may, or may not, be included in this mixture, e.g., steryl-poly(L-lysine).

Cationic lipids have been used in the art to deliver oligonucleotides to cells (see, e.g., U.S. Pat. Nos. 5,855,910; 5,851,548; 5,830,430; 5,780,053; 5,767,099; Lewis et al., 1996; Hope et al., 1998). Other lipid compositions which can be used to facilitate uptake of the instant oligonucleotides can be used in connection with the methods of the invention. In addition to those listed above, other lipid compositions are also known in the art and include, e.g., those taught in U.S. Pat. Nos. 4,235,871; 4,501,728; 4,837, 028; 4,737,323.

In one embodiment lipid compositions can further comprise agents, e.g., viral proteins to enhance lipid-mediated transfections of oligonucleotides. In another embodiment N-substituted glycine oligonucleotides (peptoids) can be used to optimize uptake of oligonucleotides.

In another embodiment, a composition for delivering oligonucleotides of the invention comprises a peptide having from between about one to about four basic residues. These basic residues can be located, e.g., on the amino terminal, C-terminal, or internal region of the peptide. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine (can also be considered non-polar), asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Apart from the basic amino acids, a majority or all of the other residues of the peptide can be selected from the non-basic amino acids, e.g., amino acids other than lysine, arginine, or histidine. Preferably a preponderance of neutral amino acids with long neutral side chains are used.

In one embodiment, oligonucleotides are modified by attaching a peptide sequence that transports the oligonucleotide into a cell, referred to herein as a "transporting peptide." In one embodiment, the composition includes an oligonucleotide which is complementary to a target nucleic acid molecule encoding the protein, and a covalently attached transporting peptide.

In a further embodiment, the oligonucleotide is attached to a targeting moiety such as N-acetylgalactosamine (GalNAc), an antibody, antibody-like molecule or aptamer (see, for example, Toloue and Ford (2011) and Esposito et al. (2018)).

Administration

In one embodiment, the oligonucleotide of the disclosure is administered systemically. As used herein "systemic administration" is a route of administration that is either enteral or parenteral.

As used herein "enteral" refers to a form of administration that involves any part of the gastrointestinal tract and includes oral administration of, for example, the oligonucleotide in tablet, capsule or drop form; gastric feeding tube, duodenal feeding tube, or gastrostomy; and rectal administration of, for example, the oligonucleotide in suppository or enema form.

As used herein "parenteral" includes administration by injection or infusion. Examples include, intravenous (into a vein), intraarterial (into an artery), intramuscular (into a muscle), intracardiac (into the heart), subcutaneous (under the skin), intraosseous infusion (into the bone marrow), intradermal, (into the skin itself), intrathecal (into the spinal canal), intraperitoneal (infusion or injection into the peritoneum), intravesical (infusion into the urinary bladder). transdermal (diffusion through the intact skin), transmucosal (diffusion through a mucous membrane), inhalational.

In one embodiment, administration of the pharmaceutical composition is subcutaneous.

The oligonucleotide may be administered as single dose or as repeated doses on a period basis, for example, daily, once every two days, three, four, five, six seven, eight, nine, ten, eleven, twelve, thirteen or fourteen days, once weekly, twice weekly, three times weekly, every two weeks, every three weeks, every month, every two months, every three months to six months or every 12 months.

In one embodiment, administration is 1 to 3 times per week, or once every week, two weeks, three weeks, four weeks, or once every two months.

In one embodiment, administration is once weekly.

In one embodiment, a low dose administered for 3 to 6 months, such as about 25-50 mg/week for at least three to six months and then up to 12 months and chronically.

Illustrative doses are between about 10 to 5,000 mg. Illustrative doses include 25, 50, 100, 150, 200, 1,000, 2,000 mg. Illustrative doses include 1.5 mg/kg (about 50 to 100 mg) and 3 mg/kg (100-200 mg), 4.5 mg/kg (150-300 mg), 10 mg/kg, 20 mg/kg or 30 mg/kg. In one embodiment doses are administered once per week. Thus in one embodiment, a low dose of approximately 10 to 30, or 20 to 40, or 20 to 28 mg may be administered to subjects typically weighing between about 25 and 65 kg. In one embodiment the oligonucleotide is administered at a dose of less than 50 mg, or less than 30 mg, or about 25 mg per dose to produce a therapeutic effect.

EXAMPLES

Example 1-Methods

Ethics Statement

Collection of peripheral blood mononuclear cells (PBMCs) from healthy donors was approved by Monash Health under the HREC reference 02052A.

Cell Isolation, Culture and Stimulation

PBMCs were isolated from whole blood donations via density centrifugation using HISTOPAQUE™-1770 (Sigma-Aldrich) as previously reported (Gantier et al., 2010), and plated in RPMI 1640 plus L-glutamine medium (Thermo Fisher Scientific) complemented with 1× antibiotic/antimycotic and 10% heat-inactivated foetal bovine serum (referred to as complete RPMI).

293XL-hTLR8-HA (referred to as HEK-TLR8) and 293XL-hTLR7-HA (referred to as HEK-TLR7) and 293XL-hTLR9-HA stably expressing TLR8, TLR7, and TLR9 respectively, were purchased from Invivogen, and were maintained in Dulbecco's modified Eagle's medium (Thermo Fisher Scientific) supplemented with 10% heat-inactivated foetal bovine serum (Thermo Fisher Scientific) and 1× antibiotic/antimycotic (Thermo Fisher Scientific) (referred to as complete DMEM) supplemented with 10 µg/ml Blasticidin (Invivogen). Parental wild-type (WT) THP-1, UNC93B1-deficient THP-1 (Schmid-Burgk et al., 2014) and matched clones reconstituted with fluorescent wild-type UNC93B1 (Pelka et al., 2014) were grown in complete RPMI. OCI-AML3 and MOLM13 were grown in RPMI supplemented with 20% heat inactivated foetal bovine serum and 1× antibiotic/antimycotic (their identity was confirmed by in house cell line identification service relying on POWERPLEX™ HS16 System kit, Promega). All the cells were cultured at 37° C. with 5% CO2. Cell lines were passaged 2-3 times a week and tested for *mycoplasma* contamination on routine basis by PCR.

For stimulations, THP-1, MOLM13 and OCI-AML3 were treated overnight with ASOs, prior to stimulation with 1 µg/ml R848 (Invivogen). HEK-TLR7 and HEKTLR8 were treated with indicated concentration of ASOs for 20-50 min, prior to stimulation with R848, CL075, Gardiquimod (all from Invivogen), or 7-Allyl-7,8-dihydro-8-oxoguanosine (Loxoribine-SigmaAldrich). All ASOs were synthesised by Integrated DNA Technologies (IDT), and resuspended in RNase-free TE buffer, pH 8.0 (Thermo Fisher Scientific). ASO sequences and modifications are provided in Table 1, 2 and 3. The cGAS ligand ISD70 (Table 1) was prepared as previously described (Pepin et al., 2020) and transfected with LIPOFECTAMINE™ 2000 at 2.5 µg/ml final concentration. The Class B CpG oligonucleotide human TLR9 ligand ODN 2006 was synthesised by IDT and resuspended in RNase-free TE buffer Luciferase Assays HEK293 cells stably expressing TLR7, 8 or 9 were transfected with pNF-κB-Luc4 reporter (Clontech), pLuc-IFN-β (a kind gift from K. Fitzgerald, University of Massachusetts) or pCCL5 [RANTES]-Luc (a kind gift from G. Scholz, University of Melbourne) with LIPOFECTAMINE™ 2000 (Thermo Fisher Scientific), according to the manufacturer's protocol. Briefly, 500,000-700,000 cells were reverse-transfected with 400 ng of reporter with 1.2 μl of LIPOFECTAMINE™ 2000 per well of a 6-well plate, and incubated for 3-24 h at 37° C. with 5% CO2. Following transfection, the cells were collected from the 6-wells and aliquoted into 96-wells, just before ASO and overnight TLR stimulation (as above described). The next day, the cells were lysed in 40 μl (for a 96-well plate) of 1× Glo Lysis buffer (Promega) for 10 min at room temperature. 15 μl of the lysate was then subjected to firefly luciferase assay using 40 μl of Luciferase Assay Reagent (Promega). Luminescence was quantified with a FLUOSTAR™ OPTIMA (BMG LABTECH) luminometer.

Down-Regulation of HPRT with ASOs in HeLa Cells

Each ASO was reverse-transfected in biological triplicate in 96-well plates by complexing the various ASO doses with 0.5 μl LIPOFECTAMINE™ 2000 (Thermo Fisher Scientific) in OPTI-MEM™ I (Thermo Fisher Scientific) for a total volume of 50 μl in each well. HeLa cells (20,000) were suspended in 100 μl DMEM supplemented with 10% foetal calf serum (FCS), added to the lipid-ASO complexes, then incubated for 24 h at 37° C. and 5% CO2. RNA was collected with the SV Total RNA Isolation Kit (Promega) with DNaseI treatment. cDNA was synthesized from ~200 ng total RNA with anchored oligonucleotide dT and random hexamer primers (Integrated DNA Technologies) using SuperScript II Reverse Transcriptase (Thermo Fisher Scientific) as per the manufacturer's instructions. qPCR reactions were performed using ~10 ng cDNA with Immolase DNA polymerase (Bioline), 500 nM of each primer and 250 nM probe in 10 μl reactions in 384-well plate format. Amplification reactions were run on an Applied Biosystems 7900HT (Thermo Fisher Scientific). All qPCR reactions were performed in triplicate for each sample and averaged.

Linearized cloned amplicons were used as copy number standards to establish absolute quantitative measurements for each assay. HPRT (NM 000194) and SFRS9 (NM 003769) expression levels were quantified by multiplexing 5'-nuclease assays, and HPRT levels normalized against SFRS9-used as internal reference control. Sequences of the primers and probe assays used are provided in Table 1. Knock-down efficiency was calculated relative to NC1 and NC5 negative control ASOs.

Detection of Cytokines

Human TNF-α and IP-10 were measured usin BD OPTEIA™ ELISA sets (BD Biosciences, #555212 and #550926, respectively), according to the manufacturers' instructions. Human IFN-α detection was carried out as previously reported (Gantier, 2013). Tetramethylbenzidine substrate (Thermo Fisher Scientific) was used for quantification of the cytokines on a FLUOSTAR™ OPTIMA (BMG LABTECH) plate-reader.

mRNA Reverse Transcription Quantitative Real-Time PCR (RT-qPCR)

Total RNA was purified from cells using the ISOLATE II RNA Mini Kit (Bioline). Random hexamer cDNA was synthesized from isolated RNA using the High-Capacity cDNA Archive kit (Thermo Fisher Scientific) according to the manufacturer's instructions. RT-qPCR was carried out with the Power SYBR Green Master Mix (Thermo Fisher Scientific) on the HT7900 and QUANTSTUDIO 6 RT-PCR system (Thermo Fisher Scientific). Each PCR was carried out in technical duplicate and human 18S was used as reference gene. Each amplicon was gel-purified and used to generate a standard curve for the quantification of gene expression (used in each run). Melting curves were used in each run to confirm specificity of amplification.

The primers used were the following: Human RSAD2: hRSAD2-RT-FWD TGGTGAGGTTCTGCAAAGTAG (SEQ ID NO: 475); hRSAD2-RT-REV GTCACAGGAGA-TAGCGAGAATG (SEQ ID NO: 476); hIFIT1: hIFIT1-FWD TCACCAGATAGGGCTTTGCT (SEQ ID NO: 477); hIFIT1-REV CACCTCAAATGTGGGCTTTT (SEQ ID NO: 478); h18S: h18S-FWD CGGCTACCACATC-CAAGGAA (SEQ ID NO: 479); h18S-REV GCTGGAAT-TACCGCGGCT (SEQ ID NO: 480); hIFI44: hIFI44-FWD ATGGCAGTGACAACTCGTTTG (SEQ ID NO: 481); hIFI44: TCCTGGTAACTCTCTTCTGCATA (SEQ ID NO: 482); hIFNB: hIFNB-FWD GCTTGGATTCCTA-CAAAGAAGCA (SEQ ID NO: 483); hIFNBREV: ATA-GATGGTCAATGCGGCGTC (SEQ ID NO: 484); hHPRT-FWD: GACTTTGCTTTCCTTGGTCAG (SEQ ID NO: 485); hHPRT-REV GGCTTATATCCAACACTTCGTGGG (SEQ ID NO: 486); amplicons from RSAD2, IFIT1, and 18S PCRs were verified by Sanger sequencing. IFI44 and IFNB primers were from the Primer Bank (Wang et al., 2012), and HPRT primers were designed by IDT.

Statistical Analyses

Statistical analyses were carried out using Prism 8 (GRAPHPAD™ Software Inc.). Every experiment was carried out in biological triplicate (except FIGS. 2A, 2B, 4D and 5E, carried out in biological duplicate) and repeated a minimum of two independent times. One-way and two-way analyses of variance (ANOVA) were used when comparing groups of conditions, while two-tailed unpaired non-parametric Mann-Whitney U tests or unpaired two-tailed t-tests were used when comparing pairs of conditions. Symbols used: * P≤0.05,  P≤0.01, * P≤0.001, **** P≤0.0001 and "ns" is non-significant.

Example 2: Sequence and Backbone-Dependent Effects of ASOs on TLR7/8 Sensing

The inventors initially investigated the activity of a panel of 11 2'OMe gapmer ASOs targeted to the mRNA of the innate immune sensor cGAS, on immune responses of undifferentiated THP-1 cells. Surprisingly, overnight pre-treatment with the ASOs led to strong potentiation of IP-10 and TNF-α production upon R848 stimulation of TLR7/8 in the cells, for select ASOs (e.g. ASO2, ASO9, ASO11, but not ASO4-FIG. 1A). Previous studies have reported that T-rich PS oligonucleotides could promote TLR8 sensing, while inhibiting TLR7 (Gorden et al., 2006; Jurk et al., 2006). Since THP-1 can respond to both TLR7 and TLR8 ligands (Gantier et al., 2008), the inventors speculated that the sequence-specific effect of the ASOs on R848 sensing they observed could be due to their different activities on TLR7 and TLR8. To define this, the inventors next tested our panel of sequences in HEK 293 cells stably expressing TLR7 or TLR8 (referred to as HEK-TLR7 and HEKTLR8 hereafter), along with an NF-κB-luciferase reporter (FIGS. 1B, 1C, 8A and 8B).

Interestingly, the inventors found that most ASOs strongly inhibited TLR7 sensing of R848, with the exception of ASO8 and ASO11, which were less potent inhibitors (FIG. 1B). Conversely, and directly aligning with the inventors observations in THP-1 cells, several ASOs strongly potentiated TLR8 sensing of R848 (e.g. ASO2, ASO9 and ASO11-FIG. 1C). The ASOs on their own did not stimulate TLR7 or TLR8 (FIGS. 8A, 8B). Focusing on ASO2 and ASO11, which equally potentiated TLR8 but had different activities on TLR7, the inventors validated further their TLR7/8-dependent activity in THP-1 lacking UNC93B1, which is essential to TLR7/8 signalling (Pelka et al., 2014). The potentiation effect of ASO2 and ASO11 on R848 sensing was not seen in THP-1 lacking UNC93B1, but could be restored upon reconstitution of UNC93B1-Citrine expression (Pelka et al., 2014) (FIG. 1D), thereby supporting the involvement of TLR7/8 in this effect. In addition, stimulation of human peripheral blood mononuclear cells (PBMCs) with ASO2 and ASO11 strongly potentiated R848 induced TNF-α, but did not impact IFN-α levels, indicative of a preferential effect on TLR8 sensing of R848 (Gantier et al., 2008) (FIGS. 1E, 1F). This effect on IFN-α and TNF-α was not related to TLR9 activation of PBMCs by the ASOs, since ASO2 did not activate TLR9 signalling in HEK-TLR9 cells, while ASO11 did (FIG. 8C).

To define whether this effect of the ASOs on TLR7/8 was dependent on their backbone or base modifications, the inventors next studied a series of ASO variants based on the sequence of ASO2 (FIGS. 1G, 1H, 1I). Analyses of these variants in HEK-TLR7 cells stimulated with R848 revealed that all ASO2 variants containing a PS backbone inhibited TLR7, independent of the type of base modifications used (DNA only, 2'OMe, LNA or 2'MOE) (FIGS. 1G, 1H, Table 1). Conversely, potentiation of R848 sensing by TLR8 was directly dependent on the 5' and 3' end base modifications, with 2'OMe giving the best potentiation in this sequence context (FIGS. 1G, 1I). Addition of a 3' end Cy3 linker decreased this potentiation of TLR8 sensing, while substitution of 2'OMe bases with 2'MOE or LNA bases ablated the potentiation.

Potentiation was not limited to the dual TLR7/8 agonist R848 and was also seen with CL075 (TLR8 agonist), Loxoribine (TLR7 agonist), and to some extent with Gardiquimod (TLR7 agonist) (FIG. 7).

Similar to the effect observed on TLR7, the PS backbone was also necessary for TLR8 potentiation; it was not, however, sufficient for this effect by itself, since the 2'OME and LNA ASO2 variants were also synthesised on a PS backbone, and only limited potentiation was seen with the variant featuring the PS modification only (ASO2-PS). Collectively these results demonstrated that PS ASOs could display potent TLR7/8 immunomodulation, in a sequence-dependent manner.

TABLE 1

Various oligonucleotides used in this study (all in 5'-3'). UPPERCASE alone for DNA, 'm' indicates 2'OMe base, '/i2MOEr/' indicates 2'MOE base, '+' indicates LNA base, and * denotes the phosphorothioate backbone. Cy3Sp denotes the Cy3 tag. FAM, HEX, ZEN, 3IABKFQ are qPCR probe modifications.

| Name | Sequence | SEQ ID NO. |
|---|---|---|
| NC1 2OMe/PS ASO (Neg Cont) | mG*mC*mG*mU*mA*T*T*A*T*A*G*C*C*G*A*mU*mU*mA*mA*mC | 1 |
| NC5 2OMe/PS ASO (Neg Cont) | mG*mC*mG*mA*mC*T*A*T*A*C*G*C*G*C*A*mA*mU*mA*mU*mG | 2 |
| [cGAS]ASO1 | mA*mU*mG*mG*mC*C*T*T*T*C*C*G*T*G*C*mC*mA*mA*mG*mG | 3 |
| [cGAS]ASO2 | mU*mC*mC*mG*mG*C*C*T*C*G*A*A*G*C*mU*mC*mU*mC*mU | 4 |
| [cGAS]ASO3 | mG*mC*mA*mU*mU*C*C*G*T*G*C*G*G*A*A*mG*mC*mC*mU*mU | 5 |
| [cGAS]ASO4 | mG*mG*mC*mC*mG*A*A*C*T*T*T*C*C*C*G*mC*mC*mU*mU*mA | 6 |
| [CGAS]ASO5 | mG*mG*mU*mC*mU*T*G*G*C*T*T*C*G*T*G*mG*mA*mG*mC*mA | 7 |
| [CGAS]ASO6 | mG*mG*mA*mG*mC*T*T*C*G*A*G*G*C*C*C*mC*mA*mG*mG*mC | 8 |
| [cGAS]ASO7 | mG*mG*mU*mG*mG*T*C*C*A*C*A*A*C*C*C*mC*mU*mU*mU*mC | 9 |
| [cGAS]ASO8 | mC*mA*mU*mU*mA*G*G*T*G*C*A*G*A*A*A*mU*mC*mU*mU*mC | 10 |
| [cGAS]ASO9 | mU*mU*mC*mU*mG*G*G*A*C*T*T*C*C*A*mG*mU*mU*mU*mA | 11 |
| [cGAS]ASO10 | mU*mG*mA*mU*mU*C*C*A*A*A*G*C*C*A*G*mG*mG*mU*mU*mA | 12 |
| [cGAS]ASO11 | mC*mU*mU*mU*mA*G*T*C*G*T*A*G*T*T*G*mC*mU*mU*mC*mC | 13 |

TABLE 1-continued

Various oligonucleotides used in this study (all in 5'-3'). UPPERCASE alone for DNA, 'm' indicates 2'OMe base, '/i2MOEr' indicates 2'MOE base, '+' indicates LNA base, and * denotes the phosphorothioate backbone. Cy3Sp denotes the Cy3 tag. FAM, HEX, ZEN, 3IABKFQ are qPCR probe modifications.

| Name | Sequence | SEQ ID NO. |
|---|---|---|
| ASO2-Cy3 | mU*mC*mC*mG*mG*C*C*T*C*G*G*A*A*G*C*mU*mC*mU*mC*mU/3Cy3Sp/ | 14 |
| ASO2-PS | T*C*C*G*G*C*C*T*C*G*G*A*A*G*C*T*C*T*C*T | 15 |
| ASO2-PO | mUmCmCmGmGCCTCGGAAGCmUmCmUmCmU | 16 |
| ASO2-LNA | +C*+G*+G*C*C*T*C*G*G*A*A*G*C*+T*+C*+T | 17 |
| ASO2-2MOE | /52MOErT/*/i2MOErC/*/i2MOErC/*/i2MOErG/*/i2MOErG/*C*C*T*C*G*G*A*A*G*C*/i2MOErT/*/i2MOErC/*/i2MOErT/*/i2MOErC/*/32MOErT/ | 18 |
| ASO11-Mut1 | mC*mU*mU*mU*mA*G*T*C*G*T*A*G*T*T*G*mU*mC*mU*mC*mU | 19 |
| ASO11-Mut2 | mU*mC*mC*mG*mG*G*T*C*G*T*A*G*T*T*G*mC*mU*mU*mC*mC | 20 |
| ASO852 | mC*mU*mC*mU*mC*T*T*T*C*T*G*T*G*G*T*mU*mU*mC*mU*mC | 21 |
| ASO852-dT | mC*mU*mC*mU*mC*T*T*T*T*T*T*T*T*T*T*mU*mU*mC*mU*mC | 22 |
| ASO2504 | mC*mC*mU*mA*mU*T*A*A*A*A*A*A*T*T*mU*mA*mU*mA*mC | 23 |
| ASO2504-Mut | mC*mC*mU*mA*mU*T*T*T*C*T*G*T*G*G*T*mU*mA*mU*mA*mC | 24 |
| dT20 | T*T*T*T*T*T*T*T*T*T*T*T*T*T*T*T*T*T*T*T | 25 |
| Hs HPRT F517 | GACTTTGCTTTCCTTGGTCAG | 26 |
| Hs HPRT R591 | GGCTTATATCCAACACTTCGTGGG | 27 |
| Hs HPRT P554 FAM | /56-FAM/ATGGTCAAG/ZEN/GTCGCAAGCTTGCTGGT/3IABKFQ/ | 28 |
| Hs SFRS9 F594 | GTCGAGTATCTCAGAAAAGAAGACA | 29 |
| Hs SFRS9 R690 | CTCGGATGTAGGAAGTTTCACC | 30 |
| Hs SFRS9 P625 HEX | /5HEX/ATGCCCTGC/ZEN/GTAAACTGGATGACA/3IABKFQ/ | 31 |
| ODN 2006 | T*C*G* T*C*G* T*T*T* T*G*T* C*G*T* T*T*T* G*T*C* G*T*T | 32 |
| ISD70-FWD | CCA TCA GAA AGA GGT TTA ATA TTT TTG TGA GAC CAT CGA AGA GAG AAA GAG ATA AAA CTT TTT TAC GAC T | 33 |
| ISD70-REV | AGT CGT AAA AAA GTT TTA TCT CTT TCT CTC TTC GAT GGT CTC ACA AAA ATA TTA AAC CTC TTT CTG ATG G | 34 |

Example 3: Screen to Identify ASOs with Low TLR7 Inhibition and High TLR8 Potentiation The observation of TLR7 inhibition and TLR8 potentiation by select PS ASOs aligned with the previous reports that T-rich PS oligonucleotides could promote similar activities (Gorden et al., 2006; Jurk et al., 2006). However, the finding that some 2'OMe ASO sequences had less inhibitory activity on TLR7 (e.g. ASO8 and ASO11) suggested that TLR7 inhibition promoted by the PS backbone may be counter-balanced in select 2'OMe gapmer ASOs. The inventors reasoned that defining the modalities of this activity could help design ASOs with reduced immunosuppressive activities towards TLR7. In addition, the observation that ASO11 was able to potentiate TLR8 sensing of R848 while preserving TLR7 activity, suggested that the activities on TLR7 and 8 were not governed by the same sequence determinants.

To characterize these observations further, the inventors screened a library of 192 2'OMe ASOs. It is noteworthy that these ASOs were designed to target 4 different transcripts (48 ASOs each), with a minimum of single base increments between the ASOs (Table 2). The screen was performed at two different ASO concentrations for each TLR and measured their impact on NF-κB luciferase induction by R848 in HEK-TLR7 and HEK-TLR8 cells (FIGS. 2A, 2B and Table 2).

In agreement with the initial panel of ASOs, the inventors found that the majority of ASOs used at 500 nM strongly suppressed TLR7 sensing. As such, 78% of the ASOs reduced R848 activity on TLR7 by more than 80%, and only 2 ASOs reduced TLR7 sensing by less than 40% at both concentrations (FIG. 2A and Table 2-ASOs '[CDKN2B-AS1]-852' and '[LINC-PINT]-2504', referred to as ASO852 and ASO2504 hereafter). Conversely, the effect of ASOs on TLR8 potentiation was diverse across ASOs with 51% of the ASOs potentiating R848 sensing by at least 2 fold at 100 nM (FIG. 2B). Importantly, while both displaying low TLR7 inhibition, ASO852 and ASO2504 had distinct activities on TLR8 (FIG. 2A, 2B and Table 2). ASO dose-response studies in HEK293-TLR7 and HEK293-TLR8 cells confirmed that ASO2504 and ASO852 had little impact on R848 sensing by TLR7 compared to ASO4, however ASO852 potentiated TLR8 sensing significantly more than ASO4 (FIG. 2C). Analyses of the impact of ASO852 on various doses of R848 revealed that it decreased the sensitivity of TLR7 to R848 by ~2.5 fold (FIG. 2D). However, ASO852 treatment increased the activity of R848 on TLR8 ~13 fold (FIG. 2D).

TABLE 2

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO08 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [CDKN2B-AS1]1240 | mG*mU*mC*mU*mC*T*A*C*T*G*T*T*A*C*mC*mU*mC*mU*mG*mA | 5.79 | 2.41 | 16.16 | 19.16 | 35 |
| [CDKN2B-AS1]132 | mU*mU*mA*mA*mA*T*A*A*T*C*T*A*G*T*T*mU*mG*mA*mA*mG | 6.43 | 3.96 | 15.33 | 25.66 | 36 |
| [CDKN2B-AS1]1415 | mG*mU*mG*mU*mC*C*T*T*C*A*T*G*C*T*T*mU*mG*mG*mA*mU | 1.60 | 1.33 | 12.24 | 18.05 | 37 |
| [CDKN2B-AS1]1519 | mA*mG*mA*mA*mA*G*A*A*G*C*A*A*A*G*A*mU*mU*mC*mA*mA | 2.78 | 1.96 | 17.19 | 42.99 | 38 |
| [CDKN2B-AS1]1522 | mC*mC*mU*mA*mG*A*A*A*G*A*A*A*G*C*A*A*mA*mG*mA*mU*mU | 4.94 | 3.58 | 24.37 | 57.20 | 39 |
| [CDKN2B-AS1]1528 | mG*mU*mC*mA*mA*A*C*C*T*A*G*A*A*A*G*mA*mA*mG*mC*mA | 1.85 | 1.60 | 16.51 | 23.64 | 40 |
| [CDKN2B-AS1]1773 | mG*mA*mU*mU*mA*A*A*C*A*G*A*T*T*A*mA*mU*mA*mC*mA | 1.48 | 0.73 | 15.20 | 21.92 | 41 |
| [CDKN2B-AS1]1774 | mG*mG*mA*mU*mU*A*A*A*C*A*G*A*T*T*mA*mA*mU*mA*mC | 1.67 | 1.16 | 14.92 | 27.16 | 42 |
| [CDKN2B-AS1]1775 | mA*mG*mG*mA*mU*T*A*A*A*C*A*G*A*T*mU*mA*mA*mU*mA | 2.63 | 2.19 | 58.42 | 36.28 | 43 |
| [CDKN2B-AS1]2108 | mG*mA*mG*mU*mU*C*T*T*C*G*T*A*G*G*C*mU*mU*mC*mU*mG | 1.23 | 0.96 | 15.37 | 25.86 | 44 |
| [CDKN2B-AS1]2130 | mA*mG*mA*mU*mU*A*T*C*T*T*C*T*T*T*mA*mA*mU*mU*mU | 6.26 | 3.02 | 19.91 | 37.10 | 45 |
| [CDKN2B-AS1]2131 | mA*mA*mG*mA*mU*T*A*T*C*T*T*C*T*T*T*mU*mA*mA*mU*mU | 5.62 | 2.91 | 20.16 | 42.09 | 46 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 µg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8-500 nM | TLR8-100 nM | TLR7-500 nM | TLR7-100 nM | SEQ ID NO. |
|---|---|---|---|---|---|---|
| [CDKN2B-AS1]2132 | mA*mA*mA*mG*mA*T*T*A*T*C*T*T*C*T*T*mU*mU*mA*mA*mU | 5.04 | 2.96 | 24.62 | 49.28 | 47 |
| [CDKN2B-AS1]2133 | mA*mA*mA*mA*mG*A*T*T*A*T*C*T*T*C*T*mU*mU*mU*mA*mA | 4.68 | 3.19 | 20.33 | 47.41 | 48 |
| [CDKN2B-AS1]2134 | mG*mA*mA*mA*mA*G*A*T*T*A*T*C*T*T*C*mU*mU*mU*mU*mA | 1.87 | 1.31 | 18.57 | 34.44 | 49 |
| [CDKN2B-AS1]2137 | mU*mG*mU*mG*mA*A*A*A*G*A*T*T*A*T*C*mU*mU*mC*mU*mU | 4.97 | 2.79 | 18.34 | 34.51 | 50 |
| [CDKN2B-AS1]2138 | mU*mU*mG*mU*mG*A*A*A*A*G*A*T*T*A*T*mC*mU*mU*mC*mU | 1.94 | 1.05 | 19.49 | 35.02 | 51 |
| [CDKN2B-AS1]2139 | **mC*mU*mU*mG*mU*G*A*A*A*A*G*A*T*T*A*mU*mC*mU*mU*mC | 6.02 | 3.89 | 49.18 | 85.33 | 52** |
| [CDKN2B-AS1]2196 | mG*mG*mU*mG*mG*C*C*A*C*A*G*G*C*A*A*mC*mG*mU*mC*mA | 0.98 | 0.80 | 16.65 | 39.07 | 53 |
| [CDKN2B-AS1]2198 | mA*mA*mG*mG*mU*G*G*C*C*A*C*A*G*G*C*mA*mA*mC*mG*mU | 0.78 | 0.58 | 14.95 | 57.85 | 54 |
| [CDKN2B-AS1]2218 | mA*mG*mG*mC*mC*T*C*C*A*G*T*G*T*C*T*mU*mC*mU*mC*mC | 4.66 | 2.19 | 21.33 | 44.73 | 55 |
| [CDKN2B-AS1]2219 | mC*mA*mG*mG*mC*C*T*C*C*A*G*T*G*T*C*mU*mU*mC*mU*mC | 3.89 | 2.02 | 23.06 | 54.11 | 56 |
| [CDKN2B-AS1]2223 | mG*mU*mC*mC*mC*A*G*G*C*C*T*C*C*A*G*mU*mG*mU*mC*mU | 2.17 | 1.05 | 12.54 | 19.01 | 57 |
| [CDKN2B-AS1]2227 | mC*mC*mA*mU*mG*T*C*C*C*A*G*G*C*C*T*mC*mC*mA*mG*mU | 1.46 | 1.24 | 17.53 | 41.39 | 58 |
| [CDKN2B-AS1]2230 | mU*mC*mU*mC*mC*A*T*G*T*C*C*C*A*G*G*mC*mC*mU*mC*mC | 9.17 | 3.41 | 21.16 | 43.45 | 59 |
| [CDKN2B-AS1]2231 | mG*mU*mC*mU*mC*C*A*T*G*T*C*C*C*A*G*mG*mC*mC*mU*mC | 1.25 | 1.01 | 16.91 | 23.75 | 60 |
| [CDKN2B-AS1]2232 | mA*mG*mU*mC*mU*C*C*A*T*G*T*C*C*C*A*mG*mG*mC*mC*mU | 2.28 | 1.64 | 14.11 | 35.77 | 61 |
| [CDKN2B-AS1]2233 | mC*mA*mG*mU*mC*T*C*C*A*T*G*T*C*C*C*mA*mG*mG*mC*mC | 3.81 | 2.73 | 16.62 | 47.75 | 62 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 µg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
| --- | --- | --- | --- | --- | --- | --- |
| [CDKN2B-AS1]2234 | mG*mC*mA*mG*mU*C*T*C*C*A*T*G*T*C*C*mC*mA*mG*mG*mC | 2.25 | 1.79 | 13.30 | 20.30 | 63 |
| [CDKN2B-AS1]2235 | mA*mG*mC*mA*mG*T*C*T*C*C*A*T*G*T*C*mC*mC*mA*mG*mG | 4.93 | 2.81 | 14.78 | 25.50 | 64 |
| [CDKN2B-AS1]2236 | mA*mA*mG*mC*mA*G*T*C*T*C*C*A*T*G*T*mC*mC*mC*mA*mG | 2.62 | 1.79 | 15.46 | 35.69 | 65 |
| [CDKN2B-AS1]2237 | mA*mA*mA*mG*mC*A*G*T*C*T*C*C*A*T*G*mU*mC*mC*mC*mA | 3.38 | 1.90 | 15.95 | 27.16 | 66 |
| [CDKN2B-AS1]368 | mG*mU*mC*mG*mU*G*G*C*A*A*A*T*A*G*T*mC*mC*mU*mA*mG | 3.24 | 2.12 | 14.09 | 27.52 | 67 |
| [CDKN2B-AS1]442 | mG*mG*mA*mG*mA*T*C*A*G*A*T*G*A*G*A*mG*mG*mA*mG*mC | 1.67 | 1.05 | 15.77 | 26.34 | 68 |
| [CDKN2B-AS1]495 | mA*mG*mU*mG*mG*C*A*C*A*T*A*C*C*A*C*mA*mC*mC*mC*mU | 4.48 | 2.24 | 16.83 | 41.95 | 69 |
| [CDKN2B-AS1]568 | mC*mU*mU*mC*mA*C*A*T*C*C*A*A*G*A*C*mA*mG*mC*mA*mA | 7.23 | 2.26 | 25.10 | 55.01 | 70 |
| [CDKN2B-AS1]611 | mG*mU*mG*mU*mU*T*T*T*A*A*T*T*T*T*G*mU*mA*mA*mA*mG | 1.88 | 1.31 | 18.82 | 23.63 | 71 |
| [CDKN2B-AS1]613 | mC*mA*mG*mU*mG*T*T*T*T*T*A*A*T*T*T*mU*mG*mU*mA*mG | 6.73 | 3.18 | 45.63 | 62.68 | 72 |
| [CDKN2B-AS1]626 | mA*mU*mU*mU*mC*C*A*C*A*T*G*C*C*C*A*mG*mU*mG*mU*mU | 4.09 | 2.06 | 16.15 | 32.05 | 73 |
| [CDKN2B-AS1]627 | mU*mA*mU*mU*mU*C*C*A*C*A*T*G*C*C*C*mA*mG*mU*mG*mU | 3.87 | 2.77 | 15.14 | 30.54 | 74 |
| [CDKN2B-AS1]645 | mA*mA*mU*mU*mU*A*A*A*G*C*A*T*G*A*A*mU*mA*mU*mU*mA | 5.02 | 3.29 | 21.11 | 46.75 | 75 |
| [CDKN2B-AS1]79 | mA*mA*mA*mA*mU*A*A*G*G*G*A*A*T*A*mG*mG*mG*mG*mA | 0.71 | 0.86 | 19.79 | 68.45 | 76 |
| [CDKN2B-AS1]80 | mU*mA*mA*mA*mA*T*A*A*G*G*G*G*A*A*T*mA*mG*mG*mG*mG | 1.30 | 1.28 | 20.64 | 40.95 | 77 |
| [CDKN2B-AS1]831 | mA*mU*mA*mU*mC*T*G*C*T*G*C*C*C*A*C*mC*mU*mU*mC*mU | 5.89 | 2.55 | 18.61 | 47.52 | 78 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [CDKN2B-AS1]832 | mA*mA*mU*mA*mU*C*T*G*C*T*G*C*C*A*mC*mC*mU*mU*mC | 4.45 | 1.79 | 20.07 | 43.66 | 79 |
| [CDKN2B-AS1]852 | **mC*mU*mC*mU*mC*T*T*T*C*T*G*T*G*T*mU*mU*mC*mU*mC | 12.67 | 3.82 | 61.82 | 92.33** | 80 |
| [CDKN2B-AS1]924 | mG*mU*mG*mG*mU*T*A*A*G*T*A*C*A*T*G*mA*mG*mC*mU*mC | 0.83 | 0.59 | 15.50 | 21.58 | 81 |
| [CDKN2B-AS1]965 | mG*mG*mA*mC*mA*C*T*T*A*G*C*T*G*T*T*mC*mC*mU*mC*mG | 2.62 | 1.13 | 20.92 | 45.77 | 82 |
| [CTNNB1]1212 | mG*mG*mG*mU*mC*C*A*C*C*A*C*T*A*G*C*mC*mA*mG*mU*mA | 1.95 | 1.18 | 1.57 | 33.47 | 83 |
| [CTNNB1]1234 | mU*mC*mA*mU*mU*A*T*A*T*T*T*A*C*T*A*mA*mA*mG*mC*mU | 7.84 | 4.22 | 6.03 | 65.47 | 84 |
| [CTNNB1]1235 | **mC*mU*mC*mA*mU*T*A*T*A*T*T*T*A*C*T*mA*mA*mA*mG*mC | 7.60 | 3.46 | 5.53 | 93.53** | 85 |
| [CTNNB1]1294 | mC*mA*mG*mA*mU*A*G*C*A*C*C*T*T*C*A*mG*mC*mA*mC*mU | 5.89 | 3.22 | 4.55 | 126.50 | 86 |
| [CTNNB1]1445 | **mU*mC*mC*mA*mU*C*C*C*T*T*C*C*T*G*T*mU*mU*mA*mG*mU | 7.84 | 4.57 | 6.21 | 96.37** | 87 |
| [CTNNB1]1548 | mC*mU*mU*mA*mU*A*A*T*T*A*T*G*C*A*mA*mG*mU*mG*mA | 6.45 | 2.78 | 4.61 | 74.91 | 88 |
| [CTNNB1]1549 | **mU*mC*mU*mU*mA*T*A*A*T*T*A*T*T*G*C*mA*mA*mG*mU*mG | 7.36 | 4.58 | 5.97 | 110.24** | 89 |
| [CTNNB1]1575 | mA*mC*mC*mC*mA*C*T*T*G*C*A*G*A*C*mC*mA*mU*mC*mA | 6.80 | 2.74 | 4.77 | 65.83 | 90 |
| [CTNNB1]1576 | **mC*mA*mC*mC*mC*A*C*T*T*G*G*C*A*G*A*mC*mC*mA*mU*mC | 3.00 | 1.12 | 2.06 | 91.47** | 91 |
| [CTNNB1]1577 | mC*mC*mA*mC*mC*C*A*C*T*T*G*G*C*A*G*mA*mC*mC*mA*mU | 2.23 | 0.99 | 1.61 | 86.93 | 92 |
| [CTNNB1]1578 | mA*mC*mC*mA*mC*C*C*A*C*T*T*G*G*C*A*mG*mA*mC*mC*mA | 5.55 | 1.71 | 3.63 | 63.40 | 93 |
| [CTNNB1]1642 | mU*mG*mG*mC*mA*G*G*C*T*C*A*G*T*G*A*mU*mG*mU*mC*mU | 3.26 | 1.73 | 2.49 | 50.44 | 94 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [CTNNB1]1678 | mC*mU*mU*mG*mG*T*G*T*C*G*G*C*T*G*G*mU*mC*mA*mG*mA | 3.77 | 2.15 | 2.96 | 79.82 | 95 |
| [CTNNB1]1692 | mG*mG*mC*mC*mA*T*C*T*C*T*G*C*T*T*C*mU*mU*mG*mG*mU | 0.86 | 0.82 | 0.84 | 35.92 | 96 |
| [CTNNB1]1703 | mA*mC*mU*mG*mC*A*T*T*C*T*G*G*G*C*C*mA*mU*mC*mU*mC | 5.59 | 2.96 | 4.28 | 73.17 | 97 |
| [CTNNB1]2071 | mC*mA*mA*mU*mG*G*G*A*G*A*A*T*A*A*A*mG*mC*mA*mG*mC | 5.40 | 2.50 | 3.95 | 73.67 | 98 |
| [CTNNB1]2072 | mU*mC*mA*mA*mU*G*G*G*A*G*A*A*T*A*A*mA*mG*mC*mA*mG | 7.05 | 3.97 | 5.51 | 68.89 | 99 |
| [CTNNB1]2073 | mU*mU*mC*mA*mA*T*G*G*G*A*G*A*A*T*A*mA*mA*mG*mC*mA | 6.41 | 3.03 | 4.72 | 32.94 | 100 |
| [CTNNB1]2136 | mU*mU*mC*mU*mG*C*A*G*C*T*T*C*C*T*T*mG*mU*mC*mC*mU | 7.56 | 4.06 | 5.81 | 42.72 | 101 |
| [CTNNB1]2252 | mU*mG*mU*mG*mG*C*T*T*G*T*C*C*T*C*A*mG*mA*mC*mA*mU | 3.61 | 1.57 | 2.59 | 47.10 | 102 |
| [CTNNB1]2341 | mG*mU*mC*mC*mA*A*G*A*T*C*A*G*C*A*G*mU*mC*mU*mC*mA | 3.61 | 1.96 | 2.78 | 32.61 | 103 |
| [CTNNB1]2439 | mA*mC*mC*mC*mA*A*G*G*C*A*T*C*C*T*G*mG*mC*mC*mA*mU | 4.62 | 2.29 | 3.45 | 70.66 | 104 |
| [CTNNB1]2446 | **mG\*mG\*mU\*mC\*mC\*A\*T\*A\*C\*C\*A\*A\*G\*G\*mC\*mA\*mU\*mC\*mC | 1.65 | 1.00 | 1.33 | 104.51 | 105** |
| [CTNNB1]2447 | mG*mG*mG*mU*mC*C*A*T*A*C*C*C*A*A*G*mG*mC*mA*mU*mC | 1.85 | 1.08 | 1.46 | 47.61 | 106 |
| [CTNNB1]2479 | mG*mG*mU*mG*mG*T*G*G*C*C*A*C*C*C*A*mU*mC*mU*mC*mA | 1.78 | 1.11 | 1.44 | 75.57 | 107 |
| [CTNNB1]2516 | mA*mG*mA*mU*mC*T*G*G*C*A*G*C*C*C*A*mU*mC*mA*mA*mC | 3.15 | 1.89 | 2.52 | 55.37 | 108 |
| [CTNNB1]2545 | mG*mC*mC*mC*mA*T*C*C*A*T*G*A*G*G*T*mC*mC*mU*mG*mG | 2.41 | 1.46 | 1.94 | 31.68 | 109 |
| [CTNNB1]2742 | mU*mC*mA*mA*mA*G*T*A*T*A*T*A*C*C*T*mG*mU*mU*mU*mU | 7.84 | 4.27 | 6.06 | 64.39 | 110 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 µg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8-500 nM | TLR8-100 nM | TLR7-500 nM | TLR7-100 nM | SEQ ID NO. |
|---|---|---|---|---|---|---|
| [CTNNB1]311 | mG*mC*mC*mG*mC*T*T*T*T*C*T*G*T*C*T*mG*mG*mU*mU*mC | 3.29 | 2.00 | 2.64 | 70.52 | 111 |
| [CTNNB1]3395 | mC*mA*mG*mA*mU*T*A*C*A*A*T*T*A*A*T*mU*mA*mG*mA*mG | 4.38 | 2.76 | 3.57 | 80.81 | 112 |
| [CTNNB1]3401 | mU*mU*mU*mA*mU*T*C*A*G*A*T*T*A*C*A*mA*mU*mU*mA*mA | 6.77 | 3.68 | 5.23 | 53.38 | 113 |
| [CTNNB1]3445 | **mU*mC*mU*mA*mU*T*T*G*T*C*T*A*T*T*T*mU*mA*mU*mA*mC | 7.84 | 4.61 | 6.22 | 92.76** | 114 |
| [CTNNB1]3476 | **mC*mA*mU*mA*mU*T*A*A*A*A*G*G*A*A*mA*mC*mU*mA*mA | 5.60 | 2.31 | 3.95 | 108.39** | 115 |
| [CTNNB1]3483 | mU*mU*mU*mU*mA*A*G*C*A*T*A*T*T*A*A*mA*mA*mA*mG*mG | 7.17 | 3.67 | 5.42 | 59.36 | 116 |
| [CTNNB1]3484 | mA*mU*mU*mU*mU*A*A*G*C*A*T*A*T*T*A*mA*mA*mA*mA*mG | 5.91 | 2.37 | 4.14 | 47.01 | 117 |
| [CTNNB1]3485 | mU*mA*mU*mU*mU*T*A*A*G*C*A*T*A*T*T*mA*mA*mA*mA*mA | 6.24 | 2.61 | 4.43 | 62.33 | 118 |
| [CTNNB1]3486 | mU*mU*mA*mU*mU*T*T*A*A*G*C*A*T*A*T*mU*mA*mA*mA*mA | 7.17 | 2.97 | 5.07 | 41.46 | 119 |
| [CTNNB1]3487 | **mC*mU*mU*mA*mU*T*T*T*A*A*G*C*A*T*A*mU*mU*mA*mA*mA | 6.72 | 2.88 | 4.80 | 123.13** | 120 |
| [CTNNB1]3488 | mG*mC*mU*mU*mA*T*T*T*T*A*A*G*C*A*T*mA*mU*mU*mA*mA | 5.17 | 1.90 | 3.53 | 41.08 | 121 |
| [CTNNB1]3489 | mU*mG*mC*mU*mU*A*T*T*T*T*A*A*G*C*A*mU*mA*mU*mU*mA | 6.87 | 2.73 | 4.80 | 66.36 | 122 |
| [CTNNIB1]3648 | mC*mU*mC*mU*mU*G*A*A*G*C*A*T*C*G*T*mA*mU*mC*mA*mC | 5.00 | 2.71 | 3.86 | 93.38 | 123 |
| [CTNNB1]3697 | **mC*mG*mA*mA*mU*G*A*A*T*T*A*A*A*A*G*mU*mU*mU*mA*mA | 5.93 | 3.01 | 4.47 | 104.39** | 124 |
| [CTNNB1]577 | mG*mG*mA*mU*mC*T*G*C*A*T*G*C*C*C*T*mC*mA*mU*mC*mU | 2.02 | 1.15 | 1.59 | 47.92 | 125 |
| [CTNNB1]589 | mA*mC*mU*mG*mU*G*T*A*G*A*T*G*G*G*A*mU*mC*mU*mG*mC | 4.97 | 3.43 | 4.20 | 99.81 | 126 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 µg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [CTNNB1]808 | mC*mG*mU*mG*mU*C*T*G*G*A*A*G*C*T*T*mC*mC*mU*mU*mU | 5.09 | 2.89 | 3.99 | 66.99 | 127 |
| [CTNNB1]809 | mG*mC*mG*mU*mG*T*C*T*G*G*A*A*G*C*T*mU*mC*mC*mU*mU | 1.28 | 0.91 | 1.10 | 40.74 | 128 |
| [CTNNB1]810 | mU*mA*mG*mC*mG*T*G*T*C*T*G*G*A*A*G*mC*mU*mU*mC*mC | 2.85 | 1.56 | 2.21 | 60.29 | 129 |
| [CTNNB1]916 | mG*mG*mG*mA*mA*A*G*G*T*T*A*T*G*C*A*mA*mG*mG*mU*mC | 2.82 | 1.76 | 2.29 | 51.43 | 130 |
| [EGFR]1010 | mC*mU*mU*mG*mC*A*C*G*T*G*G*C*T*T*C*mG*mU*mC*mU*mC | 4.70 | 3.06 | 3.88 | 28.14 | 131 |
| [EGFR]1013 | mG*mU*mC*mC*mU*T*G*C*A*C*G*T*G*G*C*mU*mU*mC*mG*mU | 1.59 | 0.80 | 1.19 | 31.52 | 132 |
| [EGFR]1014 | mU*mG*mU*mC*mC*T*T*G*C*A*C*G*T*G*G*mC*mU*mU*mC*mG | 6.13 | 2.61 | 4.37 | 62.73 | 133 |
| [EGFR]1015 | mG*mU*mG*mU*mC*C*T*T*G*C*A*C*G*T*G*mG*mC*mU*mU*mC | 1.55 | 0.80 | 1.17 | 28.29 | 134 |
| [EGFR]1016 | mG*mG*mU*mG*mU*C*C*T*T*G*C*A*C*G*T*mG*mG*mC*mU*mU | 1.58 | 0.88 | 1.23 | 72.16 | 135 |
| [EGFR]1017 | mA*mG*mG*mU*mG*T*C*C*T*T*G*C*A*C*G*mU*mG*mG*mC*mU | 2.42 | 1.27 | 1.84 | 76.42 | 136 |
| [EGFR]1018 | mC*mA*mG*mG*mU*G*T*C*C*T*T*G*C*A*C*mG*mU*mG*mG*mC | 3.41 | 1.95 | 2.68 | 55.43 | 137 |
| [EGFR]1115 | mG*mG*mG*mA*mC*A*C*T*T*C*T*T*C*A*C*mG*mC*mA*mG*mG | 2.13 | 1.24 | 1.69 | 52.15 | 138 |
| [EGFR]1224 | mA*mA*mG*mG*mC*C*C*T*T*C*G*C*A*C*T*mU*mC*mU*mU*mA | 2.54 | 1.49 | 2.02 | 31.16 | 139 |
| [EGFR]1225 | mC*mA*mA*mG*mG*C*C*C*T*T*C*G*C*A*C*mU*mU*mC*mU*mU | 4.44 | 2.42 | 3.43 | 79.44 | 140 |
| [EGFR]1226 | mG*mC*mA*mA*mG*G*C*C*C*T*T*C*G*C*A*mC*mU*mU*mC*mU | 4.33 | 2.55 | 3.44 | 33.01 | 141 |
| [EGFR]2313 | mC*mA*mC*mU*mG*G*G*T*G*T*A*A*G*A*G*mG*mC*mU*mC*mC | 3.94 | 2.44 | 3.19 | 87.28 | 142 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
| --- | --- | --- | --- | --- | --- | --- |
| [EGFR]2790 | mC*mU*mG*mU*mG*A*T*C*T*T*G*A*C*A*T*mG*mC*mU*mG*mC | 5.24 | 3.44 | 4.34 | 53.32 | 143 |
| [EGFR]2859 | mU*mA*mG*mG*mC*A*C*T*T*T*G*C*C*T*C*mC*mU*mU*mC*mU | 5.45 | 2.29 | 3.87 | 58.92 | 144 |
| [EGFR]2874 | mA*mU*mG*mC*mC*A*T*C*C*A*C*T*T*G*A*mU*mA*mG*mG*mC | 2.49 | 1.16 | 1.83 | 29.28 | 145 |
| [EGFR]3263 | mA*mU*mC*mC*mA*C*C*A*C*G*T*C*G*T*C*mC*mA*mU*mG*mU | 1.79 | 1.06 | 1.42 | 34.71 | 146 |
| [EGFR]3266 | mG*mG*mC*mA*mU*C*C*A*C*C*A*C*G*T*C*mG*mU*mC*mC*mA | 1.53 | 0.85 | 1.19 | 34.94 | 147 |
| [EGFR]3267 | mC*mG*mG*mC*mA*T*C*C*A*C*C*A*C*G*T*mC*mG*mU*mC*mC | 2.97 | 1.33 | 2.15 | 56.74 | 148 |
| [EGFR]3268 | mU*mC*mG*mG*mC*A*T*C*C*A*C*C*A*C*G*mU*mC*mG*mU*mC | 2.37 | 1.39 | 1.88 | 53.73 | 149 |
| [EGFR]3274 | mU*mA*mC*mU*mC*G*T*C*G*G*C*A*T*C*C*mA*mC*mC*mA*mC | 2.71 | 1.08 | 1.90 | 70.15 | 150 |
| [EGFR]3275 | mG*mU*mA*mC*mU*C*G*T*C*G*G*C*A*T*C*mC*mA*mC*mC*mA | 2.11 | 1.25 | 1.68 | 31.46 | 151 |
| [EGFR]335 | mG*mU*mU*mA*mC*T*C*G*T*G*C*C*C*T*T*G*mG*mC*mA*mA*mA | 1.93 | 1.17 | 1.55 | 32.34 | 152 |
| [EGFR]3526 | mC*mU*mU*mU*mU*G*G*G*A*A*C*G*G*A*C*mU*mG*mG*mU*mU | 3.17 | 1.91 | 2.54 | 53.24 | 153 |
| [EGFR]3652 | mA*mC*mA*mG*mU*G*T*T*G*A*G*A*T*A*C*mU*mC*mG*mG*mG | 5.02 | 2.73 | 3.88 | 47.65 | 154 |
| [EGFR]3908 | mG*mG*mG*mU*mA*T*C*G*A*A*A*G*A*G*T*mC*mU*mG*mG*mA | 1.35 | 0.91 | 1.13 | 27.08 | 155 |
| [EGFR]4705 | mU*mG*mG*mG*mC*T*G*G*A*A*T*C*C*G*A*mG*mU*mU*mA*mU | 2.93 | 1.92 | 2.42 | 36.11 | 156 |
| [EGFR]4885 | mG*mG*mA*mG*mA*T*T*T*C*A*G*A*G*C*A*mG*mC*mU*mU*mC | 1.87 | 1.25 | 1.56 | 36.25 | 157 |
| [EGFR]5094 | mU*mU*mA*mC*mU*T*T*A*A*A*A*G*C*A*A*mA*mA*mG*mG*mA | 5.74 | 2.27 | 4.00 | 34.97 | 158 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [EGFR]5095 | mU*mG*mA*mA*mG*T* A*A*A*A*T*C*A*A* mU*mA*mG*mC*mG | 3.99 | 1.96 | 2.97 | 29.97 | 159 |
| [EGFR]5101 | mG*mU*mA*mA*mA*A* A*G*C*T*T*T*G*A*m A*mG*mU*mG*mA | 3.82 | 1.62 | 2.72 | 29.11 | 160 |
| [EGFR]5102 | mU*mU*mG*mA*mA*G* T*G*A*A*G*T*A*A*A* mA*mG*mG*mA*mG | 1.31 | 0.96 | 1.13 | 31.83 | 161 |
| [EGFR]5103 | mU*mU*mU*mU*mG*A* A*G*T*G*T*T*T*A*A*m U*mA*mU*mU*mC | 7.84 | 4.09 | 5.96 | 78.92 | 162 |
| [EGFR]5104 | mG*mU*mA*mA*mA*A* G*G*A*G*A*A*A*A*C* mU*mA*mU*mC*mU | 3.05 | 1.14 | 2.10 | 31.74 | 163 |
| [EGFR]5105 | mU*mU*mU*mG*mA*A* G*T*G*A*A*G*T*A*A* mA*mA*mG*mG*mA | 5.70 | 2.58 | 4.14 | 35.25 | 164 |
| [EGFR]5106 | mU*mU*mU*mA*mC*G* G*T*T*T*T*C*A*G*A*m A*mU*mA*mU*mC | 7.84 | 3.63 | 5.74 | 40.61 | 165 |
| [EGFR]5107 | mG*mA*mA*mG*mU*G* A*A*G*T*A*A*A*A*G* mG*mA*mG*mA*mA | 0.78 | 0.57 | 0.67 | 35.65 | 166 |
| [EGFR]5108 | mA*mA*mA*mA*mG*G* A*G*A*A*A*A*C*T*A* mU*mC*mU*mU*mC | 4.36 | 1.65 | 3.01 | 47.60 | 167 |
| [EGFR]5110 | mA*mA*mA*mA*mA*T* T*A*C*T*T*T*A*A*A*m A*mG*mC*mA*mA | 3.90 | 1.32 | 2.61 | 71.09 | 168 |
| [EGFR]5111 | mA*mG*mU*mA*mA*A* A*A*G*C*T*T*T*T*G*m A*mA*mG*mU*mG | 5.34 | 2.70 | 4.02 | 48.30 | 169 |
| [EGFR]5112 | mU*mU*mU*mU*mG*A* A*G*T*G*A*A*G*T*A* mA*mA*mA*mG*mG | 6.17 | 3.08 | 4.62 | 51.65 | 170 |
| [EGFR]5113 | mG*mU*mA*mG*mA*G* A*A*A*T*T*A*T*T*T*m U*mA*mG*mG*mA | 4.92 | 2.47 | 3.70 | 34.45 | 171 |
| [EGFR]5114 | mA*mA*mU*mU*mA*C* T*T*T*A*A*A*A*G*C*m A*mA*mA*mA*mG | 5.13 | 2.07 | 3.60 | 77.10 | 172 |
| [EGFR]5115 | mU*mG*mU*mA*mG*A* G*A*A*A*T*T*A*T*T*m U*mU*mA*mG*mG | 6.58 | 2.99 | 4.78 | 61.44 | 173 |
| [EGFR]5118 | mA*mU*mU*mA*mC*T* T*T*A*A*A*A*G*C*A* mA*mA*mA*mG*mG | 5.43 | 2.17 | 3.80 | 42.87 | 174 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [EGFR]5119 | mU*mU*mU*mU*mU*G*A*A*G*T*G*T*T*T*A*mA*mU*mA*mU*mU | 7.84 | 3.43 | 5.63 | 59.02 | 175 |
| [EGFR]5120 | mU*mA*mA*mA*mA*G*G*A*G*A*A*A*A*C*T*mA*mU*mC*mU*mU | 3.93 | 1.69 | 2.81 | 58.22 | 176 |
| [EGFR]5121 | mC*mU*mU*mU*mU*G*A*A*G*T*G*A*A*G*T*mA*mA*mA*mA*mG | 3.76 | 1.98 | 2.87 | 79.85 | 177 |
| [EGFR]727 | mA*mU*mG*mU*mC*C*C*G*C*C*A*C*T*G*G*mA*mU*mG*mC*mU | 1.58 | 0.84 | 1.21 | 71.68 | 178 |
| [LINC-PINT]101 | mU*mC*mC*mC*mA*T*C*C*C*T*T*C*T*G*C*mU*mG*mC*mC*mA | 10.88 | 3.95 | 17.01 | 43.08 | 179 |
| [LINC-PINT]102 | mG*mU*mC*mC*mC*A*T*C*C*C*T*T*C*T*G*mC*mU*mG*mC*mC | 5.07 | 1.37 | 17.73 | 22.47 | 180 |
| [LINC-PINT]103 | mG*mG*mU*mC*mC*C*A*T*C*C*C*T*T*C*T*mG*mC*mU*mG*mC | 1.87 | 1.28 | 16.85 | 20.75 | 181 |
| [LINC-PINT]106 | mU*mC*mU*mG*mG*T*C*C*C*A*T*C*C*C*T*mU*mC*mU*mG*mC | 5.25 | 3.36 | 16.79 | 29.42 | 182 |
| [LINC-PINT]108 | mU*mC*mU*mC*mU*G*G*T*C*C*C*A*T*C*C*mC*mU*mU*mC*mU | 11.42 | 5.44 | 33.24 | 78.25 | 183 |
| [LINC-PINT]109 | **mC*mU*mC*mU*mC*T*G*G*T*C*C*C*A*T*C*mC*mC*mU*mU*mC | 10.10 | 2.73 | 40.55 | 84.97 | 184** |
| [LINC-PINT]110 | mU*mC*mU*mC*mU*C*T*G*G*T*C*C*C*A*T*mC*mC*mC*mU*mU | 11.27 | 3.68 | 20.35 | 43.82 | 185 |
| [LINC-PINT]111 | mU*mU*mC*mU*mC*T*C*T*G*G*T*C*C*C*A*mU*mC*mC*mC*mU | 9.51 | 2.83 | 17.22 | 26.22 | 186 |
| [LINC-PINT]112 | mC*mU*mU*mC*mU*C*T*C*T*G*G*T*C*C*C*mA*mU*mC*mC*mC | 9.21 | 2.92 | 22.69 | 56.20 | 187 |
| [LINC-PINT]113 | mC*mC*mU*mU*mC*T*C*T*C*T*G*G*T*C*C*mC*mA*mU*mC*mC | 3.51 | 3.01 | 23.33 | 60.90 | 188 |
| [LINC-PINT]114 | mC*mC*mC*mU*mU*C*T*C*T*C*T*G*G*T*C*mC*mC*mA*mU*mC | 8.12 | 2.60 | 18.76 | 49.59 | 189 |
| [LINC-PINT]115 | mA*mC*mC*mC*mU*T*C*T*C*T*C*T*G*G*T*mC*mC*mC*mA*mU | 7.57 | 2.55 | 18.30 | 43.37 | 190 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8-500 nM | TLR8-100 nM | TLR7-500 nM | TLR7-100 nM | SEQ ID NO. |
|---|---|---|---|---|---|---|
| [LINC-PINT]116 | mC*mA*mC*mC*mC*T* T*C*T*C*T*C*T*G*G*m U*mC*mC*mC*mA | <u>5.97</u> | <u>1.85</u> | <u>27.63</u> | <u>73.30</u> | <u>191</u> |
| [LINC-PINT]1222 | mU*mU*mA*mG*mC*T* C*C*T*T*G*C*C*T*C*m G*mU*mU*mC*mC | 8.41 | 3.43 | 19.40 | 31.67 | 192 |
| [LINC-PINT]126 | mG*mU*mC*mU*mC*C* T*C*C*A*C*A*C*C*C*m U*mU*mC*mU*mC | 7.17 | 1.98 | 18.29 | 25.01 | 193 |
| [LINC-PINT]127 | mG*mG*mU*mC*mU*C* C*T*C*A*C*A*C*C*m C*mU*mU*mC*mU | 3.72 | 1.29 | 19.32 | 23.66 | 194 |
| [LINC-PINT]128 | mG*mG*mG*mU*mC*T* C*C*T*C*A*C*A*C*m C*mC*mU*mU*mC | 1.23 | 0.87 | 18.20 | 21.47 | 195 |
| [LINC-PINT]1284 | mU*mC*mC*mC*mA*A* C*T*C*T*T*C*T*A*A*m C*mU*mC*mG*mU | 13.35 | 3.70 | 19.85 | 40.79 | 196 |
| [LINC-PINT]1315 | mG*mC*mA*mA*mG*G* C*A*G*A*G*A*A*A*C* mU*mC*mC*mA*mG | 2.69 | 1.45 | 17.16 | 19.99 | 197 |
| [LINC-PINT]148.1 | mA*mA*mA*mU*mG*T* C*C*T*G*G*C*C*C*T*m C*mA*mC*mU*mG | 1.56 | 1.45 | 15.38 | 46.45 | 198 |
| [LINC-PINT]1497.1 | mG*mA*mU*mG*mG*T* T*C*C*A*G*T*C*C*C*m U*mC*mU*mU*mC | 1.01 | 0.84 | 15.35 | 22.32 | 199 |
| [LINC-PINT]2504 | **mC*mC*mU*mA*mU*T* A*A*A*A*A*A*T*T* mU*mA*mU*mA*mC | 6.09 | 2.19 | 76.27 | 108.68** | 200 |
| [LINC-PINT]2524 | **mU*mA*mU*mU*mC*A *T*A*T*T*T*T*A*T* mU*mU*mC*mA*mG | 10.13 | 4.47 | 45.95 | 87.12** | 201 |
| [LINC-PINT]2527 | mU*mG*mC*mU*mA*T* T*C*A*T*A*T*T*T*T*m U*mA*mU*mU*mU | 9.02 | 3.01 | 18.42 | 42.38 | 202 |
| [LINC-PINT]2673.1 | mU*mU*mG*mG*mC*C* T*G*T*G*G*A*T*G*C*m U*mU*mU*mG*mU | 0.94 | 0.75 | 13.85 | 21.43 | 203 |
| [LINC-PINT]2690 | mU*mU*mU*mG*mA*A* A*T*T*C*A*G*A*A*G* mA*mU*mU*mU*mG | 4.93 | 2.57 | 20.33 | 35.07 | 204 |
| [LINC-PINT]2754 | mU*mU*mU*mA*mU*A* T*T*A*C*A*A*A*G*C*m U*mA*mC*mU*mU | 6.45 | 2.71 | 16.54 | 33.70 | 205 |
| [LINC-PINT]2755 | mC*mU*mU*mU*mA*T* A*T*T*A*C*A*A*A*G* mC*mU*mA*mC*mU | 6.37 | 2.11 | 22.54 | 54.83 | 206 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 μg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8- 500 nM | TLR8- 100 nM | TLR7- 500 nM | TLR7- 100 nM | SEQ ID NO. |
|---|---|---|---|---|---|---|
| [LINC-PINT]2811 | mA*mA*mA*mA*mG*T*G*G*G*A*A*A*T*A*A*mA*mG*mG*mU*mU | 2.33 | 1.48 | 14.66 | 30.90 | 207 |
| [LINC-PINT]2812 | mA*mA*mA*mA*mA*G*T*G*G*G*A*A*A*T*A*mA*mA*mG*mG*mU | 1.83 | 1.34 | 15.63 | 28.76 | 208 |
| [LINC-PINT]283.1 | mU*mG*mA*mU*mG*A*T*G*C*T*T*G*C*A*G*mG*mA*mG*mG*mC | 1.57 | 1.18 | 16.66 | 25.50 | 209 |
| [LINC-PINT]2990 | mC*mA*mC*mU*mG*T*A*T*T*T*T*A*T*T*A*mC*mA*mG*mA*mA | 4.86 | 2.67 | 18.87 | 58.13 | 210 |
| [LINC-PINT]3011 | mA*mG*mU*mU*mU*A*T*A*G*A*T*T*C*A*mA*mG*mU*mA*mG | 5.28 | 3.06 | 17.44 | 37.64 | 211 |
| [LINC-PINT]384 | mU*mG*mA*mC*mA*A*A*A*C*A*A*T*A*A*T*mA*mA*mC*mA*mG | 2.57 | 1.31 | 18.59 | 36.68 | 212 |
| [LINC-PINT]412 | mG*mU*mU*mC*mA*G*T*C*A*G*A*T*C*G*C*mU*mG*mG*mG*mA | 1.70 | 1.55 | 16.42 | 17.46 | 213 |
| [LINC-PINT]450 | mA*mA*mA*mG*mU*C*A*A*A*A*G*A*A*A*mA*mA*mC*mU*mG | 2.72 | 1.62 | 18.78 | 45.57 | 214 |
| [LINC-PINT]501 | mU*mG*mU*mU*mU*C*C*C*C*G*G*A*G*A*G*mC*mA*mA*mU*mG | 2.04 | 1.62 | 15.46 | 30.90 | 215 |
| [LINC-PINT]523 | mU*mG*mA*mC*mA*T*T*T*C*G*T*G*G*C*T*mC*mC*mU*mA*mC | 4.34 | 1.73 | 15.98 | 33.56 | 216 |
| [LINC-PINT]524.1 | mA*mU*mG*mA*mC*A*T*T*T*C*G*T*G*G*C*mU*mC*mC*mU*mA | 1.20 | 0.88 | 17.18 | 32.53 | 217 |
| [LINC-PINT]587 | mA*mG*mC*mC*mG*A*A*C*A*G*A*A*G*G*A*mG*mC*mG*mU*mC | 3.73 | 2.54 | 17.17 | 27.70 | 218 |
| [LINC-PINT]727.1 | mG*mU*mC*mC*mG*T*A*C*C*T*C*C*A*C*C*mC*mA*mC*mC*mG | 3.70 | 1.70 | 15.34 | 22.79 | 219 |
| [LINC-PINT]83.1 | mC*mA*mA*mG*mC*C*C*C*A*G*C*G*T*T*C*mC*mU*mC*mC*mG | 4.44 | 2.74 | 23.97 | 45.20 | 220 |
| [LINC-PINT]877 | mC*mC*mC*mU*mA*A*T*G*C*T*T*T*C*C*T*mC*mU*mC*mC*mA | 8.39 | 2.70 | 32.41 | 58.39 | 221 |
| [LINC-PINT]935 | mG*mC*mG*mU*mA*G*T*T*T*C*T*C*T*T*C*mC*mU*mC*mC*mC | 4.12 | 1.86 | 18.79 | 27.23 | 222 |

TABLE 2-continued

196 ASO screen data. The targeted gene names are provided in brackets (e.g. [EGFR]). ASOs were synthesised with the following modifications: UPPERCASE alone for DNA, 'm' indicates 2'OMe base modifications, and * denotes the phosphorothioate backbone. Averaged NF-κB- Luciferase data from each screen at indicated ASO concentration is given (using 1 µg/ml R848 co-stimulation). Underlined sequences from the PINT family were studied further in FIG. 3B and 3F. Sequences in black bold were used as 17 low TLR7 inhibitors and analysed with MEME for motif enrichment (along with [cGAS]ASO8 and ASO11) shown in FIG. 3A.

| [Transcript Name] and Reference | Sequence | TLR8-500 nM | TLR8-100 nM | TLR7-500 nM | TLR7-100 nM | SEQ ID NO. |
|---|---|---|---|---|---|---|
| [LINC-PINT]937.1 | mU*mG*mG*mC*mG*T*A*G*T*T*T*C*T*C*T*mU*mC*mC*mU*mC | 4.25 | 2.48 | 15.25 | 32.81 | 223 |
| [LINC-PINT]94 | **mC*mC*mU*mU*mC*T*G*C*T*G*C*C*A*A*G*mC*mC*mC*mC*mA** | 3.71 | 1.45 | 33.74 | 85.57 | 224 |
| [LINC-PINT]98 | mC*mA*mU*mC*mC*C*T*T*C*T*G*C*T*G*C*mC*mA*mA*mG*mC | 8.23 | 2.95 | 24.38 | 54.34 | 225 |
| [LINC-PINT]99 | mC*mC*mA*mU*mC*C*C*T*T*C*T*G*C*T*G*mC*mC*mA*mA*mG | 5.67 | 2.38 | 17.14 | 52.57 | 226 |
| R848 only | | 1.00 | 1.00 | 100.00 | 100.00 | |
| NT | | 0.20 | 0.07 | 13.17 | 26.54 | |

Example 4: TLR7 Inhibition by 2'OMe ASOs can be Reverted by CUU Terminal Motifs

MEME motif discovery analysis (Bailey and Elkan, 1994) of 19 ASOs with lowest TLR7 inhibitory activity based on the above screens led to the observation that the 2'OMe regions of the ASOs exhibiting terminal 5' and 3' "C" bases were over-represented in 8 sequences, along with uridine residues (FIG. 3A, Table 2). In addition, analysis of a family of sequences from the screen (referred to as the PINT family) with single base increments suggested different inhibitory activity on TLR7 for closely related sequences (FIG. 3B, 3C and Table 2—from ASO '[LINC-PINT]-108' to [LINC-PINT]-116', referred to as ASO108-ASO116).

Validation of the PINT family of ASOs in HEK293-TLR7 cells confirmed that ASO111 only was capable of blocking TLR7 activation by R848 in this family (FIGS. 3B, 3C). Critically, sequence alignment analyses revealed that ASO111 was the only sequence lacking a CUU/CUT/CTT motif in its 5' or 3' end regions (FIG. 3C). Since [cGAS] ASO11 also harboured such terminal 2'OMe CUU motifs in both its 5' and 3'-ends (along with 4 other sequences harbouring the enriched motif in FIG. 3A), the inventors next tested [cGAS] ASO11 variants (ASO11-Mut1 and ASO11-Mut2) in which the 5' and 3' end 2'OMe regions were swapped with these of ASO2, which lacked such "CUU" motifs and was a potent repressor of TLR7 (FIGS. 3D, 3E). Aligning with a key role for both the 5' and 3' end regions, both ASO11 mutants significantly increased TLR7 inhibition compared to the parental ASO11 (FIGS. 3D, 3E). These findings collectively indicated that 5' and 3' CUU motifs were important modulators of TLR7 inhibition by the 2'OMe-PS ASOs.

Example 5: TLR8 Potentiation is Driven by the Central DNA Region and the 5' End of 2'OMe PS ASOs The inventors also analysed the PINT family (ASO108-116) and [cGAS] ASO11 mutants for TLR8 potentiation. While two sequences were more potent (e.g. ASO108 and ASO110), most of the sequences displayed similar TLR8 potentiation, suggesting that the central region of these molecules was predominantly involved in TLR8 modulation (FIGS. 3C, 3F). Similarly, the ASO11 mutations only mildly impacted TLR8 potentiation, although addition of the ASO2 3' end (ASO11-Mut1) significantly decreased, while the ASO2 5' end (ASO11-Mut2) significantly increased TLR8 sensing (FIGS. 3D, 3G). These results indicated that the control of TLR8 potentiation by 2'OMe-PS ASO was predominantly governed by the central 10-mer DNA region of the ASO, but that the 2'OMe ends also played a role.

In further support of a contribution for the 5'-end region of the ASOs, the inventors noticed that most of the top 20 potentiators of TLR8 sensing in our screen had a terminal 5'-U (14 out of 20), while occurrence of such terminal 5'-U was much less frequent among the bottom 20 potentiators (3 out of 20) (Table 2). Analyses of TLR8 potentiation on the 192 ASOs comparing sequences with or without terminal 5'-U confirmed a significantly increased potentiation of TLR8 sensing for sequences harbouring a terminal 5'-U (FIG. 3H and Table 2). A similar trend was observed considering terminal 5'-UC motifs (present in 9/20 of the top ASOs-FIG. 3I and Table 2). Critically, ASO108 and ASO110 were the only two ASOs from the PINT family to harbour such terminal 5'-UC motif, also present in ASO2 and ASO11-Mut2.

The inventors also noted that the central 10-mer DNA region of the TLR8 potentiating ASO852 contained a central T-rich region (TTTCTGTGGT, SEQ ID NO: 487), while that of ASO2504 was A-rich (TAAAAAAATT; SEQ ID NO: 488). Comparison of the central DNA regions of the top and bottom 20 potentiators of TLR8 sensing confirmed a significant increased proportion of thymidine residues in the ASOs potentiating TLR8 sensing the most—with a median of 4 central thymidines (FIG. 3J and Table 2). Since this was directly aligned with previous reports that T-rich regions were important for TLR8 potentiation (Gorden et al., 2006; Jurk et al., 2006), the inventors mutated ASO852 to ASO852-dT, containing a central stretch of 10 dTs (FIG. 3K). In addition, the inventors swapped the central 10-mer DNA region of ASO2504 with that of ASO852 to result in ASO2504-Mut (FIG. 3K), since ASO2504 did not potentiate TLR8 as much as ASO852. Comparison of the activities of these oligonucleotides on R848 sensing was performed in THP-1 cells, HEK-TLR7 and HEK-TLR8 cells (FIGS. 3L, 3M, 8A, 8B and 8D). The 2504-Mut ASO was significantly more potent in driving IP-10 production in THP-1 cells and NF-κB luciferase in HEK-TLR8 cells, an observation in support of a critical role for the central T-rich 10-mer DNA region of the ASOs in their effects on TLR8. In addition, ASO852-dT was also more potent at inducing IP-10 than ASO852, reaching similar levels of stimulation to those obtained with a 20-mer dT PS oligonucleotide (dT20) in THP-1 cells. Conversely, substitutions of the central regions for ASO852-dT and ASO2504-Mut did not significantly impact TLR7 sensing of R848, while dT20 blocked TLR7 activation. None of these ASOs used alone in HEK-TLR7, HEK-TLR8 or THP-1 cells impacted NF-κB luciferase in HEK cells and IP-10 production in THP-1 (FIGS. 8A, 8B, 8D). However, increasing the central T-rich region of ASO852 potentiated further its basal activity on TLR9-driven NF-κB luciferase-aligning with the observation that dT20 alone also acted as a mild TLR9 ligand in HEK-TLR9 cells (FIG. 8C).

Example 6: TLR8 Potentiation of R848 by ASOs Leads to IRF Activation

The capacity of ASO852-dT to strongly potentiate IP-10 production upon R848 sensing was confirmed in two other TLR8 expressing AML cell lines (MOLM13 and OCI-AML3; FIG. 4A), and was readily observable with as little as 4 to 20 nM ASO852-dT (FIG. 4B). Given the high production of IP-10 seen, suggestive of IRF activation, the inventors tested the activity of the ASO852-dT series in HEKTLR8 cells expressing CCL5-Luciferase or IFN-β-Luciferase reporters, which are driven by IRFs (Chow et al., 2018; Schafer et al., 1998). While R848 alone did not activate either reporters, co-stimulation with the oligonucleotides potentiated both promoters, with ASO852-dT and dT20 being the most potent, followed by ASO852/2504-Mut, and ASO2504 being the least potent (FIG. 4C); this finding thus mirrors the results obtained with IP-10 production in THP-1 cells (FIG. 3L).

To further support induction of an IRF-driven response, the inventors carried out RT-qPCR analyses of several IRF-driven genes including IFNB1, at 4 h after R848 stimulation of THP-1 cells. While little induction of IFIT1, RSAD2, IFI44 and IFNB1 was seen with R848 only, all these genes were significantly increased by co-stimulation with ASO852-dT (FIG. 4D). The inventors had observed that ASO co-stimulation strongly increased the sensitivity of TLR8 to R848 in HEK-TLR8 cells (FIG. 2D), suggesting that the effect seen on IFN-β induction may be due to increased sensitivity of TLR8 to R848. IFN-β-Luciferase reporter dose-responses to R848 (ranging from 1 to 15 µg/ml) in HEK-TLR8 cells demonstrated that high doses of R848 engaged the IFN-β response in these cells to a similar extent as with low dose R848+ASO852-dT.

Collectively these results suggested that ASO such as ASO852-dT facilitated activation of IRF-driven response otherwise only achievable with very high doses of R848.

Example 7: Identification of Gene-Targeting ASOs Potentiating TLR8 Sensing

The inventors next sought to establish proof-of-principle that bi-functional ASOs combining gene-targeting and TLR8 potentiation (while avoiding TLR7 inhibition) could be achieved. For this purpose, the inventors tested a panel of 48 2'OMe ASOs designed against the mRNA of the human HPRT gene.

Preliminary studies in Hela cells suggested that 29 out of the 48 ASOs significantly reduced HPRT mRNA levels by at least 50% at 10 nM (FIG. 6 and Table 3). The inventors therefore focused on this sub-panel of 29 sequences for the following experiments comparing gene-targeting, TLR7 inhibition and TLR8 potentiation of R848 sensing (FIGS. 5A, 5B and 5C, respectively). In agreement with the previous findings, these experiments confirmed that most ASOs blocked TLR7 activation by R848, with the notable exceptions of [HPRT] ASO551, ASO660-663 and ASO665 ASOs (FIG. 5B). Critically, each of these sequences harboured at least one CUU/CUT motifs in their 5' or 3' end, further suggesting an important role for these motifs in the retention of TLR7 sensing (FIG. 5D). Interestingly, both ASO551 and ASO662 ASOs harboured one 5'-CUU and one 3'-UUC motif, but ASO551 ASO was the only ASO entirely preserving TLR7 sensing. Since the position of these 5'-CUU and 3'-UUC motifs varied between both ASOs, optimal positioning of the CUU motif may be in the terminal 5'-end of the ASOs, indicating that terminal 3'-end UUC motifs may also be important. At this point, the inventors note again that [LINC-PINTJASO109 and [cGAS] ASO8 also had such terminal 3'-UUC motifs. These data align with the MEME motif that showed terminal 5' and 3' Cs were prevalent in non-inhibitory sequences (FIG. 3A).

TABLE 3

HPRT-targeting ASO sequences. ASOs were synthesised with the following modifications: UPPERCASE alone for DNA, 'm' indicates 2'OMe base modifications, and * denotes the phosphorothioate backbone. The 29 sequences used in FIG. 5 are in bold.

| [Transcript Name] and Reference | Sequence | SEQ ID NO. |
|---|---|---|
| [HPRT]1027 | mAmA*mUmC*mC*G*C*C*C*A*A*A*G*G*G*mA*mA*mC*mU*mG | 227 |

TABLE 3-continued

HPRT-targeting ASO sequences. ASOs were synthesised with the following modifications: UPPERCASE alone for DNA, 'm' indicates 2'OMe base modifications, and * denotes the phosphorothioate backbone. The 29 sequences used in FIG. 5 are in bold.

| [Transcript Name] and Reference | Sequence | SEQ ID NO. |
|---|---|---|
| [HPRT]1353 | mG*mC*mU*mG*mA*C*A*A*G*A*T*T*C*A*mC*mU*mG*mG*mU | 228 |
| [HPRT]292 | mA*mC*mG*mU*mU*C*A*G*T*C*C*T*G*T*C*mC*mA*mU*mA*mA | 229 |
| [HPRT]294 | mA*mG*mA*mC*mG*T*T*C*A*G*T*C*C*T*G*mU*mC*mC*mA*mU | 230 |
| [HPRT]326 | mG*mG*mC*mC*mU*C*C*C*A*T*C*T*C*C*T*mU*mC*mA*mU*mC | 231 |
| [HPRT]329 | mG*mA*mU*mG*mG*C*C*T*C*C*C*A*T*C*T*mC*mC*mU*mU*mC | 232 |
| [HPRT]330 | mUmG*mA*mU*mG*G*C*C*T*C*C*C*A*T*C*mU*mC*mC*mU*mU | 233 |
| [HPRT]331 | mG*mU*mG*mA*mU*G*G*C*C*T*C*C*C*A*T*mC*mU*mC*mC*mU | 234 |
| [HPRT]332 | mU*mG*mU*mG*mA*T*G*C*C*T*C*C*C*A*mU*mC*mU*mC*mC | 235 |
| [HPRT]333 | mA*mU*mG*mU*mG*A*T*G*C*C*T*C*C*C*mA*mU*mC*mU*mC | 236 |
| [HPRT]334 | mA*mA*mU*mG*mU*G*A*T*G*G*C*C*T*C*C*mC*mA*mU*mC*mU | 237 |
| [HPRT]335 | mC*mA*mA*mU*mG*T*G*A*T*G*G*C*C*T*C*mC*mC*mA*mU*mC | 238 |
| [HPRT]388 | mA*mU*mC*mC*mA*G*C*A*G*G*T*C*A*G*C*mA*mA*mA*mG*mA | 239 |
| [HPRT]475 | mC*mU*mG*mG*mU*C*A*T*T*A*C*A*A*T*A*mG*mC*mU*mC*mU | 240 |
| [HPRT]489 | mA*mU*mG*mU*mC*C*C*C*T*G*T*T*G*A*C*mU*mG*mG*mU*mC | 241 |
| [HPRT]551 | mC*mU*mU*mC*mC*A*C*A*A*T*C*A*A*G*A*mC*mA*mU*mU*mC | 242 |
| [HPRT]660 | mC*mU*mU*mC*mG*T*G*G*G*G*T*C*C*T*T*mU*mU*mC*mA*mC | 243 |
| [HPRT]661 | mA*mC*mU*mU*mC*G*T*G*G*G*G*T*C*C*T*mU*mU*mU*mC*mA | 244 |
| [HPRT]662 | mC*mA*mC*mU*mU*C*G*T*G*G*G*G*T*C*C*mU*mU*mU*mU*mC | 245 |
| [HPRT]663 | mA*mC*mA*mC*mU*T*C*G*T*G*G*G*G*T*C*mC*mU*mU*mU*mU | 246 |
| [HPRT]664 | mA*mA*mC*mA*mC*T*T*C*G*T*G*G*G*G*T*mC*mC*mU*mU*mU | 247 |
| [HPRT]665 | mC*mA*mA*mC*mA*C*T*T*C*G*T*G*G*G*G*mU*mC*mC*mU*mU | 248 |
| [HPRT]666 | mC*mC*mA*mA*mC*A*C*T*T*C*G*T*G*G*G*mG*mU*mC*mC*mU | 249 |
| [HPRT]667 | mU*mC*mC*mA*mA*C*A*C*T*T*C*G*T*G*G*mG*mG*mU*mC*mC | 250 |

TABLE 3-continued

HPRT-targeting ASO sequences. ASOs were synthesised with the following modifications: UPPERCASE alone for DNA, 'm' indicates 2'OMe base modifications, and * denotes the phosphorothioate backbone. The 29 sequences used in FIG. 5 are in bold.

| [Transcript Name] and Reference | Sequence | SEQ ID NO. |
|---|---|---|
| [HPRT]668 | mA*mU*mC*mC*mA*A*C*A*C*T*T*C*G*T*mG*mG*mG*mU*mC | 251 |
| [HPRT]669 | mU*mA*mU*mC*mC*A*A*C*A*C*T*T*C*G*T*mG*mG*mG*mU | 252 |
| [HPRT]692 | mC*mA*mA*mA*mU*C*C*A*A*C*A*A*G*T*mC*mU*mG*mG*mC | 253 |
| [HPRT]732 | mU*mA*mG*mU*mC*A*A*G*G*C*A*T*A*T*mC*mC*mU*mA*mC | 254 |
| [HPRT]847 | mA*mU*mA*mG*mG*A*C*T*C*C*A*G*A*T*G*mU*mU*mU*mC*mC | 255 |
| [HPRT]950 | mC*mU*mA*mA*mA*G*T*A*C*A*A*A*C*A*mG*mA*mU*mA*mA | 256 |
| [HPRT]1292 | mA*mA*mC*mA*mC*T*A*C*T*A*A*A*A*T*A*mA*mU*mU*mC*mC | 257 |
| [HPRT]1335 | mG*mU*mA*mA*mU*A*A*T*T*T*G*A*A*C*A*mA*mG*mU*mU*mG | 258 |
| [HPRT]1126 | mC*mU*mA*mA*mU*A*T*A*T*C*T*T*C*T*C*mU*mU*mU*mA*mU | 259 |
| [HPRT]1123 | mA*mU*mA*mU*mA*T*C*T*T*C*T*C*T*T*T*mA*mU*mU*mU*mC | 260 |
| [HPRT]225 | mU*mU*mA*mG*mG*T*A*T*G*C*A*A*A*A*T*mA*mA*mA*mU*mC | 261 |
| [HPRT]1121 | mA*mU*mA*mU*mC*T*T*C*T*C*T*T*T*A*T*mU*mU*mC*mU*mU | 262 |
| [HPRT]1194 | mU*mA*mA*mU*mU*A*A*C*A*A*T*A*T*T*C*mA*mA*mU*mC*mA | 263 |
| [HPRT]939 | mA*mA*mC*mA*mG*A*T*A*A*A*A*T*T*C*T*mU*mA*mG*mA*mA | 264 |
| [HPRT]944 | mU*mA*mC*mA*mA*A*C*A*G*A*T*A*A*A*mA*mU*mU*mC*mU | 265 |
| [HPRT]1244 | mU*mC*mU*mU*mU*G*A*T*G*T*G*A*A*A*A*mU*mU*mG*mA*mC | 266 |
| [HPRT]1133 | mU*mA*mA*mA*mA*A*A*C*T*A*A*T*A*T*A*mU*mC*mU*mU*mC | 267 |
| [HPRT]938 | mA*mC*mA*mG*mA*T*A*A*A*A*T*T*C*T*T*mA*mG*mA*mA*mG | 268 |
| [HPRT]934 | mA*mU*mA*mA*mA*A*T*T*C*T*T*A*G*A*A*mG*mA*mU*mA*mC | 269 |
| [HPRT]1135 | mA*mU*mU*mA*mA*A*A*A*C*T*A*A*T*A*mU*mA*mU*mC*mU | 270 |
| [HPRT]1124 | mA*mA*mU*mA*mU*A*T*C*T*T*T*C*T*C*T*T*mU*mA*mU*mU*mU | 271 |
| [HPRT]1134 | mU*mU*mA*mA*mA*A*A*C*T*A*A*T*A*T*mA*mU*mC*mU*mU | 272 |
| [HPRT]1195 | mA*mU*mA*mA*mU*T*A*A*C*A*A*T*A*T*T*mC*mA*mA*mU*mC | 273 |

In addition, most ASOs significantly potentiated TLR8 sensing to varying degrees, with the exception of 4 HPRT ASOs (ASO329, ASO321, ASO333, ASO666) (FIG. 5C). Based on these analyses, the inventors selected ASO662 as an ASO with good HPRT targeting (>70% at 10 nM), retaining TLR7 activity (~80%), and potentiating TLR8 sensing of R848 ~5 fold. In addition, the inventors selected ASO847 as an ASO with high gene targeting activity (>93%), strong TLR7 inhibition and TLR8 potentiating activity close to that of ASO662. The two ASOs were transfected in THP-1 cells and led to significant HPRT downregulation, which was more pronounced for ASO847-aligning with the data from HeLa cells (FIGS. 5A and 5E). In addition, following the same transfection protocol, ASO662 strongly potentiated IP-10 production induced by R848 (to a similar level as with the control dT20 oligonucleotide) (FIG. 5F). Unexpectedly, ASO847 failed to increase IP-10 production following R848 co-stimulation, which may be attributed to its inhibitory effect on TLR7, which is also functional in THP-1 cells (Gantier et al., 2008).

Example 8: TLR8 Potentiation-Modulation by 5'End Motifs

It has been previously observed that 2'OMe ASOs could potentiate TLR8 sensing of R848 through the sensing of the central 10 DNA bases, and that "T" rich regions were better potentiators (as seen with ASO-852 and its variant ASO-852dT) (FIG. 3—Alharbi et al., 2020).

In addition, the inventors showed that changing the 5'end 2'OMe region of ASO11, to include the 5'UCCGG region of ASO2, led to a significant increase in TLR8 potentiation (FIG. 3—Alharbi et al., 2020). Comparison of TLR8 potentiation of ASOs terminating with a 5'U or 5'UC motif indicated, based on 192 ASOs, that 5'U or 5'UC ASOs were significantly stronger TLR8 potentiators (Alharbi et al., 2020).

ASO2-Mut2), did not influence TLR8 potentiation. This indicates that the strategy of 5'end modification, while able to confer TLR8 potentiation of 2'OMe ASOs, is not compatible with gapmer LNA ASOs. The inventors attribute this to the LNA modification potentially altering processing of the 5'end by a nuclease (see below-section on LNA ASO potentiation of TLR8) (FIG. 9).

TABLE 4

Various oligonucleotides used in the below examples (all in 5'-3'). UPPERCASE alone for DNA, 'm' indicates 2'OMe base, '/12MOEr' indicates 2'MOE base, '+' indicates LNA base, and * denotes the phosphorothioate backbone.

| Name | Sequence | SEQ ID NO. |
|---|---|---|
| ASO1-UC | mU*mC*mA*mU*mG*mG*mC*C*T*T*T*C*C*G*T*G*C*mC*mA*mA*mG*mG | 274 |
| ASO2 LNA | +C*+G*+G*C*C*T*C*G*G*A*A*G*C*+T*+C*+T | 275 |
| ASO2-LNA Mut1 | mU*mC*+C*+G*+G*C*C*T*C*G*G*A*A*G*C*+T*+C*+T | 276 |
| ASO2-LNA Mut2 | mC*mU*mU*+C*+G*+G*C*C*T*C*G*G*A*A*G*C*+T*+C*+T*mU*mU*mC | 277 |
| ASO 660 | mC*mU*mU*mC*mG*T*G*G*G*G*T*C*C*T*T*mU*mU*mC*mA*mC | 278 |
| ASO 660-Mut | mG*mA*mA*mC*mG*T*G*G*G*G*T*C*C*T*T*mU*mU*mC*mA*mC | 279 |
| C2Mut-1 | mG*mC*mG*mG*mU*A*T*C*C*A*T*G*T*C*C*mC*mA*mG*mG*mC | 280 |
| C2Mut1-PS | G*C*G*G*T*A*T*C*C*A*T*G*T*C*C*C*A*G*G*C | 281 |
| C2Mut1-2OMe | mG*mC*mG*mG*mU*mA*mU*mC*mC*mA*mU*mG*mU*mC*mC*mC*mA*mG*mG*mC | 282 |

To directly implicate the role of 5'U/UC in the modulation of TLR8 sensing, the inventors next tested the effect of adding a terminal 2'OMe UC motif to an otherwise non-TLR8 potentiating ASOs. The first molecule the inventors tested was ASO1-UC, which is a 22 nt molecule with appended 5'UC motif (with 7 2'OMe bases on the 5' end). While ASO1 did not potentiate TLR8 in HEKTLR8 or THP-1 cells, its 5'end variant significantly promoted TLR8 potentiation in both models (FIG. 9). This is proof of principle that addition of a 5' end UC motif could be used as a strategy to confer TLR8 potentiation to an otherwise non-potentiating 2'OMe gapmer ASOs.

The inventors also tested the effect of 5'end modification of ASO HPRT-660, which the inventors previously found was a strong potentiator of TLR8 (FIG. 5—Alharbi et al., 2020). The native sequence of ASO 660 contains a 5'CUU region, which the inventors mutated to a 5'GAA region (giving ASO 660-Mut). This mutation entirely ablated TLR8 potentiation in HEK-TLR8 and THP-1 cells, confirming the importance of 5'end uridine residues in the potentiation of TLR8 by 2'OMe ASOs (FIG. 9).

To further these results, the inventors tested the effect of the same strategy on ASO2 LNA, which the inventors previously found did not potentiate TLR8 (FIG. 1—Alharbi et al., 2020). In this sequence context, addition of the 5'end 2'OMe UC motif (resulting in LNA ASO2-Mut1), failed to promote TLR8 potentiation. Similarly, 5' and 3' extension of ASO2 with 5'CUU and 3'UUC 2'OMe motifs (giving LNA Example 9: TLR8 Potentiation is not Limited to R848-Like Molecules Previous reports have demonstrated that R848-dependent activation of TLR8 is reliant on its binding to a site where uridine is normally binding (Tanji et al., 2015) (referred to as site 1). On the other hand, degradation products of uridine-containing RNAs are binding to a second site of the TLR8 dimer (site 2), generally as short di-nucleotides (e.g. UG or UUG or CG) (Tanji et al., 2015).

Uridine residues in the short RNAs binding to site 2 are not essential for TLR8 activation by uridine/R848 binding to site 1 as sensing of TLR8 by PS-ssRNA41 (lacking uridine) along with the TLR13 ligand Sa19 (with a single uridine residue) was potentiated with uridine (Shibata et al., 2016). Interestingly, PS-polyA, polyC or polyG failed to potentiate TLR8 sensing of uridine-aligning with the structural data and rather suggesting binding to selective RNA motifs (Shibata et al., 2016).

Speculating that the present 2'OMe ASOs (or their degradation products) potentiated R848 sensing by binding to site 2 of TLR8, the inventors next tested whether 2'OMe ASOs could potentiate TLR8 sensing of free uridine. In agreement with this, the inventors observed a sequence-specific TLR8 potentiation of uridine sensing with select 2'OMe (ASO 660, 852dT) and dT20, in HEK-TLR8 (with NF-κB-luciferase) and THP-1 cells (with IP-10) (FIG. 10). However, the 5'end mutant of ASO 660 failed to potentiate TLR8 sensing-mirroring the effects seen with R848, and confirming the sequence-dependent effect of ASOs.

The inventors have previously shown that ASO potentiation of R848 sensing resulted in increased IRF activation (presumably IRF5 through TASL recruitment). In agreement with this, ASO-potentiation of uridine sensing by TLR8 resulted in RANTES-luciferase induction (in a sequence-specific manner-compare ASO 660 and ASO 660-Mut) (FIG. 10).

Collectively these results confirm that TLR8 potentiation by 2'OMe ASOs is not limited to synthetic imidazoquinoline compounds and is also visible with natural uridine (which binds to site 1 of TLR8).

Importantly, since the effect of ASO 660 on R848 and uridine potentiation is entirely ablated by the substitution of its 5' CUU motif with a GAA motif in ASO 660 Mut, the present results suggest that the short di-nucleotide required to potentiate TLR8 needs to originate from the 5'end of this ASO (with a similar finding for ASO1 and ASO1-UC). The importance of the CUU seen for potentiation in ASO 660 does not appear to be consistent with a role for RNase T2, which preferentially cleaved GU or AU motifs in ssRNAs (on both PS and phosphodiester backbone) (Greulich et al., 2019). Critically, the CUU motif in ASO 660 is in a 5' mCmUmU/mCmG context (all 2'OMe).

LNA ASO2 Mut2 also contains a 5' mCmUmU/+C+G context (where+is an LNA base). Since this does not result in TLR8 potentiation, the inventors speculate that the endonuclease necessary to release the CUU fragment is not effective in the context of an LNA base-noting that if the cleavage was operating at the 5' mCmU/mU position, there would not be a difference of TLR8 potentiation between the LNA ASO2 Mut2 and ASO 660, which both have this sequence.

Example 10: TLR8 Potentiation by LNA and 2MOE Gapmer ASOs

The inventors previously demonstrated that gapmer ASO2 ASOs with LNA or 2'MOE modifications did not significantly potentiate TLR8 sensing of R848 (FIG. 1—Alharbi et al., 2020). Based on the concept that these oligos are processed into fragments binding to site 2 of TLR8 to enhance uridine and R848 activity, these findings suggested that LNA and 2'MOE modifications hampered processing in the context of ASO2 (also noting that LNA ASO2 was only 16 nt and lacked 2 nt at 5' and 3' end).

To gain a broader insight into the effect of LNA and 2'MOE ASOs on TLR8 sensing, the inventors screened a panel of 91 LNA ASOs, and 76 2'MOE ASOs at 100 and 500 nM, in HEK-TLR8 cells treated with R848 (FIG. 11, Table 5 and Table 6). For LNA ASOs, the inventors found that TLR8 potentiation was limited, with only 27% (25/91) of the ASOs leading to >2 fold increased NF-κB luciferase at 500 nM, with no ASO potentiating over 2 fold at 100 nM. This is in stark contrast with 2'OMe ASOs, for which >50% of the molecules potentiated TLR8 sensing by >2 fold at 100 nM (FIG. 2—Alharbi et al., 2020).

For 2'MOE ASOs, the inventors found that TLR8 potentiation was greater than with LNA, but lesser than 2'OMe, with 50% (38/76) of the ASOs leading to >2 fold increased NF-κB luciferase at 500 nM, and with 34% (26/76) ASOs potentiating over 2 fold at 100 nM (FIG. 11).

The inventors next sought to validate these results in repeat experiments in HEK TLR8 cells, using a few molecules from the screens. For LNA ASOs, the inventors confirmed that A7 and H11 significantly potentiated TLR8 sensing of R848 (FIG. 12). However, when testing the same sequences in THP-1 cells, there was very limited potentiation compared to dT20 (~10 fold less) and A7 was the only sequence consistently increasing IP-10 production (H11 failed to do so in these cells) (FIG. 12). While these results are consistent with a limited capacity of LNA ASOs to potentiate TLR8 sensing, they also indicate the possibility that the degradation pattern of the LNA ASOs could be cell-dependent (i.e. the endonuclease degrading ASO H11 in HEK cells may be absent in THP-1 cells).

The inventors also validated the results from the 2'MOE screen in a preliminary experiment in HEK-TLR8 cells (FIG. 13). While this experiment only led to a modest TLR8 activation by R848 (which did not optimally activate the cells here), it validated the top potentiating ASOs (G9, D2, D7, B5, A9). Importantly, the inventors noted in the screen data that sequences with single nucleotide increments from the HPRT family exhibited different effects on TLR8. This was validated with this preliminary experiment, showing that ASO 663 but not 664/665/666 ASOs could potentiate TLR8 sensing. Although warranting further confirmation, this is of particular interest because the same ASO series made with 2'OMe chemistry showed a similar trend, with 2'OMe HPRT 663 being the strongest TLR8 potentiator (663>664>665) (FIG. 5—Alharbi et al., 2020).

Since the 2'OMe and 2'MOE gapmer ASOs the inventors used have the same length/sequence and only differ by the nature of the bases used in the 5' and 3' 5 nt regions, these results suggest that the pattern of endonuclease cleavage is conserved (sequence targeting by the nuclease is not prevented), although probably less efficient for 2'MOE ASOs compared to 2'OMe ASOs.

TABLE 5

TLR7 and TLR8 modulation by LNA ASOs

| Well | SEQ ID NO. | Name | Sequence | TLR8 500 nM | TLR8 100 nM | TLR7 500 nM | TLR7 100 nM |
|---|---|---|---|---|---|---|---|
| A1 | 283 | CTNN2B-311 LNA KL | +C*+G*+C*+T*+T*+C*+T*+G*+T*+C*+T*+G*+T | 2.896068751 | 0.919880555 | 0.14185991 | 0.39318604 |
| A10 | 284 | HPRT LNA-665 V1 | +A*+C*+A*+C*+T*+C*+G*+T*+G*+G*+T*+C*+C | 1.028907862 | 0.421771896 | 0.08615711 | 0.54796744 |
| A11 | 285 | HPRT LNA-332 V1 | +T*+G*+A*+T*+G*+G*+C*+T*+C*+C*+A*+T*+C | 0.262861964 | 0.373889035 | 0.15275009 | 0.65650092 |
| A12 | 286 | HPRT LNA-330 V1 | +A*+T*+G*+G*+C*+T*+C*+C*+A*+T*+C*+T*+C | 1.355861146 | 0.368856109 | 0.11716763 | 0.55013319 |
| A2 | 287 | CTNN2B-1575 LNA V1 | +C*+C*+A*+C*+T*+G*+G*+C*+A*+G*+A*+C*+A*+T | 1.212622978 | 0.683935484 | 0.46952034 | 0.76506387 |
| A3 | 288 | EGFR-2790 LNA KL | +G*+T*+G*+A*+T*+C*+T*+G*+A*+C*+A*+T*+G*+T | 1.806415165 | 0.583370618 | 0.06022367 | 0.43756054 |
| A4 | 289 | EGFR-1225 LNA V1 | +A*+A*+G*+G*+C*+C*+C*+T*+T*+C*+G*+C*+A*+C*+T*+T | 0.967416317 | 0.506563128 | 0.16370864 | 0.73745623 |
| A5 | 290 | CAMSAP1-1635 LNA KL | +A*+A*+C*+C*+A*+C*+G*+T*+C*+T*+C*+T*+A*+A | 4.259168003 | 0.933486362 | 0.53224953 | 1.07818714 |
| A6 | 291 | CAMSAP1-4915 LNA V1 | +G*+C*+A*+C*+A*+C*+T*+T*+C*+G*+T*+A*+C*+C*+A | 1.091460322 | 0.318981952 | 0.22110651 | 0.65677278 |
| A7 | 292 | MB21D1-689 LNA KL | +A*+A*+C*+C*+C*+T*+T*+T*+C*+A*+C*+C*+A*+T | 8.653942007 | 1.871330912 | 0.42631118 | 0.77147456 |
| A8 | 293 | MB21D1-525 LNA V1 | +G*+A*+A*+G*+T*+T*+T*+G*+C*+T*+T*+C*+G | 0.641705492 | 0.573508016 | 0.06662907 | 0.79308061 |
| A9 | 294 | HPRT LNA-388 KL | +C*+C*+A*+G*+C*+A*+G*+T*+C*+A*+G*+C*+A*+A | 1.499436456 | 0.411543502 | 0.94211591 | 1.10083724 |
| B1 | 295 | CTNN2B-916 LNA KL | +G*+A*+A*+A*+G*+T*+T*+A*+T*+G*+C*+A*+A*+G | 4.109748834 | 1.156212285 | 0.10098192 | 0.16623017 |
| B10 | 296 | HPRT LNA-333 V1 | +G*+T*+G*+A*+T*+G*+C*+C*+T*+C*+C*+A*+T | 1.111733994 | 0.516764822 | 0.13894737 | 0.66514369 |
| B11 | 297 | HPRT LNA-335 V1 | +A*+T*+G*+T*+G*+A*+T*+G*+C*+C*+T*+C*+C*+A | 1.839717337 | 0.637113907 | 0.12778074 | 0.49983046 |

TABLE 5-continued

TLR7 and TLR8 modulation by LNA ASOs

| Well | SEQ ID NO. | Name | Sequence | TLR8 500 nM | TLR8 100 nM | TLR7 500 nM | TLR7 100 nM |
|---|---|---|---|---|---|---|---|
| B12 | 298 | HPRT LNA-660 V1 | +T*+C*+G*T*G*G*G*T*C*C*T*T*+T*+C | 2.965725774 | 0.778445594 | 0.31788966 | 0.54005514 |
| B2 | 299 | CTNN2B-808 LNA V1 | +T*+G*+T*C*T*G*A*A*G*C*T*T*+C*+T | 0.871122112 | 0.600080893 | 0.27787327 | 0.49453053 |
| B3 | 300 | EGFR-3652 LNA KL | +A*+G*+T*G*T*T*A*A*G*A*T*A*C*+T*+C+G | 0.599083955 | 0.427018507 | 0.11539072 | 0.55864079 |
| B4 | 301 | EGFR-1015 LNA V1 | +G*+T*+C*C*T*G*C*A*C*G*T*G*+C*+T | 0.935849795 | 0.570390577 | 0.25053206 | 0.47146409 |
| B5 | 302 | CAMSAP1-1739 LNA KL | +T*+A*+C*T*T*C*C*G*A*G*G*T*+G*+T+C | 0.417240354 | 0.417240354 | 0.4512019 | 0.73846497 |
| B6 | 303 | CAMSAP1-5594 LNA V1 | +G*+G*+C*T*C*G*C*T*T*G*C*C*+T*+A+C | 0.706148377 | 0.373742513 | 0.18619377 | 0.56938527 |
| B7 | 304 | MB21D1-719 LNA KL | +G*+C*+A*C*T*T*C*A*G*T*C*T*G*+A*+G+G | 0.864230705 | 0.495364271 | 0.1617036 | 0.71281604 |
| B8 | 305 | MB21D1-523 LNA V1 | +G*+G*+T*C*T*T*G*C*T*T*C*G*+T*+G+G | 1.385506297 | 0.616352872 | 0.04178645 | 0.48137976 |
| B9 | 306 | HPRT LNA-475 KL | +G*+G*+T*C*A*T*T*A*C*A*A*T*A*+G*+C+T | 1.380898459 | 0.4999171 | 0.04874837 | 0.57983939 |
| C1 | 307 | CTNN2B-1294 LNA KL | +G*+A*+T*A*G*C*A*C*C*T*T*C*A*+G*+C*+A | 2.862783595 | 0.820558594 | 0.04949276 | 0.43379199 |
| C10 | 308 | HPRT LNA-667 V1 | +C*+A*+A*C*A*T*T*C*G*T*G*G*+G*+T | 0.689536106 | 0.590755294 | 0.47631673 | 0.66256341 |
| C11 | 309 | HPRT LNA-334 V1 | +T*+G*+T*G*A*T*G*G*C*C*T*C*+C*+A+T | 1.595846668 | 0.581865191 | 0.09010669 | 0.31544459 |
| C12 | 310 | HPRT LNA-669 V1 | +T*+C*+C*A*A*C*A*C*T*T*C*G*T*+G*+G | 0.490756266 | 0.412601982 | 0.24944949 | 0.3182419 |
| C2 | 311 | CTNN2B-2545 LNA V1 | +C*+C*+A*T*+C*A*T*G*A*G*T*+C*+T | 1.168812131 | 0.674842397 | 0.64432531 | 0.99240168 |
| C3 | 312 | EGFR-3908 LNA KL | +G*+T*A*T*C*G*A*A*G*A*G*T*+C*+T+G | 1.781012065 | 0.636606671 | 0.11343983 | 0.56243018 |
| C4 | 313 | EGFR-2874 LNA V1 | +G*+C*+C*A*T*C*C*A*C*T*G*A*+T*+A+G | 0.681322005 | 0.440369427 | 0.12292291 | 0.67146076 |

TABLE 5-continued

TLR7 and TLR8 modulation by LNA ASOs

| Well | SEQ ID NO. | Name | Sequence | TLR8 500 nM | TLR8 100 nM | TLR7 500 nM | TLR7 100 nM |
|---|---|---|---|---|---|---|---|
| C5 | 314 | CAMSAP1-4295 LNA KL | +G*+G*+T*T*A*C*G*C*T*C*A*G*+T*+A*+T | 1.84782642 | 0.804379463 | 0.14008917 | 0.43785909 |
| C6 | 315 | CAMSAP1-4916 LNA V1 | +T*+G*+C*A*C*A*C*T*T*C*G*T*A*+C*+C*+C | 0.369671442 | 0.411275899 | 0.29939644 | 0.80645801 |
| C7 | 316 | MB21D1-1181 LNA KL | +T*+C*+G*T*A*G*T*T*G*C*T*T*C*+C*+T*+A | 1.582702591 | 0.556643844 | 0.19842456 | 0.38026667 |
| C8 | 317 | MB21D1-522 LNA V1 | +G*+T*+C*T*T*G*C*T*T*C*G*T*+G*+G*+A | 2.137051018 | 0.677910736 | 0.05637718 | 0.65162009 |
| C9 | 318 | HPRT LNA-489 KL | +G*+T*+C*C*C*T*G*T*T*G*A*C*+T*+G*+G | 0.303537628 | 0.3352112 | 0.12271748 | 0.55685117 |
| D1 | 319 | CTNN2B-2341 LNA KL | +C*+C*+A*A*G*A*T*C*A*G*C*A*G*+T*+C*+T | 2.91994853 | 1.014820046 | 0.69656948 | 0.8818727 |
| D10 | 320 | HPRT LNA-329 V1 | +T*+G*+G*C*T*C*C*C*A*T*C*T*+C*+C*+T | 1.127427243 | 0.495491714 | 0.21708902 | 0.87696501 |
| D11 | 321 | HPRT LNA-661 V1 | +T*+T*+C*G*T*G*G*G*T*C*C*T*+T*+T | 3.144310898 | 0.620585256 | 0.17756599 | 0.48728787 |
| D12 | 322 | HPRT LNA-292 V1 | +G*+T*+T*C*A*G*T*C*C*T*G*T*C*+C*+A*+T | 4.128854096 | 1.068508653 | 0.11426897 | 0.45597999 |
| D2 | 323 | CTNN2B-1642 LNA V1 | +G*+C*+A*A*G*C*T*C*A*G*T*G*A*+T*+G*+T | 1.439533955 | 0.638180016 | 0.18884129 | 0.67647223 |
| D3 | 324 | EGFR-4705 LNA KL | +G*+G*+C*T*G*A*A*T*C*C*A*+G*+T*+T | 0.577088592 | 0.561637084 | 0.04131333 | 0.41656083 |
| D4 | 325 | EGFR-3267 LNA V1 | +G*+C*+A*T*C*C*C*A*C*G*T*+C*+C*+A*+A | 0.738233723 | 0.607383649 | 0.08520819 | 0.55525442 |
| D5 | 326 | CAMSAP1-4697 LNA KL | +T*+T*+T*T*G*C*T*G*G*A*T*+T*+C*+A | 1.411677311 | 0.542417088 | 0.30542713 | 0.56354698 |
| D6 | 327 | CAMSAP1-2584 LNA V1 | +G*+C*+C*A*T*G*C*T*G*C*T*C*+G*+G*+A | 0.363474708 | 0.446408939 | 0.17542771 | 0.6380256 |
| D7 | 328 | MB21D1-1248 LNA KL | +G*+C*+C*A*T*G*T*T*T*C*T*T*C*+T*+T*+G | 0.431182656 | 0.430459006 | 0.02075046 | 0.81600703 |

TABLE 5-continued

TLR7 and TLR8 modulation by LNA ASOs

| Well | SEQ ID NO. | Name | Sequence | TLR8 500 nM | TLR8 100 nM | TLR7 500 nM | TLR7 100 nM |
|---|---|---|---|---|---|---|---|
| D8 | 329 | MB21D1-168 LNA V1 | +C*+G*+C*+C*+T*C*G*A*A*G*C*+T*+C*+T | 0.21857614 | 0.401507928 | 0.1389126 | 0.59401711 |
| D9 | 330 | HPRT LNA-551 KL | +T*+C*+C*+A*+C*A*A*T*C*A*A*G*A*+C*+A*+T | 0.89344393 | 0.474275592 | 0.53322126 | 0.86313802 |
| E1 | 331 | CTNN2B-3648 LNA KL | +C*+T*+T*+G*A*A*G*A*C*A*T*C*G*T*+A*+T*+C | 3.888848608 | 0.959918056 | 0.0438927 | 0.36286553 |
| E10 | 332 | HPRT LNA-666 V1 | +A*+A*+C*+A*C*T*T*C*G*T*G*G*+G*+T*+C | 0.882130479 | 0.496305985 | 0.44467195 | 0.89893562 |
| E11 | 333 | HPRT LNA-662 V1 | +C*+T*+T*+C*G*T*G*G*G*T*C*C*+T*+T*+T | 4.366497579 | 1.097412417 | 0.23301734 | 0.68538279 |
| E12 | 334 | HPRT LNA pos cont | +A*+G*+G*+A*+C*T*C*C*A*G*A*T*G*+T*+T*+T | 1.033453241 | 0.278472837 | 0.29310899 | 0.43363496 |
| E2 | 335 | CTNN2B-2516 LNA V1 | +A*+T*+C*+T*G*C*A*G*C*A*T*+G*+C*+T*+C*+A | 2.628295796 | 0.807587707 | 0.27890078 | 0.66285286 |
| E3 | 336 | EGFR-4885 LNA KL | +A*+T*+A*+T*T*C*A*G*A*G*C*A*+G*+C*+T | 0.77018825 | 0.401114395 | 0.0206294 | 0.43772578 |
| E4 | 337 | EGFR-1013 LNA V1 | +C*+C*+T*+T*G*C*A*C*G*T*G*G*C*+T*+T*+C | 2.414242522 | 1.314579837 | 0.28128379 | 0.6172155 |
| E5 | 338 | CAMSAP1-6273 LNA KL | +A*+A*+A*+G*+A*C*T*G*A*G*A*A*+A*+A*+G | 2.662700169 | 0.881982649 | 0.26740807 | 0.51270535 |
| E6 | 339 | CAMSAP1-2709 LNA V1 | +T*+T*+C*+A*+G*C*C*+T*C*G*C*C*+T*+T*+G | 0.764329236 | 0.478887514 | 0.18055434 | 0.6416398 |
| E7 | 340 | MB21D1-1483 LNA KL | +T*+G*+A*+C*T*G*T*C*T*T*G*A*G*+G*+G*+T | 3.209604677 | 0.9725735 | 0.14999726 | 0.80240327 |
| E8 | 341 | MB21D1-520 LNA V1 | +C*+T*+T*+G*C*T*T*C*G*T*G*+A*+A*+G*+C | 0.593607406 | 0.458104857 | 0.09794609 | 0.80632843 |
| E9 | 342 | HPRT LNA-692 KL | +A*+A*+T*+C*+A*A*C*A*A*A*G*T*+C*+T*+G | 1.899545122 | 0.590751475 | 0.4326279 | 0.72655691 |
| F1 | 343 | CTNN2B-809 LNA V1 | +G*+T*+G*+T*C*T*G*A*A*G*C*+T*+T*+C | 2.057291617 | 0.922865713 | 0.0668831 | 0.3554078 |
| F10 | 344 | HPRT LNA-664 V1 | +C*+A*+C*+T*+T*C*G*T*G*G*T*+C*+C*+T | 1.446145761 | 0.424556089 | 0.24003633 | 0.86814066 |

TABLE 5-continued

TLR7 and TLR8 modulation by LNA ASOs

| Well | SEQ ID NO. | Name | Sequence | TLR8 500 nM | TLR8 100 nM | TLR7 500 nM | TLR7 100 nM |
|---|---|---|---|---|---|---|---|
| F11 | 345 | HPRT LNA-331 V1 | +G*+A*+T*G*G*C*T*C*C*C*A*T*+C*+C | 0.185915879 | 0.278358605 | 0.11903826 | 0.55812929 |
| F12 | 346 | NC1 LNA PS 3-10-3 | +C*+G*+T*A*T*A*T*A*G*C*C*G*+A*+T*+T | 0.716037601 | 0.396066198 | 0.22566078 | 0.75412488 |
| F2 | 347 | CTNN2B-2136 LNA V1 | +C*+T*+G*C*A*G*C*T*T*C*C*T*T*+G*+T*+C | 0.935994958 | 0.477630621 | 0.05267412 | 0.4668655 |
| F3 | 348 | EGFR-1014 LNA V1 | +T*+C*+C*T*T*G*C*A*C*G*T*G*+G*+C*+T*+T | 0.601229377 | 0.491267464 | 0.48221215 | 0.81167637 |
| F4 | 349 | EGFR-1016 LNA V1 | +T*+G*+T*C*C*T*T*G*C*A*C*G*T*+G*+C | 0.157848602 | 0.635917805 | 0.1903806 | 0.50221199 |
| F5 | 350 | CAMSAP1-2112 LNA V1 | +T*+C*+T*T*C*A*T*C*G*G*C*C*C*+T*+G*+C | 1.393172852 | 0.595094771 | 0.51085066 | 0.81989598 |
| F6 | 351 | CAMSAP1-2456 LNA V1 | +G*+T*+C*T*C*T*G*A*G*A*C*T*T*+C*+C*+T | 2.401950564 | 0.76443429 | 0.08440541 | 0.47710507 |
| F7 | 352 | MB21D1-521 LNA V1 | +T*+C*+T*T*G*G*C*T*T*C*G*T*G*+A*+G | 0.196973894 | 0.5405367 | 0.28768075 | 1.0325815 |
| F8 | 353 | MB21D1-616 LNA V1 | +A*+G*+C*T*T*C*A*A*G*A*G*C*C*C*+C*+A*+G | 0.864508317 | 0.331485279 | 0.11099721 | 0.55425805 |
| F9 | 354 | HPRT LNA-732 KL | +G*+T*+C*A*A*G*G*G*C*A*T*A*T*+C*+C*+T | 2.301162835 | 0.543243053 | 0.14162734 | 0.65040068 |
| G1 | 355 | CTNN2B-2446 LNA V1 | +T*+C*+C*A*T*A*C*C*A*A*G*+C*+A*+T | 1.334008584 | 0.595023037 | 0.49364331 | 1.05617457 |
| G10 | 356 | HPRT LNA-668 V1 | +C*+C*+A*A*C*T*T*C*G*T*G*+G*+G | 0.835058763 | 0.534877754 | 0.4460221 | 0.80831707 |
| G11 | 357 | HPRT LNA-294 V1 | +A*+C*+G*T*T*C*A*G*T*C*C*T*G*+T*+C*+C | 0.49347248 | 0.356093832 | 0.13623624 | 0.60093638 |
| G12 | 358 | NCS LNA PS 3-10-3 | +G*+A*+C*T*A*T*A*C*G*C*G*C*A*+A*+T*+A | 3.377696066 | 0.777122568 | 0.09759621 | 0.2817351 |
| G2 | 359 | CTNN2B-2479 LNA V1 | +T*+G*+G*T*G*G*C*C*A*C*C*C*+A*+T*+T | 0.604463097 | 0.463599487 | 0.39295731 | 0.9568601 |

TABLE 5-continued

TLR7 and TLR8 modulation by LNA ASOs

| Well | SEQ ID NO. | Name | Sequence | TLR8 500 nM | TLR8 100 nM | TLR7 500 nM | TLR7 100 nM |
|---|---|---|---|---|---|---|---|
| G3 | 360 | EGFR-3266 LNA V1 | +C*+A*+T*+C*+A*+C*A*+C*G*T*C*+G*+T*+C | 2.417304533 | 0.77840921 | 0.35333763 | 0.74095298 |
| G4 | 361 | EGFR-727 LNA V1 | +G*+T*+C*+C*G*+C*+C*A*+C*T*G*+A*+T*+G | 0.744775878 | 0.585159169 | 0.31080227 | 0.84335141 |
| G5 | 362 | CAMSAP1-2113 LNA V1 | +G*+T*+C*+T*+T*+C*A*T*+C*G*+C*+C*+C*+T*+G | 2.086214626 | 0.663716035 | 0.11859632 | 0.64096423 |
| G6 | 363 | CAMSAP1-2906 LNA V1 | +C*+C*+A*+C*A*T*+C*+T*G*T*G*G*+C*+T*+C | 0.232442282 | 0.291365866 | 0.36345034 | 0.78888908 |
| G7 | 364 | MB21D1-524 LNA V1 | +A*+G*+G*+T*+C*+T*+T*+G*+C*+T*+T*+C*+G*+T*+G | 1.953232965 | 0.596247374 | 0.05003212 | 0.45714258 |
| G8 | 365 | MB21D1-697 LNA V1 | +T*+T*+G*+G*+T*+C*+A*+C*+A*+A*+C*+C*+C*+T*+T | 1.453569312 | 0.558507437 | 0.54529597 | 1.00843749 |
| G9 | 366 | HPRT LNA-1027 KL | +T*+C*+C*+C*+A*+C*+T*+T*+G*+C*+A*+G*G*+A*+A* | 0.724923765 | 0.540879865 | 0.54271738 | 0.86013861 |
| H1 | 367 | CTNN2B-1576 LNA V1 | +A*+C*+T*+T*+C*+G*T*T*G*G*G*T*+C*+C*+C*+T | 1.865354601 | 0.898697761 | 0.63913972 | 1.02415107 |
| H10 | 368 | HPRT LNA-663 V1 | +A*+C*+T*+T*+C*+C*A*T*+C*T*C*+C*T*+T*+C* | 3.672132066 | 0.819821652 | 0.73554308 | 0.80396669 |
| H11 | 369 | HPRT LNA-326 V1 | +C*+C*+T*+T*+C*+C*A*T*+C*C*+T*+C*+T*+T*+C +A | 6.75898779 | 1.46930113 | 0.84318021 | 0.75846825 |
| H3 | 370 | EGFR-2859 LNA V1 | +G*+G*+C*+A*+C*+T*+T*+T*G*+C*+C*+T*+C*+T +T | 0.862488571 | 0.651706464 | 0.66841118 | 0.77430522 |
| H5 | 371 | CAMSAP1-1850 LNA V1 | +T*+G*+C*+T*+C*+C*+T*+C*+G*T*+C*T*+C*+C +C | 4.77079461 | 1.097052718 | 0.59461451 | 0.75110463 |
| H7 | 372 | MB21D1-526 LNA V1 | +G*+G*+A*+G*+G*+T*+C*+T*+T*+G*G*+C*+T*+T*+C +G | 0.881971694 | 0.574984194 | 0.11943028 | 0.5030592 |
| H9 | 373 | HPRT LNA-1353 KL | +T*+T*+G*+A*+C*+A*+A*+G*+A*+T*+T*+C*+A*+C*+T +G | 1.756020752 | 0.633203821 | 0.42963559 | 1.04030631 |
|  |  |  | NT | 0.022710362 | 0 | 0 | 0 |
|  |  |  | NT | 0 | 0.004817336 | 0.0112819 | 0.03133982 |

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| A1 | 374 | HPRT-489 MOE | 16486 3614 | /52MOErA/*/i2MOErT/*/i2MOErC/*/i2MOErT/*C*C*C*T*G*T* T*G*A*C*/i2MOErC/*/i2MOErA/*/i2MOErC/*/i2MOErC/ | 2.1177 02488 | 1.7516 16656 | 0.2239 852 | 0.4264 9646 |
| A10 | 375 | MB21D1-525 MOE | 16486 3681 | /52MOErC/*/i2MOErG/*/i2MOErG/*/i2MOErA/*G*T*C*T*T*G* G*C*T*T*/i2MOErC/*/i2MOErT/*/i2MOErG/*/32MOErG/ | 3.2569 51701 | 2.1970 37799 | 0.1384 1623 | 0.5046 8096 |
| A2 | 376 | HPRT-666 MOE | 16486 3622 | /52MOErC/*/i2MOErC/*/i2MOErG/*/i2MOErA/*A*C*T*T*C*G* T*G*G*T*/i2MOErA/*/i2MOErC/*/i2MOErC/*/32MOErT/ | 1.1846 11684 | 1.2229 91859 | 0.3341 1155 | 0.8557 367 |
| A3 | 377 | CTNN2B-311 MOE | 16486 3628 | /52MOErA/*/i2MOErG/*/i2MOErC/*/i2MOErC/*G*T*T*T*T*C*T* G*T*C*T*/i2MOErA/*/i2MOErG/*/i2MOErC/*/32MOErT/ | 0.3686 07182 | 0.9676 00353 | 0.2676 0548 | 0.5671 2124 |
| A4 | 378 | CTNN2B-1575 MOE | 16486 3636 | /52MOErC/*/i2MOErC/*/i2MOErC/*/i2MOErG/*C*T*T*G*G*C* A*G*A*C*/i2MOErT/*/i2MOErA/*/i2MOErC/*/32MOErC/ | 3.9845 37376 | 2.8219 29166 | 0.3362 1214 | 0.4731 3049 |
| A5 | 379 | EGFR-2790 MOE | 16486 3643 | /52MOErC/*/i2MOErG/*/i2MOErC/*/i2MOErG/*A*A*T*C*T*T*G* A*C*A*T*/i2MOErG/*/i2MOErT/*/i2MOErG/*/32MOErC/ | 1.3869 21689 | 1.3077 86303 | 0.2061 6041 | 0.4491 5672 |
| A6 | 380 | EGFR-1225 MOE | 16486 3651 | /52MOErC/*/i2MOErC/*/i2MOErA/*/i2MOErG/*C*C*C*T*T*C* G*C*A*C*/i2MOErT/*/i2MOErG/*/i2MOErG/*/32MOErT/ | 1.2357 1091 | 1.1151 70978 | 0.3359 088 | 0.5870 7138 |
| A7 | 381 | CAMSAP1-1635 MOE | 16486 3658 | /52MOErA/*/i2MOErG/*/i2MOErC/*/i2MOErT/*A*A*C*G*T*C*T* G*C*T*C*/i2MOErC/*/i2MOErA/*/i2MOErC/*/32MOErA/ | 3.8270 21747 | 2.7867 19553 | 0.2911 8238 | 0.5972 6395 |
| A8 | 382 | CAMSAP1-4915 MOE | 16486 3666 | /52MOErA/*/i2MOErG/*/i2MOErC/*/i2MOErT/*C*A*C*T*T*C* G*T*A*C*/i2MOErC/*/i2MOErA/*/i2MOErC/*/32MOErA/ | 1.9723 89171 | 1.5546 51541 | 0.2330 987 | 0.4184 5047 |
| A9 | 383 | MB21D1-689 MOE | 16486 3673 | /52MOErC/*/i2MOErA/*/i2MOErC/*/i2MOErA/*C*C*C*C*C*T*T* C*A*C*C*/i2MOErC/*/i2MOErA/*/i2MOErC/*/32MOErC/ | 14.807 88512 | 8.8411 74403 | 0.5329 865 | 0.5930 6383 |
| B1 | 384 | HPRT-732 MOE | 16486 3615 | /52MOErG/*/i2MOErA/*/i2MOErA/*/i2MOErT/*A*T*A*T*T*C*T* A*T*A*T*/i2MOErA/*/i2MOErG/*/i2MOErG/*/32MOErC/ | 2.0869 83549 | 1.4568 83526 | 0.1914 825 | 0.4228 9281 |
| B10 | 385 | MB21D1-523 MOE | 16486 3682 | /52MOErG/*/i2MOErG/*/i2MOErA/*/i2MOErG/*C*T*T*G*C* T*T*C*G*T*/i2MOErC/*/i2MOErT/*/i2MOErG/*/32MOErG/ | 2.1637 14713 | 1.8216 12413 | 0.0950 8383 | 0.4186 4296 |

-continued

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| B2 | 386 | HPRT-664 MOE | 16486 3623 | /52MOErA/*/i2MOErC/*/i2MOErC/*/i2MOErC/*T*T*C*T*G* G*G*T*/i2MOErA/*/i2MOErC/*/i2MOErT/*/32MOErT/ | 3.1666 31079 | 2.7253 1571 | 0.2255 6347 | 0.4062 2852 |
| B3 | 387 | CTNN2B-916 MOE | 16486 36229 | /52MOErG/*/i2MOErT/*/i2MOErG/*/i2MOErA/*A*G*T*T*A* T*G*C*A*/i2MOErA/*/i2MOErG/*/i2MOErT/*/32MOErC/ | 3.5000 94565 | 3.1170 83061 7177 | 0.1629 | 0.5987 8077 |
| B4 | 388 | CTNN2B-808 MOE | 16486 36327 | /52MOErC/*/i2MOErG/*/i2MOErT/*/i2MOErG/*C*T*G*A*A* G*C*T*T*/i2MOErC/*/i2MOErT/*/i2MOErG/*/32MOErT/ | 1.2219 18629 06482 | 1.4757 7426 | 0.3498 | 0.5410 3881 |
| B5 | 389 | EGFR-3652 MOE | 16486 36544 | /52MOErA/*/i2MOErA/*/i2MOErT/*/i2MOErA/*G*T*T*G*A* A*T*A*C*/i2MOErT/*/i2MOErG/*/i2MOErG/*/32MOErG/ | 8.2607 0467 | 5.6811 83066 | 0.1290 7231 | 0.4203 6229 |
| B6 | 390 | EGFR-1015 MOE | 16486 36552 | /52MOErG/*/i2MOErT/*/i2MOErT/*/i2MOErG/*C*T*T*G*C* C*G*T*G*/i2MOErC/*/i2MOErG/*/i2MOErT/*/32MOErC/ | 1.2739 43089 78135 | 1.3828 | 0.2116 4122 | 0.3771 6937 |
| B7 | 391 | CAMSAP1-1739 MOE | 16486 36569 | /52MOErG/*/i2MOErC/*/i2MOErT/*/i2MOErT/*T*T*C*C*G* A*G*G*T*/i2MOErA/*/i2MOErG/*/i2MOErA/*/32MOErA/ | 4.8268 15355 60253 | 3.8915 | 0.3364 314 | 0.5880 2627 |
| B8 | 392 | CAMSAP1-5594 MOE | 16486 36667 | /52MOErC/*/i2MOErC/*/i2MOErT/*/i2MOErC/*T*T*G*G*C* T*G*C*C*/i2MOErT/*/i2MOErG/*/i2MOErG/*/32MOErT/ | 0.8126 94026 79074 | 1.0957 8071 | 0.2039 | 0.5228 6129 |
| B9 | 393 | MB21D1-719 MOE | 16486 36744 | /52MOErC/*/i2MOErA/*/i2MOErG/*/i2MOErG/*C*T*T*C*A* T*C*T*G*/i2MOErC/*/i2MOErA/*/i2MOErG/*/32MOErT/ | 2.1576 03307 36427 | 1.6969 5556 | 0.2408 | 0.5737 9492 |
| C1 | 394 | HPRT-1027 MOE | 16486 36186 | /52MOErA/*/i2MOErG/*/i2MOErT/*/i2MOErC/*G*C*C*A*A* A*G*G*T*/i2MOErC/*/i2MOErC/*/i2MOErG/*/32MOErG/ | 4.6587 94019 16338 | 2.6847 4226 | 0.5211 | 0.6911 4382 |
| C10 | 395 | MB21D1-522 MOE | 16486 36683 | /52MOErA/*/i2MOErA/*/i2MOErG/*/i2MOErG/*T*T*T*G*C* T*C*G*T*/i2MOErC/*/i2MOErC/*/i2MOErT/*/32MOErC/ | 5.0641 85819 69399 | 3.6560 9547 | 0.1500 | 0.5470 7524 |
| C2 | 396 | HPRT-668 MOE | 16486 36244 | /52MOErA/*/i2MOErA/*/i2MOErA/*/i2MOErG/*A*C*A*C*T*T* C*G*T*C*/i2MOErA/*/i2MOErT/*/32MOErC/ | 1.5186 17414 84222 | 1.4366 1948 | 0.6113 | 0.7582 2197 |
| C3 | 397 | CTNN2B-1294 MOE | 16486 36330 | /52MOErC/*/i2MOErA/*/i2MOErG/*/i2MOErC/*A*G*C*A*C* T*T*C*A*/i2MOErA/*/i2MOErC/*/i2MOErT/*/32MOErT/ | 2.3561 39597 78484 | 1.7727 8781 | 0.2536 | 0.4971 0558 |

-continued

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| C4 | 398 | CTNN2B-2545 MOE | 16486363 8 | /52MOErG/*/i2MOErC/*/i2MOErC/*/i2MOErA/*T*C*C*A*T*G* A*G*T*/i2MOErA/*/i2MOErG/*/i2MOErG/*/32MOErG/ | 0.5410 93814 | 0.8992 11795 | 0.1240 3774 | 0.3401 1914 |
| C5 | 399 | EGFR-3908 MOE | 16486364 5 | /52MOErG/*/i2MOErG/*/i2MOErG/*/i2MOErA/*T*T*G*A*A*A* G*A*G*T*/i2MOErT/*/i2MOErG/*/i2MOErG/*/32MOErA/ | 4.0729 87366 | 3.1380 70272 | 0.0788 0296 | 0.3502 5342 |
| C6 | 400 | EGFR-2874 MOE | 16486365 3 | /52MOErA/*/i2MOErG/*/i2MOErG/*/i2MOErG/*A*T*C*C*A*C* T*G*G*A*/i2MOErT/*/i2MOErA/*/i2MOErG/*/32MOErC/ | 2.0250 68656 | 2.0278 27004 | 0.3896 4998 | 0.6675 6568 |
| C7 | 401 | CAMSAP1-4295 MOE | 16486366 0 | /52MOErT/*/i2MOErC/*/i2MOErC/*/i2MOErT/*T*T*A*C*G*C* T*C*A*G*/i2MOErT/*/i2MOErA/*/i2MOErA/*/32MOErG/ | 1.5383 68652 | 1.6104 1232 | 0.1672 3544 | 0.4265 4438 |
| C8 | 402 | CAMSAP1-4916 MOE | 16486366 8 | /52MOErA/*/i2MOErG/*/i2MOErG/*/i2MOErT/*A*A*A*C*T*T* C*G*T*A*/i2MOErT/*/i2MOErA/*/i2MOErA/*/32MOErA/ | 2.1994 03059 | 1.8771 74993 | 0.1182 7242 | 0.2964 3805 |
| C9 | 403 | MB21D1-1181 MOE | 16486367 5 | /52MOErA/*/i2MOErC/*/i2MOErC/*/i2MOErT/*A*T*G*T*T*G* C*T*T*C*/i2MOErA/*/i2MOErA/*/i2MOErG/*/32MOErC/ | 5.8885 50496 | 3.0913 11197 | 0.2275 5577 | 0.4935 0712 |
| D1 | 404 | HPRT-1353 MOE | 16486361 7 | /52MOErG/*/i2MOErG/*/i2MOErT/*/i2MOErT/*C*A*A*A*G*A* T*T*C*A*/i2MOErA/*/i2MOErA/*/i2MOErG/*/32MOErG/ | 3.0668 07993 | 1.4746 33705 | 0.1898 4544 | 0.3746 3868 |
| D10 | 405 | MB21D1-168 MOE | 16486368 4 | /52MOErT/*/i2MOErT/*/i2MOErG/*/i2MOErC/*C*C*C*T*G*G* A*A*G*C*/i2MOErC/*/i2MOErC/*/i2MOErT/*/32MOErT/ | 0.7811 95498 | 0.8156 62848 | 0.1657 6699 | 0.4403 4836 |
| D2 | 406 | HPRT-663 MOE | 16486362 5 | /52MOErA/*/i2MOErC/*/i2MOErA/*/i2MOErC/*T*T*C*G*T*G* G*G*T*C*/i2MOErA/*/i2MOErC/*/i2MOErG/*/32MOErT/ | 6.3195 3664 | 4.7778 96935 | 0.2345 3617 | 0.4030 6039 |
| D3 | 407 | CTNN2B-2341 MOE | 16486363 1 | /52MOErG/*/i2MOErT/*/i2MOErC/*/i2MOErC/*T*G*G*T*G*G* G*C*A*G*/i2MOErA/*A*G*A*T*C*A*/*/32MOErA/ | 3.3641 92508 | 3.0205 32585 | 0.1200 3911 | 0.2978 145 |
| D4 | 408 | CTNN2B-1642 MOE | 16486363 9 | /52MOErG/*/i2MOErG/*/i2MOErT/*/i2MOErT/*G*T*G*A*T*T* G*T*G*A*/i2MOErA/*/i2MOErG/*C*T*C*A*/*/32MOErA/ | 0.9733 63783 | 1.0740 12499 | 0.1672 2499 | 0.4151 1519 |
| D5 | 409 | EGFR-4705 MOE | 16486364 6 | /52MOErT/*/i2MOErG/*/i2MOErG/*/i2MOErA/*T*T*G*G*A*A*T* C*C*G*A*/i2MOErG/*/i2MOErA/*/*/32MOErT/ | 2.0580 11094 | 1.4515 0796 | 0.0954 0912 | 0.2696 3733 |

-continued

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| D6 | 410 | EGFR-3267 MOE | 16486 36654 | /52MOErC/*/i2MOErG/*/i2MOErC/*/i2MOErA/*T*C*A*C*C* A*C*G*T*/i2MOErT/*/i2MOErC/*/i2MOErT/*/i2MOErC/ | 0.9025 89252 | 1.2494 88975 | 0.2021 7442 | 0.4850 9335 |
| D7 | 411 | CAMSAP1-4697 MOE | 16486 36661 | /52MOErG/*/i2MOErG/*/i2MOErT/*/i2MOErT/*T*G*C*T*G* G*A*A*T*/i2MOErC/*/i2MOErA/*/i2MOErG/*/32MOErT/ | 6.3320 13893 | 5.4963 20869 | 0.1912 5347 | 0.3461 2049 |
| D8 | 412 | CAMSAP1-2584 MOE | 16486 36669 | /52MOErT/*/i2MOErT/*/i2MOErC/*/i2MOErT/*C*A*G*C*T*G* G*C*T*C*/i2MOErG/*/i2MOErA/*/i2MOErC/*/32MOErT/ | 0.5724 76159 | 0.8810 35052 | 0.1379 6921 | 0.4446 932 |
| D9 | 413 | MB21D1-1248 MOE | 16486 36676 | /52MOErC/*/i2MOErC/*/i2MOErT/*/i2MOErC/*A*T*G*T*T* C*T*T*C*T*/i2MOErT/*/i2MOErT/*/i2MOErG/*/32MOErA/ | 2.7134 20404 | 1.9088 13233 | 0.1386 6161 | 0.4017 3954 |
| E1 | 414 | HPRT-665 MOE | 16486 36618 | /52MOErC/*/i2MOErC/*/i2MOErC/*/i2MOErA/*C*T*T*C*G*T* G*G*G*G*/i2MOErC/*/i2MOErG/*/i2MOErT/*/32MOErT/ | 1.6393 20542 | 1.3200 95465 | 0.2854 1067 | 0.4870 7527 |
| E10 | 415 | MB21D1-520 MOE | 16486 36685 | /52MOErT/*/i2MOErT/*/i2MOErA/*/i2MOErT/*G*G*C*T*T*C* G*T*G*G*/i2MOErG/*/i2MOErC/*/i2MOErA/*/32MOErG/ | 3.5355 19673 | 2.3825 88073 | 0.0949 4771 | 0.3718 5677 |
| E2 | 416 | HPRT-332 MOE | 16486 36626 | /52MOErT/*/i2MOErC/*/i2MOErC/*/i2MOErC/*T*T*G*G*C*T* C*C*C*A*/i2MOErC/*/i2MOErA/*/i2MOErT/*/32MOErC/ | 0.9379 20749 | 0.9404 98388 | 0.2381 8484 | 0.3121 7493 |
| E3 | 417 | CTNN2B-3648 MOE | 16486 36632 | /52MOErC/*/i2MOErA/*/i2MOErA/*/i2MOErA/*G*A*A*G*C*A* T*C*G*T*/i2MOErG/*/i2MOErT/*/i2MOErT/*/32MOErC/ | 2.2003 47878 | 1.6496 44484 | 0.3411 4704 | 0.6094 458 |
| E4 | 418 | CTNN2B-2516 MOE | 16486 36640 | /52MOErG/*/i2MOErC/*/i2MOErC/*/i2MOErA/*T*G*G*C*A*G* C*C*C*A*/i2MOErT/*/i2MOErG/*/i2MOErC/*/32MOErC/ | 4.4653 54523 | 3.0685 53658 | 0.2008 0114 | 0.5002 2668 |
| E5 | 419 | EGFR-4885 MOE | 16486 36647 | /52MOErG/*/i2MOErG/*/i2MOErG/*/i2MOErA/*T*T*T*T*C*A*G* A*G*C*A*/i2MOErT/*/i2MOErT/*/i2MOErC/*/32MOErC/ | 4.3079 19558 | 3.1223 03239 | 0.0879 8584 | 0.3301 3617 |
| E6 | 420 | EGFR-1013 MOE | 16486 36655 | /52MOErG/*/i2MOErG/*/i2MOErG/*/i2MOErT/*T*T*G*C*A*C*G* T*G*C*/i2MOErA/*/i2MOErG/*/i2MOErT/*/32MOErT/ | 1.5932 0093 | 1.9000 18099 | 0.0884 8914 | 0.2160 6611 |
| E7 | 421 | CAMSAP1-6273 MOE | 16486 36662 | /52MOErC/*/i2MOErA/*/i2MOErT/*/i2MOErA/*G*G*A*C*T*G* A*G*A*T*/i2MOErA/*/i2MOErG/*/i2MOErT/*/32MOErG/ | 3.4057 01387 | 3.8962 27028 | 0.1888 8792 | 0.3969 5722 |

-continued

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| E8 | 422 | CAMSAP1-2709 MOE | 16486367 0 | /52MOErG/*/i2MOErC/*/i2MOErT/*/i2MOErC/*A*G*C**G*C*T*G*C*C*/i2MOErC/*/i2MOErC/ | 0.6195 0615 | 0.9849 38855 | 0.1964 9181 | 0.5272 735 |
| E9 | 423 | MB21D1-1483 MOE | 16486367 7 | /52MOErC/*/i2MOErC/*/i2MOErT/*/i2MOErA/*/c*T*G*T*C*T*T*G*A*G*/i2MOErG/*/i2MOErC/*/32MOErC/ | 3.1849 27454 | 2.4543 50233 | 0.2992 8598 | 0.6274 7469 |
| F1 | 424 | HPRT-333 MOE | 16486361 9 | /52MOErA/*/i2MOErT/*/i2MOErG/*/i2MOErA/*A*T*G*T*G*C*C*T*C*C*C*/i2MOErT/*/i2MOErC/*/32MOErC/ | 1.4288 94886 | 0.9388 0343 | 0.3448 9638 | 0.6431 0603 |
| F10 | 425 | MB21D1-616 MOE | 16486368 6 | /52MOErG/*/i2MOErC/*/i2MOErA/*/i2MOErC/*T*T*C*G*A*G*G*C*C*C*/i2MOErG/*/i2MOErC/*/32MOErC/ | 0.3804 55178 | 0.7602 78973 | 0.1791 8249 | 0.3915 3905 |
| F2 | 426 | HPRT-335 MOE | 16486362 7 | /52MOErG/*/i2MOErC/*/i2MOErC/*/i2MOErC/*T*T*G*A*T*G*G*/i2MOErA/*/i2MOErG/*/32MOErC/ | 1.6772 20354 | 1.5179 48246 | 0.2789 3557 | 0.4508 0173 |
| F3 | 427 | CTNNB-809 MOE | 16486363 3 | /52MOErT/*/i2MOErA/*/i2MOErG/*/i2MOErC/*T*T*C*T*G*A*A*G*C*T*/i2MOErG/*/32MOErT/ | 0.4944 61834 | 1.1790 3471 | 0.1335 7737 | 0.4145 2378 |
| F4 | 428 | CTNNB-2136 MOE | 16486364 1 | /52MOErA/*/i2MOErC/*/i2MOErC/*/i2MOErC/*C*A*G*C*T*T*/i2MOErG/*/32MOErT/ | 2.4077 13432 | 2.0486 65177 | 0.0593 9581 | 0.1828 7457 |
| F5 | 429 | EGFR-1014 MOE | 16486364 8 | /52MOErG/*/i2MOErT/*/i2MOErG/*/i2MOErC/*T*T*G*C*A*C*/i2MOErG/*/32MOErG/ | 1.4326 59639 | 1.1873 31153 | 0.0568 6524 | 0.0286 9936 |
| F6 | 430 | EGFR-1016 MOE | 16486365 6 | /52MOErG/*/i2MOErC/*/i2MOErG/*/i2MOErG/*A*C*G*T*C*C*T*T*G*C*/i2MOErT/ | 1.0187 61564 | 1.5320 76454 | 0.1311 6798 | 0.3576 4308 |
| F7 | 431 | CAMSAP1-2112 MOE | 16486366 3 | /52MOErG/*/i2MOErC/*/i2MOErC/*/i2MOErC/*T*T*C*A*T*C*G*/i2MOErT/ | 1.1777 29568 | 1.3309 01789 | 0.1852 2714 | 0.3964 975 |
| F8 | 432 | CAMSAP1-2456 MOE | 16486367 1 | /52MOErA/*/i2MOErC/*/i2MOErG/*/i2MOErC/*T*T*C*T*G*A*/i2MOErT/*/32MOErT/ | 0.6834 04291 | 0.8488 61193 | 0.1698 508 | 0.4687 4085 |
| F9 | 433 | MB21D1-521 MOE | 16486367 8 | /52MOErG/*/i2MOErG/*/i2MOErC/*C*G*T*G*/i2MOErrA/*/i2MOErG/*/i2MOErT/*T*G*C*T*T*/i2MOErrA/*/32MOErrA/ | 4.5960 60449 | 3.3858 15287 | 0.1705 3262 | 0.4604 9829 |

-continued

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| G1 | 434 | HPRT-667 MOE | 16486 3620 | /52MOErT/*/i2MOErC/*/i2MOErA/*/i2MOErA/*A*A*C*T*T*C*G*T*G*/i2MOErG/*/i2MOErC/ | 1.4321 04366 | 1.1421 99438 | 0.5781 9082 | 0.9289 2911 |
| G10 | 435 | MB21D1-697 MOE | 16486 3687 | /52MOErG/*/i2MOErG/*/i2MOErT/*/i2MOErT/*T*C*C*A*C*A*C*C*C*/i2MOErC/*/32MOErC/ | 3.7000 63727 | 2.1213 41127 | 0.0969 3604 | 0.6199 5586 |
| G3 | 436 | CTNN2B-2446 MOE | 16486 3634 | /52MOErG/*/i2MOErG/*/i2MOErA/*/i2MOErT/*A*T*C*A*A*T*A*C*C*/i2MOErA/*/32MOErC/ | 2.1073 53214 | 1.9012 17871 | 0.0958 7341 | 0.3639 6351 |
| G4 | 437 | CTNN2B-2479 MOE | 16486 3642 | /52MOErG/*/i2MOErG/*/i2MOErC/*/i2MOErA/*C*C*C*A*T*G*C*C*A*/i2MOErA/*/32MOErC/ | 0.8735 28497 | 1.4914 12913 | 0.1921 4453 | 0.4797 7378 |
| G5 | 438 | EGFR-3266 MOE | 16486 3659 | /52MOErG/*/i2MOErG/*/i2MOErG/*/i2MOErT/*C*T*C*A*A*C*C*A*T*/i2MOErC/*/32MOErA/ | 1.5658 7114 | 1.6185 06125 | 0.0971 6989 | 0.2157 6031 |
| G6 | 439 | EGFR-727 MOE | 16486 3657 | /52MOErA/*/i2MOErA/*/i2MOErG/*/i2MOErT/*C*T*C*C*G*C*C*A*T*/i2MOErC/*/32MOErT/ | 1.7079 82031 | 2.0287 68596 | 0.1708 5396 | 0.3971 7936 |
| G7 | 440 | CAMSAP1-2113 MOE | 16486 3664 | /52MOErG/*/i2MOErG/*/i2MOErC/*/i2MOErA/*T*T*C*A*T*C*A*T*T*C*/i2MOErC/*/32MOErC/ | 1.0933 44915 | 1.2471 02513 | 0.1319 9722 | 0.3712 7496 |
| G8 | 441 | CAMSAP1-2906 MOE | 16486 3672 | /52MOErG/*/i2MOErG/*/i2MOErA/*/i2MOErA/*C*A*T*C*C*T*/i2MOErA/*/32MOErC/ | 0.4928 97094 | 0.9187 50444 | 0.1189 2947 | 0.2989 7614 |
| G9 | 442 | MB21D1-524 MOE | 16486 3679 | /52MOErA/*/i2MOErG/*/i2MOErG/*/i2MOErG/*T*C*T*T*G*G*/i2MOErG/*/32MOErG/ | 5.2877 57611 | 3.9755 20288 | 0.0912 4819 | 0.4337 1803 |
| H1 | 443 | HPRT-329 MOE | 16486 3621 | /52MOErG/*/i2MOErC/*/i2MOErC/*/i2MOErG/*C*C*C*T*C*C*C*/i2MOErG/*/32MOErC/ | 1.6980 23797 | 0.9786 70686 | 0.3360 5342 | 0.6776 8814 |
| H10 | 444 | NC5 2'MOE | 15763 5439 | /52MOErG/*/i2MOErC/*/i2MOErA/*/i2MOErC/*A*A*T*A*C*G/*i2MOErC/*/32MOErG/ | 0.8830 39592 | 1.0671 59916 | 0.2942 2227 | 0.9481 7716 |
| H3 | 445 | CTNN2B 1576 MOE | 16486 3635 | /52MOErA/*/i2MOErC/*/i2MOErA/*/i2MOErC/*A*A*G*A*A*C*T*G*/i2MOErC/*/32MOErC/ | 1.5020 65697 | 1.4404 08915 | 0.2270 2965 | 0.6004 9629 |

-continued

| Well | SEQ ID NO. | ASO | Ref ID | Sequence | TLR8 500 nM | TLR8 100 nM | TLR7 500 nM | TLR7 100 nM |
|---|---|---|---|---|---|---|---|---|
| H5 | 446 | EGFR-2859 MOE | 16486 36550 | /52MOErT/*/i2MOErG/*/i2MOErG/*/i2MOErC/*A*C*T*T*G* C*T*T*C*/i2MOErC/*/i2MOErT/*/i2MOErT/*/32MOErT/ | 0.8844 82754 | 0.7727 87531 | 0.2051 5584 | 0.4550 184 |
| H7 | 447 | CAMSAP1-1850 MOE | 16486 36665 | /52MOErG/*/i2MOErA/*/i2MOErT/*/i2MOErG/*/i2MOErC/*T*C*C*T*C*G* G*T*C*T*/i2MOErC/*/i2MOErT/*/32MOErT/ | 1.9537 62836 | 1.3917 56007 | 0.1993 1744 | 0.4525 4896 |
| H8 | 448 | NC1 2'MOE | 15763 54358 | /52MOErG/*/i2MOErA/*/i2MOErC/*/i2MOErT/*/i2MOErG/*T*T*A*T*A*G* C*C*G*A*/i2MOErA/*/i2MOErA/*/32MOErC/ | 2.7769 93481 | 1.8830 52499 | 0.2649 1771 | 0.5652 492 |
| H9 | 449 | MB21D1-526 MOE | 16486 36680 | /52MOErG/*/i2MOErC/*/i2MOErC/*/i2MOErA/*/i2MOErA/*G*G*T*C*T*T* G*G*C*T*/i2MOErC/*/i2MOErG/*/32MOErG/ | 2.2264 36415 | 1.5981 5863 | 0.1535 6207 | 0.4525 2984 |
| G11 | | NT | | | 0.0598 47661 | 0.0249 62066 | 0.0144 466 | |
| G12 | | NT | | | 0.0368 60718 | 0.0134 97566 | 0.0169 8715 | 0.0028 5387 |
| H11 | | NT | | | 0.1433 565 | 0.0887 29649 | 0.0084 9868 | 0.0488 9513 |
| H12 | | NT | | | 0 | 0.0182 18026 | 0 | 0.0040 5533 |

Example 11: TLR8 Potentiation Requires Co-Administration of Site 1 and Site 2 Ligands In all the experiments to date, the inventors used a pre-treatment of the cells with their ASOs (~30 min in HEKs-overnight in THP-1 cells), prior to R848 stimulation. Critically, the inventors always kept the ASOs in the supernatants during uridine or R848 stimulation. To better define whether de novo degradation of the oligonucleotides was required for the effect on R848, the inventors pre-incubated PS-dT20 with HEK-TLR8 cells, and then washed them off prior to R848 stimulation (FIG. 14). Surprisingly, removal of dT20 from the supernatants at the time of R848 stimulation strongly decreased TLR8 potentiation by this oligonucleotide. This indicates that dT20 is rapidly degraded once in the endosome, and that its degradation products, presumably binding to site 2 of TLR8, are very short lived and essential to potentiate R848 activity.

It is also noteworthy that the inventors noticed short incubation of their 2'OMe ASOs in THP-1 (~2.5 h) strongly decreased their potentiating capacity compared to overnight incubation, but that this did not alter the effect of dT20 (FIG. 14). Based on the observation that the effect of dT20 does not persist after wash-off in HEKs, the inventors speculate that degradation of their 2'OMe ASOs is probably slower than that of dT20 (thereby explaining why their effect is reduced with the 2.5 h pre-incubation compared to dT20).

Collectively, these results suggest a negative correlation between ASO stability and TLR8 potentiation that requires further studies. Since 2'MOE potentiation of the HPRT 663-665 series appears to be similar to that of the 2'OMe, it indicates that 2'MOE ASOs are still processed in a similar fashion as 2'OMe (probably by the same nuclease), but probably less rapidly. This is consistent with the concept that 2'MOE ASOs are usually more potent at promoting mRNA down-regulation that 2'OMe ASOs —potentially partially relating to greater intracellular stability.

This could provide opportunities for the selection and design of ASOs potentiating TLR8 sensing of uridine or R848 for longer times—which would be of particular importance when the ASO and R848/udirine/site 1 agonist are not administered at the same time.

Example 12: TLR8 Potentiation of Co-Cultured Cells—and Implications in Cancer Next, the inventors were interested to test whether a cell transfected with one of their 2'OMe ASOs potentiating TLR8 (using 852dT as a model), when co-cultured with phagocytes, could potentiate TLR8 sensing in phagocytes. The inventors reasoned that unprocessed ASOs or their degradation products could favor R848 sensing of TLR8, on the basis of a recent publication that showed that phagocytosis of apoptotic cells transfected with synthetic PS-modified DNA molecules resulted in phago-lysosomal delivery of the DNA in the phagocytes (Ahn et al., 2018).

Here the inventors transfected HEK cells with 2'OMe ASO3 (non TLR8 potentiating) or 852dT (strongly potentiating TLR8), prior to UV treatment and co-culture with PMA-differentiated THP-1 overnight, before 24 h R848 stimulation (FIG. 15). In this set up, R848 stimulation of co-cultures with ASO3 transfected HEK cells only marginally upregulated TNFα production (2.8 fold), while R848 stimulation of co-cultures with 852dT transfected HEK cells strongly up-regulated TNFα production (>13 fold) (FIG. 15).

These results suggest that the intracellular ASOs in HEKs (or their degradation products), found their way to the endosome of THP-1 cells to result in potentiation of TLR8 sensing.

This observation could have implications in the context of tumor targeting ASOs. As such, bi-functional ASOs with cancer cell killing activity and TLR8 potentiating activity, could also be taken up (or their degradation products) by closely surrounding phagocytes. When stimulated with uridine/R848 site 1 ligands, these tumor phagocytes could end up being strongly activated to promote recruitment of further immune cells, while also favoring MHC presentation of cancer cell peptides they would have engulfed. Critically, tumour phagocytes that are not directly engaged in phagocytosis of dying cancer cells (and do not have endosomal ASO degradation products and cancer epitopes to present) would not be strongly activated by R848.

Example 13: TLR8 Potentiation with Fully 2'OMe ASO

The inventors also tested the capacity of fully 2'OMe-modified ASOs (with no central DNA «gap») to potentiate TLR8. For this, the inventors compared the effect of ASO C2Mut1, and its variants either fully lacking 2'OMe (referred to as C2Mut1-PS), or fully 2'OMe modified (C2Mut1-2OMe). These experiments showed that even in the absence of a central DNA region, this ASO was still significantly potentiating TLR8 (noting that this family of ASOs was not a strong potentiator compared to other sequences) (FIG. 16). Critically these results suggest that fully 2'OMe oligonucleotides can be spontaneously taken up by cells to activate endosomal TLR8, without the need for transfection.

Example 14: TLR7 Inhibition-Modulation by 5'End Motifs

The inventors also tested the mutant sequences (ASO1-UC, LNA ASO2-mut1 and mut2, and ASO 660/ASO 660-Mut) on TLR7 sensing of R848. In accord with their previous finding that 5' terminal CUU motifs were important to limit TLR7 inhibition by 2'OMe ASOs, ASO 660-Mut (lacking its 5' end mCmUmU motif) was significantly more inhibitory than ASO-660 (FIG. 17). Conversely, LNA ASO2 mut2 (also harboring a 5' mCmUmU motif) retained TLR7 inhibition. Addition of a 5'UC motif in ASO1-UC did not alter TLR7 inhibition (while it did strongly increase TLR8 potentiation).

Example 15: TLR7 Inhibition-Modulation by Base Modifications

The inventors have previously observed that ASO2 LNA or 2'MOE variants were strongly inhibiting TLR7 sensing (FIG. 1, Alharbi et al., 2020). To define whether select motifs in LNA or 2'MOE ASOs would preclude TLR7 inhibition, the inventors tested their panels of 91 LNA ASOs, and 76 2'MOE ASOs at 100 and 500 nM, in HEK-TLR7 cells treated with R848 (FIG. 18).

For LNA ASOs, the inventors found that TLR7 inhibition was predominant, with only 85% (78/91) of the ASOs leading to 50% decreased NF-κB luciferase at 500 nM, and 52% (48/91) of the ASOs leading to 80% decreased NF-κB luciferase at that dose. Such TLR7 inhibition was however a bit less frequent than what the inventors observed for 2'OMe, for which >78% of the molecules inhibited TLR7 sensing by 80% fold at 500 nM (FIG. 2—Alharbi et al., 2020).

For 2'MOE, the inventors found 95% (72/76) of the ASOs leading to 50% decreased NF-κB luciferase at 500 nM, and 54% (41/76) of the ASOs leading to 80% decreased NF-κB luciferase at that dose (FIG. 18). Critically, however, a similar to what the inventors saw for 2'OMe, a few select ASOs did not inhibit TLR7 (e.g. A9, H11, D1, H1 for LNA, and G1, C2, C1, A9, A2 for 2'MOE).

The inventors next sought to validate these results in repeat experiments, focusing on the ASOs that did not inhibit TLR7. Specifically, the inventors noted that the LNA ASOs A9, H11, D1, H1 all had a 5'+C+C motif (+denotes LNA modification)-13 and that such motif was absent in all the strong TLR7 inhibitor (i.e. with >75% inhibition at 500 nM). The inventors also included A11, B1 and C11 that inhibited TLR7. Repeat experiments confirmed the trend of the screen, validating that LNA D1 and H11 did not significantly decrease NF-κB luciferase activity (noting that A9 rather slightly increased NF-κB luciferase, and H1 only mildly reduced it) (FIG. 19).

For 2'MOE ASOs, the inventors only ran a single preliminary experiment that confirmed the decreased TLR7 inhibition with G1, A2, C1 and A9 (compared to the other ASO tested which, in this experiment, entirely ablated TLR7 signalling). Importantly, the inventors noted that sequences with single nucleotide increments E1 (665), A2 (666), and G1 (667) exhibited different effects on TLR7. As such, only A2 and G1 2'MOE ASOs had reduced TLR7 activity (suggesting the existence of a motif regulating TLR7 inhibition, similar to what the inventors found for 2'OMe ASOs). While warranting further confirmation, this is of particular interest because the same ASO series made with 2'OMe chemistry differently inhibited TLR7-666 and 667 2'OMe ASOs inhibited more TLR7 than 665 (FIG. 5—Alharbi et al., 2020) (FIG. 19).

Collectively these results confirm that some sequences have the capacity to be less immunosuppressive on TLR7 than others with all three gapmer ASO chemistries.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

All publications discussed and/or referenced herein are incorporated herein in their entirety.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

REFERENCES

Ahn et al., (2018) Cancer Cell 33:862-873
Alharbi et al., (2020) Nucleic Acids Research 48:7052-7065
Al Shaer et al. (2020) Pharmaceuticals (Basel) 13:40.
Bailey and Elkan (1994) Proc Int Conf Intel Syst Mol Biol. 2:28-36.
Bayik et al. (2016) Pharmacol Res. 105:216-225.
Beignon et al. (2005) J Clin Invest. 115:3265-3275.
Chow et al. (2018) J Immunol. 201:3036-3050.
Coutinho et al. (2019) Adv Exp Med Biol. 1157:133-177.
Esposito et al. (2018) Genes 9:529.
Frazier (2015) Toxicol Pathol. 43:78-89.
Gantier (2013) Methods Mol Biol. 942:79-191.
Gantier et al. (2008) J Immunol. 180:2117-2124.
Gantier and Williams (2010) Methods Mol Biol. 623:21-33.
Greulich et al. (2019) Cell 179:1264-1275
Gursel et al. (2003) J Immunol. 171:1393-1400.
Hamm et al. (2010) Immunobiology 215:559-569.
Hope et al. (1998) Molecular Membrane Biology 15:1.
Hornung et al. (2005) Nat Med. 11:263-270.
Jurk et al. (2006) Eur J Immunol. 36:1815-1826.
Kaminski et al. (2013) J Immunol. 191:3876-3883.
Kariko et al. (2005) Immunity 23:165-175.
Kleinman et al. (2008) Nature 452:591-597.
Krieg et al. (1995) Nature 374:546-549.
Lewis et al. (1996) Proc. Natl. Acad. Sci. USA 93:3176.
Pelka et al. (2014) J Immunol. 193:3257-3261
Pepin et al. (2020) mBio. 11.
Schafer et al. (1998) J Biol Chem. 273:2714-2720.
Schmid-Burgk et al. (2014) Genome Res. 24:1719-1723.
Shibata et al. (2016) International Immunology 28:211-222
Steinhagen et al. (2018) Eur J Immunol. 48:605-611.
Tanji et al. (2015) Nature Structural & Molecular Biology 22:109-115
Toloue and Ford (2011) Methods Mol Biol 764:123-130.
Wang et al. (2012) Nucleic Acids Res. 40: D1144-1149.
Yin and Rogge (2019) Clin Transl Sci. 12:98-112.

The invention claimed is:

1. An oligonucleotide, comprising a 5' region comprising at least five modified nucleotides, wherein the 5' end consists of terminal 5'-mUmC-3' or terminal 5'-mCmU-3',
   a middle region comprising a stretch of ten nucleotides wherein each nucleotide comprises a 3'-5' phosphorothioate internucleotide linkage, and
   a 3' region comprising at least five modified nucleotides, wherein each modified nucleotide comprises a 2'-O-methyl sugar and a 3'-5' phosphorothioate internucleotide linkage,
   wherein mU comprises 2'-O-methyl uridine and a 3'-5' phosphorothioate internucleotide linkage, and mC comprises 2'-O-methyl cytidine and a 3'-5' phosphorothioate internucleotide linkage,
   wherein the oligonucleotide is between about 20 and about 50 nucleotides in length, and wherein the oligonucleotide potentiates Toll-like receptor 8 (TLR8) activity.

2. The oligonucleotide according to claim 1, comprising or consisting of a nucleic acid sequence of:

(a)
                                            (SEQ ID NO: 196)
mUmCmCmCmAA*C*T*C*T*T*C*T*A*A*mCmUmCmGmU;

(b)
                                            (SEQ ID NO: 21)
mCmUmCmUmCT*T*T*C*T*G*T*G*G*T*mUmCmCmUmC;

(c)
                                            (SEQ ID NO: 183)
mUmCmUmCmUG*G*T*C*C*A*T*C*C*mCmUmUmCmU;

(d)
                                            (SEQ ID NO: 185)
mUmCmUmCmUC*T*G*G*T*C*C*C*A*T*mCmCmCmUmU;

(e)
                                            (SEQ ID NO: 179)
mUmCmCmCmAT*C*C*C*T*T*C*T*G*C*mUmGmCmCmA;

(f)
                                            (SEQ ID NO: 184)
mCmUmCmUmCT*G*G*T*C*C*C*A*T*C*mCmCmUmUmC;

(g)
                                            (SEQ ID NO: 187)
mCmUmUmCmUC*T*C*T*G*G*T*C*C*C*mAmUmCmCmC;

(h)
                                            (SEQ ID NO: 59)
mUmCmUmCmCA*T*G*T*C*C*C*A*G*G*mCmCmUmCmC;

(i)
                                            (SEQ ID NO: 87)
mUmCmCmAmUC*C*C*T*T*C*C*T*G*T*mUmUmAmGmU;

(j)
                                            (SEQ ID NO: 114)
mUmCmUmUmAmUT*T*G*T*C*T*A*T*T*T*mUmAmUmAmC;

(k)
                                            (SEQ ID NO: 84)
mUmCmAmUmUA*T*A*T*T*T*A*C*T*A*mAmAmGmCmU;

(l)
                                            (SEQ ID NO: 110)
mUmCmAmAmAG*T*A*T*A*T*A*C*T*mGmUmUmUmU;

(m)
(SEQ ID NO: 85)
mCmUmCmAmUT*A*T*A*T*T*T*A*C*T*mAmAmAmGmC;

(n)
(SEQ ID NO: 89)
mUmCmUmUmAT*A*A*T*T*A*T*T*G*C*mAmAmGmUmG;

(o)
(SEQ ID NO: 70)
mCmUmUmCmAC*A*T*C*C*A*G*A*C*mAmGmCmAmA;

(p)
(SEQ ID NO: 99)
mUmCmAmAmUG*G*A*G*A*A*T*A*A*mAmGmCmAmG;

(q)
(SEQ ID NO: 120)
mCmUmUmAmUT*T*T*A*A*G*C*A*T*A*mUmUmAmAmA;

(r)
(SEQ ID NO: 88)
mCmUmUmAmUA*A*T*T*A*T*T*G*C*A*mAmGmUmGmA;

(s)
(SEQ ID NO: 206)
mCmUmUmUmAT*A*T*T*A*C*A*A*A*G*mCmUmAmCmU;

(t)
(SEQ ID NO: 52)
mCmUmUmGmUG*A*A*A*A*G*A*T*T*A*mUmCmUmUmC;

(u)
(SEQ ID NO: 182)
mUmCmUmGmGT*C*C*C*A*T*C*C*C*T*mUmCmUmGmC;

(v)
(SEQ ID NO: 143)
mCmUmGmUmGA*T*C*T*T*G*A*C*A*T*mGmCmUmGmC;

(w)
(SEQ ID NO: 123)
mCmUmCmUmUG*A*A*G*C*A*T*C*G*T*mAmUmCmAmC;

(x)
(SEQ ID NO: 131)
mCmUmUmGmCA*C*G*T*G*G*C*T*T*C*mGmUmCmUmC;

(y)
(SEQ ID NO: 95)
mCmUmUmGmGT*G*T*C*G*G*C*T*G*G*mUmCmAmGmA;

(z)
(SEQ ID NO: 177)
mCmUmUmUmUG*A*A*G*T*G*A*A*G*T*mAmAmAmAmG;

(aa)
(SEQ ID NO: 153)
mCmUmUmUmUG*G*G*A*A*C*G*G*A*C*mUmGmGmUmU;

(ab)
(SEQ ID NO: 149)
mUmCmGmGmCA*T*C*C*A*C*A*C*G*mUmCmGmUmC;

(ac)
(SEQ ID NO: 4)
mUmCmCmGmGC*C*T*C*G*G*A*A*G*C*mUmCmUmCmU;

(ad)
(SEQ ID NO: 19)
mCmUmUmUmAG*T*C*G*T*A*G*T*T*G*mUmCmUmCmU;

(ae)
(SEQ ID NO: 20)
mUmCmCmGmGG*T*C*G*T*A*G*T*T*G*mCmUmUmCmC;

(af)
(SEQ ID NO: 13)
mCmUmUmUmAG*T*C*G*T*A*G*T*T*G*mCmUmUmCmC;

(ag)
(SEQ ID NO: 22)
mCmUmCmUmCT*T*T*T*T*T*T*T*T*mUmUmCmUmC;

(ah)
(SEQ ID NO: 240)
mCmUmGmGmUC*A*T*T*A*C*A*A*T*A*mGmCmUmCmU;

(ai)
(SEQ ID NO: 242)
mCmUmUmCmCA*C*A*A*T*C*A*A*G*A*mCmAmUmUmC;

(aj)
(SEQ ID NO: 243)
mCmUmUmCmGT*G*G*G*T*C*C*T*T*mUmUmCmAmC;
or (ak)
(SEQ ID NO: 250)
mUmCmCmAmAC*A*C*T*T*C*G*T*G*G*mGmGmUmCmC, wherein mU comprises 2'-O-methyl uridine and a 3'-5' phosphorothioate internucleotide linkage, mC comprises 2'-O-methyl cytidine and a 3'-5' phosphorothioate internucleotide linkage, mA comprises 2'-O-methyl adenosine and a 3'-5' phosphorothioate internucleotide linkage, mG comprises 2'-O-methyl guanosine and a 3'-5' phosphorothioate internucleotide linkage, and

* is a 3'-5' phosphorothioate internucleotide linkage.

3. The oligonucleotide according to claim 1, wherein at least two of the nucleotides in the middle region comprise thymidine.

4. The oligonucleotide according to claim 3, wherein at least four continuous nucleotides in the middle region of the oligonucleotide comprise thymidine.

5. The oligonucleotide according to claim 1, comprising
i) 5'-mCmUmUmGmU-3', 5'-mCmUmUmAmU-3', or 5'-mCmUmUmUmA-3' at the 5' end; and
ii) 5'-mCmUmUmCmU-3', 5'-mCmAmUmAmU-3', 5'-mCmUmUmCmU-3', 5'-mAmAmUmUmU-3,' 5'-mAmAmAmUmU-3', 5'-mCmCmUmUmC-3', 5'-mAmAmUmCmA-3' or 5'-mCmGmUmCmU-3' at the 3' end, wherein mU comprises 2'-O-methyl uridine and a 3'-5' phosphorothioate internucleotide linkage, mC comprises 2'-O-methyl cytidine and a 3'-5' phosphorothioate internucleotide linkage, mA comprises 2'-O-methyl adenosine and a 3'-5' phosphorothioate internucleotide linkage, mG comprises 2'-O-methyl guanosine and a 3'-5' phosphorothioate internucleotide linkage.

6. The oligonucleotide according to claim 1, wherein at least one of the following apply;
a) the 5' region comprises three continuous modified nucleotides comprising pyrimidine bases,
b) the 5' region comprises modified nucleotides, and the junction between the 5' region and middle region comprises three continuous nucleotides comprising pyrimidine bases,
c) the 3' region comprises three continuous modified nucleotides comprising pyrimidine bases,
d) the 3' region comprises modified nucleotides, and the junction between the 3' region and middle region comprises three continuous nucleotides comprising pyrimidine bases, and
e) the 5' region comprises two continuous modified nucleotides comprising cytosine.

7. The oligonucleotide according to claim 6 a), b), c) or d), wherein the three continuous nucleotides comprising pyrimidine bases are within seven nucleotides of the 5' and/or 3' end of the oligonucleotide; or
    wherein the three continuous nucleotides comprising pyrimidine bases are at the 5' and/or 3' end of the oligonucleotide.

8. The oligonucleotide according to claim 6,
    wherein the 5' three continuous pyrimidine bases have the sequence 5'-CUU-3', 5'-CUT-3', 5'-CCU-3', 5'-UUC-3', 5'-UUU-3' or 5'-CTT-3'; or
    wherein the 3'three continuous pyrimidine bases have the sequence 5'-UUC-3', 5'-TUC-3', 5'-UCC-3', 5'-CUU-3', 5'-UUU-3' or 5'-TTC-3'.

9. The oligonucleotide according to claim 6, wherein the two continuous cytosine bases comprise a 2'-LNA and a phosphorothioate backbone.

10. The oligonucleotide according to claim 6, wherein at least one of the three continuous nucleotides comprising pyrimidine bases and/or at least one of the two continuous nucleotides comprising cytosine does not hybridize to a target polynucleotide.

11. The oligonucleotide according to claim 6 a), b) c) or d), wherein one, two or all three of the three continuous nucleotides comprising pyrimidine bases are removed by an endonuclease in vivo.

12. The oligonucleotide according to claim 1, wherein the oligonucleotide is between about 20 and about 30 nucleotides, or about 20 nucleotides in length.

13. The oligonucleotide according to claim 1, wherein the oligonucleotide is an antisense oligonucleotide or a double stranded oligonucleotide for gene silencing.

14. The oligonucleotide according to claim 1, wherein the oligonucleotide is a gapmer antisense oligonucleotide.

15. A composition comprising an oligonucleotide according to claim 1 and a pharmaceutically acceptable carrier.

16. The composition of claim 15, which further comprises an immune response modifier.

17. The oligonucleotide according to claim 1, wherein the oligonucleotide does not inhibit TLR7 activity.

18. The oligonucleotide according to claim 1, wherein one or more modified nucleotides comprise a modified base.

19. The oligonucleotide according to claim 1, comprising or consisting of a nucleic acid sequence of mUmCmUmCmUG*G*T*C*C*C*A*T*C*C*mCmUm UmCmU (SEQ ID NO: 183),
    where mU comprises 2'-O-methyl uridine and a 3'-5' phosphorothioate internucleotide linkage,
    mC comprises 2'-O-methyl cytidine and a 3'-5' phosphorothioate internucleotide linkage, and
    * is a 3'-5' phosphorothioate internucleotide linkage.

* * * * *